(12) United States Patent
Zalewski et al.

(10) Patent No.: US 10,848,192 B2
(45) Date of Patent: Nov. 24, 2020

(54) ENERGY AWARE WIRELESS POWER HARVESTING DEVICE

(71) Applicants: Gary M. Zalewski, Piedmont, CA (US); Albert S. Penilla, Sunnyvale, CA (US)

(72) Inventors: Gary M. Zalewski, Piedmont, CA (US); Albert S. Penilla, Sunnyvale, CA (US)

(*) Notice: Subject to any disclaimer, the term of this patent is extended or adjusted under 35 U.S.C. 154(b) by 0 days.

(21) Appl. No.: 16/512,376

(22) Filed: Jul. 16, 2019

(65) Prior Publication Data

US 2019/0363746 A1 Nov. 28, 2019

Related U.S. Application Data

(63) Continuation of application No. 15/217,976, filed on Jul. 23, 2016, now Pat. No. 10,335,730.
(Continued)

(51) Int. Cl.

| H04B 1/38 | (2015.01) |
|---|---|
| H04B 1/3827 | (2015.01) |
| H04W 76/14 | (2018.01) |
| H04W 4/80 | (2018.01) |
| H04W 4/70 | (2018.01) |
| H02N 11/00 | (2006.01) |
| H04L 29/08 | (2006.01) |
| G06Q 30/06 | (2012.01) |
| H04W 84/12 | (2009.01) |
| H04W 88/06 | (2009.01) |

(Continued)

(52) U.S. Cl.
CPC ....... *H04B 1/3833* (2013.01); *G06Q 30/0635* (2013.01); *H02N 11/002* (2013.01); *H04L 67/10* (2013.01); *H04W 4/70* (2018.02); *H04W 4/80* (2018.02); *H04W 76/14* (2018.02); *H04B 1/1607* (2013.01); *H04L 67/12* (2013.01); *H04L 67/125* (2013.01); *H04W 4/50* (2018.02); *H04W 84/12* (2013.01); *H04W 88/02* (2013.01); *H04W 88/06* (2013.01); *Y02D 30/70* (2020.08); *Y02D 70/22* (2018.01); *Y04S 40/18* (2018.05)

(58) Field of Classification Search
CPC combination set(s) only.
See application file for complete search history.

(56) References Cited

U.S. PATENT DOCUMENTS 9,948,902 B1* 4/2018 Trundle .............. H04N 7/183
2011/0260839 A1* 10/2011 Cook ............... G06K 19/0708
340/10.4

(Continued)

*Primary Examiner* — Junpeng Chen

(57) ABSTRACT

Methods and devices are provided. One device includes persistent memory, a microcontroller and a power source configured to generate power in response to ambient energy received at a first frequency during a cycle of energy harvesting. The power is transferred to a power storage cell such that when the power storage cell has an amount of power the microcontroller performs processing. The microcontroller selects and runs code routines based on the power available and stores associated state data into the persistent memory. During one or more additional cycles of energy harvesting, the device uses the generated power to retrieve state data from persistent memory and continue processing. The processing is related to assembling a payload and to process a wireless transmission of a payload over a second frequency.

31 Claims, 52 Drawing Sheets

Related U.S. Application Data

(60) Provisional application No. 62/197,003, filed on Jul. 25, 2015, provisional application No. 62/387,403, filed on Dec. 24, 2015.

(51) Int. Cl.
  *H04W 4/50* (2018.01)
  *H04B 1/16* (2006.01)
  *H04W 88/02* (2009.01)

(56) References Cited

U.S. PATENT DOCUMENTS

| | | | |
|---|---|---|---|
| 2013/0121176 A1* | 5/2013 | Addepalli | H04L 67/12 370/252 |
| 2015/0249787 A1* | 9/2015 | Hall | G06F 9/4416 348/372 |
| 2017/0025857 A1* | 1/2017 | Matthews | H02J 50/40 |

* cited by examiner

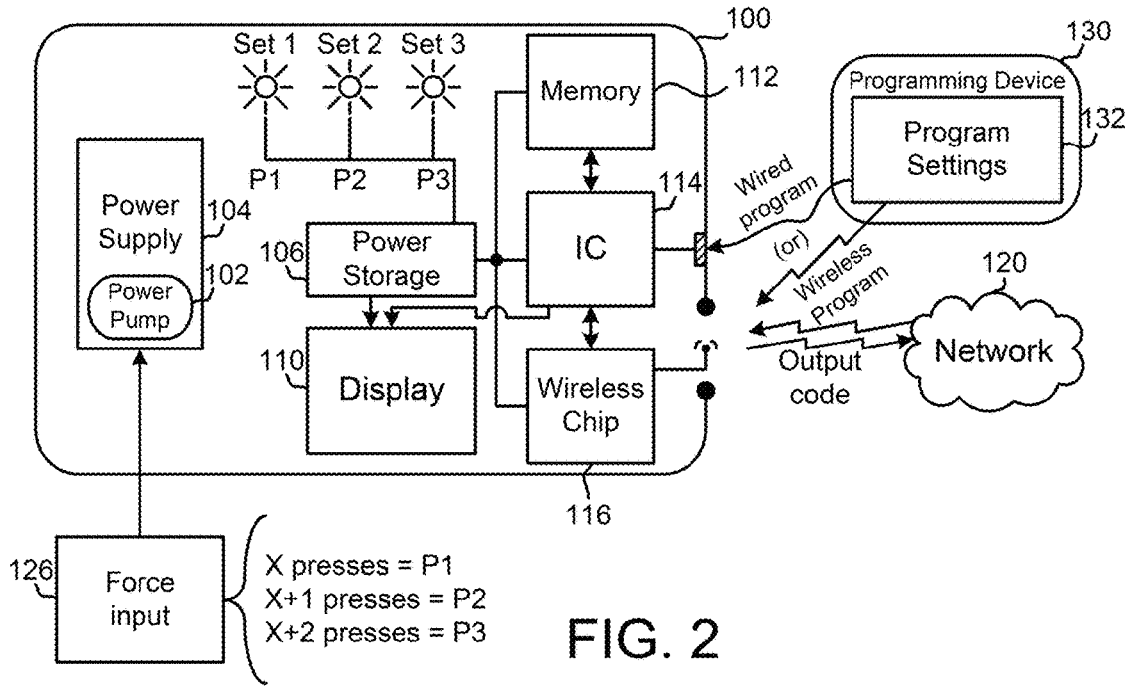

FIG. 2

Program Settings (User configurable or 3rd Party Set)

Set 1 = (Message) = Request help or Send to email/text or Provide location

Set 2 = (Message) = I am OK or Send to email/text or Provide location

Set 3 = (Fetch message) = message service or get news, or get password

Set 4 = Send data code, or send biometric data, or request authorization

Set 5 = Request data, or receive advertisement, or receive coupon, or discount

Set 5 = Post to social media, or post picture, or message social media, or discover local friends, or post a picture to a stream, or request help, etc.

FIG. 3

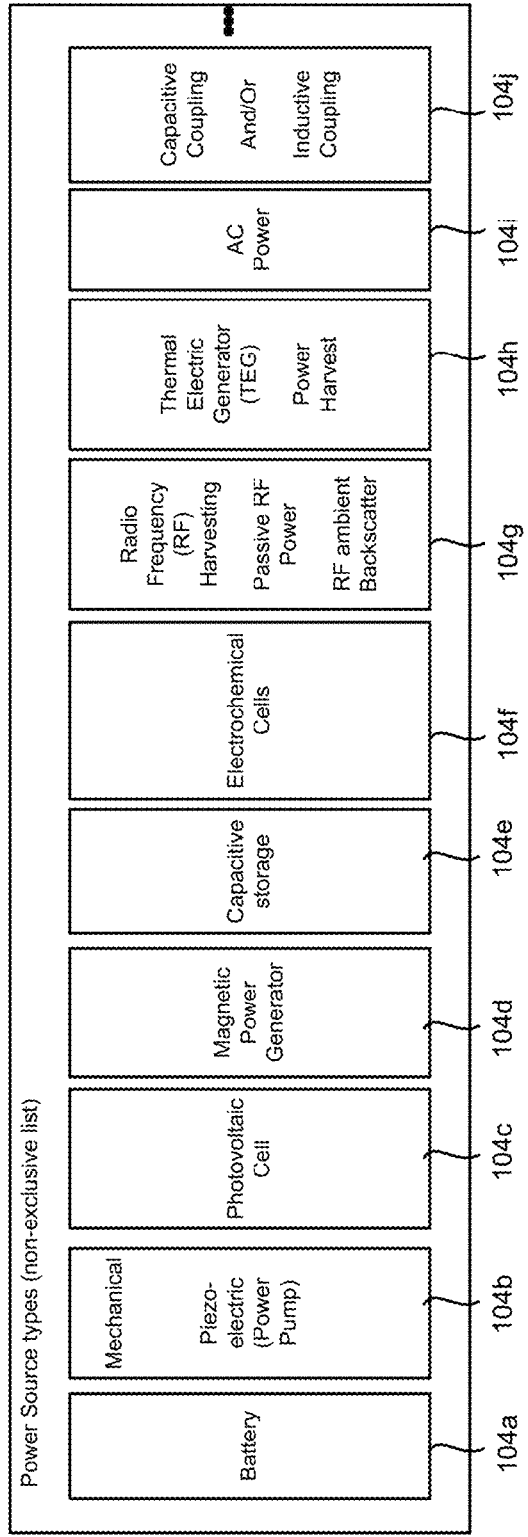
FIG. 5A
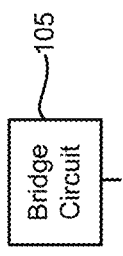
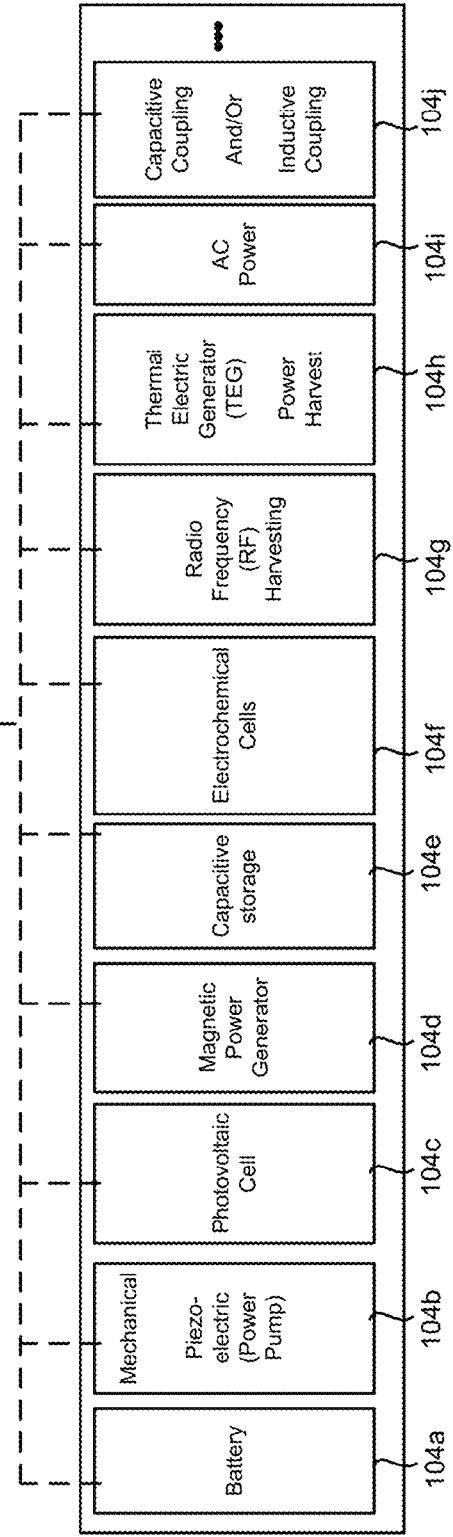
FIG. 5B

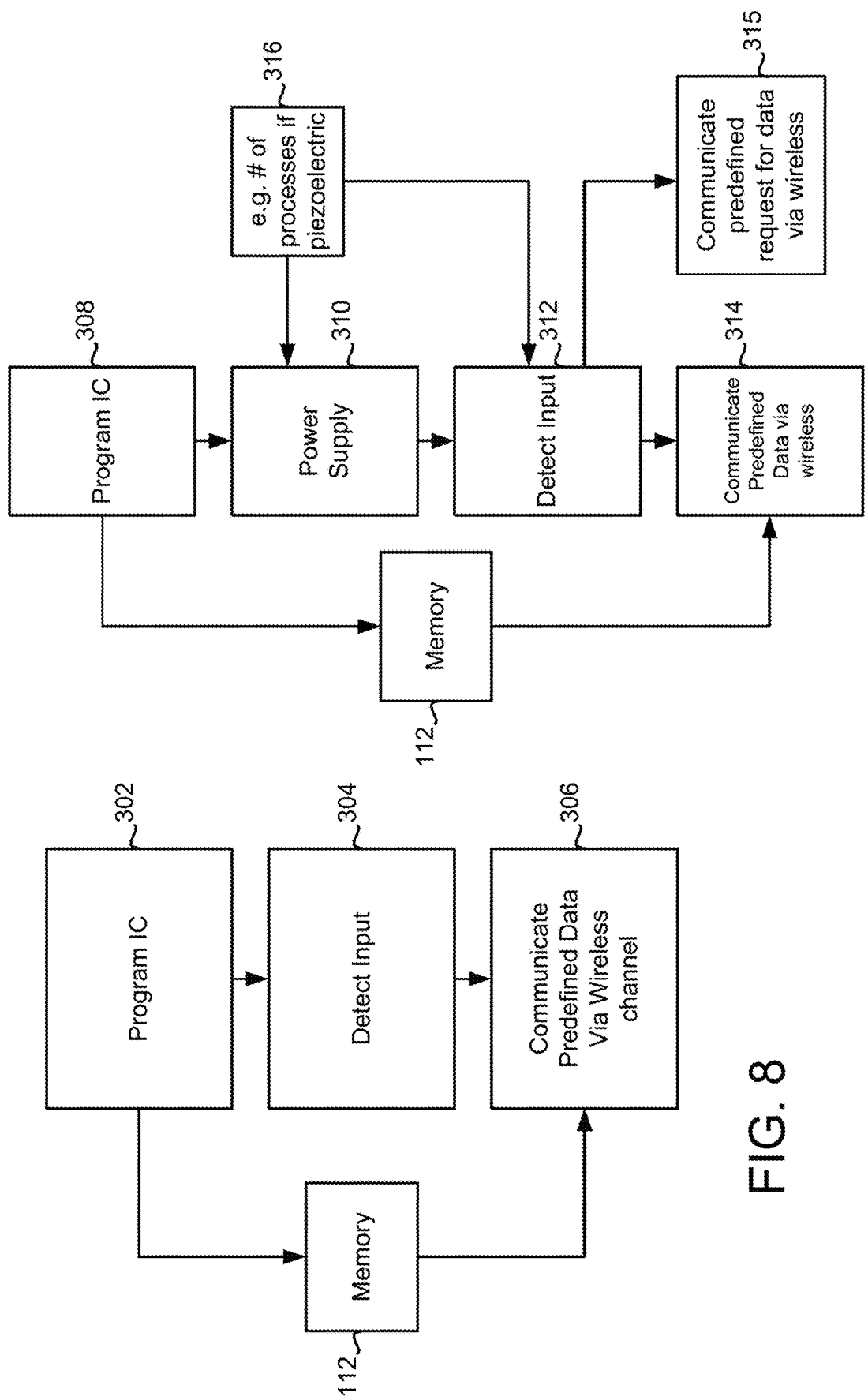

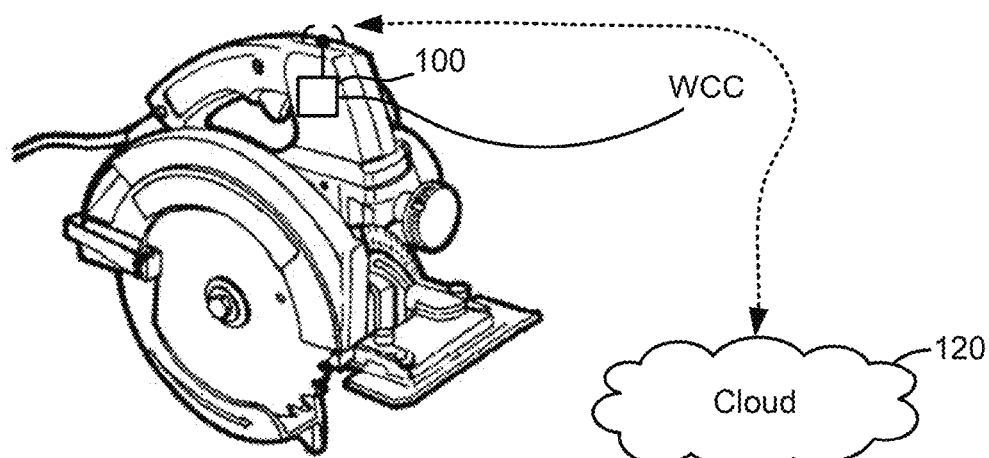
FIG. 26A
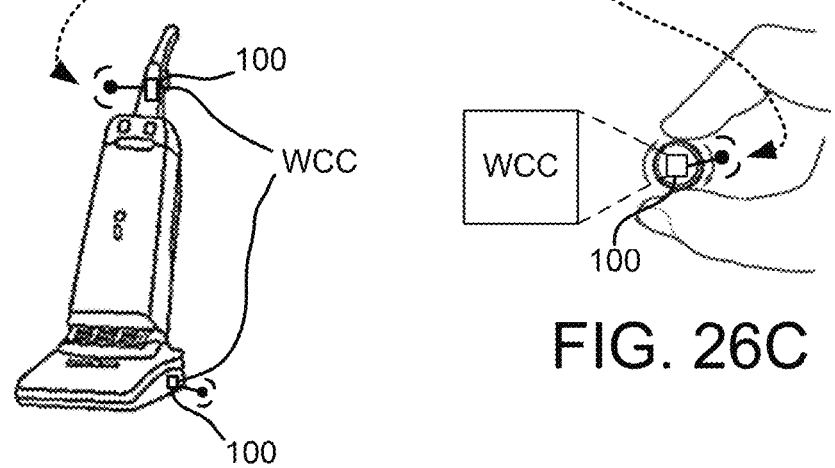
FIG. 26B
FIG. 26C
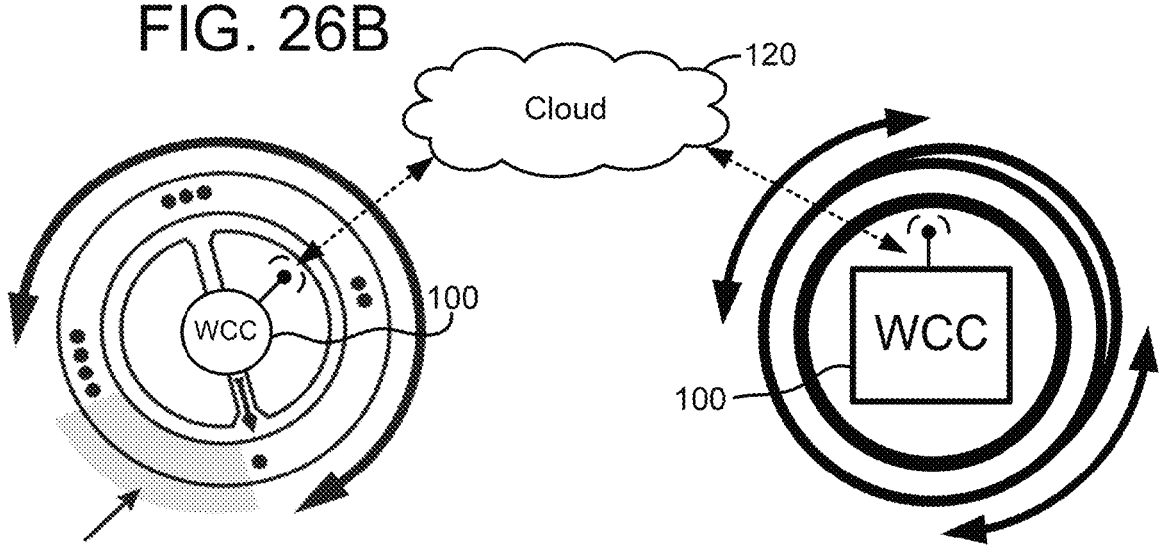
FIG. 26D
FIG. 26E

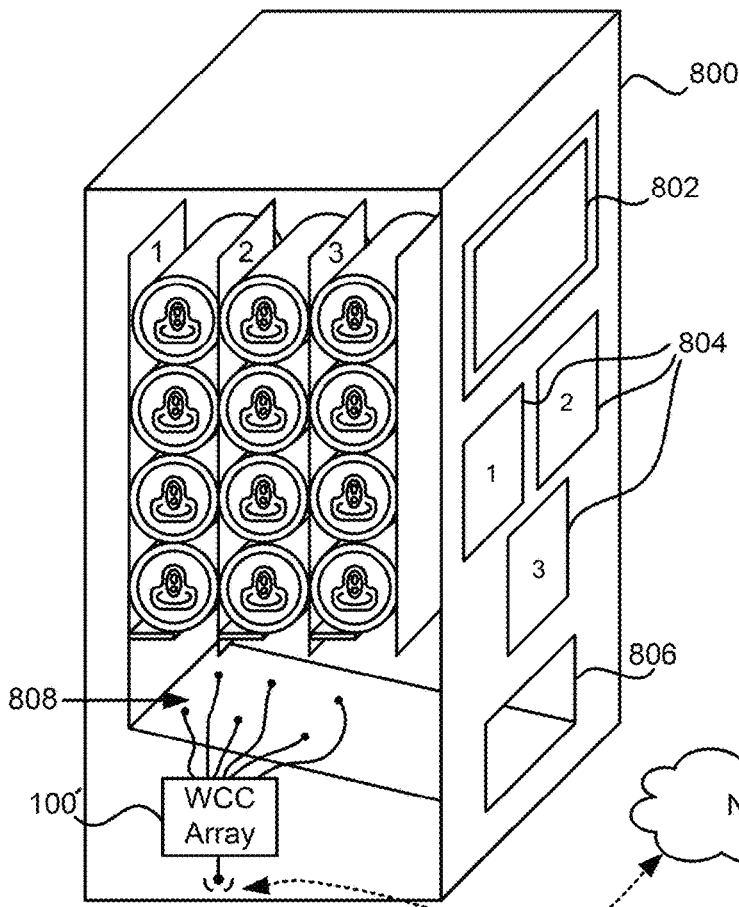
FIG. 28
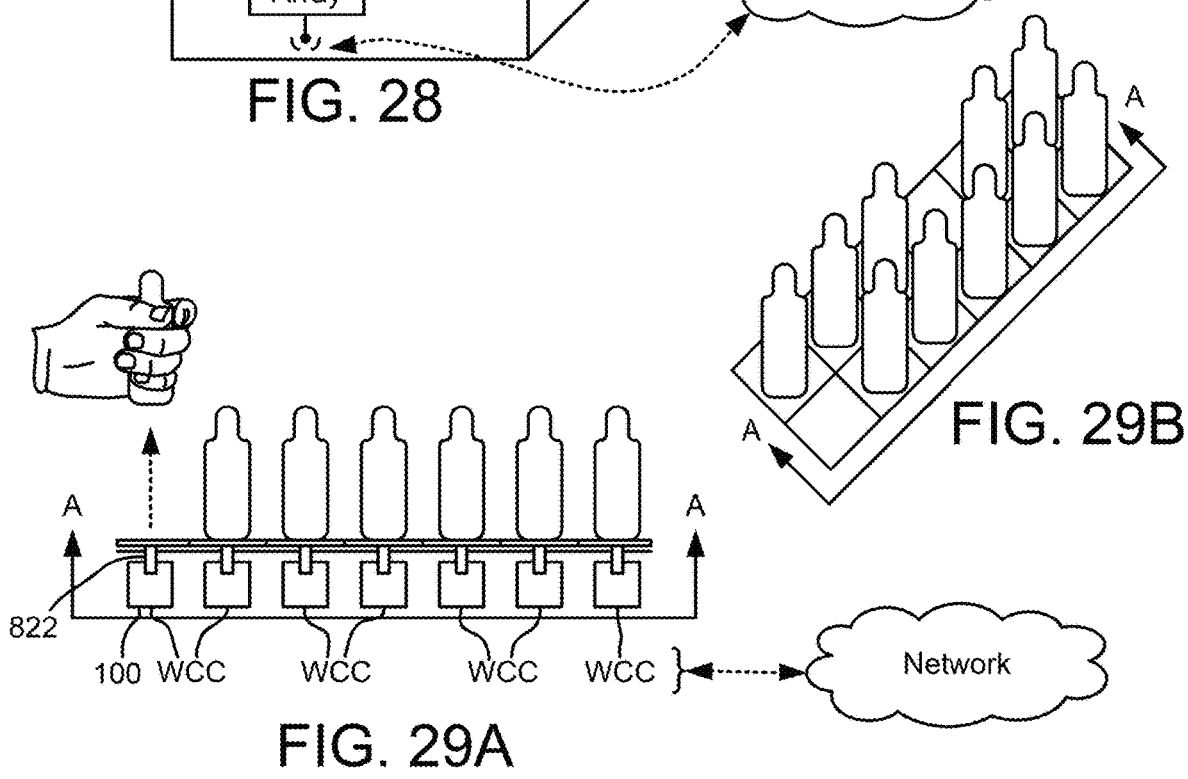
FIG. 29A
FIG. 29B

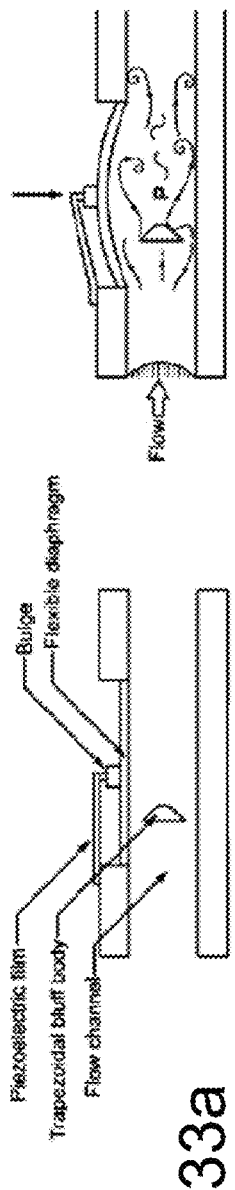
FIG. 33a
FIG. 33b
FIG. 33c
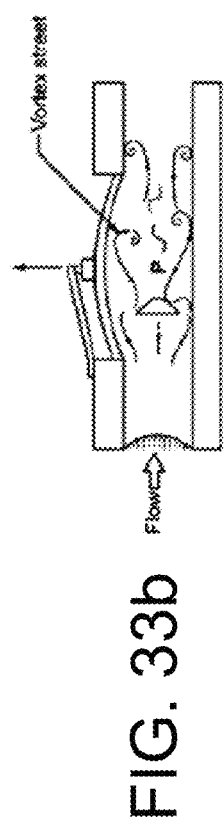
FIG. 33d
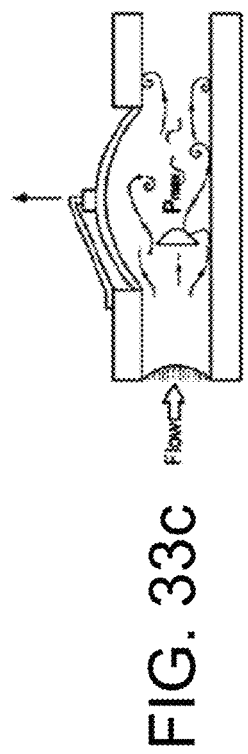
FIG. 33e

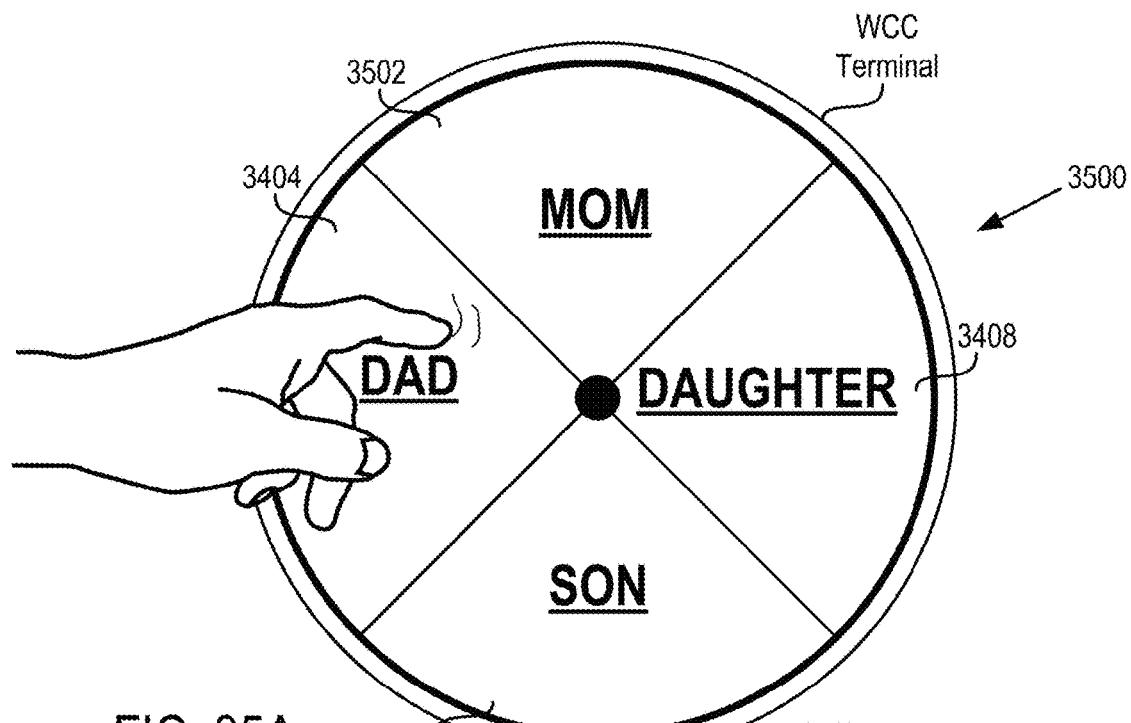
FIG. 35A
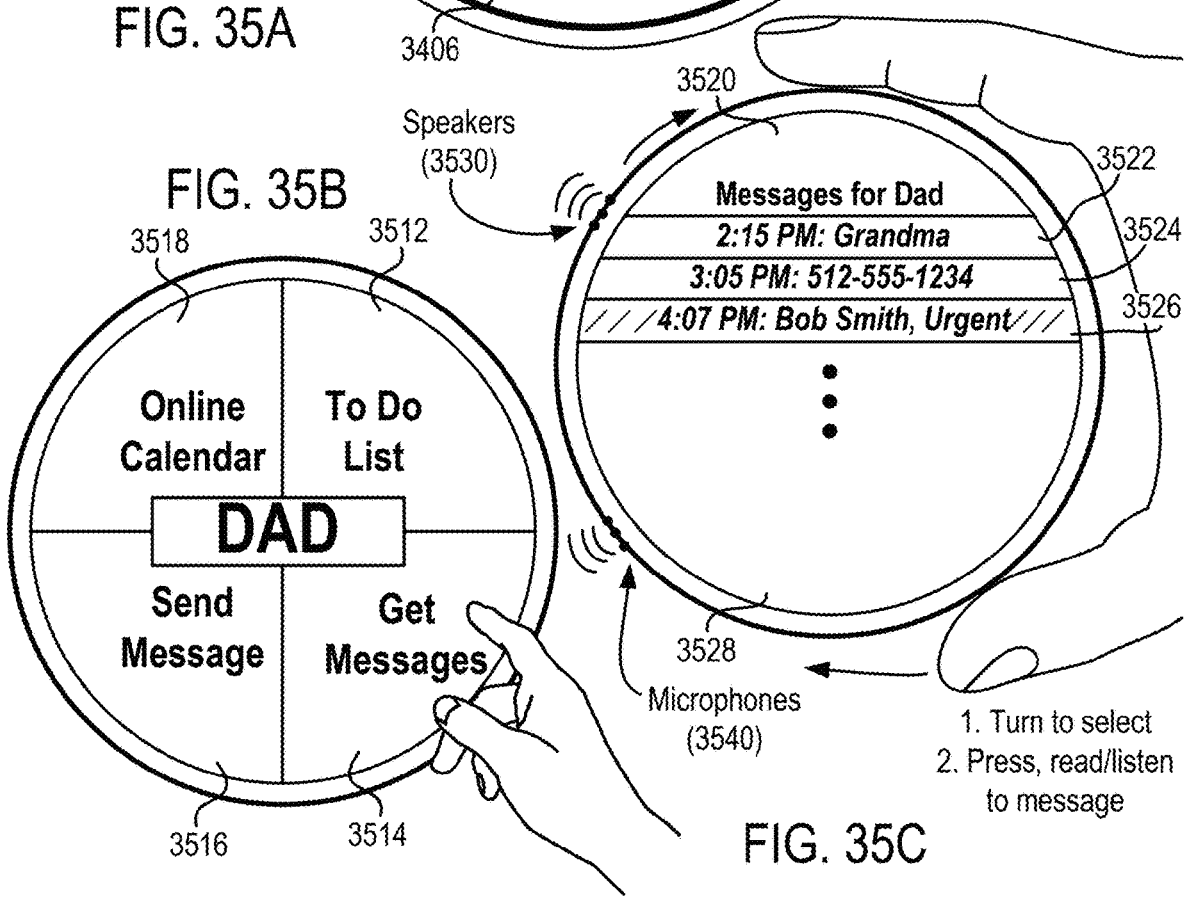
FIG. 35B
FIG. 35C

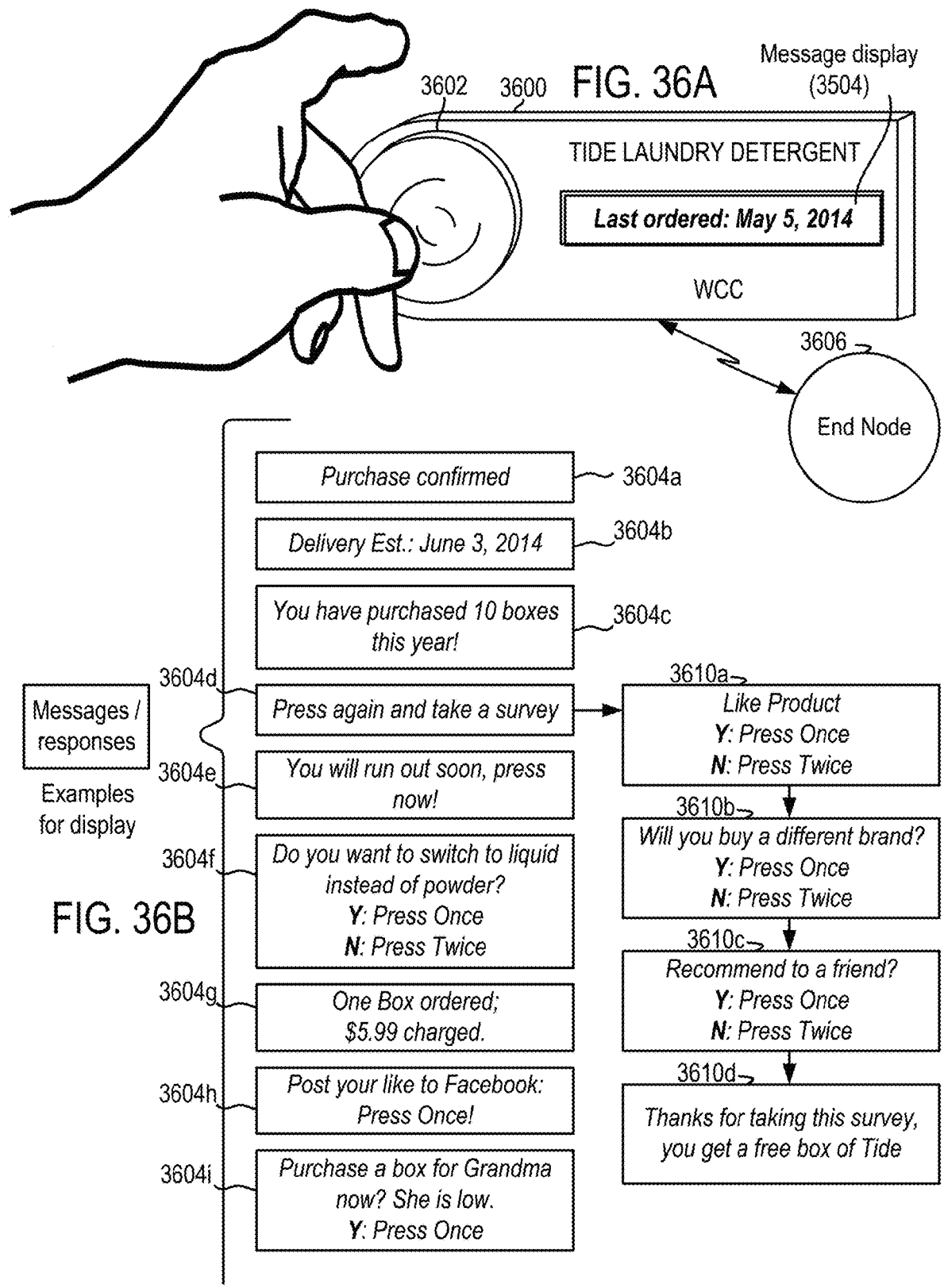

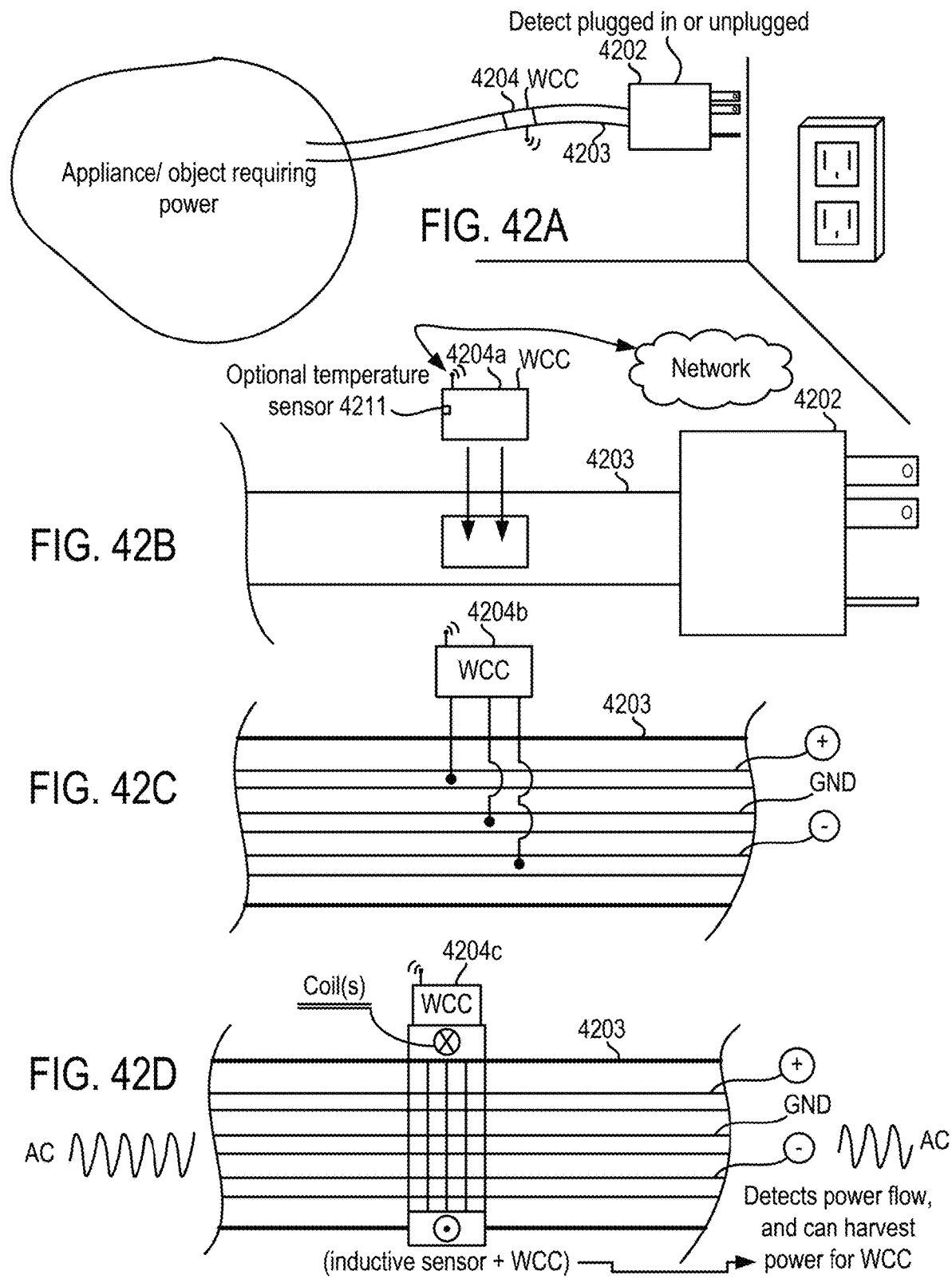

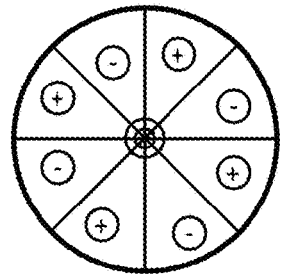
*Increased gearing, more pump per rotation
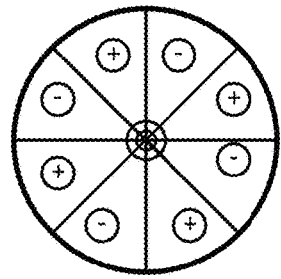
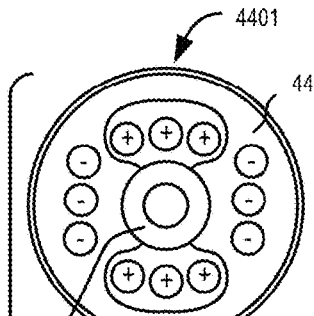
FIG. 44A
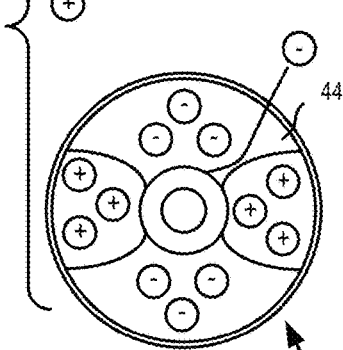
FIG. 44B
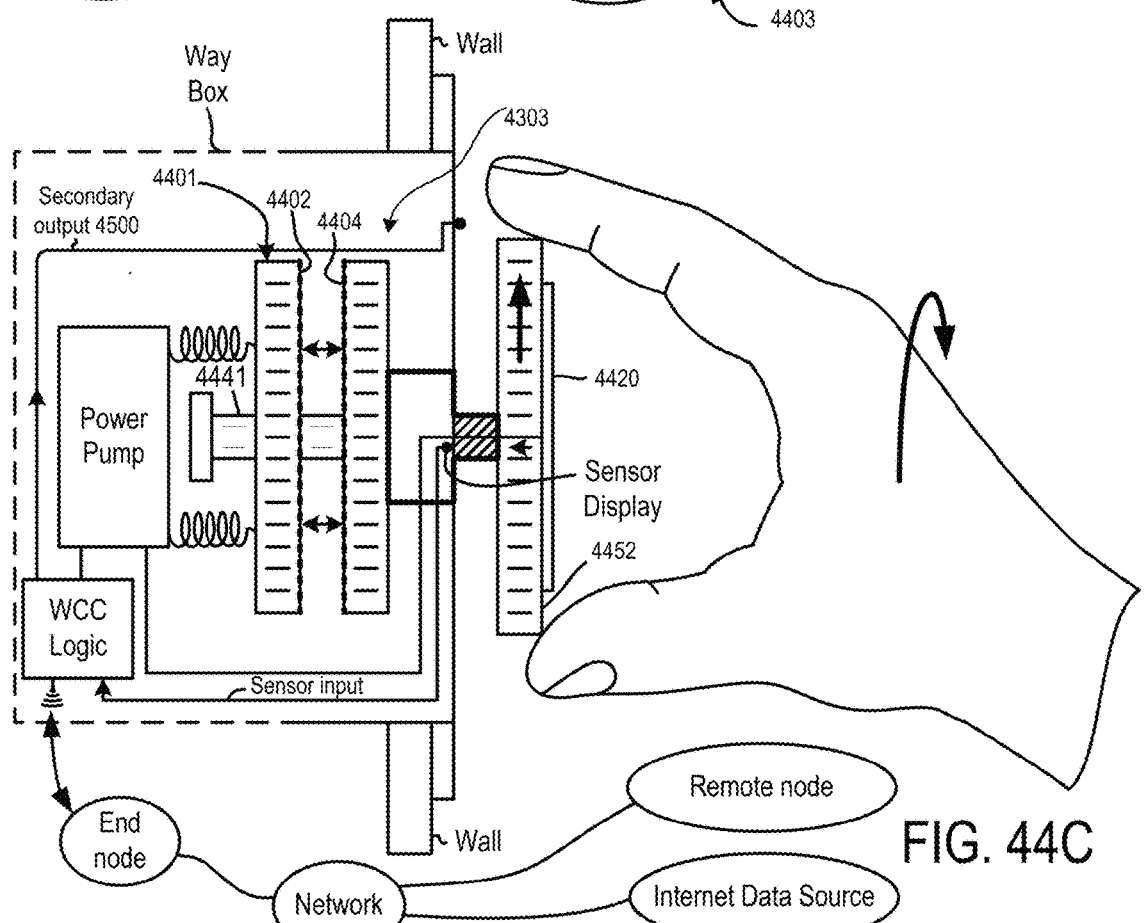
FIG. 44C

ENERGY AWARE WIRELESS POWER HARVESTING DEVICE

CLAIM OF PRIORITY

This is a continuation of U.S. patent application Ser. No. 15/217,976, entitled "WIRELESS CODED COMMUNICATION (WCC) DEVICES WITH ENERGY HARVESTING POWER SOURCES FOR PROCESSING INTERNET PURCHASE TRANSACTIONS," which claims priority from U.S. Provisional Patent Application No. 62/197,003, filed on Jul. 25, 2015, and entitled "WIRELESS CODED COMMUNICATION (WCC) DEVICES AND METHODS, SYSTEMS, DEVICES USING OR IMPLEMENTING WCC DEVICES," and also claims priority from U.S. Provisional Patent Application No. 62/387,403, filed on Dec. 24, 2015, and entitled "SIGNALING SYSTEMS FOR WIRELESS CODED COMMUNICATION (WCC) DEVICES AND CONNECTED DEVICES," which are both incorporated by reference for all purposes.

CROSS-REFERENCE TO RELATED APPLICATIONS

This application is related to:

(1) U.S. patent application Ser. No. 15/217,973, filed on Jul. 23, 2016, entitled "Wireless Coded Communication (WCC) Devices with Energy Harvesting Power Sources used in Switches,"

(2) U.S. patent application Ser. No. 15/217,974, filed on Jul. 23, 2016, entitled "Wireless Coded Communication (WCC) Devices with Energy Harvesting Power Sources for Processing Biometric Identified Functions,"

(3) U.S. patent application Ser. No. 15/217,975, filed on Jul. 23, 2016, entitled "Wireless Coded Communication (WCC) Devices with Energy Harvesting Power Sources for WiFi Communication,"

(4) U.S. patent application Ser. No. 15/217,972, filed on Jul. 23, 2016, entitled "Wireless Coded Communication (WCC) Devices with Energy Harvesting Power Sources For Processing Internet Purchase Transactions,"

(5) U.S. patent application Ser. No. 15/217,977, filed on Jul. 23, 2016, entitled "Wireless Coded Communication (WCC) Devices with Energy Harvesting Power Sources For Monitoring State Data of Objects," which are all incorporated herein by reference.

FIELD OF THE EMBODIMENTS

Embodiments are described regarding devices that transmit data, including those that may also sense input, produce output, receive, process and exchange data with end-nodes or networks of end-nodes.

BACKGROUND

Over the years, there has been much advancement in the area of processing devices and devices that communicate over networks. For example, electronic devices are typically designed for specific applications. Some devices are more versatile, such as the common day smartphone or general purpose computers. These devices, although versatile and sometimes powerful, require network connections to send and receive data. Network connections, for example, are those provided by internet service providers (ISPs). Such connections can be obtained for private use, e.g., homes and businesses, and some can be obtained in public places. In either form, users are required to setup connections or initiate connections, e.g., to the Internet, via their devices and interfaces, before access is enabled.

As a result, devices provided with network access to exchange data must contend with setup procedures for obtaining access, must provide interfaces for managing setups, and must also provide sufficient power to process data and perform the communication. These typical requirements are, unfortunately, impediments to the simplification of devices that could benefit from data exchanges over networks.

It is in this context that a need is present for embodiments described in this disclosure.

SUMMARY

Embodiments are described with reference to devices integrated with a wireless communication chip and integrated power generating or delivering device. In one embodiment, these devices are referred to herein as wireless coded communication (WCC) device. Such devices are configured to harness power to cause or enable activation of a communication device to transmit data. The data can be pre-configured or coded to report occurrence of an event, log an event, log state, cause an action, and send a message or request data from one or more end nodes. In some embodiments, the devices enable communication over a wireless network, which enables access to the Internet and further enables cloud processing on data received or processing for data returned or communicated.

Broadly speaking, a WCC device is one that has or is coupled with a wireless transmission capability (e.g., a transmitter, a transceiver, Wi-Fi chip, Bluetooth chip, radio communication chip, etc.), and a power pump or a power supply.

In one configuration, a power pump device is configured to receive a force or movement input from a user or object. The force can be a direct force that is intentionally input by the user, e.g., by pushing a button, moving a slider, lifting a tab, shifting a lever, etc. Another type of force is an indirect force, which is one that the user is not intending to provide. Instead, force is created when the user moves, opens, lifts, shifts, closes, or somehow changes the position or orientation of a physical object.

For example only, a physical object may be a door, and closing of the door is the intent of the user. The indirect force of closing the door is then, in one embodiment, transferred as force to a WCC device. As such, even though the user did not have intent to provide input or force to the WCC device, the WCC device received the force. In the case of a battery operated WCC, the WCC device could also receive the input indirectly. That is, when the door is closed, an input trigger or sensor can be set or impacted or triggered, and this input to the WCC device is incidental. The input is then used to activate a process of the WCC device and to automatically transmit data or request data wirelessly over a network.

In one embodiment, if the WCC device uses a power pump, the force or physical pressure or movement received can be imparted or communicated to a mechanically flexible device or element. In one embodiment, the flexible element may be a piezoelectric device. A piezoelectric device is one that can produce a voltage when the force or movement is imparted to it, and the result is that a voltage is produced. That voltage can be harvested and stored to a storage device. In one embodiment, the storage device can be capacitive storage device (e.g., a capacitor). In other embodiments, the storage device can be a battery or a rechargeable battery cell or cells. In one implementation, if the storage device is a capacitive storage device, the device will serve as the power source to an integrated circuit of the WCC device.

In one embodiment, the integrated circuit can be programmed to communicate data or a code or a message to an end node. The end node can store the received data or perform an action, e.g., based on pre-programming.

In one embodiment, the device is a wireless coded communication (WCC) device. The WCC device, in one configuration, is passive, in that the device is not connected to active power (e.g., a battery or power plug). However, once a force, e.g., mechanical force is applied to the power pump of the WCC device, the WCC device is activated for a period of time sufficient to process and transmit coded data to the end point or end-node. In some embodiments, a WCC can be programmed with more than one method or function to perform. For example, the selection of the method or function can be based on a pre-activation setting. In other cases, a method is automatically selected based on the power available. If more power is available, methods that require more power are performed. In certain embodiments, an input feature such as a selection control, switch, slider, touch pad, may be coupled to the WCC, which generate a payload. The payload may be transmitted remotely to an end node or processed by the WCC locally or both in part or whole.

In some implementations, functions may be selected and triggered according to results of processing of the payload before, during or after transmission of the payload. In certain embodiments, the WCC includes the capability to detect or image the identity or attribute of a user, a biometric signature, a fingerprint, a voice, a sound, a scene, an object position, QR code, RFID code, barcode, status, temperature, pressure, absence or presence of conditions, environmental condition, vibration, and any signal or source coupled to, near or within sensing range of one or more sensors coupled to, or integrated with, a WCC device.

In other embodiments, devices, systems, and method are provided. One such device is a wireless coded communication (WCC) device, which may be configured for wireless communication with other devices, e.g., over a network. A WCC device is a type of internet of things (JOT) device that can sense data, process data, send data, respond to data requests and exchange data with other WCC device, a network device, a user device, and/or systems over the internet. In some configurations, a WCC device may include a power source that enables usage of low power, e.g., to send data that is sensed, request data and/or communicate data wirelessly. WCC devices maybe function as standalone devices or may be integrated into other devices. In some configurations, a WCC device may include power harvesting circuitry. A WCC device may be pre-configured or coded to report occurrence of an event, log an event, log state, cause an action, and send a message or request data from one or more end nodes. In some configurations, the devices enable communication over a wireless network, which enables access to the Internet and further enables cloud processing on data received or processing for data returned or communicated.

BRIEF DESCRIPTION OF THE DRAWINGS

The invention may best be understood by reference to the following description taken in conjunction with the accompanying drawings.

FIG. 2 illustrates another example implementation of a WCC device, in accordance with one embodiment.

FIG. 3 illustrates an example of program settings, in accordance with one embodiment.

FIG. 5A illustrates an example of different types of power sources, which are nonexclusive of other types that are possible, in accordance with some embodiments.

FIG. 5B illustrates an example of a bridge circuit, in accordance with some embodiments.

FIG. 8 illustrates an example where a WCC device can be programmed, in accordance with some embodiments.

FIG. 9 shows another example of receiving program in the IC in operation, in accordance with some embodiments.

FIGS. 26A-26E illustrate various examples of WCC devices that can be integrated into various objects or things, in accordance with some embodiments.

FIG. 28 illustrates an example of a vending machine, which may have a screen, selection input buttons, a slider for dispensing, and multiple sensors, in accordance with one embodiment.

FIGS. 29A-B illustrate examples of retail objects that may be stored on shelves, such as store shelves, in accordance with some embodiments.

FIGS. 33A-33E illustrates another embodiment for use of WCC device, in accordance with some embodiments.

FIG. 35A-35C illustrate examples of a WCC terminal, with a display screen and an outer shell that can be rotated, while leaving the screen in its present nonmoving position, in accordance with some embodiments.

FIG. 36A as an example of the WCC device, which can be used to order goods or services, in accordance with some embodiments.

FIG. 36B illustrates an example of various types of messages and or responses that can be displayed or presented to the user in the message displayed, in accordance with some embodiments.

FIGS. 42A-42G illustrate examples of WCC devices used in the context of power cords, in accordance with some embodiments.

FIGS. 44A-44E show examples of a control knob, housing, dial, terminal and/or structure that maybe provided for user interfacing, in accordance with some embodiments.

DETAILED DESCRIPTION

Figure 1A:
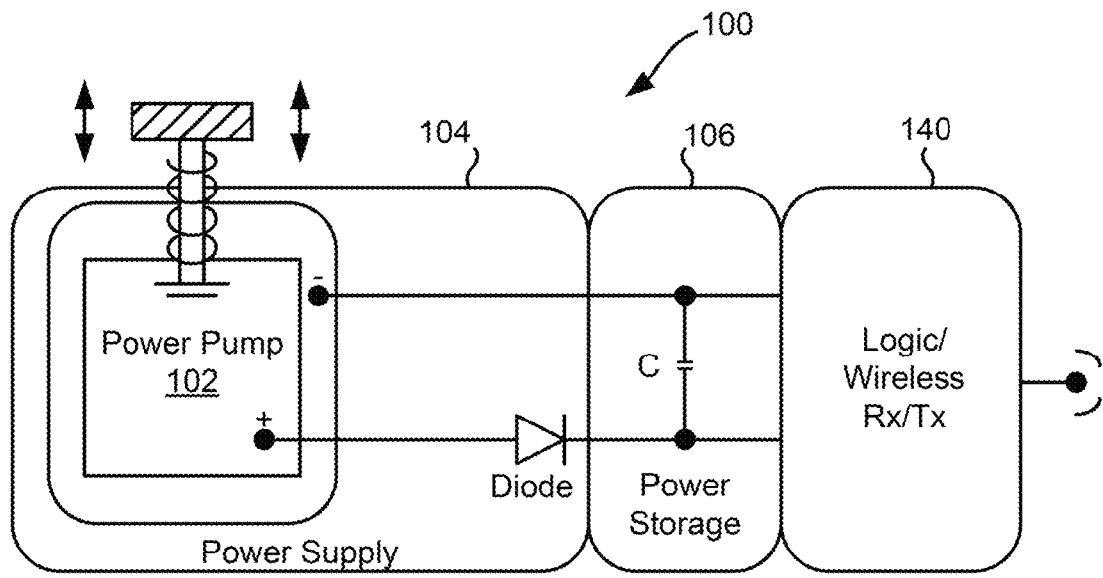
FIG. 1A illustrates one example embodiment of a WCC device, in accordance with one embodiment.

Embodiments are described for devices that can receive input, respond to or process, the input and then transmit data wirelessly to an end node. These devices are portable, and depending on whether the device is configured for energy harvesting or is powered by a power source, these devices are portable and are capable of being integrated into any type of physical configuration. The configuration can be a device that is dedicated to receive input and send data wireless upon receiving the input. In some embodiments, the device can be integrated into physical objects, such that movement, changes in state, or changes in orientation of such physical objects triggers or causes sensing of data, position, state or location information that is then processed locally in the device or transmitted as raw data wirelessly to an end node. The end node may be another local device or may be a device that is part of a network. In one embodiment, the end node may be coupled to a network. In some embodiments, the end node may be another wireless device or a server that is part of a cloud system having access to the Internet.

As will be described in greater detail below, the devices are in some embodiments configured or paired to communication with specific network devices, which in turn provide access to the Internet. In other embodiments, the devices may connect to an ad-hoc network, such as a wireless mesh network, or other wireless network to enable access to the Internet. The data sensed, captured, and processed by these devices can then be received by the end nodes, and based on the coded data sent to the end node, the end node can act to save the data, send the data to another device, use repeater nodes to transmit the data to other processing nodes/servers/devices, and or act in relaying the data to specific individuals (e.g., messages) and or request data from individuals or services connected to the Internet.

As noted above, these sensing devices with integrated or accessible wireless communication may be referred to as wireless coded communication (WCC) devices. A WCC device, in one embodiment, is one that has or is coupled with a wireless chip (e.g., a Wi-Fi chip, Bluetooth chip, transmitter, transceiver, radio or communication chip, etc.), and a power pump or a power supply.

In one embodiment, WCC devices may engage in pre-determined methods and functions, and methods and functions that are particularly selected based on the state of the WCC, its inputs and level of pump power that may be detected during an activation cycle.

In one configuration, a power pump device is configured to receive a force or movement input from a user or object. The force can be a direct for that is intentionally input by the user, e.g., by pushing a button, moving a slider, lifting a tab, shifting a lever, etc. Another type of force is an indirect or incidental one, which is one that the user or object is not intending to provide. Instead, force or input sensed is created when the user or object moves, opens, lifts, shifts, closes, or somehow changes the position of a physical object. For example only, the physical object may be a door, and closing of the door is the intent of the user. The incidental force of closing the door is then, in one embodiment, transferred as force to the WCC device. As such, even though the user did not have intent to provide input or force the WCC device, the WCC device received the force or input. In the case of a battery operated WCC, the WCC device could also receive the input incidentally. That is, when the door is closed, an input trigger or sensor can be set or impacted or triggered, and this can input to the WCC device that is incidental. In other embodiments, WCC devices may be hybrid devices that have both power pumps to enable energy harvesting and also a battery or rechargeable storage cell, or hybrid devices that use have power pumps to enable energy harvesting for use of activation of a WCC device that is contained in a device that has a dedicated or plug-in AC power source.

In one embodiment, WCC can store or save or receive programmed instructions. In one embodiment, a WCC device is defined to include a wireless chip, a memory interfaced with the wireless chip, a power storage cell, a logic chip and a power pump. The logic chip may be interfaced with or part of the wireless chip and is coupled to or includes a memory, and the power storage cell. The memory is programmed with at least one predefined function that is executed by the logic chip. The logic chip may be configured to trigger execution of the predefined function or may trigger execution of any function stored in memory, to engage or continue processing. The execution of the function may occur upon detecting a threshold amount of power in the power storage cell. The power pump is configured to generate power in response a mechanical force applied to an element of the power pump. The power is transferred to the power storage cell such that when the power storage cell has reached or has reached a stable threshold amount of power the logic chip executes the predefined function.

The WCC may operate on pre-programmed instructions or instructions that are dynamically loaded into the WCC device, or on a combination of both. The memory is configured to be programmed to cause generation of data, e.g., output code, payload. In one specific example, the memory can be programmed locally by a device, e.g., a phone or computing device. In the example of a phone, the phone may have an APP (application) that allows the user to program the device to perform an action, record actions, store a history, send a message, report a state, confirm a state, log state changes, or request data from an end node, etc.

In one embodiment, a WCC device is a special purpose WCC device that performs the same instructions, same tasks in the same order, each time upon receiving activation power (e.g., enough power that meets a given threshold level). In another embodiment, the WCC device performs different functions based on a state of the WCC device. The current state of a WCC device may be based on prior activity of the WCC device, and the WCC device may operate in a persistent manner or may save all or part of state data, including sensed data, user controls, settings, payload history, etc., in information in memory.

In some embodiments, multiple WCC devices may be applied to different objects, and coded communication from the multiple WCC devices may be received by a selected end node. For instance, a user may establish a server that receives the communication. In another embodiment, the user may associate WCC devices to a cloud service, wherein the cloud service enables access from any device to see status communicated by the multiple WCC devices. In still other embodiments, WCC devices can communicate with other WCC devices. The communication among the WCC devices may occur prior to at least one of the WCC devices sending data to an end node, which may identify interaction patterns among the WCC devices.

In one example, WCC devices may be used for tracking packages (e.g., commercial carrier packages or personal packages). Packages that are stacked or moved around can cause forces to be applied to an input of the WCC devices, which in turn harvests power. The power will power a microcontroller of the WCC device to trigger communication by a wireless chip of the WCC device. In other embodiments, a WCC device may have its own power source, e.g., such as a battery. The communication can be among multiple packages, e.g., such as communication to verify that all packages are present or all packages are present in a specific geolocation. In some embodiments, WCC devices can be associated as a group, and group data from the WCC devices can be received by an end node, e.g., a server or a computer or some device connected to a network.

Tracking can be associated to more than just packages, for example, tracking can extend to parts used to build things, such as homes, offices complexes, roads, computers, towers, automobiles, etc. The tracking can also be used by people, e.g., such as to track employees entering into restricted areas, tracking computers of employees, tracking devices, tracking employee badges, tracking use of things, tracing movement of things, absolute or relative positioning of things, etc. Again, the WCC devices are configured to communicate coded information, and the information communicated depends on a predefined coding set at each WCC device. Further, it should be understood that state is not the only type of communication a WCC device can do, and the coded information can further include sending data, sending messages, requesting data, paring with other devices, sending packets, sending payloads, sending IP addresses, relaying data or packets, receiving data for display on a local screen, etc.

In another embodiment, the WCC device performs different functions based on the environment surrounding the WCC device and/or depending on the type of communication being sent or received by the WCC device. For example, the WCC device may perform different functions for one user that is different than for another user, based on, for example, a detected user identity (i.e., biometric ID, password ID, code ID, gesture ID, etc.) or condition. In another embodiment, the WCC device performs different functions based on the state of user input selection. In another embodiment, the WCC device performs different functions based on a level of power available. In other embodiments, the WCC device may select and traverse code routines based on permutations of the above in whole or part.

WCC device may initialize its state each activation cycle, perform a known start state and perform initial function upon boot or activation, continue performance of a previously started function, repeat performance of a function, or perform a new function. The WCC device may also operate in a persistent manner. In a persistent operation, the WCC device is able to store state data between activation cycles, including activation cycles in devices that exclusively use mechanical energy harvested, e.g., from a piezoelectric element.

In some embodiments, applications are hosted on servers, to provide access to applications (e.g., mobile APPs or websites), which receive communication related to output from WCC devices. In one embodiment, a cloud system can include one or more processing servers, which may be distributed. The cloud systems can include network storage for storing user accounts. The user accounts can be associated with users that may access services that are responsive to input or data received from WCC devices. The cloud systems, in one embodiment, can be an end node. An end node, for example, is a processing system or unit that executes program instructions for generating data, e.g., in response to input received from the WCC devices or multiple WCC devices. In other embodiments, the cloud system is configured to interface with APPs executed on smart devices, such as smartphones, tablets, laptops, computers, smart watches, and other internet connected devices or things. In one configuration, a WCC device with associated with a physical object, may make the use of that physical object an Internet connected thing. Each physical object associated with a WCC device may be thought of as a thing, such as those commonly referred to as "Internet of Things (IoTs)".

There are many examples of physical objects that the WCC device can be integrated into, coupled to, or interfaced with. One example is a thermostat wheel with a WCC device, such that rotating wheel encodes instruction data. In this example, a thermostat can include a rotating wheel that, when rotated, is causing mechanical forces that are transferred to the power pump of the WCC device. The power is stored, in one embodiment, in a storage cell. The power stored is used by the device, for example, to illuminate a screen. On one embodiment, the screen can be a low power consuming screen. For example, the screen can be an e-ink screen, which once illuminated remains illuminated with displayed data without further power consumption. In some embodiments, once the wheel is turned to the setting, e.g., temperature, the button is pressed or the entire wheel is pressed. The pressing (or also the turning) of the wheel further activates the power pump, which adds to the power stored in the storage cell. The power stored in the storage cell is used by a processor, logic chip, or microcontroller to process the input (i.e., to produce data or simply capture raw data), and instruction the communication chip of the WCC to transfer data to an end node, e.g., a predefined receiving computer over a network.

In another embodiment, a WCC device has an integrated display powered by same mechanical force used to activate the transmission of data. In some embodiments, a WCC device will have an integrated display. The display, in one configuration, is a low energy bi-stable display. Bi-stable displays are commonly referred to as an E Ink screens and they will retain the displayed image even when all power sources are removed. In practice, this means that the display is consuming power only when something is changing. For example, when reading on an eReader, power is only needed when turning to a new page but no power is consumed by the display while reading the page. In one embodiment, this is most noticeable when an eReader goes into sleep mode yet there is still an image being displayed. By contrast, with a traditional LCD, the display needs to be refreshed around 30× per second; regardless of the whether anything new is being displayed. Bi-stability significantly reduces the power consumption of displays using E Ink and is a key reason eReaders have such long battery life.

In some embodiments herein, a WCC device having a bi-stable or other similar display uses the same power generated by the mechanical force imparted on the power pump to power the display, and this same power pump for transmitting device of the WCC device to enable the wireless communication. In addition to use of a bi-stable display, a WCC may be equipped with or coupled to a bi-stable reflective display. When configured with a reflective display, a WCC does not necessarily need to use a backlight. Rather, ambient light from the environment is reflected from the surface of the display back to the observer's eyes. As with any reflective surface, the more ambient light, the brighter the display looks. This attribute mimics traditional ink and paper, and users of E Ink displays have said that they do not have the same eye fatigue as with LCDs when reading for long periods of time. Since backlights can also consume up to 40% of the power used in electronic product, eliminating the need for a backlights is a significant advantage for WCC devices configured to utilize pump power from mechanical force. In a WCC device configured with a bi-stable reflective display, once the data is set, the display can remain displaying the data, without further power consumption. In one example, if the user is setting a thermostat setting of 77 degrees, the value 77 will remain on the display even after the power in the storage cell of the WCC has drained.

In some embodiments herein, a WCC device having a bi-stable or other similar display with integrated touch screen which uses the same power generated by the mechanical force imparted on the power pump to power the display, and this same power pump for transmitting device of the WCC device to enable the wireless communication.

In some embodiments herein, a WCC device having a bi-stable or other similar display with integrated touch screen and configured to provide remote control capability without the need for an internal WCC battery or external power source coupled to the WCC. In such embodiments, the WCC has a user interface displayed on the screen that shows commands on the screen which may be selected by the user. Commands available for user activation may assimilate controls used in a TV remote control, an auto interior, airline passenger seat controls, thermostat, alarm panel, etc. Thus, controls may include but not be limited to traditional ON/OFF, volume, mode select, temperature select, window up or down, door lock, channel select, dimmer switch, light ON/OFF etc. However, the controls may be customizable, labeled triggers linked to retrieve data from the Internet for display on the WCC display. In any case, the display may be partitioned into one or more regions, based on pre-defined or dynamically defined commands, GUI. The partitions may be configurable to allow users or OEMs to customize the layout of the arrangements of commands on the touch screen. In any case, it is intended for embodiments of the WCC touch display control panel to operate with access to sustained power, and for embodiments to operate exclusively using only the same power generated by the mechanical force imparted on the power pump to enable the WCC functionality, and for embodiments that operate both with sustained power and with power generated by the mechanical force imparted on the power pump.

In one embodiment, the WCC includes a touch sensitive bi-stable screen that is configured on a push-activated chassis. When a user places his finger anywhere on the screen to select an item or control displayed on the screen they press down, causing the chassis holding the screen to also depress, the movement resulting in power pump activation using a hammer force onto a piezoelectric element, causing the WCC microcontroller to engage in a function to scan or read the coordinates output from the touch screen and to generate payload data designating at least an indicia of the selected command.

Embodiments of the present disclosure, therefore, enable for remote device controls to be decoupled from wiring harnesses, and are particularly useful given that a WCC can be configured to function without the need for an internal WCC battery or external power source. In such configurations, the WCC device need not be hard-wired the controlled device. For example, the WCC touch screen push activated device can simply be glued or screwed to a wall at any location, or it can be portable. When configured with bi-stable display, when the WCC power pump energy is expired, the bi-stable screen provides the benefit of persisting the WCC output display information, input command GUIs or both.

It should be stated that using bi-stable display, the screen may be updated in response to a WCC activation cycle, using power pump harvested energy. The screen update image may be generated by or stored locally in the user activated WCC. The screen image may be updated during the initial or during secondary pump activation. The screen image, or indicia of the screen image, display data or the like may also be received by the WCC from a remote device. In any case, the response to the user selection can be formulated locally or by a remote or end-node including through a service provided via the Internet, or by a combination. A response to the user selection may include results in connection with a user request associated with a command on a region of the touch screen, confirmation of command received and state of the remote device in connection with processing the command, retrieval of news, weather, or shipping status on items purchased, for example, on Amazon.com, etc. Another example use of a WCC device is in a force activated card reader.

In this example, the WCC device receives input force, outputs RF emission, receives RF coded emission, and sends data to an end node. In still another example, a WCC device integrated with RFID reader uses a power pump to activate an RFID emission field for reading an RFID card. When a user pushes a button, the button triggers the power pump, causing activation energy for reading and powering an RFID field. As typical in RFID readers, a tag placed in proximity to the WCC device upon activation and causes RFID tag to be activated, resulting in the RFID tag to reflect it's ID. Using the harvested energy from the power pump further, the WCC may engage in transmission of the ID to an end node. The end node, such as a server, can then determine to allow access. In such configurations, the WCC device need not be hard-wired to a security cabinet or computer. The WCC device can simply be glued or screwed to a wall at any location, or it can be portable.

In a further embodiment, an application for pairing to a WCC device is provided. The WCC device, in this example, may have an integrated fingerprint reader. The fingerprint and Wi-Fi network may be paired, in one example.

In one embodiment, a Wi-Fi network is previously paired to a smartphone. In this embodiment, a smartphone APP allows a user pair a WCC device having a fingerprint reader to the Wi-Fi network. The APP will also allow the user to pair to one or more control devices. The control devices can be, for example, door knobs, door locks, locks, switches, etc. For example, if the WCC is a key fob with a fingerprint reader, the APP can identify the key fob when the APP is in discovery mode, and the WCC device has been provided power by one or more presses of a button acted upon the power pump.

In some implementations, the APP can then transfer a user's fingerprint and Wi-Fi access to a Wi-Fi network that the smartphone currently has access to (e.g., the user's home Wi-Fi). The WCC can then be used without the smartphone as an access device. In the example of a door lock, the user can use the key fob by pressing the key fob one or more times, which causes the fingerprint to be read, and then the Wi-Fi circuit of the WCC sends the fingerprint to a computer (local or cloud), which then sends instructions to the door lock, which enables unlocking. In one example, the unlocking is by way of verification of the fingerprint, which was captured by the WCC and sent to the end node (e.g., computer), which then verifies the fingerprint and unlocks the lock on the door. In this embodiment, the lock on the door is also connected to the Wi-Fi network.

In some embodiments, the data sent by a WCC is encrypted. Encryption can be implemented using any number of ways. Some ways include, for example, symmetric or asymmetric key encryption, public key encryption, message verification, digital signature verification, message authentication codes (MAC), cryptographic software, hashing encryption, digital encryption standards (DES), Asymmetric RSA, cryptographic hash functions, application layer encryption, session encryption, IP layer encryption, or combination of two or more thereof.

In some embodiments, a WCC device may be configured with a biometric sensor to enable a single push-button activation where one activation posture results in both the activation of the WCC and the reading of a biometric sensor. Such "one click" embodiments may operate solely on a power pump, without a battery, and enable, in the Internet of Things, or locally, events indicating, for example i) user X pressed WCC Y button Z, ii) user X has temperature Y; iii) retinal scan X detected at security access point (associated with) WCC Y, etc.

Sensors other than or in addition to a fingerprint sensor may be configured with a single pushbutton activation posture that results in detection and transmission of a condition of a user. User condition may include, but not be limited to, any measurable metric associated with the current condition of the user. For example, measurements may include one or more of temperature, galvanic skin response, EKG, heart rate, pulse, duration of operation, etc. In one example, a user places themselves in a suitable position required for the selected biosensor and engages in the activation of the switch, resulting in power pump activation, reading and transmission of the biosensor.

In one embodiment, the WCC device can be housed in a portable device, which can be placed in any location. The housing may include a button or buttons, which when pressed send coded data.

In one example, the button is on a housing that has a WCC device. Pressing the button activates the WCC and sends wirelessly a predefined code, e.g., order to a website for an item. In one configuration, in addition to ordering, the button has a biometric sensor to enable identification of the person making the order. For example, different people in a home or location can have different privileges. So, based on user ID, different privileges can be defined. The programming of user ID and privileges can be set on an APP or on a website. In some embodiments, the WCC device can be re-programmed for different items. In still other embodiments, the button can have a dial, so you turn to #1 detergent, turn to #2 coffee, turn to #3, diapers. Same device, same button, but different items. In another embodiment, it can be one button, two push, or double dial, so one push can select item and quantity. For example, the user can select what to order, e.g., from a predefined internet side, and also identify a quantity (e.g., coffee, 2 packs).

In one embodiment, a WCC device is configured to operate to control an AC electrical outlet or light. The outlet may be configured to receive or respond to commands initiated from the WCC device. Commands can be routed directly from the WCC device to the outlet or be routed to the outlet through a controller. In one example, a Wi-Fi network may be previously paired to a smartphone. In one example, the controller or APP can be configured to allow the user to pair a WCC to one or more control outlets. WCC device may be configured to look and feel like a traditional rocker style light switch. Alternatively, traditional light rocker switches may be modified to harness the mechanical energy from physically manipulating the switch ON and OFF or in between. The result may be, for example, configured as a passive, battery less, WCC device capable of becoming activated when the switch is activated.

Various techniques may harness the switch power. In one technique, one or more hammer elements similar to a spark generator used in miniature cigarette lighters are configured to indirectly activate through a translation of the switch object. The force triggers the hammer to strike an element, providing power pump upon switching the WCC device. Further, in one configuration, a WCC microcontroller (i.e., device that communicates or takes commands from with the WCC device) is coupled to read the state of the WCC rocker light switch and transmit a payload (e.g., data or instructions) to a desired end node (e.g., a light filament, LED, bulb, etc.) capable of mimicking the function of the traditional light switch (e.g., opening and closing AC power to the light source).

A WCC light switch can be configured for new construction or retrofit projects. In new construction, a home or business can be wired in a completely new way, using WCC switches that do not pass AC power to the light but rather initiates a wireless coded communication intended to be received by the remote light. In one embodiment, a hammer element, mechanical element or spark generator may be coupled to indirectly receive the strike force from the toggle switch when switched from OFF to ON. In another embodiment, a second hammer element spark generator may be coupled to indirectly receive the strike force from the toggle switch when switched in the opposite direction, from ON to OFF. In any case, upon activation, the WCC reads the state of the toggle light switch to determine if it is open or closed.

For retrofit applications, a hot WCC light switch may be used with traditional wiring schemes. In traditional wiring schemes, power to the light or outlet is provided directly through gate in the switch, so the switch is "hot" because it passes AC current. In a retrofit WCC light switch, the WCC switch flows electricity to the outlet as is traditionally done. A hot WCC light switch mimics the functionality of traditional switches but adds detection and transmission of the state of the switch, after transitioning the switch from ON to OFF. The hot WCC light switch passes AC to the light or electrical socket as has been done traditionally for a hundred years. "Reading" the state of a hot switch using a microcontroller or logic in the WCC, given the existence of high power, presents a marginal challenge. However, using its own power pump the switch state may detected indirectly by configuring the WCC to read the power output profile that is harvested through the switch activation, where a distinguishable power profile is established when transitioning from ON to OFF state as compared to the power profile when the WCC is operated in reverse, from an OFF to ON state.

In one embodiment, this can be accomplished by dampening the hammer strength of one of the two (or more) hammers, by using different materials for each hammer, through industrial design choice in design of the switch mechanism, offsets, spacers, etc. Still other techniques may determine the direction or end state of a hot switch, including use of a secondary sensor photo-sensor, hall effect device, etc., that is read by the WCC upon receiving pump power from switching (or other force input) and used to determine if the switch is open or closed. In another embodiment, power is tapped from the hot circuit to fuel reserve in a power cell that, in turn, provides energy to detect and transmit switch state. In another example, a WCC switch is configured as a dimmer switch and used to control the amount of brightness that is commanded to the Wi-Fi-enabled (or wireless enabled) light outlet. Currently, most dimmer switches are hot, and instead of diverting energy from the light bulb into a resistor, modern resistors rapidly shut the light circuit off and on to reduce the total amount of energy flowing through the circuit.

In one embodiment, the light bulb circuit is switched off many times every second. The switching cycle is built around the fluctuation of household electrical alternating current (AC). AC current has a varying voltage polarity—in a sine wave it fluctuates from a positive voltage to a negative voltage. The moving charge that makes up AC current is constantly changing direction and in the United States, it goes through one cycle (moving one way, then the other) 60 times a second. A modern dimmer switch "chops up" the sine wave. It automatically shuts the light bulb circuit off each time the current reverses direction, i.e., whenever there is zero voltage running through the circuit. This happens twice per cycle, or 120 times a second. It turns the light circuit back on when the voltage reaches up to a threshold level, based on the position of the dimmer switch's knob or slider. If the dimmer is turned to a brighter setting, it will switch on very quickly after cutting off. In traditional hot dimmer switches, the circuit is turned on for most of the cycle, so it supplies more energy per second to the light bulb. If the dimmer is set for lower light, it will wait until later in the cycle to turn back on. In accordance with the disclosed embodiments, a WCC device may be equipped with a cold dimmer. In a cold dimmer, the state of the dimmer switch, typically a resistance value is read upon receiving the energizing power from the power pump and is transmitted, typically, along with the ID of the WCC switch and optionally a target light source.

In one embodiment, the target source ID is transmitted from the WCC switch. In other embodiment, the target outlet is not transmitted from the switch but from a master controller that relays the desired state and dim level to the appropriate outlet. In another configuration, WCC light switch operates in a passive, hot switching mode. In this mode, AC power flows through the WCC switch to the light source or power outlet, as is typically done in existing household wiring systems. However, when using a WCC hot-AC switch, a wireless coded signal is generated upon pump activation, resulting in the additional function for establishing control to other light sources not hardwired to the existing switch, and for tracking and auditing activity in connection with the switch outlet.

In one embodiment, the wireless coded signal (i.e., data sent wirelessly by the WCC device) may indicate the desired switch state upon transition from ON to OFF. The wireless coded signal may also indicate, or may solely indicate, other settings. Other settings may include but not be limited to a desired dim level, a desired color selection or a scene setting. A hot or cold WCC-capable light switch may be used to direct control of electricity to one or more lights or power outlets.

In one embodiment, a bulb (traditional or LED), may be integrated with a wireless chip, controller or transceiver or receiver. In one embodiment, the wireless coded transmission from a hot or cold WCC switch may be received directly by a hot (AC powered) light source. In this configuration, the light source itself includes a wireless receiver and circuitry enabling the bulb to respond to commands received from a wireless transmission. Commands may include, but not be limited to, ON commands, OFF commands, dim level, color selection, scene settings including ones designating one or more light sources timing, fade profile, mood, color selection, etc.

In another embodiment, any traditional lightbulb may be used (a "dumb" bulb) to interface or interconnect with a smart ballast, socket, interface, coupler, interfacing chip, or the like. Having the capability to receive coded communication wirelessly from the WCC device (e.g., the toggle switch, touch pad, selection dial, etc.) makes the bulb act as a smart device capable of integration with the Internet of Things, making it pragmatic to track and control its state, engaging in programs for energy efficiency and integration with various home automation frameworks where any control is received and responded to with a state change in conformance to the control. Further, it should be understood that reference to bulb may refer to any device capable of illuminating or producing light. This includes traditional light bulbs, LED light sources, fluorescent lights, etc. In another embodiment, such wireless coded transmission may also be coupled to or received by a switched AC light source through a power distribution hub or ballast, or smart light socket. In any case, the hub, ballast or socket is equipped with or coupled to a wireless receiver whose output is used to trigger control to an AC relay to deliver or shunt output to socket pins housing the targeted light source. Such device may utilize existing modern resistive chop methods for dimming a traditional light source. The housing may operate with traditional bulbs or modified bulbs having additional wired or contactless coupling for signal transmission of color data or other settings. It should be understood that the hot or cold WCC switches of the present disclosure may also be coupled to both AC or low voltage DC light sources.

These embodiments have broad applications, and some examples may be application to a socket, a plug, a light bulb with a Tx/Rx unit. Also, the switch can have predefined forces (i.e., high force for up, lower force for down), which will enable identification of ON/OFF.

In one example, a cold WCC light switch includes a reflective bi-stable touch display that has regions for selecting commands including ON and OFF. The cold WCC light switch may also receive advertising that may be displayed.

As will be described below, WCC devices may also be paired to retail product shelves may provide additional product details to an APP or smart device.

In some embodiments, a WCC may be issued to customers for temporary location identification and ordering of goods. For example, a WCC is issued to a person wishing to order a drink or food at a restaurant or bar. The user is provided with a WCC device, and the WCC device has a dial that can be turned to identify the drink or food. Once the dial is pointing toward the drink or food, the user can press down on the dial, which causes selection of quantity. The quantity can identify, for example, "1" for the drink or food; a second press changes to "2" for the drink or food; a third press changes to "3", etc. The WCC device will then send coded data to the end point (e.g., restaurant server), which places the order. In one embodiment, in addition to placing the order, e.g., 3 drinks, the code can identify where in the restaurant the person ordering is (e.g., location identification). In this manner, the waitress or bartender can deliver the ordered drinks or food to the person.

In some configurations, a WCC device may be embedded into a touch pad structure. A user may position a finger on the touchpad to designate commands to a remote device, e.g., an end node. The touchpad may have fixed, removable, or custom printed regions that define commands for one or more devices. Upon activation, the WCC device reads the coordinates of the finger's location on the touch pad and transmits it to an end node, repeater, or server. Activation may be accomplished using an activation pump separate from the touch pad. Alternatively, the touchpad may be mounted on a chassis that can be depressed. In the latter case, one finger can be used to select a specific region of the touch pad, and engage in activation of the WCC device, causing it to read and transmit status for "one touch" activation. The touchpad may be two dimensional; resulting in the detection of the user's finger on both the X and Y coordinates on the pad, or is configured as a one dimensional linear pad. In another example, the touch pad may operate in a manner similar to the touch sensitive display embodiments and examples as previously described omitting the details pertaining to the dynamic display function.

Acoustic feedback or sounds may be stored, received or triggered locally or in response to a wireless signal received by a WCC in any embodiments or applications described anywhere herein. Feedback may also be augmented by LEDs when it is not practical or cost effective to include a display unit in any WCC configuration.

In some embodiments, different WCCs have different programmed uses. Based on the use, the user is able to program settings over time. However, over time, a pattern is detectable for specific users. For instance, User A likes to push button on Device A between 9 pm and 10 pm on weekdays. User B pushes Button B, to order goods on Thursdays. In still another embodiment, a WCC device can have a screen that displays advertisements for goods. For example, if User B usually orders Product A on Fridays before noon, an advertisement can be published back to the WCC screen, to enable one push selection and order. In one embodiment, the WCC device can have a simple housing, and the housing can be placed in any location. The housing can be placed around a home, e.g., near areas where products will need to be replenished. For instance, WCC devices can be placed in the pantry. Several WCC devices can be placed in different locations, e.g., for soda, chips, flower, sugar, detergent, paper, soap, etc. When the user presses the WCC device, the WCC device will activate to send coded data to an end node, e.g., an online seller of those goods. The use of these devices over time, for example, can be learned, and this learning can be used to supply discounts, coupons, advertisements, etc., back to the user, e.g., via a screen on the WCC device.

In one embodiment, one or more traditional or WCC controls may be placed on a WCC push down chassis. For example, traditional controls such as a standard rotary or linear potentiometer, rocker switch, dip switch, any switch or sensor, can be mounted on a single WCC chassis. The chassis may include a substrate upon which all the controls are mounted, and may be push-activated to engage a power pump providing an energy source for the WCC. In this embodiment, when activating the WCC device, all the controls on the chassis and the substrate they are mounted to are depressed upon activation, the WCC can read the status of the various controls and transmit the control state wirelessly to any end node, server or repeating node.

In one embodiment, radio frequency (RF) Power Harvesting may be used for periodic update of a WCC display. For example, a WCC device captures RF power. Over time, enough power is captured to WCC device, which allows the device to automatically reach out to an end node (e.g., server over a network) or automatically receive data. The data can be info to receive data to show on the display, such as an advertisement, messages, texts, reminders, calendar updates, alerts, emergency notices, public notices, news, etc. This way, the WCC device can receive data, which is displayed. In another embodiment, instead of RF harvest, a user can push once to pull/download any coupons or discounts, and then push a second time, which orders the product with the discount. These are just some ways to provide inputs, and it should be understood that input methods can vary depending on the data and situation. For instance, input can be provided as voice input, fingerprint ID, image scanning, eye scans, gesture inputs, motion inputs, signature inputs, password inputs, button presses, button dialing, sliding objects, pressing and sliding, lifting, pulling, depressing, pumping actions, multiple presses, taps, rubbing, gesturing and pressing, hand scanning, area scanning, image capture, or combination of two or more thereof.

In one embodiment, a WCC device can operate as a thermometer. In one example, the user places the thermometer into a person's mouth. When temperature is reached, the user can press on the cap of the thermometer, which includes a WCC. The WCC sends the measured temperature to an account of the user of the thermometer. The temperature is thus saved with a time code of when the temperature was taken. The data can also be shared with a doctor, transmitted to a cloud system, shared with other authorized persons, map out a history over time, save to a history file, etc.

In one embodiment, a WCC device can operate as a portable blood monitor. In one example, the user places the WCC equipped with a near infrared or laser sensor and upon activation, the WCC can perform non-invasive blood glucose monitoring. The glucose reading may be saved with a time code of when the reading was taken. The data can also be shared with a doctor, transmitted to a cloud system, shared with other authorized persons, map out a history over time, save to a history file, etc.

In another example, the user places the WCC equipped with a blood sensor including but not limited to a MEMS viscometric sensor. Prior to activation a user pricks blood and exposes the blood to the WCC blood meter, and then upon activation, the WCC scans an attribute of the blood. The scanned reading may be processed locally or remotely. It may be transmitted with a time code of when the reading was taken. The data can also be shared with a doctor, transmitted to a cloud system, shared with other authorized persons, map out a history over time, save to a history file, etc. In yet another WCC blood monitor, a WCC "easy as 1-2-3" blood monitor device may include a retractable lancet.

On a first press of the WCC, the action force may cause a lancet needle in the WCC to be exposed while a pulse of energy is provided to the power pump. On a second press of the WCC button, a diagnostic strip is placed into the device and on a third press of the WCC, the user's finger, pricked by the lancet, is coupled to the test strip to expose a blood sample where the test strip is read by the WCC. The scanned reading may be processed locally or remotely. A lancet may or may not be integrated in the WCC blood monitor. A lancet may be integrated into the blood monitor but be a replaceable component. A lancet cartridge may also be coupled to the WCC blood meter enabling a user to rotate the cartridge to get a fresh lancet each sample. Data payload may be transmitted with a time code of when the reading was taken. The data can also be shared with a doctor, transmitted to a cloud system, shared with other authorized persons, map out a history over time, save to a history file, etc.

In one embodiment, the WCC device is a medical device which has a sensor to qualitatively and/or quantitatively detect bodily fluids. In one embodiment, the fluids can be blood. In one configuration, the analysis can identify a condition of the blood or of the person. Further, once the blood is captured, the blood can be analyzed by circuitry of the WCC, processed and results sent to a doctor or to a user's smart device. In other embodiments, WCC devices can be disposable. In other embodiments, the devices can be replaced or replenished or reconditioned. For instance, the part that touches human fluids is replaceable, while other parts, e.g., such as electronics and communication devices remain. In other embodiments, the WCC can be defined by two parts. One part is the disposable part and the other part is the receiving part. In one configuration, disposable part is clipped or connected to the non-disposable part. In one embodiment, monitoring of blood or some other body fluid can be used for early detection of disease. In one embodiment, drugs or drug metabolites can be delivered by a WCC. For instance, in a second step, based on the text results, the device can deliver an amount of medicine. In some embodiments, the WCC can do both monitoring; testing, sampling or one or more thereof, and then another device or the same WCC can deliver a drug. In some embodiments, the WCC can have portion, e.g., a receiver that is implantable and a portion that wirelessly communicates with the implantable part. In this manner, there is no need for invasive blood drawing. In this configuration, an implantable device can communicate with a WCC device or the WCC device can be the implantable part, and force application to the skin (e.g., if the device is located near the skin), the force acts to activate the sensing of the blood or fluid.

In another embodiment, an insulant pump can be provided. For instance, a user can press one or more times to a device that connects to a pump, which is under the skin. For example, a catheter under the skin can deliver insulin, based on the needs of a patient. A WCC activated device can test for blood sugar, or other parameters and then deliver a right amount of insulin and at the specific times needed. In one embodiment, the WCC can collect data of use or activity of the user or state of the blood or condition of the user. This data can be transmitted wirelessly to a mesh network and then transferred to an end node. Still further, the delivery of other medicine can be triggered, regulated and/or monitored from a remote location. A doctor or caregiver can then examine and communicate with people. In one embodiment, these WCC devices can be WCC enabled Wireless Medical Telemetry Systems (WMTS), which are usable in the medical field. In some embodiments, the Food and Drug Administration (FDA) governs the use and administers the regulations. In some embodiments, WCC devices of these types can be used for sampling in biological fluids. In some embodiments, without limitation, biological fluids include but are not limited to blood, serum, urine, gastric and digestive juices, tears, saliva, stool, semen, and interstitial fluids derived from tumorous tissues.

In some embodiments, fluid can be removed by medical device is brought into contact with a microarray which samples bodily fluids. Fluid may be released from the medical device and can contain therapeutic agent(s) released in response to the presence or absence of a particular analyte. In some embodiments, bodily fluid movement into or out of the medical device is facilitated by a pump, such as a microfluidic or osmotic pump. In another embodiment, molecular transport is conducted through pressurized microfluidic lanes which cause fluids to flow over a microarray. In yet another embodiment, molecules may be transported by natural electric currents conducted by Personal Area Network (PAN) transmitters or piezoelectric or magnetic sensors. These sensors and electrical devices can be integrated or interfaced with a WCC device. In another embodiment, a laser can burn tissue and the smoke can be analyzed. The WCC interfaces with the laser and burner and samples the smoke to determine data.

In another embodiment, a WCC is configured with a Surface Plasmon Resonance (SPR) sensor capable of reading a variety of biomarkers and used to detect disease, infection, water quality, cancers, bacteria, or environmental toxins in a liquid sample. A WCC is configured with a Surface Plasmon Resonance (SPR) sensor doped with a thin layer of Graphene material. The Graphene layer may be as thin a single atom. Graphene is configured to adhere to one or more biomarkers, toxins or bacteria. A user of the WCC SPR sensor places a drop of sample in a graphene doped test strip. The strip may include capillary channels to bring the blood sample into a target region of the strip. Upon activation of the WCC power pump, an optical quality metric is read in connection with the test strip. In one embodiment, a WCC scans the sample using the power pump energy and provides an indication of a result. The result may be indicated locally or transmitted remotely, or both. A payload containing activation sample reference may be processed locally or remotely. Payload data characterizing or containing an image of the sample may be transmitted with a time code of when the reading was taken. The data can also be shared with federal regulators, environmental commission, medical insurance companies, doctor, coupled to air control systems, water valve shutoffs, etc. The payload data may be transmitted to a cloud system, shared with other authorized persons, map out a history over time, save to a history file, etc. In one embodiment graphene strips are configured into regions where each region is capable of adhering to a different marker, such that one sample can be tested for multiple conditions.

In one embodiment, a WCC includes the capability to estimate your blood-alcohol level using a breathalyzer sensor. In this example, a user presses a first button of the WCC power pump then blows into the port on the WCC breathalyzer, and then completes the activation cycle by pressing a second press of the power pump. In one embodiment, the WCC reads the value of an integrated semiconductor oxide-based tester. In another embodiment the WCC reads the value of a fuel cell, which measures alcohol content by creating a chemical reaction that oxidizes the alcohol in the sample and produces an electrical current proportional to the amount of alcohol that is oxidized or present in the sample. The WCC scans the sample using the power pump energy and provides an indication of a result. The result may be indicated locally or transmitted remotely, or both. A payload containing activation sample reference may be processed locally or remotely. Payload data characterizing or containing an image of the sample may be transmitted with a time code of when the reading was taken. The data can also be shared insurance company, with a doctor, coupled to a car access system, coupled to a car access system where the car detects the user identity using a biometric sensor on the steering wheel and compares the identity of the user containing the sample, and determines if the user is safe to operate the vehicle, etc. The payload data may be transmitted to a cloud system, shared with other authorized persons, map out a history over time, save to a history file, etc.

In some embodiments, WCC devices can be integrated into different objects, devices, structures or physical objects. When such devices move or are caused to move, a WCC device can be made to trigger. Without limitation, example devices may include airline seats, airline tray tables, airline overhead compartments, doors, stadium food ordering, stadium seats, dials, chairs, tables, doors, garages, cars, bikes, motor cars, electric cars, luggage, desks, boxes, tools, power tools, etc.

In one embodiment, WCC devices can be used for item ordering in retail stores. For example, a user presses buttons in store to select items. When users are done, the items are collected in back for the user, and packaged for the user to take with him/her. This allows the user to see items in store, feel them, test them, and if the user wishes to buy, the item is selected by pressing a WCC at the shelf, which allows the user to buy. Buying can also include predefined accounts, which can be matched to the user. The accounts can be linked to a credit card or digital form of payment. In this embodiment, users would not need a cart, since the items are collected by staff. This feature if also useful for purchasing large items, such as hardware store items that cannot be lifted easily or accessed. By pressing a button, a user can simply collect the items, which may be paid and loaded in a vehicle for the user. In stores or bars, items for purchase can be associated with WCCs with button or dial having product selection "one click" activation posture to engage in a purchase—where a fingerprint sensor is coupled to WCC power pump, causing transmission of item details and a payment request to an end node or router at the retail outlet secure payment service where the previously registered user is detected and his account is debited for the amount of the purchased item. The retail outlet may utilize such a system to go cashier-less, where security RFID or similar tags are placed on items and when a shopping cart passes through security, the group of items are scanned by the RFID reader and compared against the batch of products purchased by a user. In one example of a cashier-less WCC embodied marketplace, the user is required to provide their identity prior to exiting the store with goods.

In one embodiment, a WCC device may be used for retail confirmation of adherence to a diet. For example, a user presses buttons in store shelf to review structured criteria concerning item contained next the button. An APP obtains the UPC of product under review and checks the product characteristics against pre-set criteria. This configuration can be supported by a hands-free mode of operation where audio or haptic feedback response is provided to the user to indicate that the product did or did not meet the pre-established criteria. A video, audio or haptic signal indication of the characteristics of the product attribute may also be sent to the user's watch, or smartphone or device via a wireless transmission by the WCC device. In this embodiment, the end node is a user standing proximate to the WCC device, wherein information can be displayed on a device of the user. This communication can by via Bluetooth LE, for example, or wireless peer-to-peer, or via a wireless mesh network, or other wireless networks or protocols, as described in this disclosure.

In one embodiment, a WCC device may have an environmental sensor. In one example, a WCC device may be equipped with environmental or biological sensor that is read upon activation of power pump. Sensor data may be sent to a paired APP or transmitted to a remote server for cloud-based analysis.

In one embodiment, a WCC device can use various networks of nodes to enable routing through intermediary nodes or always-on-devices. For example, a WCC may be coupled to control a remote device through direct communication, through relayed communication using a phone, or through a server. A sleeping device may periodically wake up using a watchdog timer to check status of wireless wake-up signals. The frequency and duration of the wake-up period of any device depends on several factors, including whether the device under control is operating under dedicated power supply or a battery. Often when a wake-up signal is sent to a sleeping device, the wake up signal is burst in a long repeat pulse train to ensure that the signal is detected during the period in which a watchdog timer is alert. Robust communications can be established between a WCC and an end device by routing signals through an always-on device such as a phone or dedicated server, to the end device seeking to be controlled. Such "man-in-the-middle" routing schemes can be beneficial as always-on powered devices act as intermediary for signal repeating during long sleeping periods of a watchdog timer. In one embodiment, when an intermediary signal repeater receives a single command from a WCC, it can engage in a longer communication dialog with the end device than otherwise is generally possible using the power pump activation cycle of the WCC. This can enable the intermediary repeating device to send redundant signals, wait to get a confirmation from the device under control to confirm it has received the command, and ensure reliable communications in general.

In still other embodiments, a WCC device can be integrated into a street crossing (sensor). For example, a WCC device may be coupled in a city street or sidewalk on ground or raised on a pole, enabling a pedestrian seeking to cross the street to engage a pedestrian safety system. For example, by stepping with foot or pushing by hand, upon activation, the WCC device transmits a coded communication to a safety system capable of engaging in various functions to enable the safe crossing of the pedestrian across the avenue. Such safety system may optionally be configured to enable a user having an APP trigger the same functionality, but without the need for WCC.

In one embodiment, a WCC device is used as a mailbox state detector. In certain circumstances it may be desirable to enable security and tracking of access to a mail box. A hinge-state activated WCC may be coupled to a mailbox to enable various security-related functions. For example, the hinge-activated WCC, upon engagement, may transmit a coded communication signal to a desired endpoint, notifying the owner or manager of the mailbox that the mailbox has been opened. This is especially useful because it allows the owner to receive a signal that mail has arrived, for example. Another use for a hinge-coupled WCC attached to a mailbox, is for capturing a photo of a user opening the box.

In some circumstances, it may be desirable to couple an imaging device to a WCC. In such configuration, the WCC, upon activation, may take a snapshot photo and transmit a coded message to a desired endpoint. The photo may be stored locally on the WCC for later retrieval, or in some cases when sufficient pump activation power is available, the WCC may transmit the photo to a desired end point.

In one embodiment, a WCC device may be part of or connected to a door bell. In one example, a WCC enabled doorbell enables wireless, battery-less ability to couple to remote chime indoors, to APP running on phone, server or any desired endpoint. In some embodiments, the doorbell button may also have a fingerprint reader, which may identify the user. Once the user is identified, such as by name or some ID, the identity of the person that is at the door can be communicated to a person inside or to the owner of the home, whom may be away. This data can be, for example transmitted to an end node, such as a server, and some embodiments, the server can notify the home owner via a message, notification, web link, app, or the like.

In another embodiment, a short range WCC device for local broadcast of data to user devices is provided. In one embodiment, a WCC device that has a short range wireless device can be enabled to transmit coded data, e.g., with is predefined data. The short range wireless chip, in one embodiment, is a Bluetooth LE transceiver. The WCC device will store broadcast data in response to receiving power from the power pump. In one embodiment, the WCC device is placed in a retail store and associated to some product or service. The broadcast data is programmed and stored in memory of the WCC device. When power sufficient to trigger activation of the WCC device is harnessed (e.g., from one or more force activations, or presses), the WCC device will temporarily pair to a user device that is proximate to the WCC device.

In one embodiment, the broadcast data may be, for example, product information, discounts, pricing, links to more information, images, and generally data that provides more information regarding the product or service that the WCC device is associated to. In one embodiment, if the WCC device is attached to or located proximate to a store shelve where a good is being displayed for sale, the WCC device placed proximate to the good sends broadcast data to the user's device, e.g., a smartphone. The user can thus receive more information regarding the good or service, and may even allow the user to order the good or service or pay for the good or service. In one embodiment, if the user pays for the good or service via an online payment, the user can pick up the good or service from the shelf and leave the store w/o stopping at the cash register. In one embodiment, the WCC device can use various forms or protocols for the wireless communication, so long as the data can be transmitted to an end node (e.g., in this case it is the user device standing in front of the device).

In one embodiment, a WCC device is useable as an air pressure threshold detector. For example, a WCC with T-tap for detection of any liquid or air pressure that exceeds a preset value. In one embodiment, WCC may be spring loaded for setting a trip threshold.

In one embodiment, a WCC device can be spring loaded. For instance, a preloaded spring allows much less activation force but needs to be manually reset upon activation may be used for food and beverage processing, industrial, food vending machines, store racks, arrays of items on racks, etc.

In some embodiments, a WCC device can be integrated into a tool, powered or not powered. In powered AC tool, a hot WCC switch can be coupled to ON/OFF trigger of the power tool, to allow simple wireless tracking and transmission of real-time power tool status, useful for example, to integrate into workplace safety and worker productivity tracking systems. In one embodiment, it is possible to log the time of tool operation. An owner can then keep a log of use of the tool and the tool replacement time, or predict when to replace the tool or a disposable element of the tool (such as a vacuum bag, a drill bit, a saw blade, etc.). In one example, as tools that are used more it is possible to track so they can be pro-actively replaced based on use. In one example, a contractor can track all of his tool on multiple job sites, e.g., to determine where the tool is being used and the length of time or times the tool is used to perform a task. In one embodiment, a WCC on toolbox at job site notifies when (opened) tools are accessed. A WCC may be used for alerting a watch, cellphone or any endpoint the opening of a chest, toolbox, or any asset, including those assets on a job site, that the chest or toolbox was opened.

In one configuration a power tool may be equipped with a hot or cold WCC switch. A simple hot WCC switch operates as a typical power switch, where AC or DC current flows to or through the switch depending on the state of the switch, using traditional SPDT or any known wiring configuration. A hot WCC switch provides wireless functionality in addition to operating as a gate for flowing or closing AC or DC power, or any signal or power source, optical or electromagnetic. In one example, a WCC is activated by pump energy harvested through the mechanical actuation of the power tool. The power tool may be powered on and off using the traditional wiring, or a variant thereof. The variant wiring for the power tool may allow a DC current to flow back to the WCC switch, enabling a power source for the WCC switch, enabling it to perform the various functions of maintaining a mesh network, as provided herein.

In one embodiment, a WCC device can be integrated or coupled to weight-threshold measurement. For instance, a WCC activates upon a force being applied beyond a threshold, useful for determining whether a device such as a forklift or wheelbarrow is operating under its intended OSHA and manufacturer-recommended weight limits. In one example, a platform has a compression spring used that allows for a predicable displacement of a load based on weight and a power pump is coupled to the platform. When a weight is applied to the platform, the platform applies a force to the compression spring, causing a force onto a hammer member in a power pump. For example, a hammer-based voltage generator similar in operation to a BBQ spark generator may provide activation power when tripped, and tripping of which occurs when the desired weight threshold (based on the platform weight, the compression spring) is exceeded. Upon activation, the WCC weight threshold detector may signal a transmission payload to a remote safety system, alarm etc. The transmission may indicate the WCC associated with the weight fault, may cause notification, or perform shutoff or a controlled series of operation to safely decommission the equipment subject to the weight fault.

In one embodiment, a WCC device is an authentication system for securely accessing systems. In simple authentication, a WCC device can be a portable password storage device. For example, a WCC key fob may be configured with user authentication data and, upon manual activation of its power pump, transmit the user authentication data to a wireless USB receiver configured to operate as a PID keyboard. In this example, a user may operate their keyboard as normally but when needing to enter a password, they can simply click the WCC authenticator and it transmits the user authentication data which is injected into the keyboard input channel just as if the user typed it in using the keyboard.

In alternative user authentication scheme using WCC, a user may be subject to a challenge-response where user is prompted to engage in a specific activation pump profile of the WCC. For example a secure server may request a specific random ID to be entered in order to gain access. The server provides the number to the user and the user is required to pulse the WCC in a pattern to indicate the access number, similar to Morse code, where the response to the challenge is made by the user pressing the WCC pump once with a short delay to increment the first digit and a long delay between digits. For example, 2412 would be entered "pump (short)pump(long)pump(short)pump(short)pump(short) pump(long)pump(long)pump(short)pump". This particular method for entering input data to a WCC using a single pushbutton may be used across any embodiment in this application.

A primary benefit of the WCC authenticator is that it saves passwords or authentication data and only allows transmission of the data when physically triggering the device. In addition, the WCC authenticator may have biometric user identification and operate directly to reach to local or network devices, including the cloud, to engage in multiple schemes of security.

Another embodiment of the WCC authenticator uses a secondary device such as a cell phone to receive WCC authentication payload when activating the WCC. In this example, the secondary device may take additional request such as a site specific password or requests a fingerprint or master password of the user, or the secondary device may check its geolocation to determine if the device is being used in a known location, such as the user's house, or the secondary device may request nothing of the user or take no additional precautions. In any case, the secondary device forwards the payload to either the requested secure resource or to another device to add credential to the authentication process.

A passive device such as the WCC authenticator will have a safety feeling as users know it has no ambient power source so it can't easily be hacked. Master or site specific passwords, code, authentication tokens, public, private keys or other authentication criteria may be safely stored on the WCC without risk of tampering. WCC dials and settings may select an authentication service or site for which access is sought. WCC transmission payload will include associated credentials or sequence necessary to engage in the designated scheme for access to the site. WCC typical in this use will be energized only upon manual activation of power pump. When activating, the WCC transmits the authentication data to a receiver, typically a host PC or cell phone, router or any end-node.

A WCC authentication device may be coupled with a biometric fingerprint sensor to enable the detection of a master user in connection with transmission payload to the target resource, URL or end node. Asymmetric UAF authentication schemes may be used where the biometric sensor user data is used to identify to register and authenticate biometric signatures with a corresponding UAF verification server on premise or on the cloud. Symmetric biometric one time password schemes may also be used where biometric tokenization handshake is made between the WCC and a host to enable access. In another WCC authentication scheme, a WCC may be configured as a Universal 2nd Factor (U2F) hardware authenticator. In another series of schemes, the YubiKey line of authentication schemes are improved upon, whereby the YubiKey dongle is eliminated and the WCC operates to mimic each version of YubiKey but whereas, upon activation, a wireless transmission to a YubiKey server is called directly from the WCC. In this improvement, further security can be added using WCC with fingerprint sensor and multi-tier authentication.

Authentication credentials may be entered into the WCC authenticator in various inventive ways, including through wireless encrypted communication portals, etc. But the premise of the WCC authenticator is that it is largely a decoupled passive device, hack-proof, in that it's not plugged in or active unless it is physically triggered. Therefore, entering user credentials into a WCC authenticator is preferably done using a process that is disconnected from computers or phones that may have malware, spyware, keyloggers. Etc. In one embodiment, a WCC authenticator includes a USB port enabling a keyboard to be connected. The WCC has a setting for learn or use mode and dial for selecting one of several popular websites or custom URLs. The user enters a password credentials for a specific URL by first selecting the website or URL using the WCC dial and then he presses the activation power pump one or several times to activate the WCC in learn mode. Using the keyboard, the user types their username followed by their password at least one time. Using the keyboard as in the above example, the user would enter the username and password for the selected site. Upon pressing enter, the WCC may transmit the credentials, causing the credentials to be tested, and provide feedback to the user to indicate that access to the site was successful.

In one embodiment, a WCC detects absence or presence of a plug coupled to AC outlet. For example, a WCC may be coupled into an AC outlet and configured to trigger upon the insertion, de-insertion or upon both the insertion and de-insertion of a plug into an outlet. In one embodiment, the WCC hammer spring is mechanically set through the insertion force of the plug into the outlet and held in place by a latch. When the plug is released, the latch disengages, causing the WCC hammer to activate the pump energy, triggering the WCC to engage in a coded communication transmission to a desired end point. This can be particularly useful for notifying that a device has been unplugged. In situations such as a data center or hospital, for example, the WCC may be integrated into a system capable of tracking equipment status and thus be able to determine if a device was unplugged inadvertently, and if so, engage in remedy procedures such as transmission of appropriate alert messages, texts, emails etc. to ensure that sensitive equipment, including but not limited to servers, life-support systems etc. remain in the desired powered-on state.

In one embodiment, a WCC device can be integrated into things, such as a dishwasher, a wine cellar door, a washing machine, a vacuum, etc. Any device can have a WCC integrated or interfaced therewith. The WCC can track simple state (open/closed) or more complex use data of the device over time. For instance, and without limitation, a WCC may be coupled to a flush handle of a toilet or urinal to trigger a flush activity for a commercial toilet and/or be used to track the amount of activity and related water use of a toilet. The WCC can then, upon activation, send data to an end node.

In one embodiment, a WCC device can be coupled to connectable pipes to detect when pipes may get accidentally decoupled. For example, detecting when items become decoupled can be critical for some environments, such as manufacturing, hospitals, construction sites, etc. In one configuration, a WCC is strapped between two items, e.g., pipes or wires or lines or connectors. If the items become decoupled, the WCC device can send out a coded signal to an desired endpoint. The items can have sensitive material flowing or connected, and this can provide an instant trigger, which is powered by the power pump of the WCC—when the disconnect happens. That is, the force of the disconnect itself can harvest power via the power pump to activate the WCC device to send the coded data to an end node over a wireless network.

In one embodiment, a WCC energized by liquid flow for in-vivo flow metering is provided. For example, a WCC is equipped with a spinning dynamo propeller made of food-safe silicon or stainless steel and mounted inside a pipe coupling or conduit. When liquid passes through the pipe or conduit, the propeller spins to generate power pump activation, and spins at a rate proportional to the liquid flow rate. Upon activation, spin rate is captured and can be coded into the payload data transmitted by the WCC device.

In one embodiment, a vibration detector with pre-loaded WCC device is provided. In certain embodiments, a WCC may be manually or automatically pre-conditioned by applying partial loading on a spring hammer prior to activation. The loading will enable the WCC to gear an activation force. Force gearing will establish a more powerful strike activation than force normally required to trigger a full activation without preloading. Preloading a WCC is beneficial for applications that provide a powerful strike with little activation energy, similar to a mousetrap. One use for preloaded WCC includes a vibration detection WCC module or circuit. The WCC vibration detection module uses pre-loaded hammer for detection of an activation vibration. Activation vibration that falls beyond a threshold will trigger the WCC to engage in activation, causing it to send out a coded signal to a desire endpoint, repeater, or server. The activation vibration model may be contained in a housing. The housing may be designed at a resonant frequency to maximize sensitivity of the WCC to specific frequency cutoff.

In one embodiment, Array of Pre-loaded Sound Sensors are interfaced with one or more WCC devices. In an embodiment, a WCC device includes an array of sounds sensors. The sound sensors are spring loaded when set, and based on the sound that is received by one or more of the sensors in the array, the spring load of that sensor is released. The release of a spring is tied to a specific output sent by the WCC transmitter. In one embodiment, the WCC with the array of sensors is coupled to a door hinge. When the door is closed, all sensors are re-set (i.e., the springs are loaded). When the door is open, the WCC array is listening for sound. So if someone opens the door, the loaded WCC listens, and depending on the sound received, one or more signals are sent out by the WCC.

In one configuration, sound capture upon WCC activation. For example, a clip of voice or sound is captured and sent to a destination. The capture can happen upon trigger. For example, when someone opens a door, the sound is captured. If someone rings a doorbell, the sound is captured and sent; if someone opens a refrigerator, the WCC is triggered and the sound is captured.

In one embodiment, a WCC device can be integrated with a traffic flow sensor. In one example, a WCC may be coupled in-line with an air or gas filled tube having two segments at different pressures and laid across a roadway, for vehicle detection. When a vehicle drives over the tube, a predictable volume of air is displaced from the first section by the tire crushing the first section of the tube, forcing air to flow across the WCC triggering the WCC to switch, and forcing a surplus of pressure on the second side of the tube. The second side of the tube, which normally has a greater ambient pressure than the first portion of the tube but not enough to cause the WCC to switch back in the original direction, is able to automatically switch back when a car passes over, due to the additional pressure received from transferring across sections, resulting in the switch to reset itself when the tire releases itself from the first portion of the tube. Data from the WCC device is then sent to an end node.

In one embodiment, a passive WCC glass-break detector is provided. In one embodiment, a WCC device is coupled to a window and preconditioned, by manually compressing a spring loading to set, is activated upon a vibration where the spring load of that sensor is released to cause device activation. The release of a spring is tied to a specific output sent by the WCC transmitter. In one embodiment, the WCC is integrated into home or business security system and used for alarm trigger. In other embodiments, when a fire hose is accessed by breaking the glass, the coded communication is sent. In one configuration, the transmission of the coded communication is possible via a wireless device without power. In instances where a building is burning, it may be that power is no longer available. For this reason, the self-power harnessing of the WCC power pump enables this communication in various emergency situations.

In one embodiment, a WCC Beacon with X,Y,Z coordinate Tracking is provided. For example, a WCC may be equipped to trigger, upon activation, a simultaneous delivery of a light speed signal and slower time of flight signal to a receiving base with one or more receivers for receiving the time of flight signal for determination of the spatial position and orientation of the WCC beacon. Alternatively, the WCC may be equipped with one or more photo detectors and used in an environment having a scanning laser for at least one, by preferably two axis. The lasers may be modulated or strobed to enable the WCC to read and capture a slice of signal coded from the laser. The WCC returns the read and captured coded signal back to a base station capable of determining the position of the WCC with respect to the one or more axis.

In one embodiment, a classroom desk-attached WCC device is provided. A WCC may be attached to a desk to allow a student to raise a hand or select an answer to a multiple choice question.

In one embodiment, a pre-loaded WCC for a smoke detector bridge is provided. Existing smoke detector may be integrated into a home automation system by coupling a preloaded sound activated WCC in close proximity to a smoke alarm whereby activation of the legacy alarm causes trigger of the WCC, prompting the WCC to send a coded communication signal to a desired endpoint. This enables existing houses with existing pre-wired smoke detectors to link into home and fire safety systems.

In one embodiment, a WCC Panic Button is provided. A WCC may be coupled to, for example, a school cafeteria, locker room, church, restroom to enable a simple accessible means for alerting authorities for food allergic reaction or situation requiring call for help whereby the system could deter predatory behavior.

In one embodiment a WCC rodent trap is provided. In one example, in situations where health standard require immediate quick control of vermin, a WCC mouse/rat/animal or drone trap can email, text or notify user immediately upon activation of a trap so that the trap can be removed or reset, depending on whether the trap was activated without success, or trap resulted in a successful catch.

In one embodiment, a WCC backup to wired beacon is provided. For example, a WCC may present itself as a secondary source or backup to a wired beacon in various scenarios including but not limited to scenarios requiring backup, scenarios where the potential for failure of a primary wired/powered system would result in significant risk, loss of life, loss of asset value, loss of compliance to contract, etc.

In one embodiment, a WCC with Photo Capture is provided. In one example, a pre-loaded or standard WCC may be coupled to a CCD or otherwise device capable of capturing a visible light, infrared, or thermal image of a scene. The WCC may perform and forward the image to a desired end point by sending a coded communication stream or burst, or clip or photo. Alternatively, the WCC may perform local image analysis, object detection or otherwise locally process the image resulting in a lightweight data structure which may be transmitted by the WCC in a coded communication stream to a desired end point. In some circumstances, the WCC may remain active after transmission of the data stream to receive a return signal indicating additional analysis that may be required by the desired endpoint. In which case, the WCC will perform the additional analysis and transmit the result set to same or a different endpoint. The desired end point for the second transmission may be encoded in the return from the original end point receiving the initial result set or image.

In one embodiment, a projectile WCC energized by wind turbulence is provided. In one example, a WCC may be embedded into a housing designed to be projected in the air. Based on the shape and form factor, the WCC will engage in a trajectory of flight but will also have a spin or change in orientation according to the effect of the wind stream passing the housing. In this embodiment, the WCC utilizes the spinning motion to energize pump energy or a power harvesting device. The WCC can further be equipped with any sensor capable of sampling and transmitting data pertaining to its environment. Such sensors may be environmental sensors able to detect biological agents, gas, chemicals in the air, weather, rain, wetness, dryness, etc. The WCC sensors may be disposable and dropped from airplane, shot from a projectile, released from a projectile, etc.

In another embodiment, a WCC faucet for dispensing liquid is provided. A WCC may be formed into a housing shaped as a kitchen or bathroom sink faucet handle. When the WCC faucet handle is turned to the expected ON state, the WCC converts the mechanical energy from the movement of the faucet into pump energy, causing the WCC to engage in a coded communication signal transmission to a desired end point such as a home automation server, APP, or directly to a solenoid-actuated valve having a receiver. In one embodiment, the home automation server or APP, according to its intended water conservation program, may deliver a coded communication to the solenoid-actuated valve, commanding the value to go from the closed to the open state, causing the water or liquid to flow through the valve. In one configuration, a WCC water dispensing system may be configured in a separate housing but likely a short distance from the WCC faucet control. In one embodiment, the solenoid-based water valve may be triggered for a programmed duration upon receive of an activation signal or may receive a secondary signal to turn off, or both.

In one embodiment, WCC devices can be used for user identity detection. For example, fingerprint or other biometric unit may be configured with an integrated field generator unit and configured to enable a single pushbutton activation posture that results in detection and transmission of the user identity. A fingerprint or any biometric sensor capable of uniquely identifying the user is, in one example configuration, mounted to top edge of the movable portion of the switch chassis. The user makes contact with the identity sensor using a finger and presses to motion or manipulate engagement of the switch mechanism, resulting in the creation of the activation field. In one embodiment, the activation field may be buffered through an actuator or power pump to provide energy to active the biometric unit, resulting in the biometric unit creation of a data structure uniquely identifying the user causing the activation of the switch. In some embodiments, a microcontroller or other circuit may be used to couple the output of the identification data structure to a transmission unit. In still other embodiments, the unit may be equipped with ROM storing a switch ID. The switch ID is preferably transmitted by the transmission unit along with the user identification data.

In other embodiments, user biofeedback transmission is provided. A biometric unit may be configured with an integrated field generator unit and configured to enable a single pushbutton activation posture that results in detection and transmission of a condition of a user. User condition may include, but not be limited to, any measurable metric associated with the current condition of the user. Typical measurements include temperature, galvanic skin response, EKG, heart rate, pulse, during operation. In one example, a user places themselves in a suitable position required for the selected bio sensor and engages in the activation of the switch, resulting in the creation of an energy field.

In still other examples, the field may be buffered through memory or a power pump to provide energy to active the biosensor unit, resulting in the biometric unit creation of a data structure indicating the measured health condition of the user. In some embodiments, a microcontroller or other circuit may be used to couple the output of the identification data structure to a transmission unit. In one example, a unit may be equipped with ROM storing a switch ID. The switch ID is preferably transmitted by the transmission unit along with the user identification data.

As discussed in this disclosure, activation of a WCC device can be via many ways. The WCC device can be powered, e.g., connected to power or via a battery, or can itself harvest power from mechanical input. In some embodiments, WCC devices may be associated with dial knob transmission, dial knob with pushdown transmission, control pad with push activation, control pad with chassis mounted activation, a keyboard, a slider control transmission (i e dimmer light switch), a dial knob with pushdown transmission with rotating e-ink, a dial knob with pushdown transmission with stationary center display e-ink, a user thermometer transmission, environmental condition transmission, projectile activation, use of RF energy harvesting in addition to mechanical or battery or wired electrical power, a mesh network shoe integration with watch, a rotary encoder TX per click, an ultrasonic beacon, stadium food ordering, grocery store & retail, near field integration for contactless user identity, near field integration for contactless payment, near field integration for contactless payment plus RFID to unlock paid items from doorway security, or combinations of two or more thereof. In one embodiment, a WCC device can include a rotary knob to select a type of information to display in relation to food or types of food to be purchased. For example, the display can provide: gluten y/n, diary y/n, nuts y/n, organic y/n, fat, vitamins, etc.

In some embodiments, spark-voltage generation mechanisms for gas lighters and the like utilize a cam mechanism operating in a series of actions that a hammer strikes a piezoelectric element and generates a high-voltage pulse by releasing a compressed spring, in which the spring is compressed and released by applying only one-way compression force. A WCC device can incorporate such a device, for supplying or amplifying the force impacted or transferred to a power pump, e.g., piezoelectric element.

In one embodiment, a strong spring is compressed by finger pressure, while the hammer rests on a "shelf." When an activator reaches a point, a hammer moves off the shelf and makes impact upon a crystal, at the same time compressing the spring. The hammer hits the crystal, and the small spring returns the hammer to the "shelf". The crystal, in this example is a piezoelectric element of a power pump. In other embodiments, the piezoelectric material can be a ceramic.

The volume of the ceramic element and the amount of stress exerted on the element are factors in converting mechanical input to electrical energy. The stress on the element is the ratio of the applied force to the surface area of the element. Consequently, when the composition of the ceramic, the volume of the ceramic element, and the applied force are constant, the element that has the smallest surface area will generate the most electrical energy.

In one configuration, a squeeze-type piezoelectric fuel ignitors provide a static mechanical energy input; very low frequency, relative to the resonance frequency of the ceramic, and generates the electrical energy for ignition. In the impact ignition design a spring-loaded hammer that delivers a dynamic input to the ceramic element. The pressure wave generated when the hammer strikes the element once is in one embodiment, reflected multiple times in both the element and the hammer, in accord with the elastic and acoustical properties of the ceramic and the hammer Until the flashover at the spark gap, stress varies along the height of the ceramic element, and exact values for voltage must be calculated by integration over the height of the element. Approximate values derived from the below equation are usually sufficient for developing simple piezo ignition devices. Voltage=[g33×force (N)×thickness of ceramic (m)]; surface area of ceramic (m2).

In one embodiment, activation of a WCC device may include user manipulation of the device whereby a mechanical force is asserted onto the device, causing the device to power on for brief period of time. The activation can be direct or incidental, as described above. Further power can be provided via a battery. In some embodiments, pre-activation settings can be programmed. These settings can be associated with switches or rotary knobs or any setting, condition, RFID or field established prior to activation. Furthermore, transmission bursts may be used. For example, a sequence of transmission data sent from the WCC device over a wireless network to an end node.

In one example, the coded communication can include a node ID of the receiving device, state of pre-activation settings, encryption info etc. In some embodiments, active scanning is possible. For example, after activation of a WCC device a multitude of sensor data may be read into the device. Sensor may be data sourced from one or more sensors. For embodiments that include multiple sensors, the device can be configured to read the sensor output in a time multiplexed manner, or simultaneously or in any order.

In some embodiments, multiple sensors may be configured into a device but during operation only selected sensors may be scanned. Furthermore, the sequence of scan operations during an activation cycle may be linked to the status of scan values read during the current or previous scan sequence. Future scan sequences can be set according to the present or past scan values. The order and selection of capturing sensor output, the selection of ones to power (if necessary) may be determined dynamically or in pre-configured order to ensure adequate tradeoffs are made according to desired operation given limitations that may be present when operating under complete passive-mechanical mode.

In some embodiments, an active sensor is provided. Any sensor that requires a voltage to produce an output including fingerprint sensor, may be provided. In some embodiments, field resistance level may be adjusted or sensed for use in defining the state of operation of the module or comprising data made part of the transmission burst. In some configurations, a passive-mechanical mode is defined or a multitude of modes. In one embodiment, a WCC device is configured with no supplemental power that operates on energy harvested from the environment and/or through user manipulation to create a voltage burst.

In one embodiment, the power pump may be a hammer-based piezoelectric spark generator, a compression-based voltage generator, a bending-motion-based voltage generator, a combination units bend and snap, a dynamo rotational, or combinations of two or more thereof.

In still other embodiments, single rotary knob provide dynamo power plus acts as a state encoder to form part of the definition of the transmission burst. In another example, a single rotary knob may have fingerprint or other sensor on topside is provided. In another embodiment, a single rotary knob may be pushbutton to trigger transmission burst after activation is provided. In another embodiment, a light or sound may provide an indication when device has suitable power to perform operation is provided. In another embodiment, light or sound may provide an indication when device has suitable power to perform an operation selected by the state of the device. In another embodiment, light or sound may provide an indication when device has suitable power to perform an operation selected by the state of the device and the current state of inputs.

As noted above, many types of mechanical activation forces may be provided or received by the WCC device. Examples further include, without limitation, to push button, rotational, flick with finger, tap on table, press on object, press on compressible chasses, twist on handle, close on hinge, or any other direct or incidental force input or activation. In one example, tap-based (vs pushbutton) activation oriented devices will want to have the secondary sensor aligned such that when held in the activation pose the sensor is coupled to the sensed condition. For example the fingerprint sensor on a USB stick will be positioned so when naturally held the thumbprint scanner reads the user identify while the user taps the activation gesture.

In some configurations, energy harvesting by a power pump can have multiple implementations, wherein some are optimized for power generation, some optimized for peak power, and others optimized to store the most amount of power to a storage cell. Example technologies useable for harvesting power and using such power is provided herein. It should be understood that any one of these circuits, methods, and structures may be combined or assembled to define a WCC device.

Several of the inventive WCC configurations used herein utilize a power pump activation where a mechanical force is applied to an element of the power pump to generate power. It is desired that the power pump operate efficiently for each intended application, yet efficiency of the power pump will depend on the several factors, including the choice of material used for the power pump element, the strength of the mechanical force and the circuitry that harvests the power created in response to the mechanical force applied to the element.

In addition, WCCs will be packaged in a variety of housings such as light switches, door hinges, door knobs, appliances, outlets, remote controls, panels, and each device will deliver or embody, a resonant frequency, a limit on choice of materials, a target amount of power that can be harvested and will demand a simple or transparent user interface necessary to satisfy the desired functionality.

The constraints above must be balanced across a variety of application profiles each having unique cost/benefit/durability metrics. Yet cost tradeoffs alone will influence much of the design parameters, yielding to material performance and manufacturing tolerances and quality etc., but also impacting the power efficiency of the WCC.

WCC efficiency can be measured in terms of both the power utilization of the energy required for the intended function but also by the amount of harvested energy produced by the power pump. Harvesting pump energy is therefore a key factor in determining overall WCC efficiency and usefulness. Therefore it is desirable to maximize the harvesting of electricity generated by the mechanical force on the element of the power pump.

WCC structures, like a tuning fork, may have a fixed resonant frequency. If you strike a tuning fork to ring it, it will resonate and its resonant frequency. To efficiently harvest the power from the tuning fork, bring another identical tuning fork near it and the energy is transferred, making the second tuning fork ring.

WCC power pump will ideally foster a frequency of the source vibration that is matched to the resonant frequency of the energy harvesting circuit. It is possible to tune the resonant frequency of a WCC power pump to the source vibration caused by the mechanical force, using a resonant tank circuit or using a tunable reactive impedance at the output of the device.

However, manufacturing tolerances and design trade-offs will make it difficult to match the WCC resonant frequency to the source vibration frequency, and the source vibration frequency may vary with time, or with the state of an object coupled to produce inadvertent force on the WCC. For example, a certain door hinge WCC may have a first resonant frequency when closed, and a second or variable resonant frequency when opened to different operating angles. In any case, including for WCCs offering substantially fixed resonant frequencies, it may be beneficial to implement a tunable reactive impedance method, such as a bias-flip technique, or further, a closed loop technique that may tune the resonant frequency of a tank circuit dynamically according to the output the changing profile of the power pump energy. This can be useful in situations where the resonant frequency of the WCC changes predictably.

In some embodiments of WCC devices, an inductor is added in parallel to the resistive load of the WCC logic circuit in the power pump to cancel the capacitive admittance of the circuit. In some embodiments of WCC devices, the power pump is configured to normalize the output power it generates. In some embodiments of WCC devices, the power pump is configured to produce an output power profile that contains at least two harmonic voltage peaks at frequencies lower and higher than the resonant frequency operation of the WCC power pump. In some embodiments of WCC devices, a profile of the load resistance used during an activation cycle is known to the WCC in advance of activation, and the energy harvesting circuit or power pump itself is configured dynamically over the course of the activation cycle to ensure efficient use of power during the activation cycle. In some embodiments of WCC devices, a profile of the load resistance is not known entirely in advance but known load levels and durations are predetermined and correlate to functions that may be performed by the WCC.

In some embodiments of WCC devices, WCC operates in a closed loop control back to the power pump. In some embodiments of WCC devices, WCC operates in a closed loop with the power pump to tune the capacitive admittance to the current loads of the WCC function. In some embodiments of WCC devices, WCC operates in a closed loop with the power pump to tune the resonant frequency of a tank circuit coupled to the power pump. In some embodiments of WCC devices, WCC operates in a closed loop with the power pump to change the value of inductance imposed in a circuit coupled to the power pump.

FIG. 1A illustrates one example embodiment of a WCC device 100, in accordance with one embodiment. In this example, the WCC device 100 includes a power supply 104, a power storage 106, and logic/wireless Rx/Tx circuitry 140. As will be described below, the logic can be defined by an integrated circuit, a microcontroller, and application-specific integrated circuit (ASIC), firmware, coded instructions, or any other type of processing logic is capable of performing a predefined function. In some embodiments, the function is programmable and changeable based on input settings by a user, or another application, or a program. As illustrated, the power supply can include a power pump 102.

In one embodiment, power pump 102 is a piezoelectric device. For example, when a force or mechanical stress is applied to the piezoelectric device, a voltage is produced. The voltage can then be harvested by communicating that voltage in the direction of the diode to the power storage 106. The power storage 106 can include, for example, a capacitor. The capacitor can store the voltage in the form of charge is built up in the capacitor. Depending on the amount of voltage generated by the power pump 102, such as in response to a number of button pushes or force applications, charge is generated and the generated charge is harvested by saving it to the power storage 106. In one embodiment, when the power storage 106 has received a sufficient amount or a threshold amount of power in the capacitor or capacitors or array of capacitors, the logic 140 can process a predefined function and the wireless transceiver 140 can transmit data to a desire end node.

As noted above, an end node can be any processing entity, such as a computer, a router, a server, a cloud processing system, and intermediate repeating node, or any other processing entity that can receive data and process data. The end node, in one embodiment, may be connected to a network, and the network can receive data from the WCC device 100, which is then routed to the end node. As discussed in this disclosure, power harvesting using a piezoelectric device enables operation of the WCC device 100 without battery power or without connection to a wired power source.

For instance, once a sufficient amount of power has been harvested and stored in the power storage 106, the logic can detect that the power has been stored and reached a threshold amount. Such detection of sufficient power may be self-evident upon the logic having suitable power to activate a function. This detection that powers available can in one embodiment trigger the wireless logic to transmit data to an end node. In alternate embodiments, the power supply can be a battery, which omits the need to have a power pump 102.

Figure 1B:
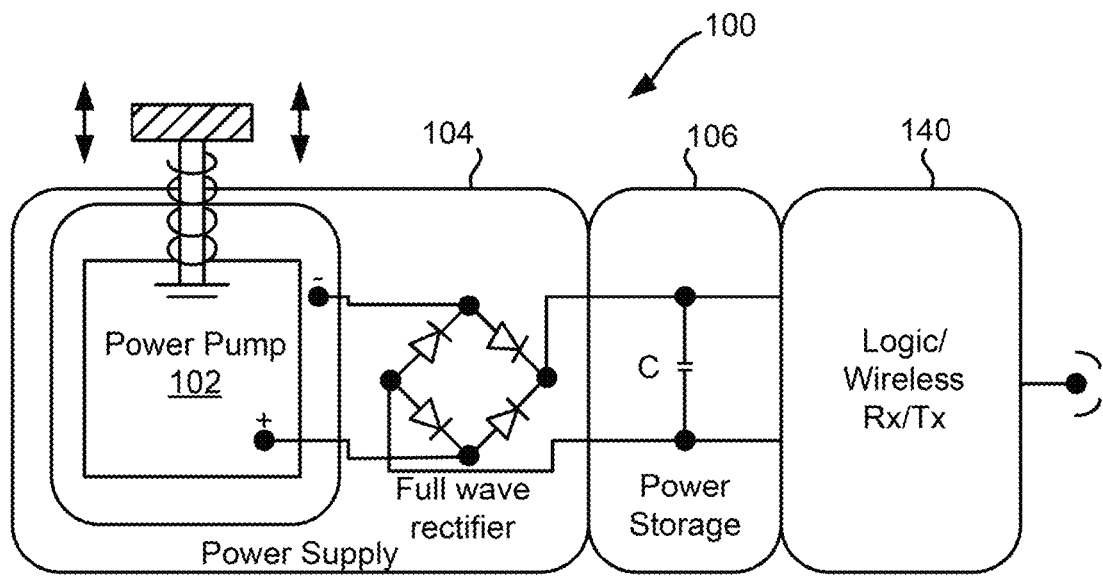
FIG. 1B illustrates an example of a WCC device, which includes a full wave rectifier, in accordance with one embodiment.

FIG. 1B illustrates an example of a WCC device, which includes a full wave rectifier. The full wave rectifier is part of the power supply 104. The full wave rectifier, in one embodiment, is capable of improving the harvesting of power generated by the power pump 102. For instance, the full wave rectifier can assist in achieving more harvesting of the generated power by the power company to and thus more efficient and more rapid charging of the capacitor of the power storage 106. As mentioned above, the WCC device 100 can be triggered using any number of forms. The button illustrated in FIGS. 1A and 1B are simply examples of the supply of force to the power pump 102.

Specifically, the force can be applied to the power pump 102 by direct application of mechanical forces. The mechanical forces can be intentionally applied and directly applied by a user, such as by pressing a button, sliding a button, tapping a button, toggling a switch, pressing a service, and any other forms of force application described throughout this application, and other equivalent forms that are within the scope of those skilled in the art.

As further noted above, the application of the mechanical forces can be indirect. For instance, if the WCC device 100 receives a force indirectly because an object is moved, it was not the intention of a user to supply forced to the WCC device 100. Nevertheless, the WCC device 100 will receive the force (e.g. mechanical force), and that force is transmitted to power pump 102.

FIG. 2 illustrates another example implementation of a WCC device 100. In this example, the power supply 104 includes a power pump 102. Force input 126 can be provided to the power pump. The force input 126 can be defined by one or more presses or mechanical forces applied thereto. In this example, X number of presses can be associated with program one (P1), X presses+1 can be associated with program two (P2), X presses+2 can be associated with program three (PS3).

In one embodiment, the integrated circuit (IC) 114 can be programmed with any number of settings. The settings can be predefined by manufacturer, or can be programmed by a user to suit their specific needs. In this example, three programs are set by the integrated circuit 114, such as P1, P2, and P3. Each of the programs can be associated with a specific light indicator, which can identify setting 1, setting 2, and setting 3. In other embodiments, a WCC device 100 can have more settings or less settings. This example simply shows that the WCC device 100 can have some sort of indicators, such as LEDs, or even a display to indicate what programming is available or what programming has been set.

In this illustration, a programming device 130 can be used to make program settings 132. The programming device can be any number of computing devices, which may be connected to the WCC device 100 via a wired connection. In another embodiment, the programming device 130 can be communicating with the WCC via a wireless connection. In one example, the programming device 130 can be a user's computer, a user's smartphone, a user smart watch, a user's Internet terminal, a custom-designed program device, or any number of interfacing logic devices that are capable of communicating program settings 132, including another WCC device. In one embodiment, the integrated circuit 114 can save the program settings 132 to a memory 112.

Memory 112 can be communicating with the integrated circuit 114 as well as to the power storage 106. A display device 110 can also optionally be provided. As noted above, low power displays can be used, such the power storage 106 can provide power to display 110. In one embodiment, the WCC device 100, once programs, can operate to generate coded data that is communicated to a network 120. In other embodiments, the network 120 can communicate information back to the WCC device 100. Memory 112 may be volatile or non-volatile including flash based memory capable of storing persistent data.

In some embodiments, the WCC device 100 can be preprogrammed with the program settings 132 to communicate to a specific end node. The WCC device 100 will utilize a wireless chip 116 to enable the communication, which is a wireless communication to the network 120. In one embodiment, the wireless communication by the wireless chip 116 can be directly to another device. For instance, the WCC device 100 can communicate with another WCC device 100, a local node, a router, a local computer, or other device without a network. In other embodiments, the communication can be to a mesh network. The mesh network can include repeater notes that enable transmission of coded data output by the WCC device 100 to the desired end node.

FIG. 3 illustrates an example of program settings 132. These program settings are simply to illustrate that any type of settings can be made. As such, one of skill in the art will understand that the program settings are purely customizable by the user depending on the implementation and needs. In some embodiments, the WCC device 100 can be preprogrammed with a predefined function. These predefined functions can be programmed by a manufacturer before the WCC devices 100 are distributed or sold.

However, if the WCC device 100 is programmable, different settings can be made to the WCC device 100. The settings provided in the program can include defining different types of functions to be performed by the WCC device 100. In other embodiments, the settings can provide a single function to be performed by the WCC device 100. FIG. 2 illustrates that the WCC device 100 can perform five different functions, which are associated with five different settings (settings 1-5). As shown, one example of a setting can be to send a message.

The message can be preprogrammed to include different types of messages. In this example, the message of setting 1 can be to send a request for help. In another embodiment, it could be to send an email or text to a specific end node or recipient. In another embodiment it can also provide a location of the WCC device 100, such as when the message was sent. In one embodiment, geo-location data can be captured by the WCC device 100.

The geo-location data can also be sent along with the messages communicated by the WCC device 100. Setting 2 illustrates a message that can communicate to a desired end node that the user is okay, or you can send an email, or text with preconfigured data or messages. Setting 3 can include a request, such as a request of batch messages from a messaging service. For instance, the user may have a preprogrammed account from which the user can pull message data from. For instance, the user can make a payment to an email account, a text message account, or other service.

Data can then be received by the WCC device 100. In one configuration, data is received by the WCC device 100 when sufficient power has been stored in the power storage 106. As such, a WCC device 100 can perform both transmission and receiving of data during a single charge. In other embodiments, multiple charge operations can be performed, such as by more power harvesting by the power supply 104 having a power pump 102.

Figure 4A:
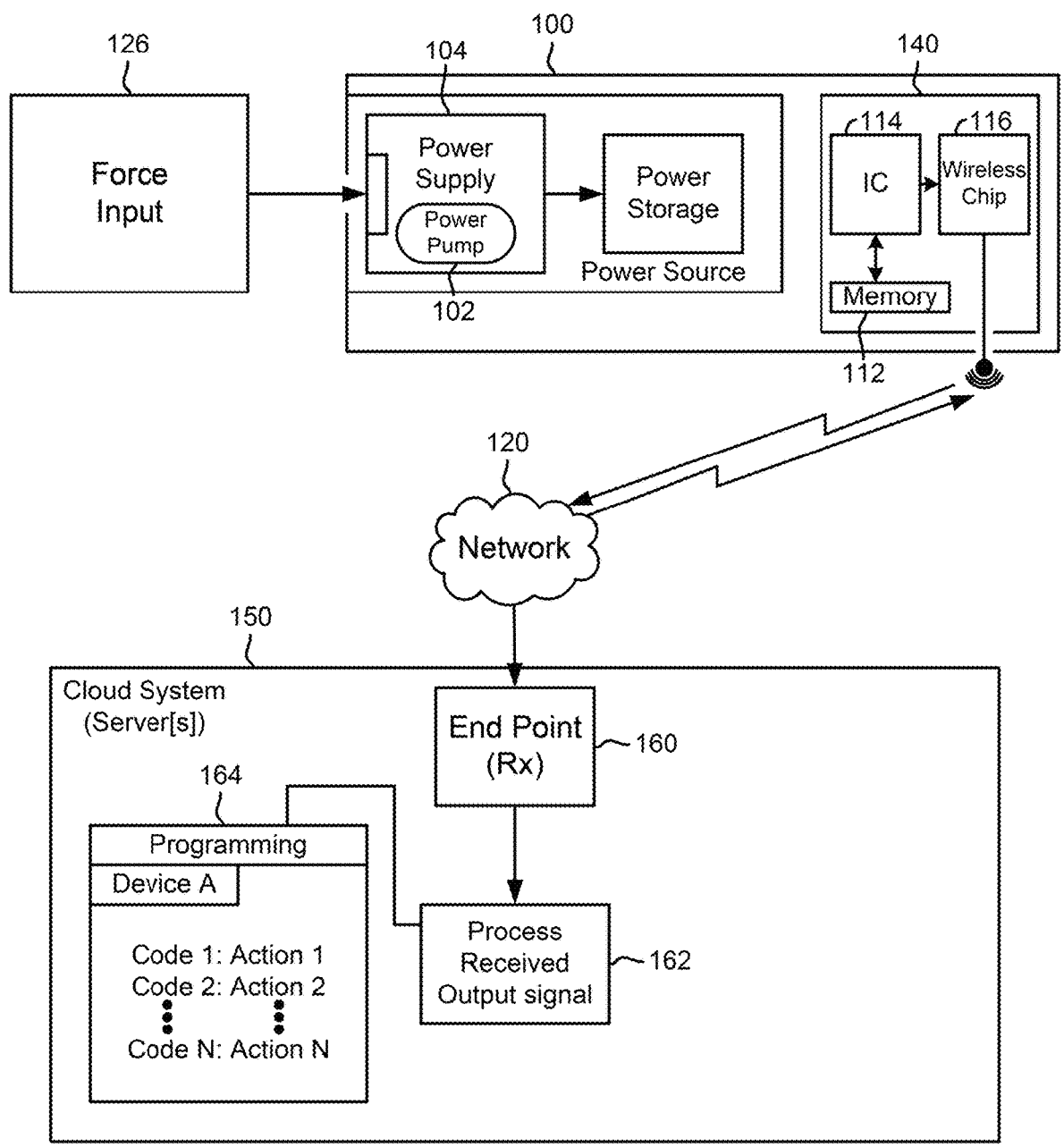
FIG. 4A illustrates another embodiment of a WCC device, in accordance with some embodiments.

FIG. 4A illustrates another embodiment of a WCC device 100. In this example, force input 126 can be provided to the power supply 104, suggest activate the power pump 102. Power storage will occur when the power pump 102 produces voltage that is optimized for power storage. The logic in wireless circuitry 140 includes the integrated circuit 114, the wireless chip 116, and memory 112.

The wireless chip 116, in one embodiment, is a Wi-Fi chip. In another embodiment, the wireless chip 116 is a Bluetooth chip. In another embodiment, the wireless chip 116 is a radio frequency communication chip. In another embodiment, the wireless chip, memory and microcontroller are all formed on single chip or module. In another embodiment a hybrid chip module containing the wireless functionality, memory and micro controller or logic chip is an ESP8266. In other embodiments, the wireless chip 116 can be defined by other communication protocols, modes, and network transmissions. In some embodiments, the integrated circuit 114 and the wireless chip 116 can be integrated into a single chip. In some embodiments, 114 and the wireless chip 116. The WCC 100 can communicate with a network 120. In one embodiment, data can be sent by the WCC 100, based on its programming which can be stored in memory 112.

The data can be preconfigured to be sent to a specific end node via network 120. In this example, network 120 can communicate with an end node 160. The end node 160 can communicate with a process that is configured to receive the output signal 162. The output signal 162 may be or include a payload. A cloud system 150, which can include a plurality of servers and storage, can be configured to receive the payload data processed and sent by a WCC 100. The end node 160 can therefore communicate with the process 162, which can communicate with logic that understands programming 164.

The programming 164 can be configured to perform specific actions, process specific routines, execute specific codes, send specific messages, respond to specific codes, and/or process specific custom routines. The cloud system 150 can therefore include the end node 160. In other embodiments, the end node may communicate with the club system 150. In various embodiments, the network 120 can communicate with multiple end nodes 160. Any WCC or end node may also communicate directly with servers or peers outside a local area network using NAT traversal techniques. A WCC or end node may also be part, participate in, or be coupled to a chord overlay network.

Figure 4B:
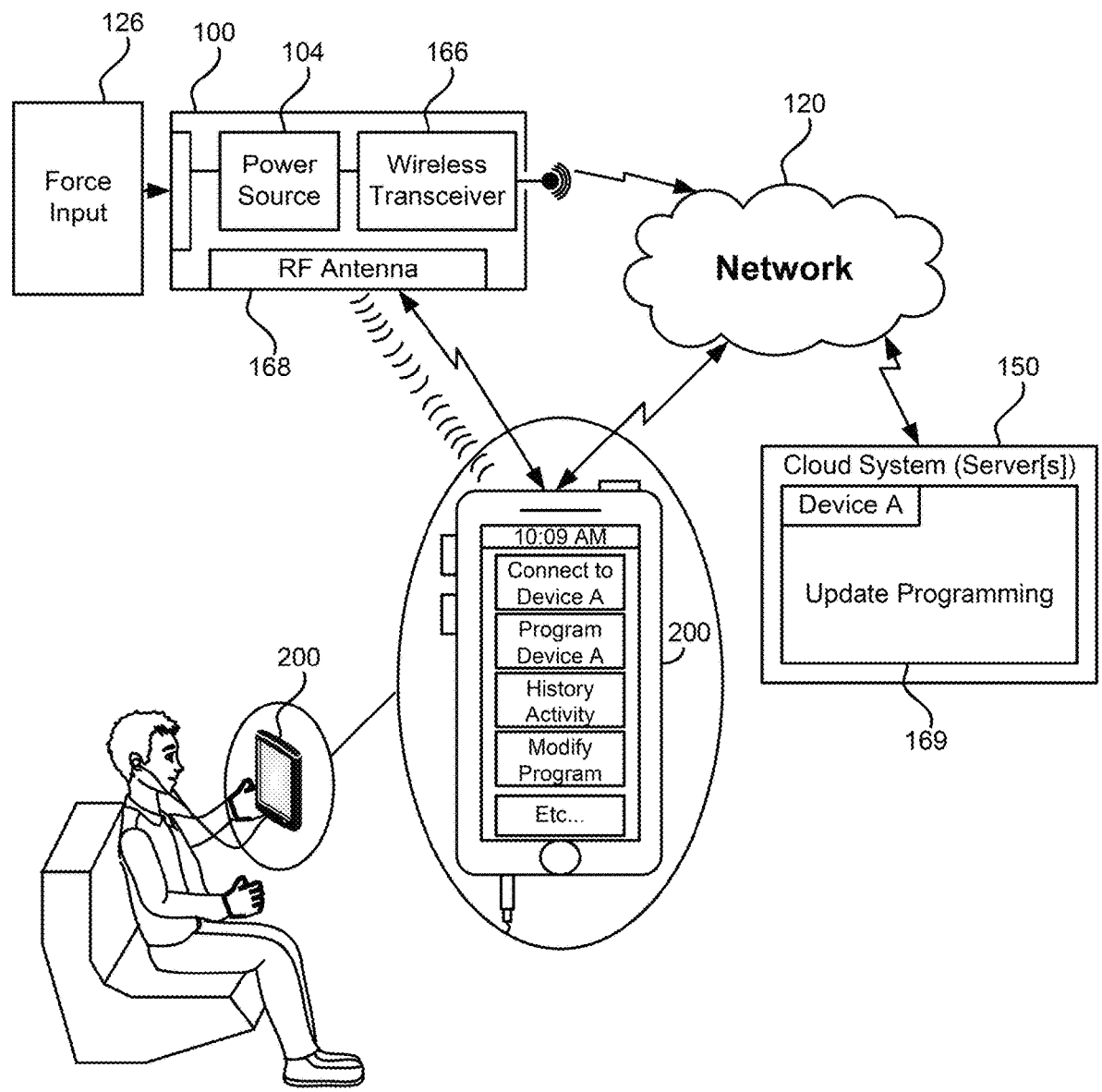
FIG. 4B illustrates another example of a WCC, in accordance with some embodiments.

FIG. 4B illustrates another example of a WCC 100, which receives force input 126. A power source 104 is shown in communication with a wireless transceiver 166. Additionally, an RF antenna 168 can also be provided as part of the WCC 100, in one embodiment. In this configuration the power source 104 can be a battery or can include a power pump. The RF antenna 168 can be used to receive RF signals directly from another device, such as user device 200. In other embodiments, the user device 200 can communicate with a network 120, and the network 120 can communicate with the WCC 100.

In some embodiments, device 200 can be used to program aspects of the WCC 100. For example, a cloud system 150 can be used to enter programming settings, such as settings for device A 169. In this example, the WCC 100 is device A. The cloud system 150 can allow any number of users to access a programming functionality, and identify the specific WCC devices that are associated with their user account. In this example, the user is able to access his device via the cloud system 150, or directly via a local signal communicated to the RF antenna 168. As illustrated, the device 200 can be provided with a user interface that includes a number of settings.

The settings can be used to communicate with the WCC device 100. In one example, the user can communicate with the device in response to a connection request. In another embodiment, the user can select the program device A. In another embodiment, the user can select to access a history of activity from the WCC device 100. In other embodiments, the user can decide to modify a program that is previously stored in the WCC device 100. Various other settings can be used to interface with the WCC device 100, either locally or via a network 120.

Figure 4C:
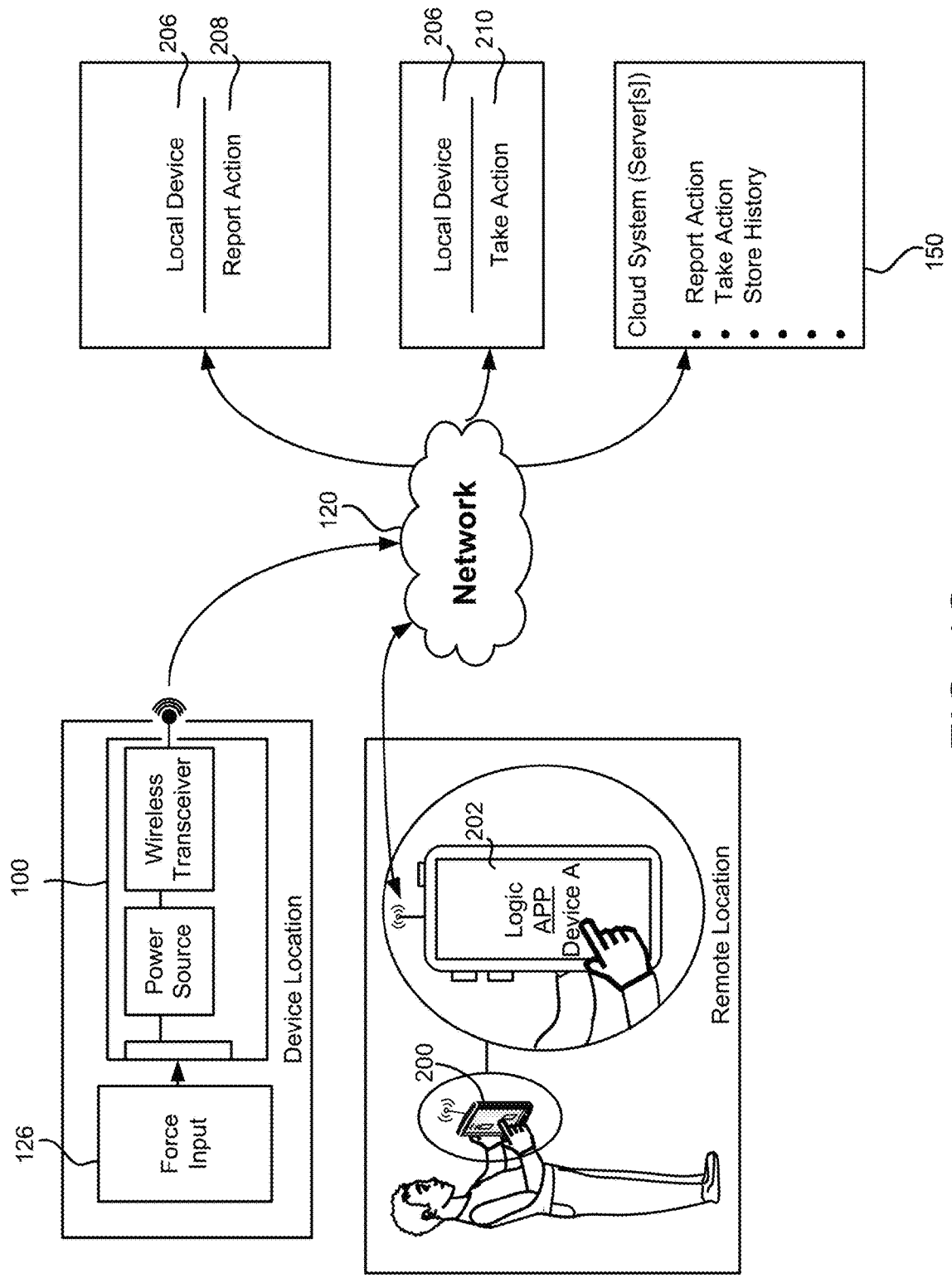
FIG. 4C illustrates an example of a WCC device that includes a power source and a wireless transceiver, and an input for receiving force input, in accordance with some embodiments.

FIG. 4C illustrates an example of a WCC device that includes a power source and a wireless transceiver, and an input for receiving force input 126. The WCC device 100 can be located at a specific device location. The device location can have access to a network 120. At another location, such as a remote location, the user can access the WCC device 100 (device a) using an application 202.

From the remote location, the user can utilize device 200 to access the network 120. In one embodiment, a local device 206 can also communicate with the WCC device 100. In another embodiment, local device 206 is another WCC device. The local device can be another computer, or device that receives information from WCC device 100. Report actions 208 can be received from the WCC device or other WCC devices via network 120. In other embodiments, a local device can include instructions, data in response to an inquiry or command made by WCC, payload data or code that are sent to a WCC device 100, such as to instruct the WCC device to take an action. The action can include, for example, sending a message, turning on a signal, vibrating the WCC device, outputting a sound for the WCC device, outputting a display message, transmitting display information, calling a function, passing arguments to a function, or communicating a new program or data.

The cloud system 150 can also receive data from the WCC device 100. The data can be stored, and associated with a reported actions database. In other embodiments, actions taken by the WCC device 100 or actions instructed to the WCC device 100 can be stored in the log, or access by a remote user via their device 200. In one embodiment, the cloud system 150 can also store of history of actions taken by WCC devices, state changes, information sent, user identification, sensor values, network quality of service levels, authentication events, transaction events, payloads, selected controls, data received, timestamps, and other metadata.

FIG. 5A illustrates an example of different types of power sources 104, which are nonexclusive of other types that are possible. In one embodiment, the power source 104 can be a battery 104a, a piezoelectric device 104b, a photovoltaic cell 104c, a magnetic power generator 104d, a capacitive storage 104e, electrochemical cells 104f, a radio frequency (RF) harvesting system 104g, a heat sensor power harvesting system (e.g., thermal electric generator (TEG)) 104h, alternating current (AC) power, and others. Combinations of the above power sources are possible. And a WCC device 100 that operates with an energy harvesting device based on mechanical force can be used along with a primary power source to supply a secondary power source that is either isolated from the primary power source or merged with the primary power source to provide a power capacity necessary to perform any action.

Increasing the power capacity or mAH in this manner may provide necessary supplement to enable any device chip or functionality, whether it is part of WCC device 100 or the device operating in connection with the WCC device 100. In other words, the voltage boost is not intended to be limited exclusively to using the voltage boost for WCC device 100 activity.

As noted, the WCC device 100 may be configured with an RF harvesting system 104g. In one embodiment, the WCC device 100 will have an antenna that is configured to capture RF power that may be in the vicinity of the WCC device 100. An RF harvesting is a process whereby Radio frequency energy emitted by sources that generate high electromagnetic fields such as TV signals, wireless radio networks and cell phone towers, but through power generating circuit linked to a receiving antenna, captured and converted into usable DC voltage.

The ambient energy, generally, may come from stray electric or magnetic fields or radio waves from nearby electrical equipment, light, thermal energy (heat), or kinetic energy such as vibration or motion of the device. The DC voltage that is generated may then be used to charge or store power to a power source 104. In some embodiments, the RF harvesting system 104g can include an impedance matching circuit that is tuned to capture certain frequencies of RF power. A rectifier circuit may then receive and rectify the RF power wave forms, which are stored in the power source 104. In some embodiments, a booster circuit may to generate amplify power used by the WCC device 100.

As mentioned above, RF harvesting 104g may also be used as a power source, e.g., for an IOT, a WCC device, or the like. In one configuration, a method is defined for harvesting energy from ambient radio frequency transmissions present in the airwaves. First, a WCC device can be equipped with a power source circuit receiver that harvests the ambient RF energy in proximity to the WCC. Such RF-based energy harvesting power source could be tuned to a specific frequency where known radio waves are abundant, such as a frequency tied to, for example, one of the Wi-Fi bands, FM or AM broadcast bands or a cellular band such as GMS, 3G or 4G LTE, HTMS, or other.

Second, the power source circuit could be tunable across a range of frequencies, and whereby the circuit itself detects the best frequency to select for harvesting RF in order to harvest the most power. This may be accomplished in a closed loop where output power is monitored and frequencies are scanned (i.e. round robin or otherwise) until one cycle of testing each frequency band associated with known RF energy sources in the tunable range was tested, upon which the tuner is selected to change to the band generating the maximum power.

Third, an RF-based energy harvesting power source may be equipped with multiple tuners and harvest RF from multiple frequency bands. Tuners can be configured as fixed frequency, variable frequency, or include both fixed and variable. When using multiple tuners, the circuit may be configured to scan the available frequencies and select one or more frequencies to achieve maximum harvested power.

Fourth, the RF-based energy harvesting source may learn the environment and be able to profile the timing of frequencies and self-adapt a tuning change schedule suited for harvesting energy from a particular location. The RF-energy harvesting power source, when learning a time schedule for switching tuning frequency or for waking up to harvest, scans power across the frequency band and detects and logs peek activity by time and frequency.

In one example and without limitation to other methods, to reinforce what we shall call "location adaptive dynamic RF-harvesting power source", consider a factory that operates a faulty motor consistently at 1 pm for one hour and during that time, the motor is inadvertently transmitting high RF energy at a specific frequency. Over time, the RF-power harvesting supply, using time-stamping and history of power output and frequency, using known statistics, detect the daily event at 1 pm and the RF-power harvesting circuit can adapt its tuning pattern to lock into the motor output RF-frequency from 1 pm to 2 pm, to capture the RF burst that occupies the airwaves in proximity to the RF-power harvester. While this example illustrates the dynamic ability of the RF-power harvester, it also illustrates how a WCC or any device coupled to the RF-power harvester can be used to raise a flag to new and possibly unknown RF activity.

For example, if the RF-power harvester was equipped with a baseline profile of known RF energy spectrum for an area, and FCC or other regulatory guidelines on use of spectrum in proximity to the device, then any activity outside of the baseline may signal an electrical or mechanical failure or suspicious interference, leading to find and correct the faulty motor before catastrophic failure. In summary, a location adaptive dynamic RF-harvesting power source may scan and change frequency to maximize power output, may engage in switching decisions based on closed loop monitoring or historical or predictive RF patterns in the air, and may report frequencies that can signal a mechanical failure or suspicious RF. WCC may be coupled to one or more antennas to increase the capture of RF for energy harvesting. A traditional antenna may be used. One or more traditional antennas may be used. Alternate antennas may be used, including but not limited to, a pipe, cord, vent, steel stud, gutter, machine, flat, coil, frame, shelf, floor, wall, ceiling, shingle or any building or other material constructed or positioned in a manner and able to receive RF energy.

In still another embodiment, methods may be used to detect a state of the current or another device based on AC Ripple. For example, a use of a WCC device may include the ability to monitor the consumption or output of another device and deduce, report, or act on the change in status of the decoupled device. In one embodiment, a WCC AC power outlet may be capable of keeping track of devices that are plugged into it. Such may include the ability to determine which device is plugged into the outlet at any time. However, such may also mean determining a condition or change in condition of the device plugged into the outlet.

Typical consumer electronic devices that draw alternating current (AC) power leave a fingerprint of AC ripple modulated on top of the 60 hertz AC signal. The ripple pattern changes with changes in the AC power profile of the underlying device. For example, it is possible to detect when a compressor for a refrigerator turns on or off. It is possible to detect when a cell phone charger changes from primary charge mode to maintenance trickle mode. It is possible to detect when a coffee maker is actively heating water vs. when sustaining a heat base to keep coffee warm vs when it is not making coffee but keeping time.

Devices plugged into an AC socket may be registered with the AC socket, causing the download of a device profile that may contain known safety tolerances for the device as well as a state table and notification table that defines conditions upon which the WCC outlet may trigger notification. Notification may be safety related or related to a condition of the device which needs attention. For example, a user may register the model number of their refrigerator to the WCC AC outlet, causing the WCC AC outlet or system monitoring the WCC AC outlet to receive the device profile upon which the WCC AC outlet may monitor the AC ripple fingerprint of the refrigerator (or any appliance or device that can consume or use AC power) to determine, for example, if the compressor is being run beyond the threshold for the device profile, which may indicate a door left open or failure of the compressor. An appropriate notification may be sent to a user to remedy the situation. The notification can be by email, by text, by phone call, by message, or data posted to a website or database for access by an application (e.g., via a user account).

The device profile may be generic but local offsets may be applied to accommodate for both time of year and geographical differences as well as operating conditions within the geographic area of use, including high altitude areas (i.e., for boilers), hot vs cold weather areas, etc.

Still further, the WCC AC outlet may send data itself over the AC line to a receiving device, using internet of power line technology. In which case, the modulation of data packets over AC line may need to be filtered from the AC line to eliminate the interference from the data transmission. Or, the data transmissions can be burst and sequenced at a specific duty cycle to allow for interleaving of quiet times where devices can be monitored without the possibility of interference from IP packets or data over the AC line.

The use of a WCC AC outlet can provide monitoring of both next generation "smart" appliances but also "dumb" legacy appliances that otherwise have IOT reporting capabilities. However, the techniques described in connection with monitoring AC outlet for AC ripple profile of devices coupled to the outlet can be built into next generation "smart" IOT or WCC appliances that are particularly configured to be plugged into traditional legacy power outlets.

In one such embodiment, an IOT appliance itself monitors the power consumption and/or AC ripple passing through its power cord, and it confirms that the profile of the ripple conforms to the expected pattern of ripple given the current and/or usage history of the device. If the pattern does not match the expected pattern, or the pattern matches a known consumption or fingerprint pattern of a known fault, a payload may be transmitted to a desired end node. The payload may be transmitted over AC power line or wirelessly.

In one embodiment, if the consumption pattern does not match the expected pattern, or the pattern matches a known consumption or fingerprint pattern of a known fault, a bridge circuit may cut off AC supply from the device and switch to an alternative power source. In such circumstance, the WCC or IOT device may engage in a payload may be transmitted to a desired end node to indicate change in power status.

In some embodiments, dynamic local cloud (DLC) maybe formed from at least two WCC devices. DLC's are described in greater detail in priority application US. Provisional 62/387,403, filed on Dec. 24, 2015, which is herein incorporated by reference. Broadly speaking, DLC clusters may share compute, storage and I/O services and coordinate the running of applications or services. In one embodiment, the DLC service may act to register and pair new WCC and IOT devices to grow the DLC service base. In some implementations, the DLC operates, forms or exchanges data to a sever-less, event driven, infrastructure while in other implementations, the DLC operates, forms or exchanges data with a server-based infrastructure, and then there are embodiments involving hybrid infrastructures involving both forms of network topology.

Some embodiments, without limitation, relate to internet of things (IOT) devices, sensors and devices, and communication logic for interfacing IOTs, receiving data from IOTs, assembling data received from IOTs, sharing resources of IOTs, sending state data to IOTs, requesting data from select IOTs, data mining "big data" received from many IOTs, interfacing IOTs with larger systems, setting security levels for communicating with select or groups of IOTs. Also disclosed herein are systems, methods and circuitry for assembly of virtual computers using resources assembled from IOTs, cloud communication with IOTs, assembly of logic to interface with cloud resources, automated communication between IOT nodes, and integration of communication logic into IOTs. Further disclosed are systems, methods and circuitry for integration of communication logic in to standard computing devices, use of smart device, smart phones, computers, tablets, home appliances, business appliances, commercial appliances, network devices, and other electronics.

The devices described herein may be WCC devices, IOTs, hybrid devices, standard computing devices. These devices, in one embodiment, produce data from integrated sensors, and/or receive and process data requested from a requested node/computer. The data may be collected over time in databases local to computing resources, databases connected to cloud infrastructure, e.g., datacenters, or distributed in memory of individual devices. Data collected may grow over time, to form "big data," which can be data mined to identify new information, generate rules for analysis, form predictions and assist in machine learning of events, actions, functions, data sensed, and/or model data for more efficient operation of individual devices, groups of devices, or improve inter-node communication. Therefore, the embodiments described herein should be viewed broadly and not restrictive to any one specific example.

In some implementations, functions may be selected and triggered according to results of processing of the payload before, during or after transmission of the payload. In certain embodiments, the WCC device includes the capability to detect or image the identity or attribute of a user, a sound, a scene, object position, QR code, RFID code, barcode, status, temperature, pressure, absence or presence of conditions, environmental condition, vibration, and any signal or source coupled to, near or within sensing range of one or more sensors coupled to, or integrated with, a WCC device.

Returning to FIG. 5A, in some applications, the indication that a power change has occurred in one node may result in a playbook of functions that may include, but not necessarily include, transferring storage from the WCC or IOT device that is experiencing the change in power status, changing or transferring DLC functionality or responsibility in the cluster, modifying resource tables, logging the event in persistent remote cloud, making configuration changes to application software or firmware or DLC code run on the appliance IOT or WCC device subject to the power change, switching back to AC power, engaging in additional testing of AC fingerprint and/or consumption patterns, collecting additional diagnostics, creating an event, and/or logging activity.

Multiple IOT devices may engage in coordinated maintenance and diagnostic routes with one another to maintain or adjust service levels for a DLC cluster. In one embodiment, if a first IOT device experiences a suspected fault. The suspected fault may be identified in various ways either through the device itself or through other devices. In one embodiment a first device senses a potential fault of a second device over the wire.

In other embodiments another device senses a potential fault wirelessly, or through some other field, radiation or signal that is detected either with or without the active polling of the sensed condition by the other device. In one configuration, the indication of a fault has occurred in one node will result in a playbook of functions in one or more IOTs that may include, but not necessarily include, transferring storage from the WCC or IOT device that is experiencing the potential fault, change in power status, changing or transferring DLC functionality or responsibility in the cluster, modifying resource tables, logging the event in persistent remote cloud, making configuration changes to application software or firmware or DLC code run on the appliance IOT or WCC device subject to the potential fault, engaging in additional testing and collecting additional diagnostics, creating an event, and or logging activity.

In one embodiment, upon suspecting a fault IOT will perform a comparison between its actual vs its expected AC ripple fingerprint. Known fingerprint patterns are associated with known states of the device, and a fingerprint that does not match the state of the device will cause a suspected fault upon which an event is generated and action taken to either further investigate or dynamically address and adjust the cluster or device to sustain suitable operation for the desired application or service. In one embodiment, another IOT device is prompted to engage in activity to observe its own AC ripple fingerprint and report the status. The payload reported by either device may include status or an image of the fingerprint. In one embodiment, the fingerprints are compared to determine if local power interference or global noise is causing the mismatch. In another embodiment, more IOT devices are included in the analysis to determine or rule out a cause or fault.

If the consumption or AC fingerprint pattern matches the expected pattern, the device may report no fault in connection with this specific class of monitoring. In one embodiment, an image of the AC ripple fingerprints are periodically or when prompted, shared with an end node which may use the data for understanding, filtering cross-talk and identifying a particular device failure or detecting the state of another device or network event.

Similar to the method of above for monitoring AC ripple patterns for faults, and capturing images of AC ripple from various IOT devices, in some embodiments, RF patterns and communication data at two or more devices are analyzed for quality of service, intrusion detection, malware, signal augmentation, interference or the like. Upon detection of a condition of anomaly at least one IOT device In still another embodiment, a supercapacitor may be used by WCC devices or end nodes. By way of example, a WCC storage capacitor may be of a supercapacitor type. Supercapacitors act like a traditional capacitor, only they can store tremendous amounts of energy. The supercapacitor's high energy storage and high power delivery make it an excellent choice to buffer energy loads, including those involving a high-power load from a low-power, energy-harvesting source. A supercapacitor can be charged very quickly due to their low internal resistance and they can be quickly discharged, too. Supercapacitors offer an important benefit for energy-harvesting applications. In one embodiment, a WCC device uses an energy-harvesting circuit to interface an energy-harvesting source to a supercapacitor. In another embodiment, a WCC device maintains the output voltage or current of the energy-harvesting source so it delivers the maximum possible power.

In another embodiment, over-voltage protection is used to ensure the supercapacitor-rated voltage is not exceeded. In another embodiment, active balancing is used to maintain the supercapacitor cells at the same voltage with a low-current circuit. In another embodiment, a WCC power source is a quasi-crystal nano-diode battery. In another embodiment, a WCC is coupled to a graphene supercapacitor. In another embodiment, the WCC is coupled to one or more supercapacitor that is of a stacked, 3-D type. In another embodiment a WCC device is coupled to graphene-based micro-supercapacitors that are produced on both sides of a polymer sheet with sections stacked, separated by solid electrolytes, where the stacked configuration substantially provides increased energy density.

In another embodiment, a WCC is coupled to a mechanically flexible supercapacitor. In another embodiment, a WCC is coupled to a micro-supercapacitor that is small enough to fit in wearable or implantable device. In another embodiment a WCC is coupled to a supercapacitor that is thinner than a piece of paper yet capable of holding more than twice as much charge as a comparable thin-film lithium battery. In another embodiment, a WCC is coupled to a supercapacitor having a design employing laser-scribed graphene, or LSG with manganese dioxide. In another embodiment a WCC is coupled to a boric acid infused laser-induced graphene supercapacitor.

FIG. 5B illustrates an example of a bridge circuit 105, which may be utilized in some devices to provide one or more of enhanced power management, dynamically or static utilization of more than one type of power, provide power switching, provide controlled gating of output power, and provide power monitoring feedback.

In one embodiment, the IOT or WCC device is connected to a bridge circuit that provides AC to DC conversion. Upon loss of AC power, the bridge circuit optionally notifies the IOT or WCC of the change in power condition. For a period of time after the AC power is cut, the bridge circuit provides the buffered DC output through a capacitor 104$i$.

In some applications, the bridge circuit utilizes a power buffer such as a capacitor to provide power for it to operate. This enables the circuit to engage in switching, monitoring, signaling or any of its function, when changing power sources due to a currently used power source being drained, switched, or cut-off.

When changing power sources, the bridge circuit may switch to another power source. In one embodiment, the bridge circuit gives priority to available power sources and changes the priority table when active power is available. In one embodiment, the priority is changed in response to the state of the power sources.

In one embodiment, the IOT or WCC device is connected to a bridge circuit that provides AC to DC conversion. The DC output is used to sustain charge of a battery power source 104$a$. Upon loss of AC power, the bridge circuit optionally notifies the IOT or WCC of the change in power condition, to signal that power is now operating from battery. In one embodiment, the bridge circuit can also provide the WCC or IOT with an indication of the power level of the battery. In one embodiment, the DCL cluster of nodes reorganize functionality across the cluster of devices due to the status change from operating from a consistent power to a temporary power source.

In some applications, for a period of time after the AC power is cut, the bridge circuit provides the buffered DC output through a capacitor 104$i$ until the capacitor is discharged and depleted by the WCC.

An IOT device that is about to lose power or if one loses a primary power supply, the bridge circuit 105 can dynamically switch to another form of power to maintain the device processing at least sufficiently long to power-down or switch to performing another operation or complete the processing of a specific currently operating function. In one embodiment, the device can have a bridge circuit that communicates between AC power and capacitive storage power. If the device loses AC power, the device can immediately transition to capacitive storage power to avoid loss of data, loss of processing function, interruption in processing, interruption in wireless communication, or interruption in sharing of resources between devices in a DLC group.

In one embodiment, the power sources of FIG. 2 may optionally individually and exclusively, or alternatively, together or in one or more clusters, can coupled to an interface circuit that adapts in particular scheme according to a design. The scheme can include utilizing portions of the power sources and dynamically switching between power sources or grouping power sources for specific functions. The grouping, selection, or switching between power sources can be configured by a user, or can be configured by the DLC group, an authority, or depending on the specific operation being processed. In some embodiments, the specific devices can identify when they can be clustered or be associated with more than one power source. In some embodiments, the bridge circuit 105 allows for dynamic switching between different types of power sources depending on the power requirements, the availability of power in any one power course, failures in power, or based on predefined configuration profiles.

In one embodiment, the bridge circuit 105 taps and couples the AC power 104$i$ into a capacitor 104$e$ to provide a desired output DC voltage to a WCC device. The bridge circuit may replenish a storage capacitor 104$e$ to recharge the capacitor at a regular interval or upon detecting the loss of voltage in the capacitor due to leakage over time. A bridge circuit may also include an activation trigger for prompting initiation of an AC tap source for charging a supercapacitor for DC use. In one embodiment the trigger is tied to short throw relay which engages in an instant temporary coupling of the AC power through the bridge circuit into a storage capacitor 104e. In one embodiment, the trigger is tied to the output of the capacitor and upon reaching a threshold voltage level engages in the AC coupling to recharge the capacitor, keeping the capacitor charged. In some cases, a trigger is received from a local WCC or from a remote source and depending on the application, it may be triggered through mechanical contact.

In one embodiment, the bridge circuit is triggered upon mechanical engagement and manipulation of switch, such as a light switch or switch coupled to an AC device, or a relay. In one embodiment, the bridge circuit is triggered upon transitioning a switch from OFF to ON or ON to OFF and whereby the bridge detects the state transition, causing a one-shot tap of AC to charge the capacitor 104e for loading an engagement cycle for reporting the switch state change to a desired end node.

In another embodiment, the above configuration is enhanced through a state signal that may be read by the WCC or IOT to indicate that stable power is available while the switch is sustained in the current state. The bridge circuit engages in the maintenance of a DC power source by coupling the AC power source into a DC source and the DC power sources is maintained by the bridge circuit using any known means in the art. When the switch coupled to the AC power source is turned OFF, the bridge circuit changes its state signal to notify the WCC that power loss from the current source is imminent, enabling the WCC or IOT to engage in any special functions to report this to a desired end node. In one embodiment, one or more or all DLC nodes take action to transfer payload. In one embodiment, one or more or all DLC nodes take action to transfer functions carried out by the soon-to-be dormant device to another device.

A bridge circuit may be configured to both convert AC to DC in devices that have access to DC, but may also pull power from multiple power sources 104. In one embodiment, a bridge circuit is configured to wake up when activated using a piezoelectric power pump source and when power is provided to provide a wake up signal to the bridge circuit.

In addition to bridging one or more power sources 104 into a WCC or IOT device, a bridge circuit may also be equipped with a gate for controlling the voltage provided to activate a WCC or IOT. The gate, can shunt stored power from any power source 104 into the WCC or IOT such that the power is provided at a specific instance.

The bridge circuit may also have a control signal capability to provide a WCC or IOT with information characterizing available power. This may be useful to notify a powered WCC that power sources is reaching a threshold power level and soon power will be lost. In one embodiment, a WCC or IOT may engage in routines in a special playbook that are tailored for use when short burst power loss is imminent, so other nodes can be made aware of the status and take any necessary action, if any, to ensure functionality of the DLC application or services being provided by a cluster of DLC members.

In one embodiment, the bridge circuit may include a low loss, efficient, rectifier and one or more buck converters to provide efficient energy extraction from sources with high open circuit voltages. In one embodiment a Linear Technology LM3588 may be configured to provide energy harvesting. In one embodiment the bridge circuit is coupled between an AC power source and a supercapacitor for enabling a short burst of AC into DC to satisfy a DC operation of a device for a period of time. In some embodiments, the RF harvesting of 104g may be enabled using passive RF harvesting. As described below, example RF harvesting logic and circuitry may be similar to that described in a paper entitled Wi-Fi RF Energy Harvesting for Battery-Free Wearable Radio Platforms, by Vamsi Talla et al., 2015, and a paper entitled Powering the Next Billion Devices with Wi-Fi, by Vamsi Tella, et al., 2015, which are herein incorporated by reference. Other implementations of the communications circuit 3708 is to implement Wi-Fi Backscatter, which uses RF signals as power sources and reuses existing Wi-Fi infrastructure to provide internet connectivity to battery-less devices. An example of Wi-Fi backscatter is described in a paper entitled Ambient Backscatter: Wireless Communication Out of Thin Air, by Vincent Liu, et al., 2013, which is herein incorporated by reference.

In still other embodiments, the power source may utilize capacitive coupling and/or inductive coupling. By way of example, a WCC/IOT device may have a capacitor that enables capture electrical current from a proximate device, and the capacitor may be charged to enable functionality of one or more features of the WCC device or IOT device. In another embodiment, the WCC/IOT device may use inductive coupling to capture energy from another device. For example, if another device with a transmission coil is placed proximate to the WCC/IOT device that has or is associated with another transmission coil, it is possible for power to be wirelessly transferred to the WCC/IOT device. In one example, without limitation, a phone that is enabled for wireless charging may have functionality for adjusting the direction of power transfer. That is, instead of the power transfer originating from a charging surface and captured by the phone, the phone can reverse the transmission direction, and use power from the phone to communicate power indicatively to an IOT/WCC device.

Figure 6:
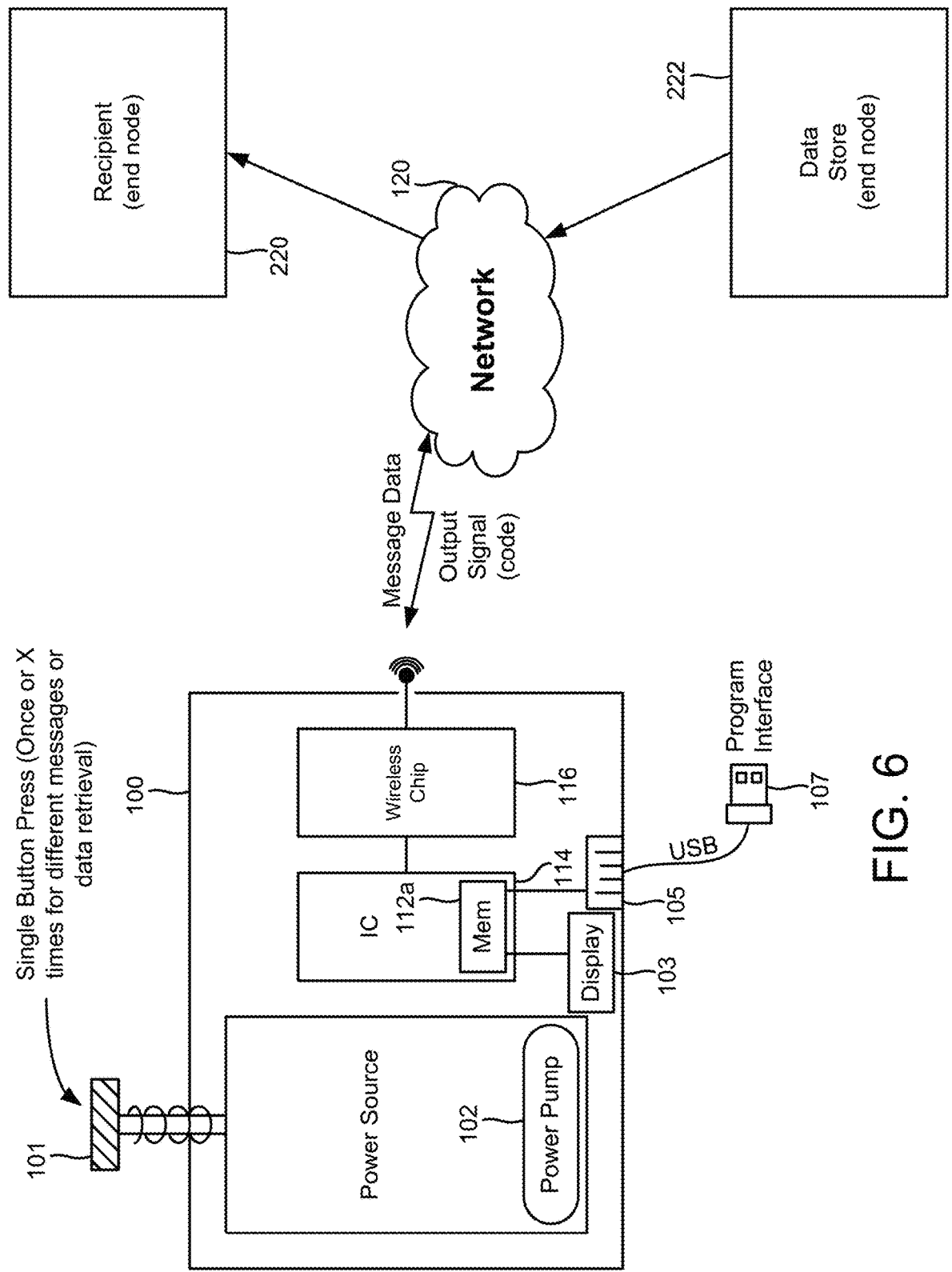
FIG. 6 illustrates another example of a WCC device, which can be provided with multiple button presses or different numbers of physical inputs to provide input or charge a power storage device of the WCC, or both, in accordance with some embodiments.

FIG. 6 illustrates another example of a WCC device 100, which can be provided with multiple button presses or different numbers of physical inputs to provide input or charge a power storage device of the WCC 100, or both. A power pump 102 may be included as part of the power source. An integrated circuit can include memory 112a that is integrated therewith, or can be interfaced separately. A display device 103 can be coupled to the memory, such as to produce data that can be rendered on the display.

A wireless chip 116 is in communication with the integrated circuit, and programming stored in the memory can be used to trigger sending or operating the wireless chip 116 when sufficient powers present in the WCC 100. The data communicated or data output by the WCC 100 can be sent to a network 120, and addressed to a specific recipient 220 end node. The end node can be addressed to a specific device, a mailbox, a phone number, a storage device, a terminal, or any other computing device. In some embodiments the end node may be part of a node in a chord overlay network or may make a request for information from a chord overlay network. In another embodiment, the data can be sent to a data store 222.

Figure 7:
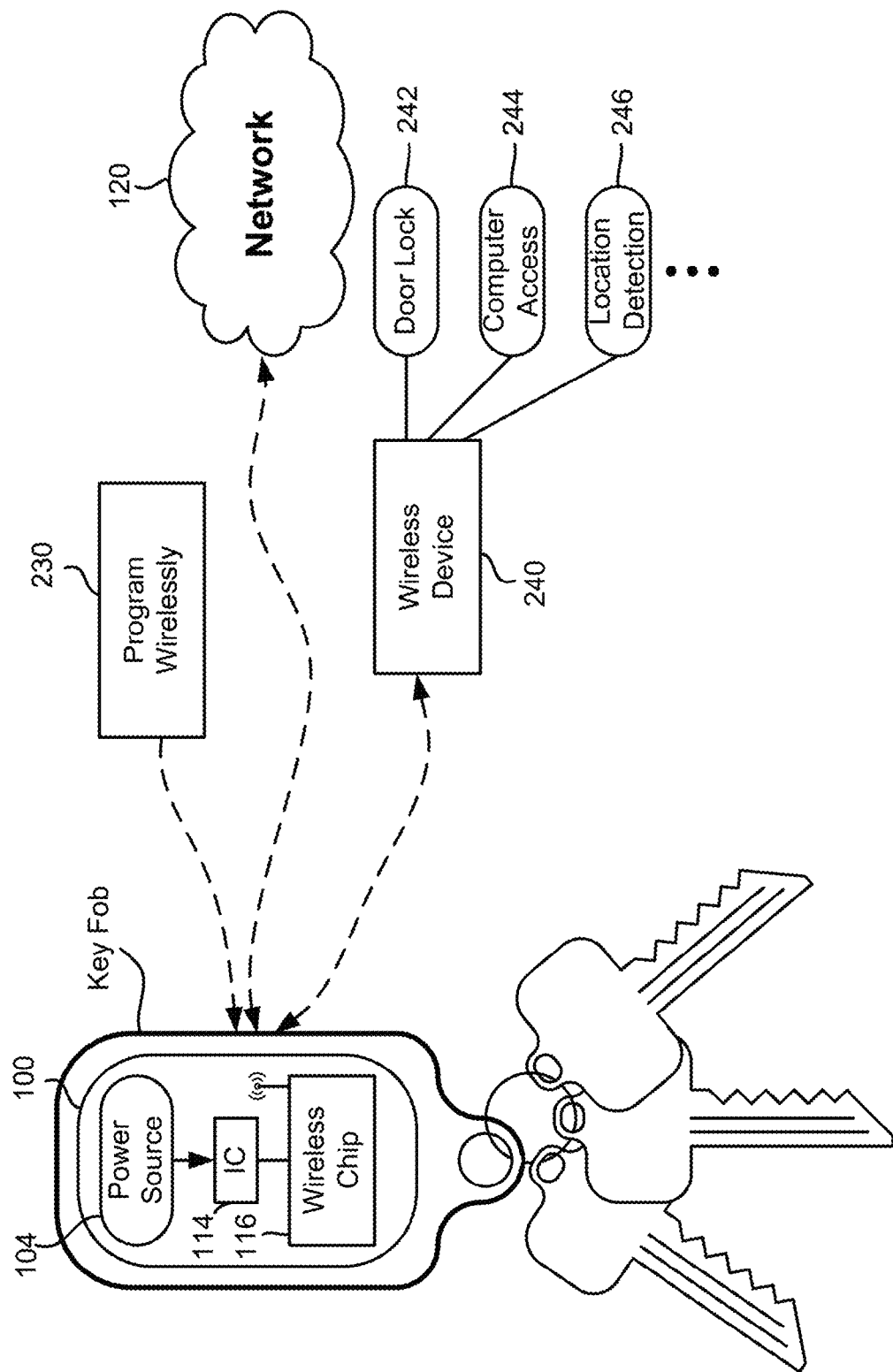
FIG. 7 illustrates another embodiment of a WCC integrated into a device, such as a key fob, in accordance with some embodiments.

FIG. 7 illustrates another embodiment of a WCC 100 integrated into a device, such as a key fob. In this example, the power source 104 may be coupled to a button or irrepressible input. When the button is pressed, the power source will harvest energy that is used to power the integrated circuit 114 and the wireless chip 116. In memory device stored in the key fob or integrated with the IC 114 or wireless chip 116, can be programmed to send specific data wirelessly to specific devices 240, such as a specific, or a randomly selected, end node.

In one embodiment, the wireless device 240 may be able to program or instruct another device to change its operation. Example operations, without limitations, can include operating a door lock 242, enabling computer access 244, requesting location detection 246 (e.g., geo-location data), opening the car, opening a house, setting the state of another device to a user preference, making a payment, detecting user identify, requesting or transmitting information, engaging in commercial advertisements including audio or visual ads, handling impression tracking events, profiling a user, entering a password, and other operations or services that can be coupled to, enhanced by or programmed into the WCC 100. In other embodiments, specific programs 230 can be wirelessly transmitted to the key fob, to enable changing of his operation when the button is pressed. The key fob shown in FIG. 7 and hereafter described may also be replaced by or operate with any WCC embodiment, example or application described in this application.

In other embodiments, multiple presses of a WCC button or the button on the key fob can produce different operations or send out different information to different end nodes. In some embodiments, the number of presses can change the amount of power that is provided, and based on the amount of power, different coded communication information can be sent either to the same end node or two different end nodes.

FIG. 8 illustrates an example where a WCC device can be programmed. The programming of the WCC device can include programming and IC 302 operation. This operation can include receiving program instructions from another device or from a class system 150. The program information can also be saved memory 112 of the WCC device 100. When input is detected at the WCC device in operation 304, the WCC device can be instructed to communicate predefined or dynamically formulated data via wireless channels. For example, based on the program stored in memory 112, and also based on the detected input 304, the WCC 100 will communicate predefined data 306, or a data payload, based on the programming stored in memory 112.

FIG. 9 shows another example of receiving program in the IC in operation 308. The program can be saved to memory 112 of the WCC 100. One a number of presses is received by a power pump, e.g., a piezoelectric element data operation 316, the power supply 310 will receive or generate power that is harvested. The power is set to be harvested because the physical input that is applied to the power pump will generate an amount of power that is saved to a power storage cell of the WCC device 100.

Based on the number of inputs, or the amount of power stored in the power supply 310, the detected input 312 will cause the WCC device to communicate in operation 314 a predefined data or data units to end node via a communication channel. The communication channel is a wireless channel, which can utilize a wireless network. As noted above, the wireless network can take on various forms and the format of the wireless data can also be formatted in accordance with various protocols. In one embodiment, the detected input 312 can also be a request for data 315, such as requesting data from an end node. The data requested can be to retrieve data from the message center, retrieve data from another end node, retrieve mail, retrieve notifications, retrieve passwords, retrieve encrypted data, and other types of data they can be requested or predefined to be requested.

Figure 10:
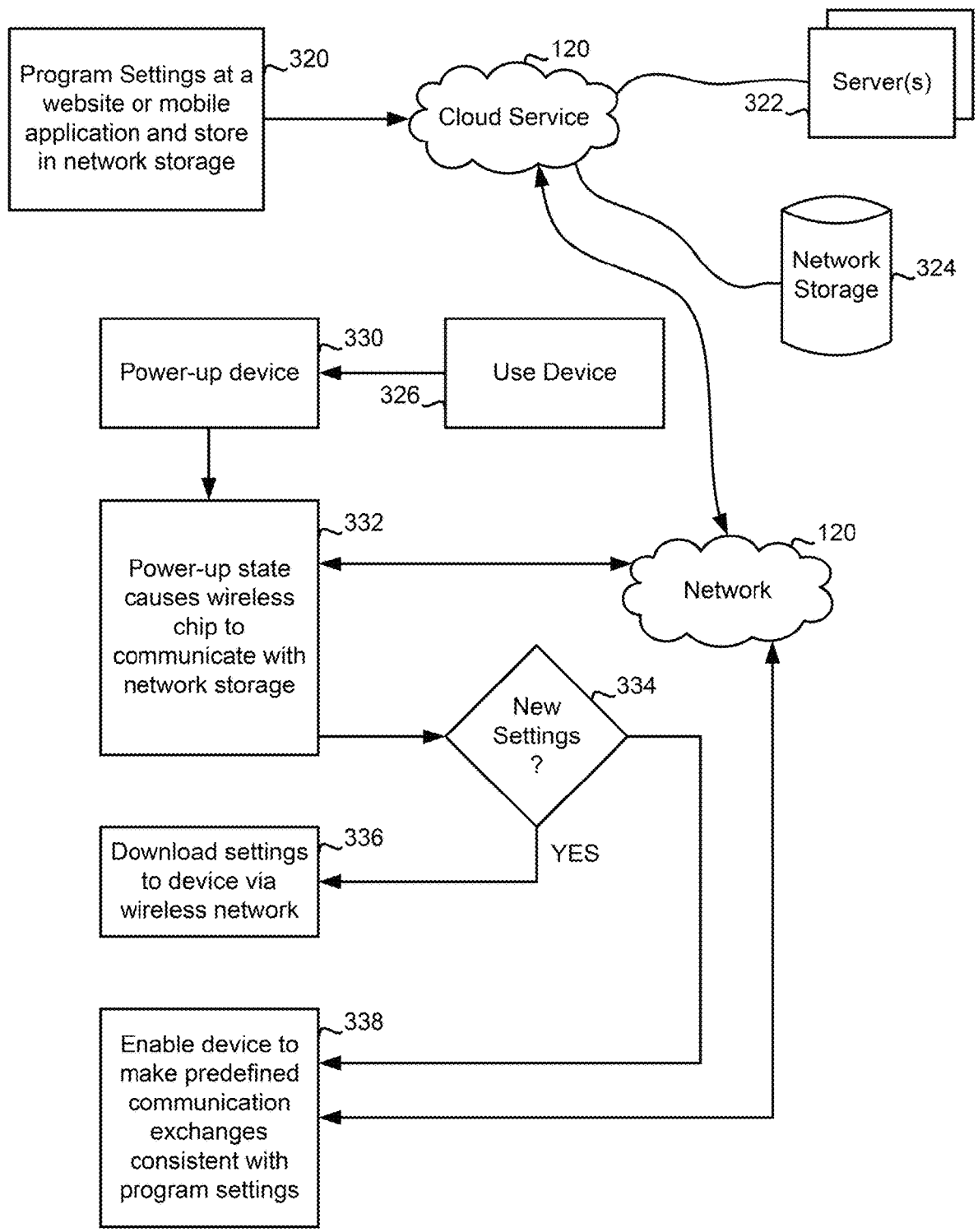
FIG. 10 illustrates another example where program settings can be set at a website or on a mobile application, in accordance with some embodiments.

FIG. 10 illustrates another example where program settings 320 can be set at a website or on a mobile application. In one embodiment, the program settings can be stored on network storage. In one embodiment, cloud services utilizing network 120 can operate on the saved settings. The saved settings can be associated with specific routines that can be or are requested to be performed at certain times.

The network 120 can also be in communication with a number of servers 322. Network storage 324 may also be coupled to the network 120 to deliver the cloud services. In one example, to use the device 326, the device is powered up in operation 330. In operation 332, the power state of the device will cause the wireless chip of the device to communicate with network storage. The communication with the network storage may be, for example, to retrieve new settings that may be stored in the storage.

For instance, if a user had program new settings via website, the new settings would be stored and network storage. In this manner, when the device powers up, or at specific times, the device can check for new settings 334. If new settings are present in the network storage, the new settings can be downloaded to the device via the wireless network in operation 336. If no new settings are available, the devices enabled to make predefined communication exchanges consistent with currently program settings in operation 338. The communications are enabled by the network 120.

Figure 11A:
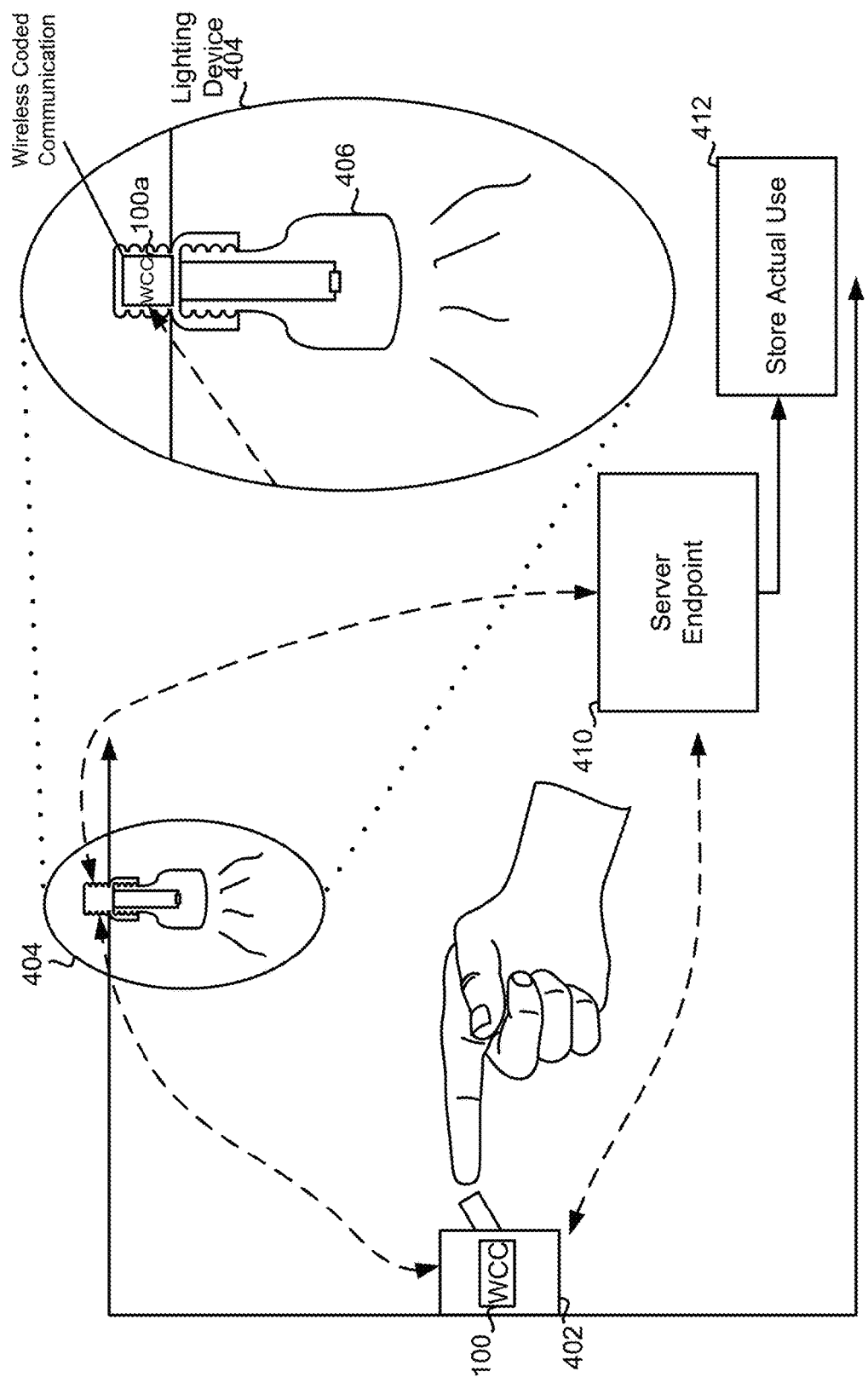
FIGS. 11A-11B illustrate examples of a WCC device that is integrated with a wall switch or other locations, in accordance with some embodiments.

FIG. 11A illustrates an example of a WCC device 100 that is integrated with a wall switch 402. In this example, the switch 402 may not be physically connected or hard wired to a lighting device 404. However, when the lighting device 404 is associated via a device 100a that is configured to communicate with a WCC device 100, the WCC switch 100 will remotely control the state of the light. Device 100a can be configured in numerous ways, and can have several physical implementations. In one embodiment, device 100a can be an add-on interconnect, that plugs into a standard light bulb socket, and then has a female portion for receiving the threaded portion of a bulb 406. As mentioned above, reference is made to a "bulb" for purposes of illustrating an example, and other lighting features, devices, lighting configurations, things, and structures are equally able to receive wireless data to control, set, toggle, and/or interface therewith via a WCC device 100.

Continuing with the example of FIG. 11A, device 100a may have an interconnect with a male thread that inserts into the standard socket of a lighting fixture, wall, device or object. Within the device 100a is circuitry or logic that is configured to communicate with WCC device 100 in a wireless fashion. For example, device 100a can include a receiver that receives wireless communication data transmitted from the WCC 100. The receiver can have logic, circuitry, a microcontroller, firmware, or a processor that enables the device 100a to interpret the communication data sent to it by the WCC device 100. The wireless data can include information that indicates a desired state for the bulb 406.

As described above, a desired state for the bulb 406 can be to shift to an ON state, an OFF state, a DIM state, a color selection, a scene setting, a Wi-Fi mode setting (if device 100a also acts as a repeater), a flash state, etc. In some embodiments, the WCC device 100 can communicate directly with the device 100a of the lighting device 404. In other embodiments, the WCC device 100 will communicate with a server endpoint 410. In this example, the server endpoint 410 is configured to communicate wirelessly with the device 100a, such as to relay the state information communicated by the WCC device 100. Further, a server endpoint 410 can also be in communication with storage and/or cloud processing or local processing to enable historical tracking of actual use 410 of the WCC device 100, or to puppet the state of the light directly on a schedule or according to events that may be triggered in a home automation or alarm system.

For example, data indicative of changes in state of the lighting device 404 can be saved to a database over a period of time. Based on the interaction of the WCC device 100 with the lighting device 404, a history with rich data is saved, which can then be data mined in order to uncover analytic patterns.

The analytic patterns can be used to identify common operational data, which may be associated with specific days, time of days, behaviors, and the like. The analytic processing can also include machine learning, which can identify patterns in use of the WCC device 100. In one embodiment, cloud processing can receive the information for processing the analytics, and identifying patterns via the machine learning. In one configuration, the learned patterns can be used to generate recommendations.

Recommendations can be sent to the users of the WCC device 100. The recommendations can also be sent to a user account that is used to access the WCC device 100 from another device. In one embodiment, the recommendations can be published to the users that have an interest in the WCC device 100, or are registered or have privileges to view information regarding the specific WCC devices 100. In one embodiment, recommendations can include providing example lighting scenes, lighting patterns, lighting timings, power saving options, and other information useful for the operator of the WCC device 100. In one embodiment, a user accessing a user account can select specific recommendations and implement the recommendations.

The implemented or selected recommendations can then be communicated by an endpoint to the WCC device 100 or directly to the device 100a. For example, a user may be away from home and may receive a notification or message indicating that a recommendation is available for the user account. The recommendation may suggest automatically turning on lights or turning off lights in specific rooms for the next day, the next month, while on vacation, during a period of time, during a season, or in response to detected motion or triggering of an alarm. As will be described further, a WCC device 100 can communicate with one or more lighting devices 404, outlets, electrical items in the house, electrical items in a building, electrical items in a commercial setting, and generally any electrical item that has the capability of receiving wireless communication from a network, and such device or item has a receiver for wireless receiving data, determining the instruction, and making a setting.

Figure 11B:
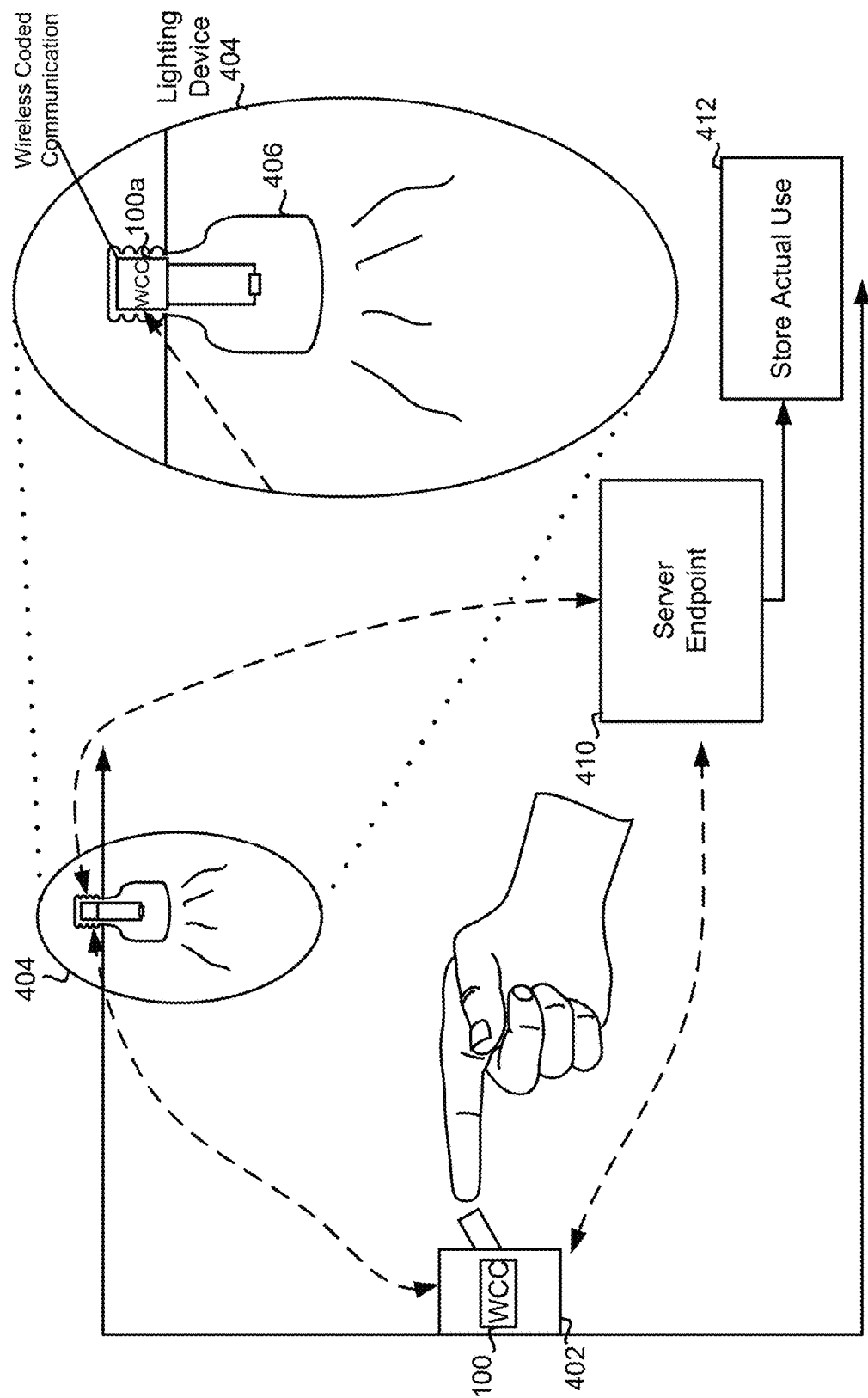

FIG. 11B illustrates another example similar to FIG. 11A. In this example, the bulb 406 is already integrated with a device 100a that is capable of receiving wireless coded communication. In this example, there is no need for an interconnect for retrofitting bulbs 406 that do not have device 100a. Accordingly, it should be understood that bulbs 406 can be manufactured and designed already include wireless communication receiving and processing logic. In the manufacturing, the wireless receiving logic can be miniaturized and defined in an ASIC, which is powered by the electrical power of the outlet itself. In some embodiments, a transformer is included or built into the bulb 406, so as to provide reduce power levels or appropriate power levels for driving the receiver circuit, firmware, assessor, logic, or ASIC.

In some embodiments, device 100a can also include memory, and the memory can be used to store previously set states. The previously set states can be retrieved by the server endpoint 410 or another and node or even another WCC device 100. As such, the historical use retrieved by server endpoint 410 can be retrieved from a number of lighting devices 404, which may be distributed throughout a building or home. In one embodiment, each of the lighting devices can be wirelessly paired with specific WCC devices 100. In another embodiment, a user device, such as a smart phone or tablet can be used to discover the WCC devices and devices 100a at a given location.

Once discovered, the devices can be paired or identified so that a network can reach the devices. As noted above, the network can include or can interconnect a plurality of nodes. The plurality of nodes are processing nodes, which can be used to repeat, relay, transfer, send, and intercommunicate with other nodes so that data can be communicated between WCC devices 100, devices 100a and other devices including servers and logic associated with cloud processing systems.

Figure 12A:
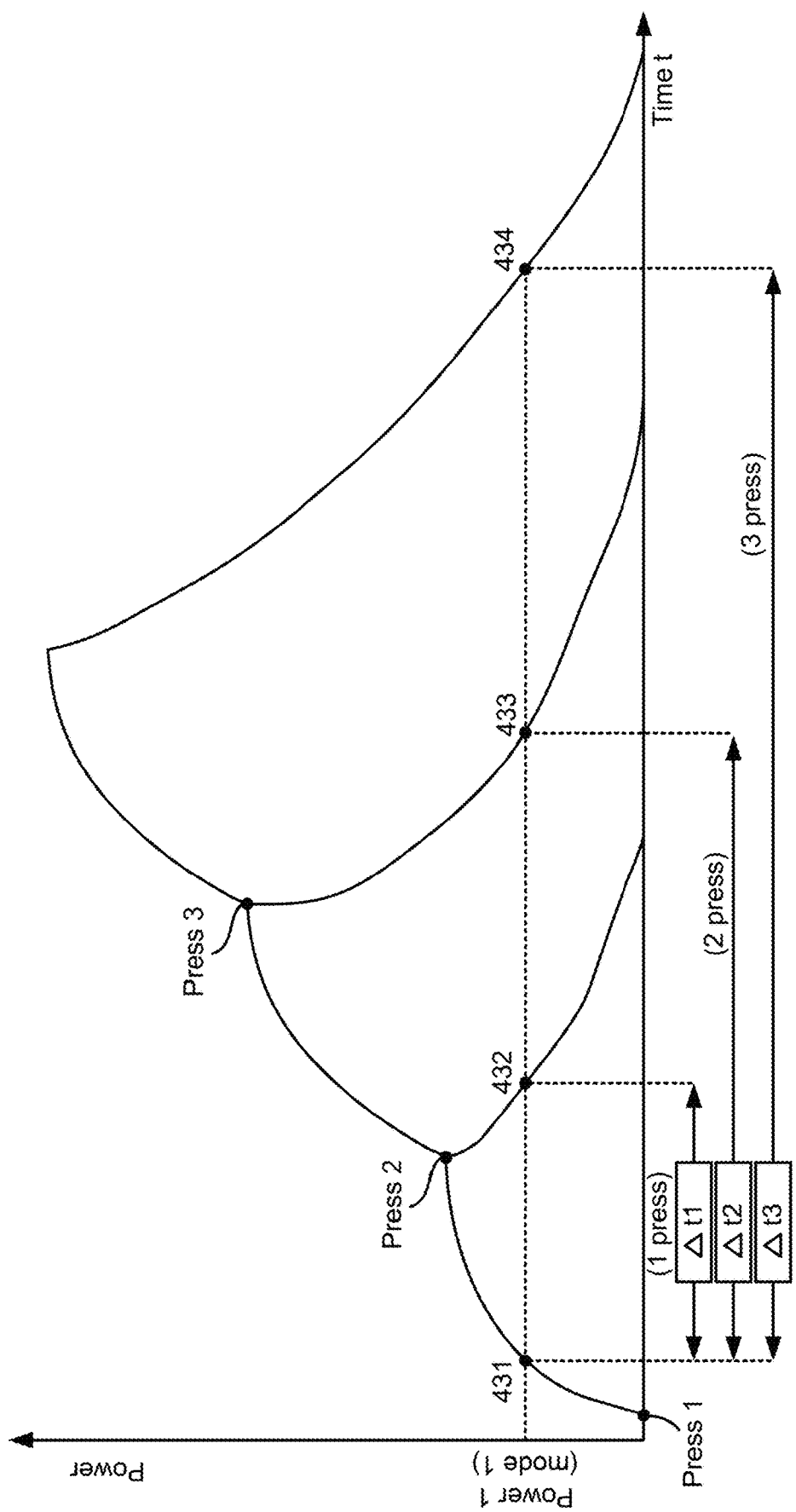
FIG. 12A illustrates a general, exaggerated and unscaled, example diagram of one of many potential charging and consumption profiles that may be achieved when charging a power storage cell of a WCC device, when the WCC device includes a power pump, in accordance with some embodiments.

FIG. 12A illustrates a general, exaggerated & unscaled, example diagram of one of many potential charging and consumption profiles that may be achieved when charging a power storage cell of a WCC device, when the WCC device includes a power pump 102. As noted above, the power pump 102 may include a piezoelectric element or material. Generally speaking, piezoelectric devices are solid materials (such as crystals, certain ceramics, and biological matter such as bone, DNA and various proteins), which produce electric charge and associated voltage in response to applied mechanical stress. In some embodiments, the power pump 102 may include electromagnetic or electrostatic materials. In some embodiments the power pump may function using electromagnetics or electrostatics, or a combination of any of piezoelectric, electromagnetic, electrostatics or other power source.

As described above, when a force, such as a mechanical force is applied to piezoelectric material that defines example power pump 102, charge is produced which is saved to a capacitor or other storage device. The charge of a capacitor typically exhibits in increasing charge profile up until it reaches a maximum charge state. A capacitor will then, in some cases, begin to discharge or decay at a particular rate, depending on load profile or tunable attributes in connection with the power pump, and, for example, the type of capacitor, etc. Generally, however, as a capacitor loses charge, the amount of charge stored in a storage cell will decrease.

In one embodiment, if the power pump is pressed by either direct human push actions onto a force applicator of the WCC device 100, or indirect force is applied by another object, that stress upon the element that defines the piezoelectric (or similar) material will produce a given amount of charge over a particular period of time. In this illustration, the integrated circuit of the WCC device 100 can be preprogrammed or store a program that identifies a mode of operation. If the mode of operation dictates that a certain amount of power must be present in order to perform the operation, then the capacitor will also have to store that amount of power for a particular period of time to enable the processing to occur, which may also include the wireless chip transmission of data to an end node.

Still referring to the example of FIG. 12A, a power level Power 1 is set to be needed in order to process a function associated with mode 1. If a user presses once or if mechanical force applied to the WCC device 100 that will produce charge that builds up, in this example, for a period of time and then will decay. If Press 2 is not applied, the processing of mode 1 can occur during a time delta t1. If the processing function requires more charge, or the processing function requires multiple operations such as determining what the sensor data means and then sending the data via the wireless chip to an end node, a press 2 may be needed to extend the duration of time to delta t2.

If the logic function requires more processing, such as capturing an image using a camera, and sending the image to a specific and node, additional presses may be required to be received by the WCC device 100. For example, if three presses, i.e., press 3, are applied, the duration or amount of charge available will be delta t3.

In some embodiments, the same function can be performed, such as for the same mode 1, and providing additional presses will allow for more of the similar function to occur. For example, if the WCC device 100 is sensing the opening of the door, the charge stored between 431 and 432 would be sufficient to transmit to an end node information that indicates that the door has opened. In another embodiment, if the processing function requires that the door send information regarding the progress of opening the door, such as the degree of the door being opened or closed or swinging, additional power may be required between 431 and 433 or between 431 and 434.

Accordingly, one implementation of using a power pump is to match up the number of mechanical presses required to activate certain functions, and if certain functions require more power to provide or receive additional presses. As discussed in this example, the presses should be understood to be either direct presses by user or indirect presses by an object such as a door opening and the hinge itself applying the presses or impacts upon the piezoelectric or any material of the power pump.

Figure 12B:
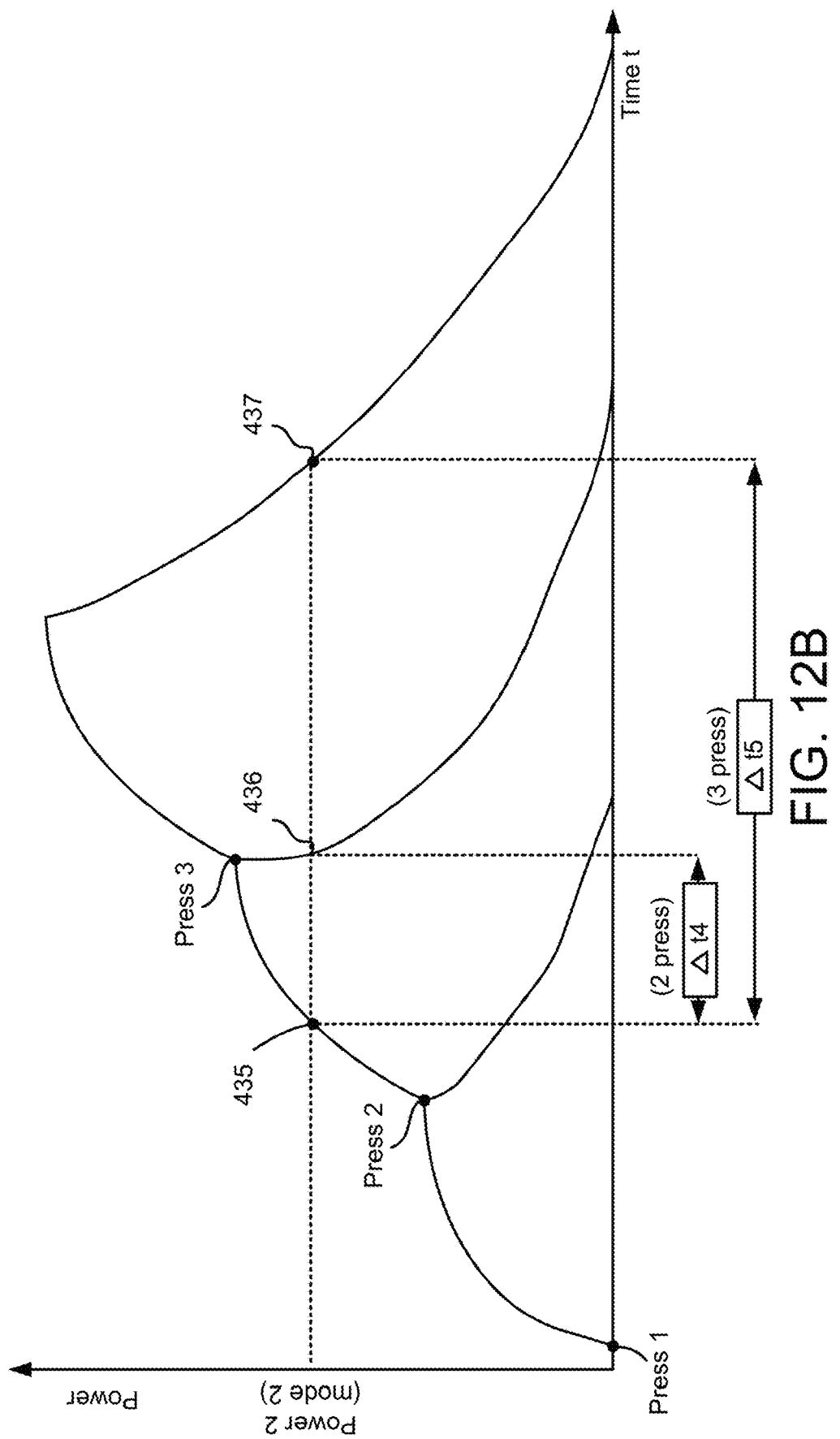
FIG. 12B illustrates another example similar to FIG. 12A, where a power pump may be used to charge a storage cell, such as one that can store power in a capacitive form, in accordance with some embodiments.

FIG. 12B illustrates another example similar to FIG. 12A, where a power pump may be used to charge a storage cell, such as one that can store power in a capacitive form. In this example, the WCC device may be programmed or set to operate a different mode, such as mode 2 that requires a Power 2. For instance, this example shows that activation of the WCC device 100 and activation of the wireless chip associated with the WCC device 100 may require a higher level of charge before processing data and causing the sending of the data wirelessly to a specific end node or end nodes. For illustration purposes, at least two presses would be required to activate mode 2. If the function performed by mode to only requires a short duration, the operation can be performed without pressing for a third time.

For instance, the function can be performed in a duration of time delta t4, which is between 435 and 436. If the user or device requires additional time to perform the mode 2 function, a third press, i.e. press 3 can be applied to the power pump to allow for an additional period of time between 436 and 437. As noted above, it is possible to further provide additional power pump presses to the WCC device 100 to enable additional processing and additional communication of information related to the sensed data, captured images, captured videos, dictated messages, and/or other information or data packets to be transferred by the wireless chip over a network to a specific end node, or an end node of a cloud processing system, or specific recipients and their devices.

Figure 12C:
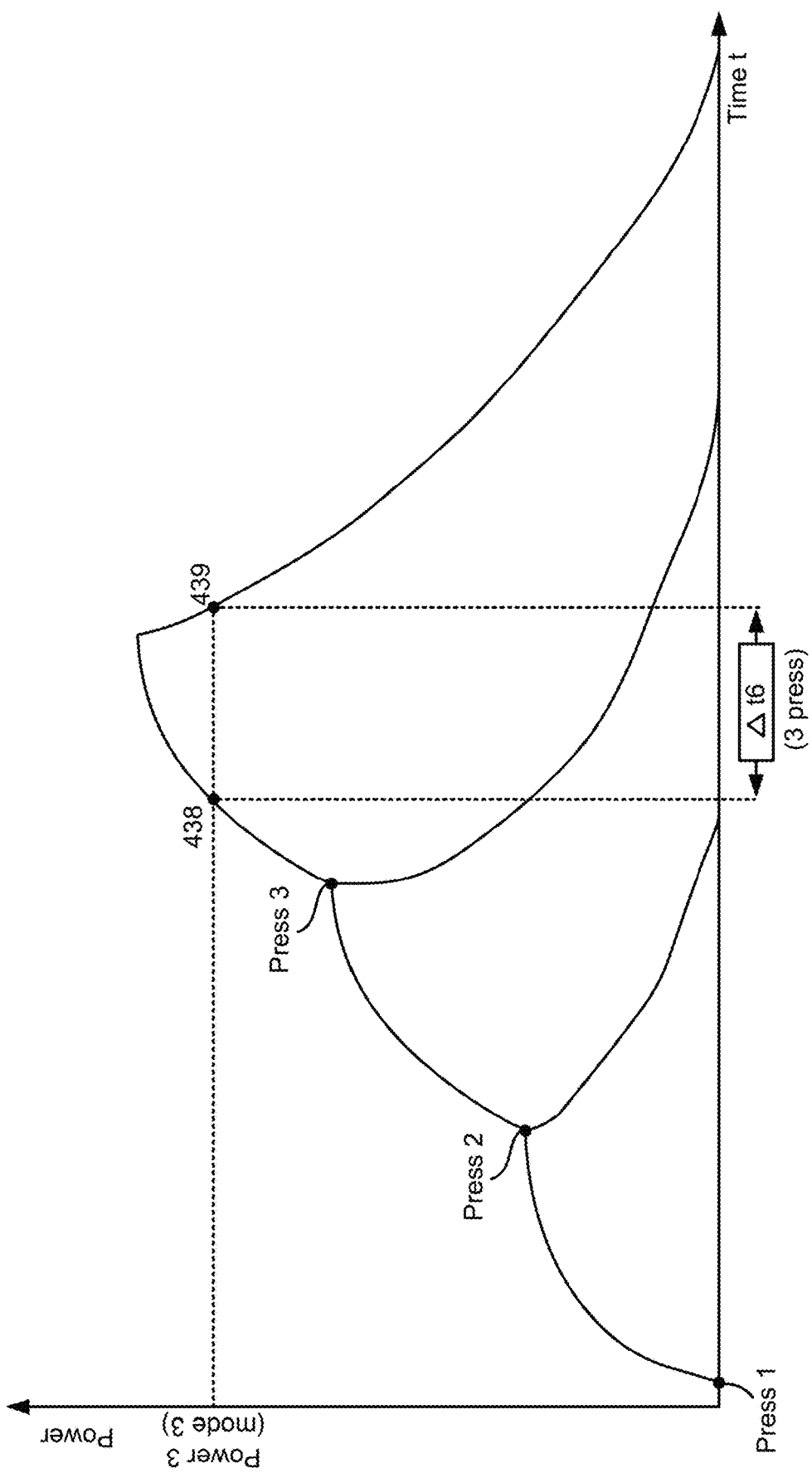
FIG. 12C illustrates an example where a WCC device can be programmed or set to operate a mode 3 program, which requires power 3, in accordance with some embodiments.

FIG. 12C illustrates an example where a WCC device can be programmed or set to operate a mode 3 program, which requires power 3. In this example, the processing function requires a higher level of power to perform the operation, and the duration required for the function may only be delta t6, which is between 438 and 439. Similar to the previous example, if the duration is required to be longer, or the mode 3 program can operate additional times or process additional information, the user can provide additional presses to the force providing device of the WCC device 100. Again, the presses described herein can be intentional direct presses by user, such as a finger, his foot, his arm, his leg, or can be indirectly applied by motion or movement of other physical objects.

Figure 13A:
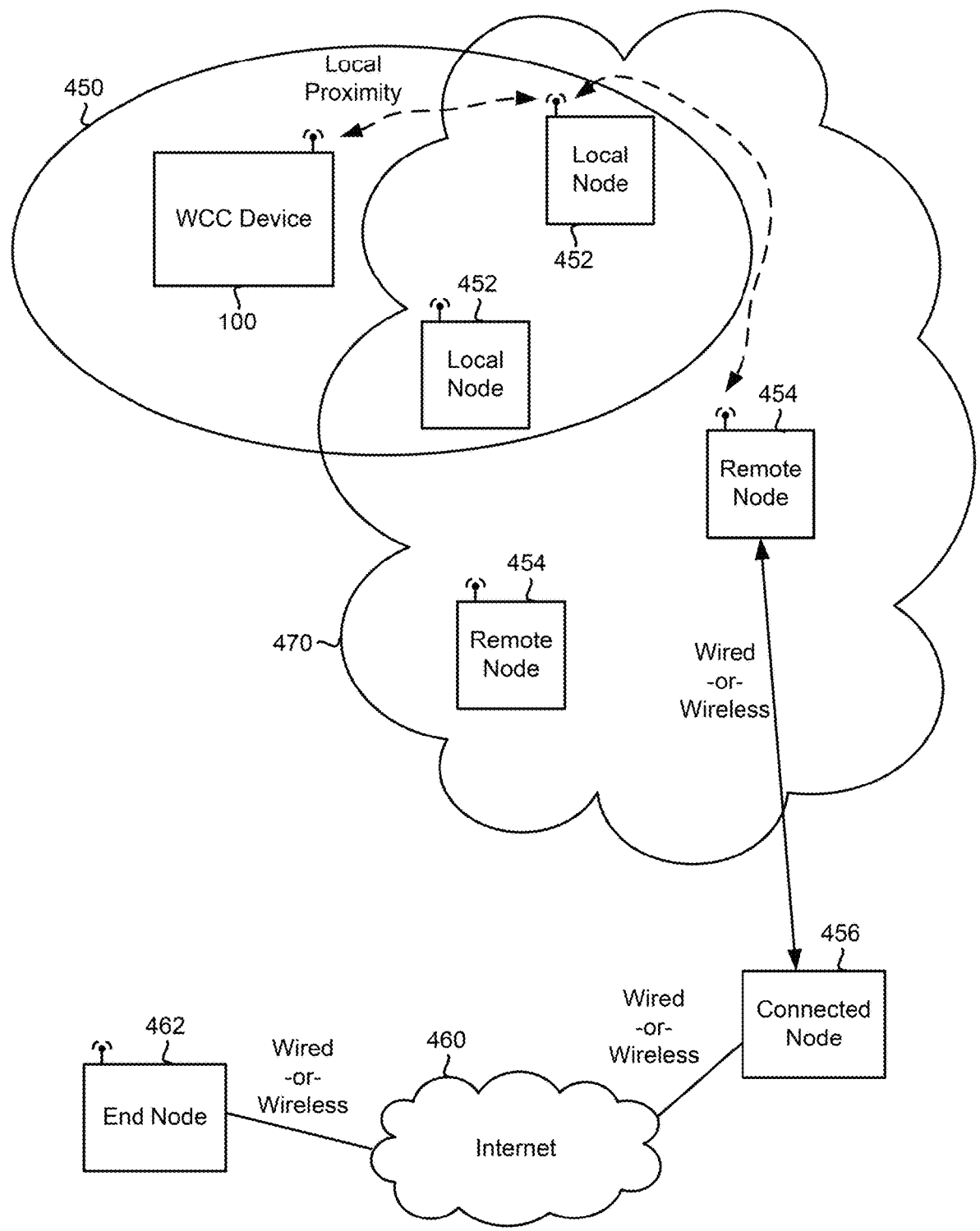
FIG. 13A illustrates an example of a WCC device, associated with a local proximity, in accordance with some embodiments.

FIG. 13A illustrates an example of a WCC device 100, associated with a local proximity 450. In this example, the local proximity can be a physical distance between the WCC device 100 and other local nodes 452. The other local nodes 452 can be other computing devices that have wireless capability. Other computing devices can include Internet connected or wirelessly connected computers, cell phones, tablet computers, routers, repeaters, they stations, servers, smart watches, smart glasses, personal computers, telephones, vehicles, bicycles, appliances, lighting equipment, and any other device having wireless communication capability. In one specific example, some of the local nodes 452 are capable of receiving communication from WCC device 100.

While it is desirable for a WCC device to operate in a wireless manner a WCC may be configured without a wireless capability but instead include an alternate communication path to engage its function is a pseudo or phantom wireless mode. For example, a non-wireless cold WCC new construction light switch can be configured to perform the same function as its wireless counterpart but can use IP over AC power line to conduct communication of the payload to any device capable of receiving and acting upon the signal, as previously outlined in the light or outlet switch section of this application previously discussed.

In some embodiments, the local nodes 452 can be paired with the WCC device 100. In other embodiments, the WCC device 100 can discover other local nodes 452 even though the local nodes 452 are not pre-paired with the WCC device 100. For example, the local nodes 452 can be part of a mesh network. Broadly speaking, and by way of example, a wireless mesh network (WMN) is a communications network made up of radio nodes organized in a mesh topology. In one embodiment, the WMN is a type of wireless ad hoc network. Wireless mesh networks may consist of mesh clients, mesh routers and gateways and/or other computing devices noted above. In one example, a mesh clients (i.e., local nodes, remote nodes, end nodes, connected nodes, and generally nodes) define the mesh and assist in routing and forwarding traffic to and from the gateways which may, but need not, connect to the Internet.

The coverage area of the nodes working as a single network may also be referred to as a mesh cloud. Access to this mesh cloud is dependent on at least some nodes proximate to each other working together to create a radio network. A mesh network also provides redundancy. When one node can no longer operate, the rest of the nodes can still communicate with each other, directly or through one or more intermediate nodes. In one embodiment, wireless mesh networks can self-define and self-repair. Wireless mesh networks can, in one embodiment, use various ones or combinations of wireless technologies, such as Wi-Fi (e.g., 802.xx), Bluetooth, NFC, radio, and cellular technologies, etc.

Continuing with the example of FIG. 13A, the local proximity 450 can change if the WCC device 100 is a mobile WCC device 100. As noted above, the WCC device 100 does not have to be fixed to a location and can be carried or moved from time to time. Additionally, other local nodes 452 can also move into the local proximity of the WCC device 100 or move out of the local proximity In some embodiments, local nodes 452 within the local proximity 450 of the WCC device 100 can communicate outside of the local proximity to a wired or wireless network, where other remote nodes 454 may be located.

In general, the local proximity is a relative term, which relates to nodes that are local to a specific node. For instance, one of the local nodes 452 may be capable of wirelessly communicating with remote node 454, but WCC device 100 does not directly have wireless communication to the remote node 454. In one example, the local node 450 to access a repeater or forwarder of the data or information or payload being transferred or sent by the WCC device 100 to a specific end node 462. The routing of data from the WCC device 100 to the end node 462 can be over the Internet 460, which couples to the connected node 456. For example, the remote node 454 can be wirelessly or wired connected to the connected node 456. In one embodiment, the connected node 456 can be a router, repeater, computer connected to the Internet via wire or wireless, or the like.

As described above, the end node 462 is a device, system, cloud system, or recipient of data produced by the WCC device 100. The data routed over a wireless network between the WCC device and the end node 462 is therefore utilizing one or more networks 470. In other embodiments, the communication to the end node 462 can bypass the Internet 460. Other example networks can include Wi-Fi networks, such as Wi-Fi aware networks utilized by devices that discover other devices and transmit and relayed messages to the destination devices. Once the data has reached the end node 462, the end node 462 can then performance processing to either store data received, forward data to another device, and data to a database, add data to a big data database utilize for mining and metric analysis and learning, and/or simply record the operation so that other devices can view status information or communicate data back to the WCC device 100 or a different WCC device 100.

Figure 13B:
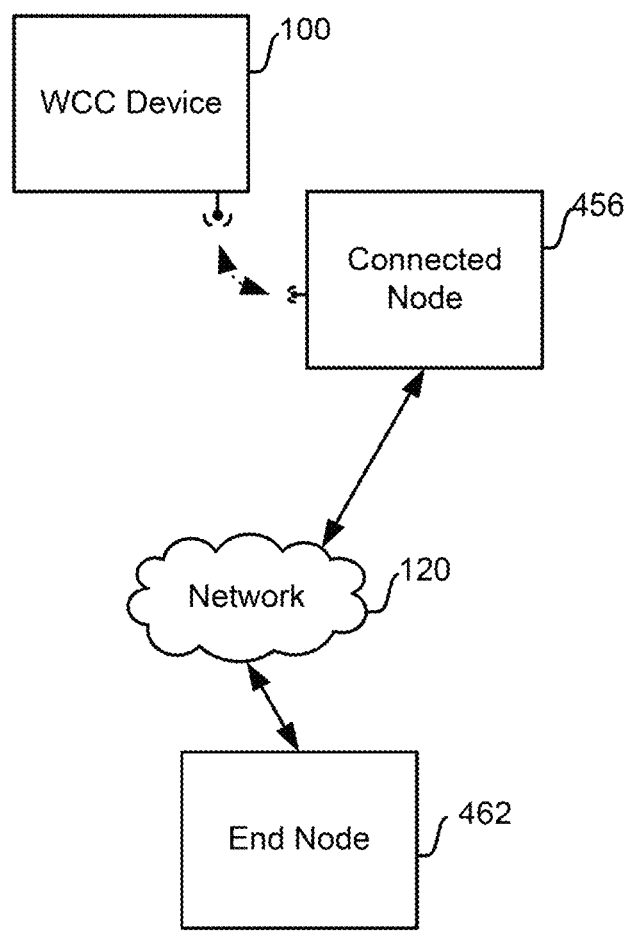
FIG. 13B illustrates an example where a WCC device can communicate wirelessly to a connected node, in accordance with some embodiments.

FIG. 13B illustrates an example where a WCC device 100 can communicate wirelessly to a connected node 456. The connected node 456, in one embodiment, may be a router, or computer or device that communicates or is wired to an Internet or network access point. The network 120, which can include the Internet or can include local mesh networks or combinations thereof, can then communicate with the end node 462.

Figure 13C:
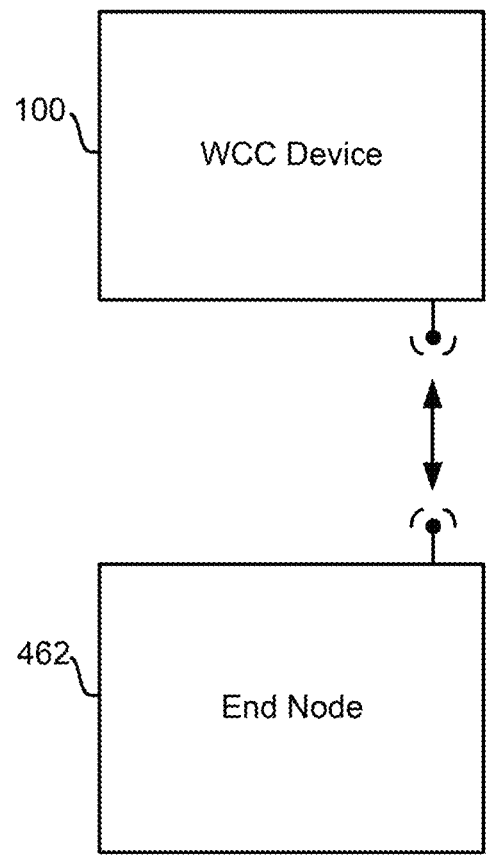
FIG. 13C illustrates another example where a WCC device can communicate directly to an end node, in accordance with some embodiments.

FIG. 13C illustrates another example where a WCC device 100 can communicate directly to an end node 462. This example may be where the WCC device communicates a peer-to-peer signal to an end node 462. Peer-to-peer signaling may take place using a local chord overlay network inside a local area network, a chord overlay network outside the local area network on a wide area network, or on a combination of both. In another example, the WCC device 100 can communicate signals directly to another WCC device, which may be represented by the end node 462. In still other embodiments, a WCC device 100 can communicate with a plurality of WCC devices 100, and one or more of the WCC devices can communicate with an end node 462, such as a server or processing entity. In some embodiments, interactions between the WCC devices 100 can be recorded and sent as interaction data to the end node 462. This data can then be processed by the cloud processing system and utilized for providing recommendations to users, notifications to users, logging of data, or simply providing viewing data or information to interested users or recipients of the data collected, sensed, process, or communicated over time.

Figure 14:
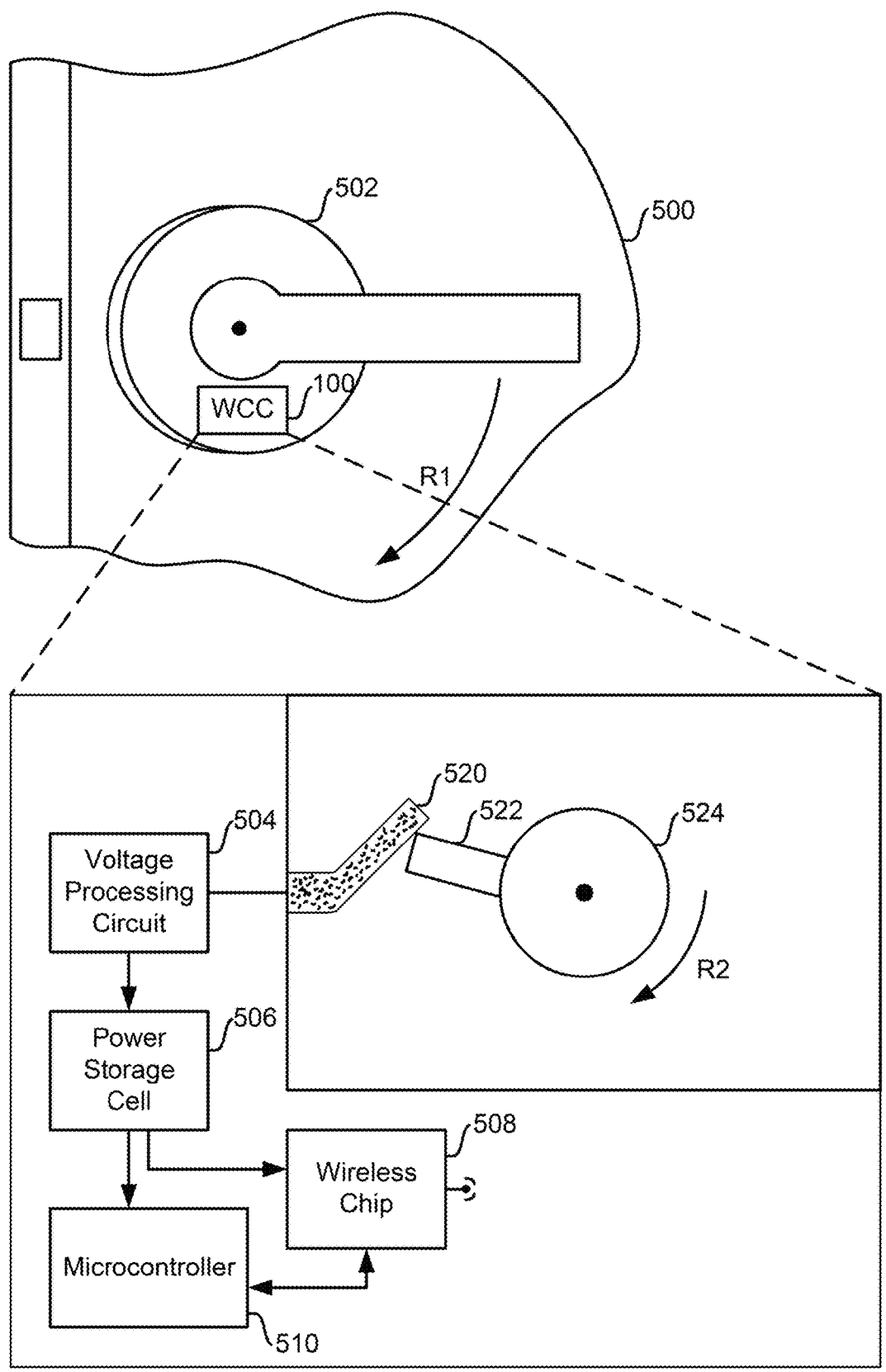
FIG. 14 illustrates an example of the use of a WCC device, in accordance with one embodiment.

FIG. 14 illustrates an example of the use of a WCC device 100, in accordance with one embodiment. As illustrated, a door 500 can include a handle 502, which hasn't integrated WCC device 100. In this example, the turning of the handle 502 can act to produce a force upon an element 520, such as a piezoelectric material. The mechanical unit 524 can have a tooth 522 that provides a striking force upon the element 520. The striking force can provide a stress upon the element 520, which produces a voltage that can be harvested by a voltage processing circuit 504. In some embodiments, the mechanical unit 524 can rotate multiple times for a single handle turn.

In other embodiments, the mechanical unit 524 can have a plurality of teeth 522, which allow for multiple striking to the element 520. In still other embodiments, multiple elements 520 can be provided and distributed within the housing so that multiple strikes to multiple elements can be captured and processed by the voltage processing circuit 504. The voltage processing circuit 504, as described above, can be tuned to optimize the voltage capture and power recovered from the stressed elements 520. The voltage processing circuit can be resonant tuned so that an optimal amount of power is harvested from the mechanical input provided to the element 525 the mechanical unit 524 force movement or motion or twisting or hammering or bending or generally stressing.

In some embodiments, the voltage processing circuit 504 can then communicate the power harvested to the power storage cell 506. Power storage cell 506 can then provide power to a microcontroller 510 and a wireless chip 508. The microcontroller 510 can be associated with memory or linked to memory for storing a program. The programming data can be predefined or can be dynamically generated based on the activity or actions performed upon the bed WCC device 100. In one embodiment, when a threshold amount of power has been saved in the power storage cell 506 to perform a specific function, the microcontroller 510 can sense the power level and then activate or turn on to allow for processing that then communicates with the wireless chip 508.

As noted above, the wireless chip 508 can then communicate data to an end node. The end node can be one that is receiving data based on pre-programming of the WCC device 100, which identified the end node as a recipient of the data. In other embodiments, the data can be transmitted to repeater nodes which are then used to transmit the data to an end node.

Figure 15:
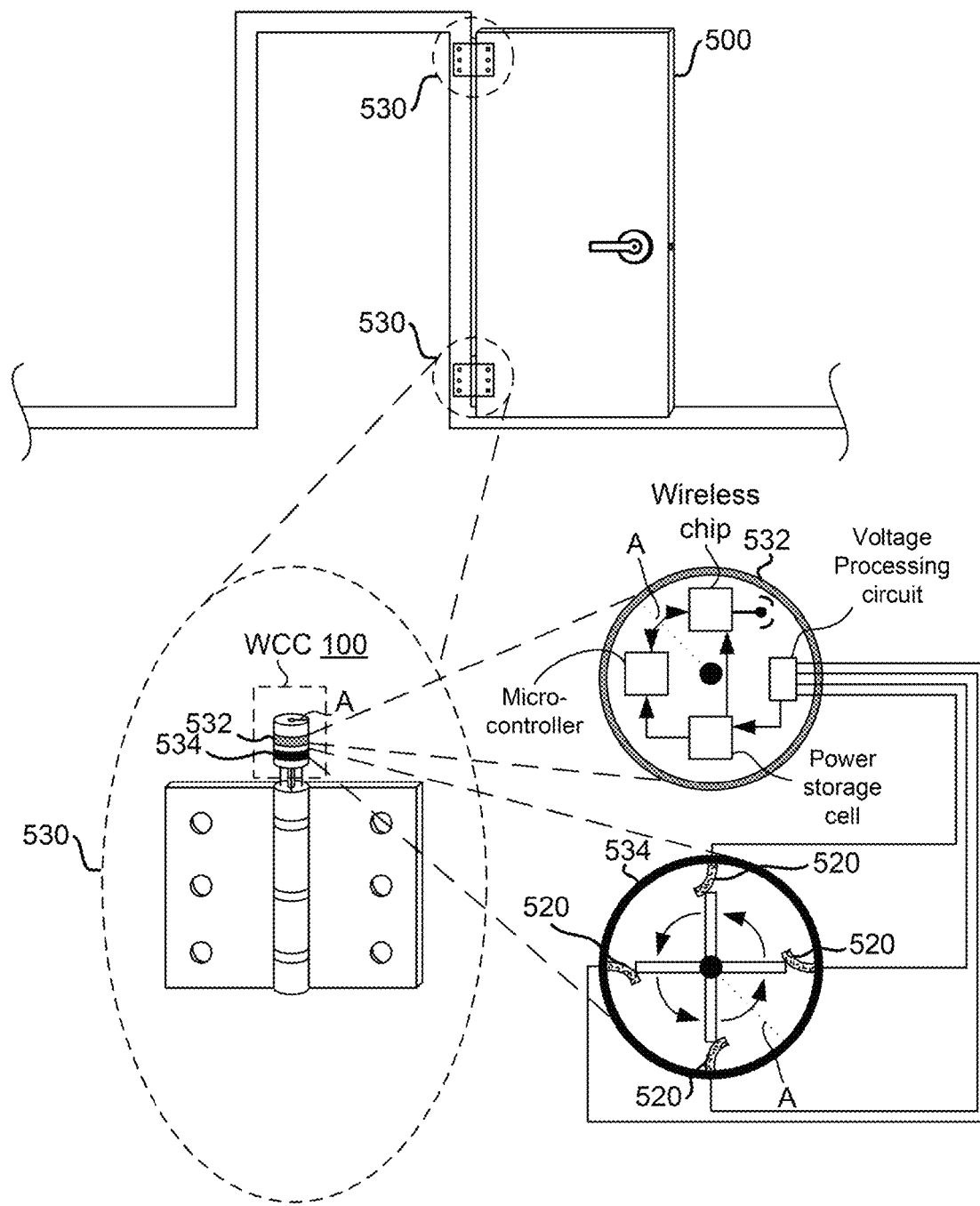
FIG. 15 illustrates an example of a doorway that includes the door and hinges, to illustrate one example of a WCC, in accordance with some embodiments.

FIG. 15 illustrates an example of a doorway that includes the door 500 and hinges 530, to illustrate one example of a WCC 100. In this example, the WCC 100 is integrated into an insertable object that couples to the hinge 530. For example, the WCC device 100 can be connected to or interfaced with the moving parts of the hinge 530, such that movement of the hinge will cause movement or turning of the mechanical teeth within the WCC device 100.

For example, the WCC device 100 can include a sub device 532 that houses the wireless chip, the microcontroller, the power storage cell, and the voltage processing circuit. Still in this example, the WCC device can have a sub component 534 that includes the mechanical moving parts that produce force upon the elements 520. The elements 520, in one embodiment, piezoelectric materials that are shown to be stressed by the force applied by teeth of a mechanical unit within the sub device 534. As the door is caused open, the teeth within the mechanical unit will rotate causing force to be applied to the elements 520, which in turn are harvested by the voltage processing circuit of the sub device 532.

When a sufficient amount power has been stored in the power storage cell, the microcontroller and the wireless chip are caused to communicate data to an end node. The data can include the simple information associated with opening the door or closing the door, they can include the speed at which the door was opened, it can include the rate at which the door was opened, it can include the time when the door was opened, they can include the location of the door, they can include other sensory data associated with a doorway (e.g., sound detection, voice detection, image taking logic, video recording logic, etc.).

Figure 16:
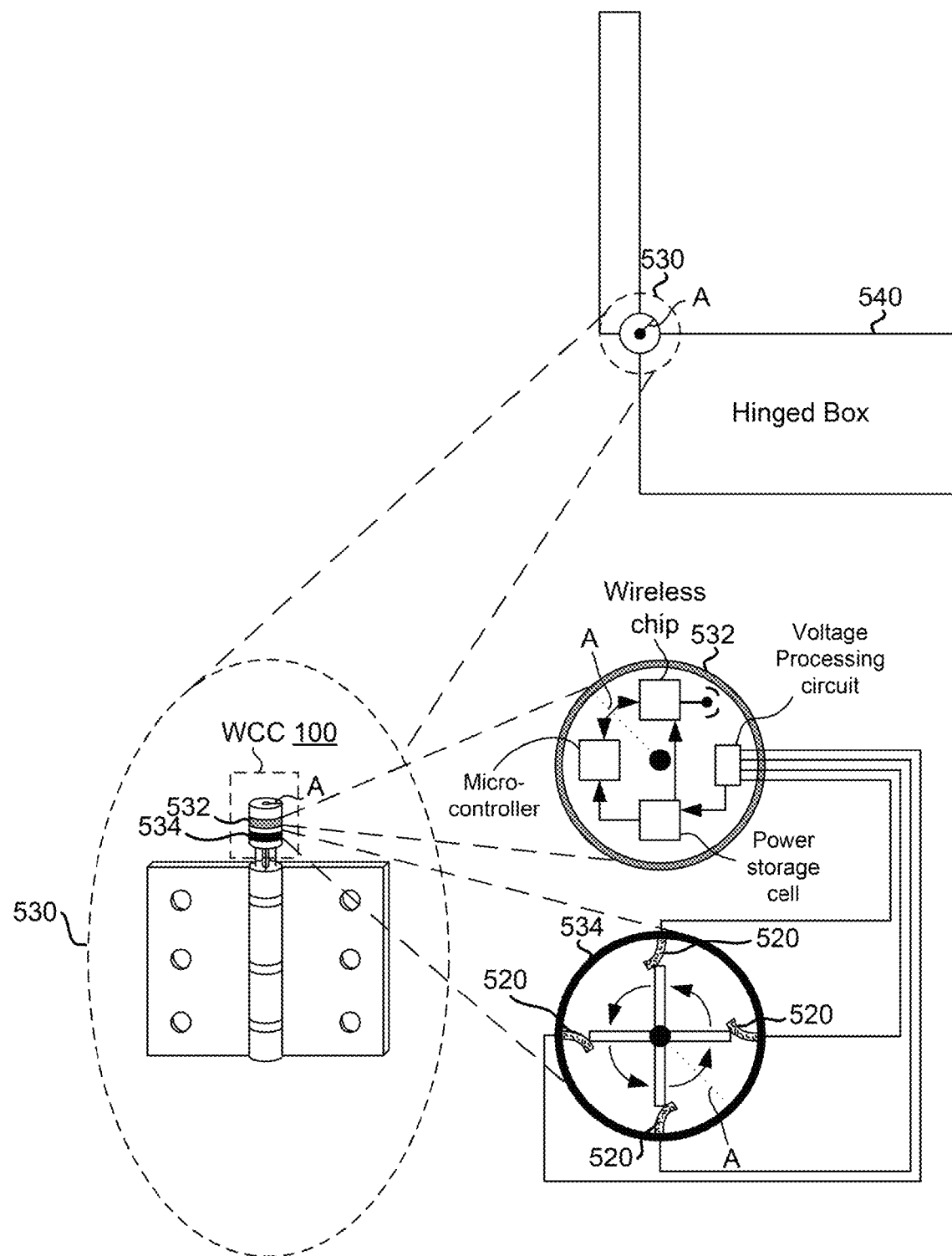
FIG. 16 illustrates an example of a hinged box, which may include a hinge, in accordance with some embodiments.

FIG. 16 illustrates an example of a hinged box 540, which may include a hinge 530. This example can also be utilizing the WCC 100 that couples to the hinge 530, as discussed with reference to FIG. 15. In other embodiments, the mechanical structure and the number of piezoelectric elements 520 can also be changed based on the size of the box or size of the door or other dimensional considerations. In this example, it is possible the track when a lid of the hinge box 540 is opened or closed. As mentioned above, uses for determining when certain things are open and closed can be tracked, catalog, and used to provide metrics regarding operational characteristics, security, use history, wear history, and other data points. Similar to the embodiment of FIG. 15, data transmitted by the wireless chip of the hinge 530 can be sent to an end node, and the end node can either process the data, save the data, recorded data, return data back to the WCC device 100, or perform other processing.

Figure 17:
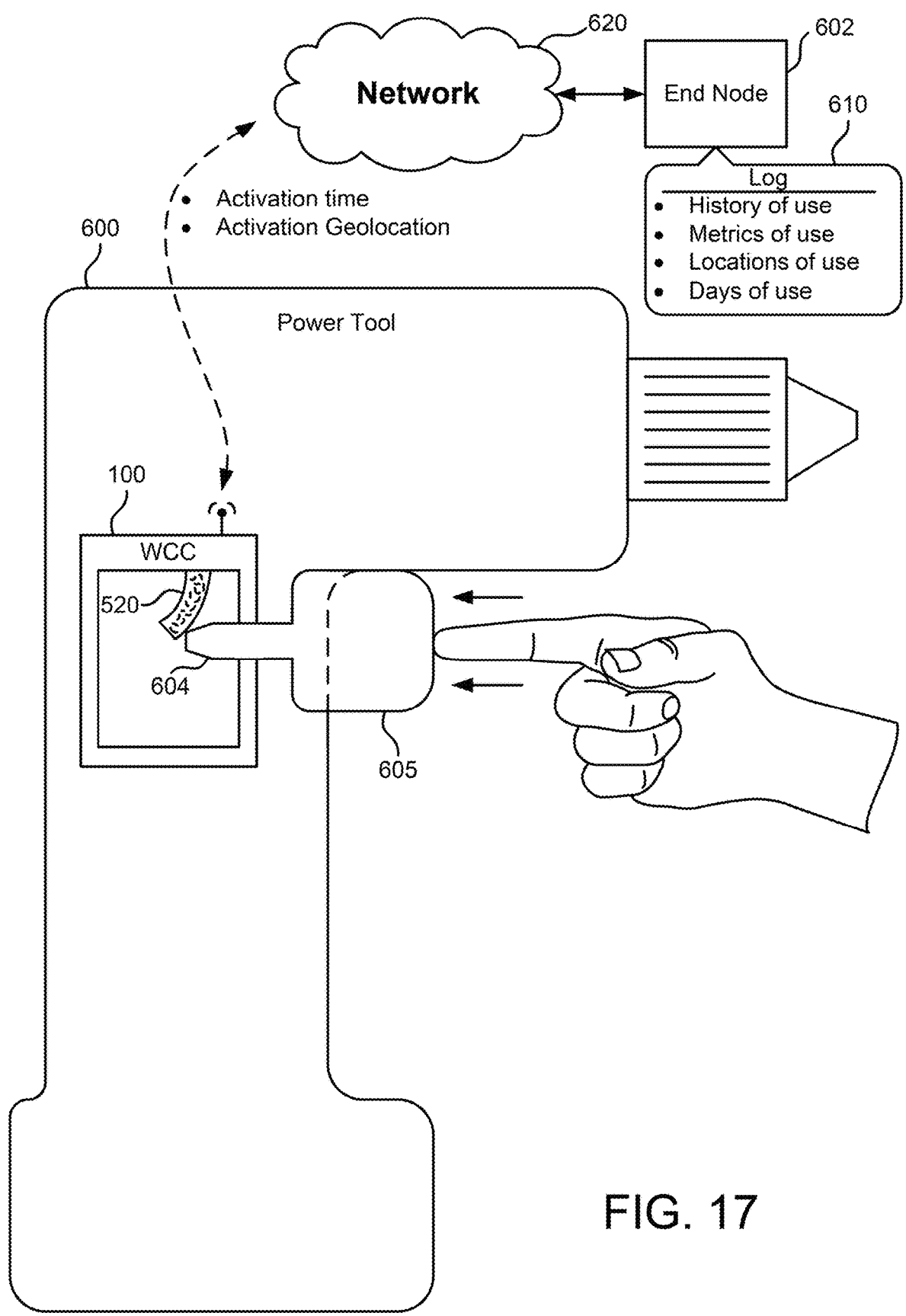
FIG. 17 illustrates an example of the power tool; each may implement a WCC device, in accordance with some embodiments.

FIG. 17 illustrates an example of the power tool 600, where each may implement a WCC device 100. The WCC device 100 can include an element 520 that can be stressed, and operate as a power pump, to produce power for then transmitting data to an end node 602. In one embodiment, activation of the power tool 600 can cause a mechanical force to be transferred to the elements 520. This example shows a simple mechanical pin 604 impacting, stressing, bending, or generally applying force to element 520. In some embodiments, in addition to the mechanical pin 604, other mechanisms can be included to strike or provide additional force to the element 520 when button 604 is pressed.

In some embodiments, pressing button 605 can be mechanically linked to a number of mechanical components that ultimately provide the mechanical impact upon the element 520. In this embodiment, the power tool 600, even though it's provided with its own power, does not need to power the WCC device 100. Further, because the WCC device 100 provides its own power, there is no need for the power tool to include additional transformers or circuitry necessary to reduce the power of voltages that are usable by circuitry of the WCC device 100. In the illustrated example, the WCC device 100 can be configured or dynamically configured to send different types of data to a network 120.

The types of data can include activation times, activation geo-locations, duration of use, impacts upon the power tool, operational data regarding the power tool, over heating data, overuse data, used by different individuals, etc. For example, the input button 605 can also include biometric sensor which can identify a user of the power tool. For instance, the power tool can be issued to specific person or persons who have the ability or license or privilege to use the power tool. Once the user presses his or her finger print upon the button 605, the WCC can include logic to verify the user and allow activation of the power tool 600.

Further, depending on the identified user, the biometric data can also be verified over a network 120 with the end node 602. Still further, other biometric sensor data can also be collected from the power tool 602, such as skin temperature, sweat, grip strength, and other data. Based on the data that is collected and processed or raw data collected, the information can be sent to the network 120 so that the end node 602 can save the data to a log 610. The log 610 can include a history of use, metrics of use, locations of use, days of use, and other data as described above. In some embodiments, the end node can also be configured to process the received data and send information to other nodes.

In some embodiments, the end node can be part of a cloud processing system. In some embodiments, the end node can be part of a server or is the server. In some embodiments, other devices having privileges or user accounts can then log into the cloud system or server to view the data regarding the use of the power tool 600. The data can include any types of metric data collected by the WCC device 100, processed by the WCC device 100, send to the end node 602, and instructions sent back to the power tool 600. The instructions sent back to the power tool 600 can include information to deactivate the tool, send an audible message, display message on a display device, and the like. The messages can be to notify the user of the power tool certain information. In one embodiment, the power tool does not include a display but messages are sent to a device such as a user's phone, watch, or to someone or something capable of relaying the message to a user, facility or management of the power tool.

The messages can be, for example, please call me, stop using the tool, lunches at 12, we have a meeting in 3 min, the tools overheating, call your wife, or other messages that are custom designed for the use and application of the specific tool. Furthermore, the tool has been illustrated to be a drill, but any type of tool can be implemented with a WCC device 100 to allow different sensor data to operate, collect data, and transmit data to a network 120 or directly to the end node 602. Still further, the power tool need not be a powered power tool. The power tool can also be a non-power tool, such as a saw, hammer, or other mechanical device that can receive a mechanical force, apply mechanical force or indirectly apply mechanical force during its use, lifting, storage, etc.

Figure 18:
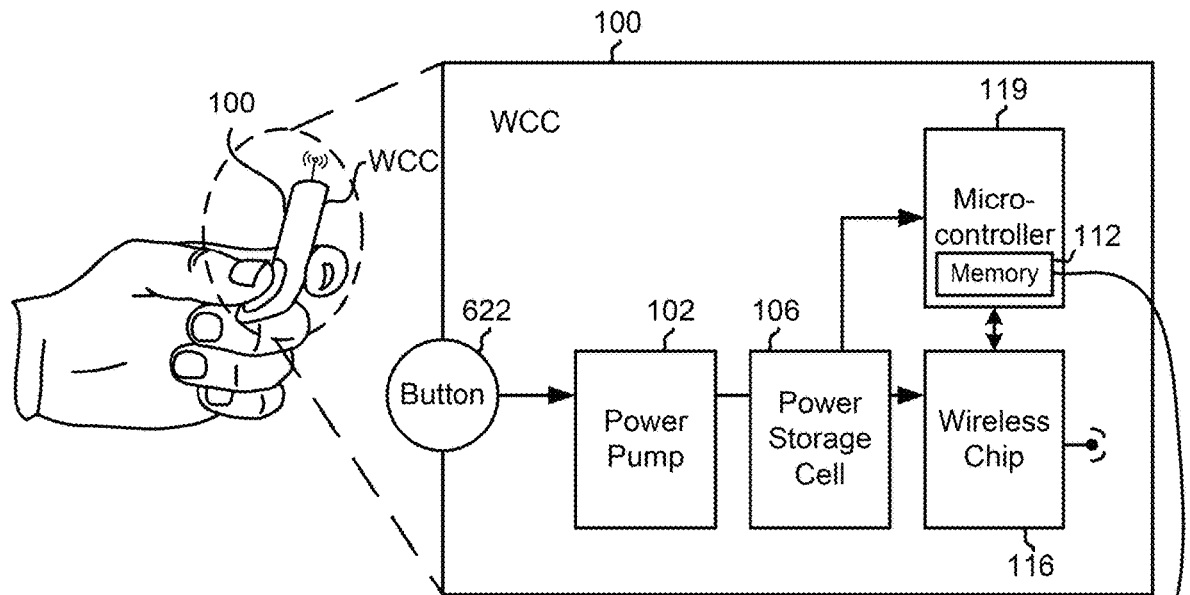
FIG. 18 illustrates an example of a WCC device, which can be in the form of a handheld fob, in accordance with some embodiments.

FIG. 18 illustrates an example of a WCC device 100, which can be in the form of a handheld fob. The handheld fob can include the WCC device 100 circuitry, such as a power pump 102, a storage cell 106, a wireless chip 116, a microcontroller 119, memory 112, and other circuitry or storage or logic. In some embodiments, the individual components of the WCC device 100 can be miniaturized, where in some logic or circuitry can be defined into an application-specific chip, which may reduce the size further and enable more efficient use of power. Button 622 can be defined as a simple button on the WCC device 100. In one embodiment, a single button is provided on the WCC device 100.

In other embodiments, multiple buttons can be defined on the WCC device 100. The button 622, in one embodiment, provides the mechanical force that is applied to the power pump. Program code stored in memory 112 can define operations that are predefined for the WCC device 100. The program code can, in one embodiment, be dynamically generated based on the users input, the environment, the geolocation, the frequency of use, the environmental conditions, the temperature, the weather, the time of day, the co-location with other devices, the identity of the user, the assigned user ID, the user account, and other factors.

Figure 19:
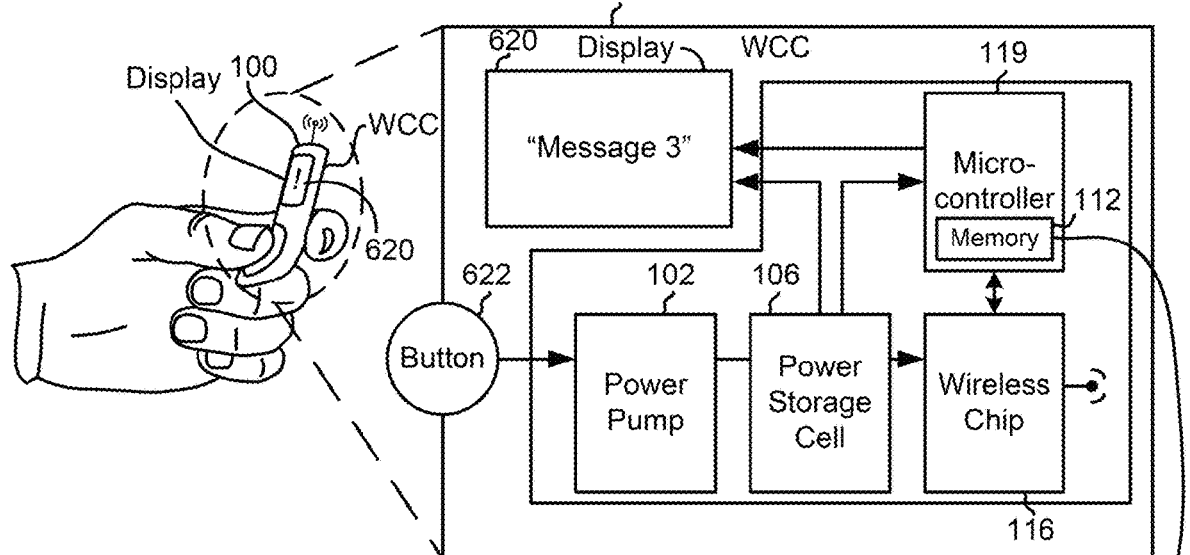
FIG. 19 illustrates another example of a WCC device, which can also include a display, in accordance with some embodiments.

FIG. 19 illustrates another example of a WCC device 100, which can also include a display 620. In this embodiment, the display 620 can include a space for showing messages, data, text, images, pictures, videos, or any type of digital data. As noted above, the display 620 can be a low-power screen, such as an E ink screen. In other embodiments, the display 620 can be an LCD, and OLED, a pixel screen, or combinations thereof for different parts of the screen. Program code can be stored in memory 112, so as to enable the rendering of data to the display 620, and communication of data to and end node, based on the programming. As noted above, the program can be updated by a user, they can be preset by factory, a can be change dynamically based on the conditions, which are many and can change over time.

Figure 20:
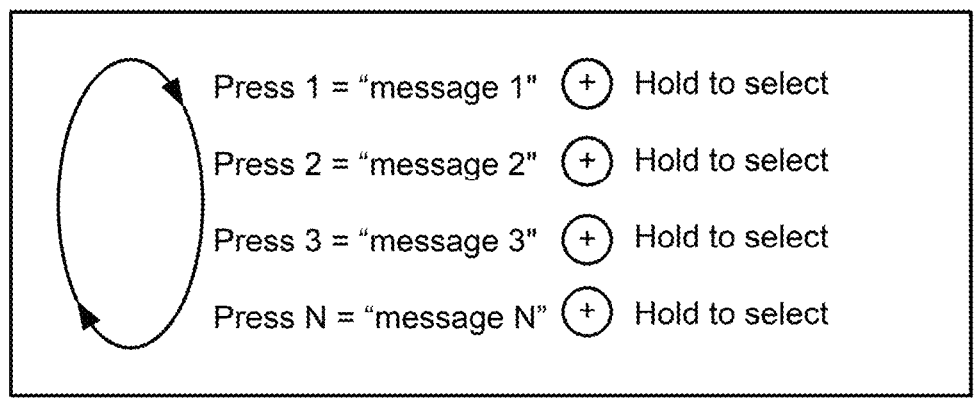
FIG. 20 illustrates an example of program code, which can be dynamically selected by a user, in accordance with some embodiments.

FIG. 20 illustrates an example of program code 624, which can be dynamically selected by a user. In this example, the selection by the user can be controlled based on a number of presses to the button 622. For example, different messages can be preprogrammed to be sent to and end node based on the number of presses. If a single button is used, the user can select the press a number of times and then hold to enable a specific message to be sent to an end node. In another embodiment, selection of the message can be to request the data be retrieved and sent back to the WCC display for reading by the user.

For instance, the user can request that text data be retrieved from a texting service or account, or request that an e-mail message be read from a mail server, or data be read from a storage device located on a cloud-based system, or retrieve data from an Internet service, such as news, sports scores, weather, stock prices, or any other type of multimedia data. In still other embodiments, advertisers can also be published to the display screen. Advertisements can be dynamically selected and sent by cloud service to the WCC device 100. The advertisements can be sent to the user based on information that is customized and learned from the WCC device 100. For example, if the WCC device is being activated at a sporting event, the advertising can be a coupon for beer at the concession stand.

Accordingly, WCC devices 100 can also communicate with geolocation servers, geolocation routers, geolocation wireless devices, and other location finding devices. The location identification function of a WCC device 100, can enable services to deliver data to the screen of the WCC device 100, or audio data, or video data, or related data. In some embodiments, the image data, video data and other information can be relayed to the user's smart phone or the user's smart watch. In such cases, the WCC device 100 can operate and its operation can signal to a media provider over the Internet that a user may request or need certain services or data. The data instead of being sent to the WCC device screen, can be linked to the user's device, which may be linked in a user account along with the WCC device.

Figure 21:
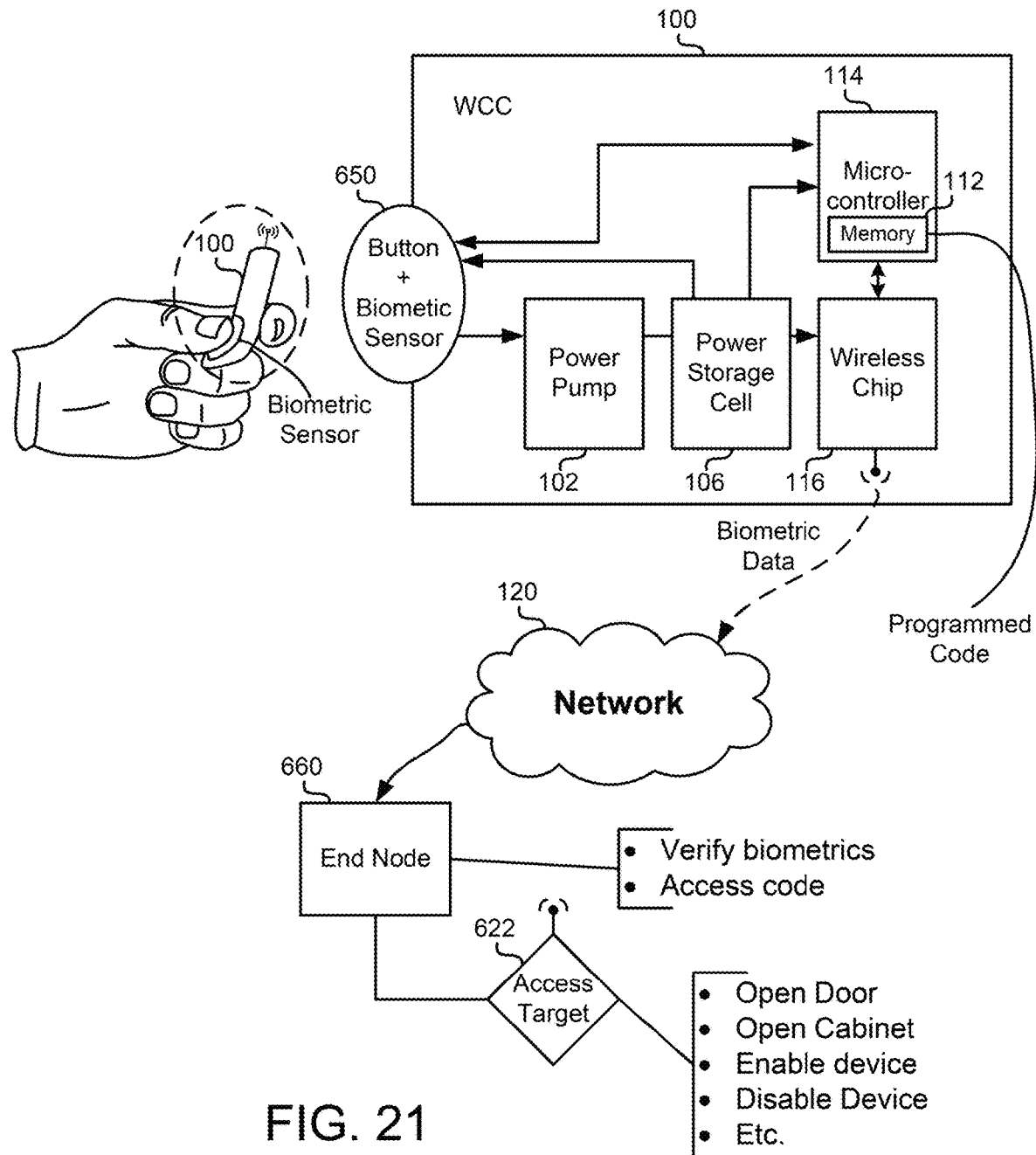
FIG. 21 illustrates an example of the WCC device which may also include a button that includes a biometric sensor, in accordance with some embodiments.

FIG. 21 illustrates an example of the WCC device 100 which may also include a button 650 that includes a biometric sensor. In this example, the biometric sensor can capture the user's fingerprints and use the fingerprint to identify the user and enable the WCC device 100. In some embodiments, multiple users can be paired to the WCC device 100, and different services can be provided to the specific user based on the biometric ID. For example, in a family environment, a WCC device can be utilized order goods or services. If a family adult is using the WCC device 100, the WCC device 100 can be enabled to order specific goods or services by the click of a button.

In some embodiments, user fingerprints are stored in the cloud and WCC devices couple to servers capable of retrieving a range of tiered access from simple identity through payment account information, depending on the intended application. In some embodiments, user fingerprints are stored in the cloud from various cell phone manufacturers including Samsung Inc. and Apple Inc., and WCC devices couple to servers capable of interacting with data provided by cell phone service providers or manufacturers.

If the WCC device 100 is utilized by a child of the family, the biometric sensor would prevent the ordering of certain types of goods and services, or only the goods and services associated with a profile. The profile the child, the profile of the dolls can then be monitored in the cloud service to identify the type to goods and services that would be offered, can be ordered, can be selected, can be reserved, etc. by the specific individual based on the biometric identification. In one embodiment, the biometric data is transferred by the wireless chip 116 to a network 120 so that an end node 660 can process the data.

The biometric data can be processed to verify the biometrics of the user, such as identifying the user and/or providing access codes or data to enable its use. In some embodiments, the WCC device 100 can be used to open doors, open cabinets, enabled devices, disabled devices, or provide general access to applications or data. If the end node 660 determines that the biometric sensor data captured by the WCC device 100 matches and is verified, a determination is made as to whether the access target 622 will be enabled.

The access target, in one embodiment, is simply end node that allows communication to specific devices, data, digital data, physical objects, or other information based on a verified biometric code or access code. In some embodiments, a WCC device 100 can also include a camera that is activated to biometrically image the user. The image can be used to identify the user and allow access to specific device if the verification is confirmed. Therefore, in addition to a biometric sensor taking a fingerprint, other biometric data can be captured by WCC device 100, such as images of the person's eyes, DNA from ambient dust shed from the user skin, facial characteristics, saliva, hair samples, or other combinations thereof. In some embodiments, a matrix of biometric data it is used to provide access to a specific type of thing, such as a physical thing or digital thing based on the identification enabled by a WCC device 100.

In one embodiment, the program code stored in memory 112 can be updated based on the use of the WCC device 100. The updating can occur dynamically over time based on the use, or can also be updated by an end node which programmatically send data back to the WCC device 100 for programming In some embodiments, the biometric sensor on the WCC device 100 can capture a fingerprint and then enable password to be entered automatically into a webpage. The password can then be stored in a cryptographic form on the WCC device memory 112, and only enabled or decrypted when the biometric sensor has detected or identified or verified the user.

Figure 22A:
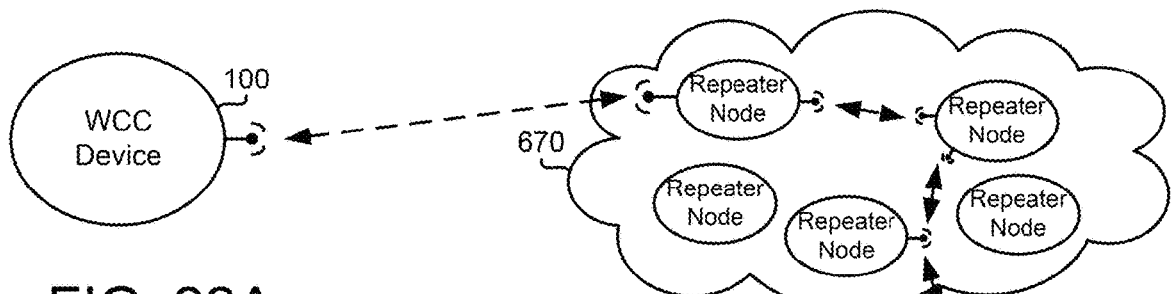
FIGS. 22A-22F illustrates various examples of communications between a WCC device and various nodes over one or more networks or directly between nodes, in accordance with some embodiments.
Figure 22B:
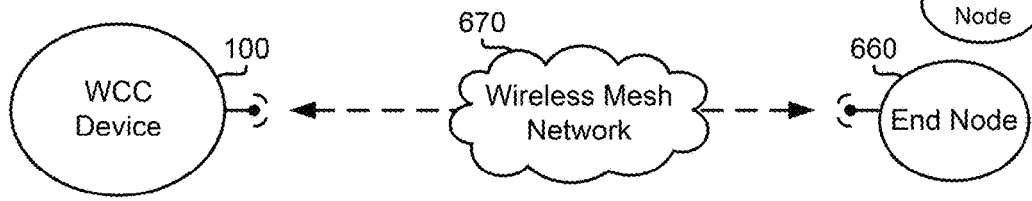

FIGS. 22A-22F illustrates various examples of communications between a WCC device 100 and various nodes over one or more networks or directly between nodes. For example, FIG. 22A shows a WCC device 100 that can communicate with a mesh network 670, which can include a plurality of repeater nodes that ultimately allow communication of data to an end node 660. FIG. 22B illustrates an example where a WCC device 100 communicates with the mesh network 670 and then directly to an end node 660.

Figure 22C:
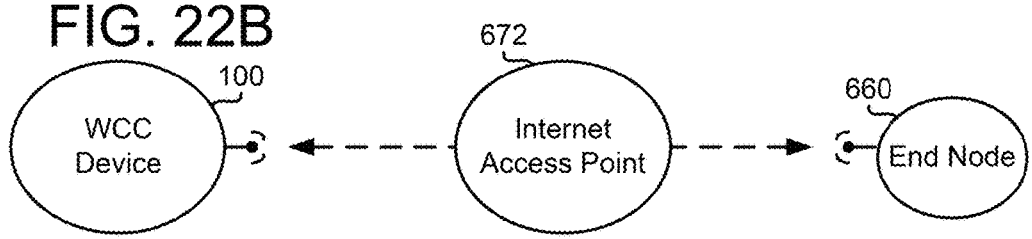
Figure 22D:
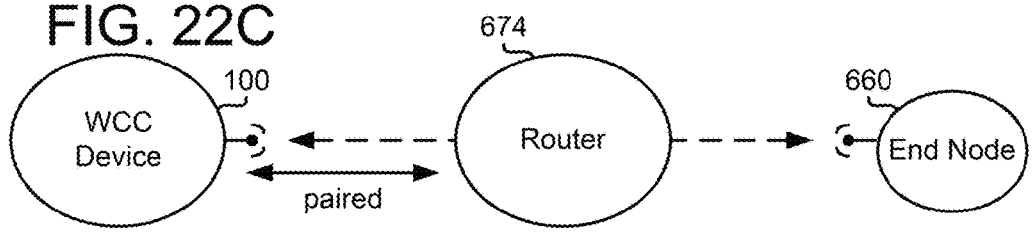
Figure 22E:
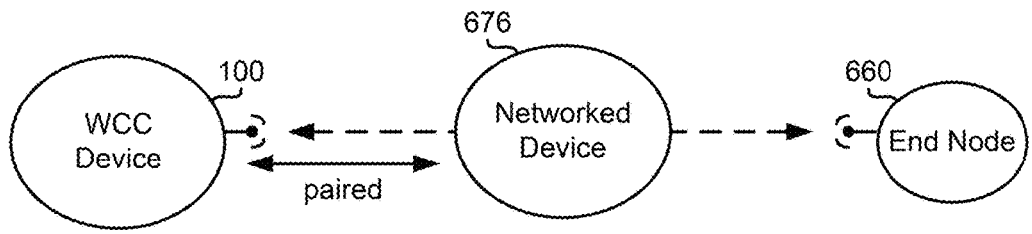
Figure 22F:
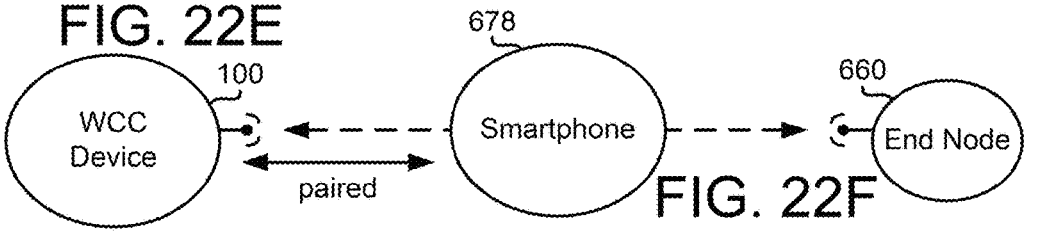

FIG. 22C illustrates a WCC device 100 communicate with an Internet access point, which then communicates with an end node 660. The end node 660 can be a local end node, such as a local computer within the user's home, or could be a remote computer distributed different part of the world and interconnected over the Internet. FIG. 22D illustrates an example of a WCC device paired with a router 674, which then provides access to the end node 660. FIG. 22E illustrates an example of a WCC device 100 paired with a network device 676 which then communicates with an end node 660. FIG. 22F illustrates an example of a WCC device 100 paired with a smart phone 678, which is used to provide access to the Internet or directly provide access to an end node 660.

In still another embodiment, the WCC device 100 can be paired and communicate directly to the smart phone, a smart watch, smart glasses, a display in a smart watch, display on the smart set of glasses, etc. As used herein, the term smart refers to a device that is capable of processing data using at least a processor and memory, and communicates with at least another device, or a network, or the Internet.

Figure 23:
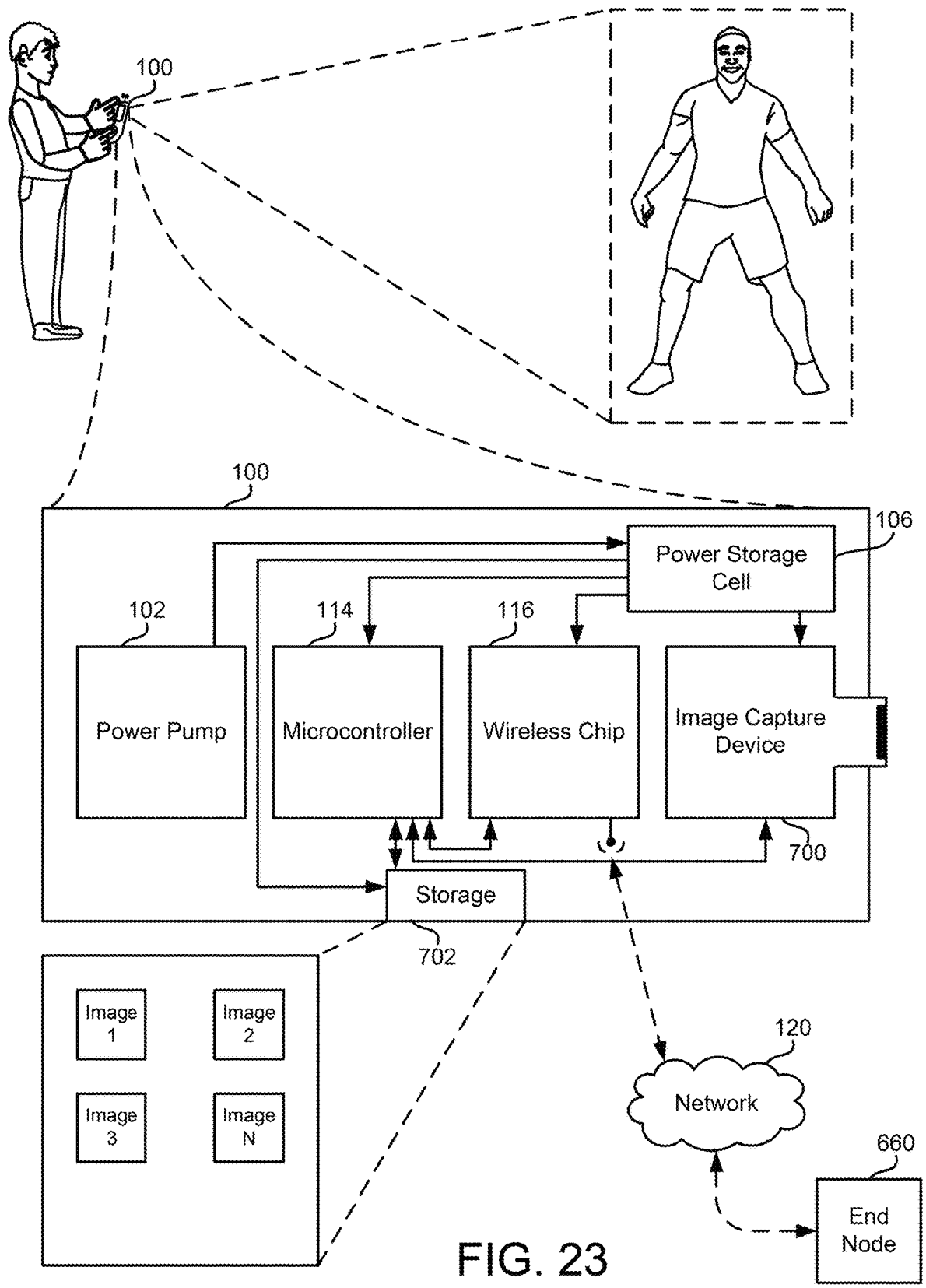
FIG. 23 illustrates an example of a WCC device utilized by a user to take a picture, and communicate the picture to end node, in accordance with some embodiments.

FIG. 23 illustrates an example of a WCC device 100 utilized by a user to take a picture, and communicate the picture to end node 660. In this example, the WCC device 100 can include storage 702, and an image capture device 700. The image capture device 700 can be controlled by the microcontroller 114, and images taken by the image capture device can be communicated via the wireless chip to a network 120, which then communicates with end node 660. Storage 702 can store multiple images that have been taken using the WCC device 100.

In some embodiments, the WCC device is capable of capturing video images, sound images, sound and video, vibrations, inertial sensor data, and other capture information. This data can then be communicated over a network 122 and end node 660. As mentioned above, geolocation data can also be captured by the WCC device 100.

Figure 24:
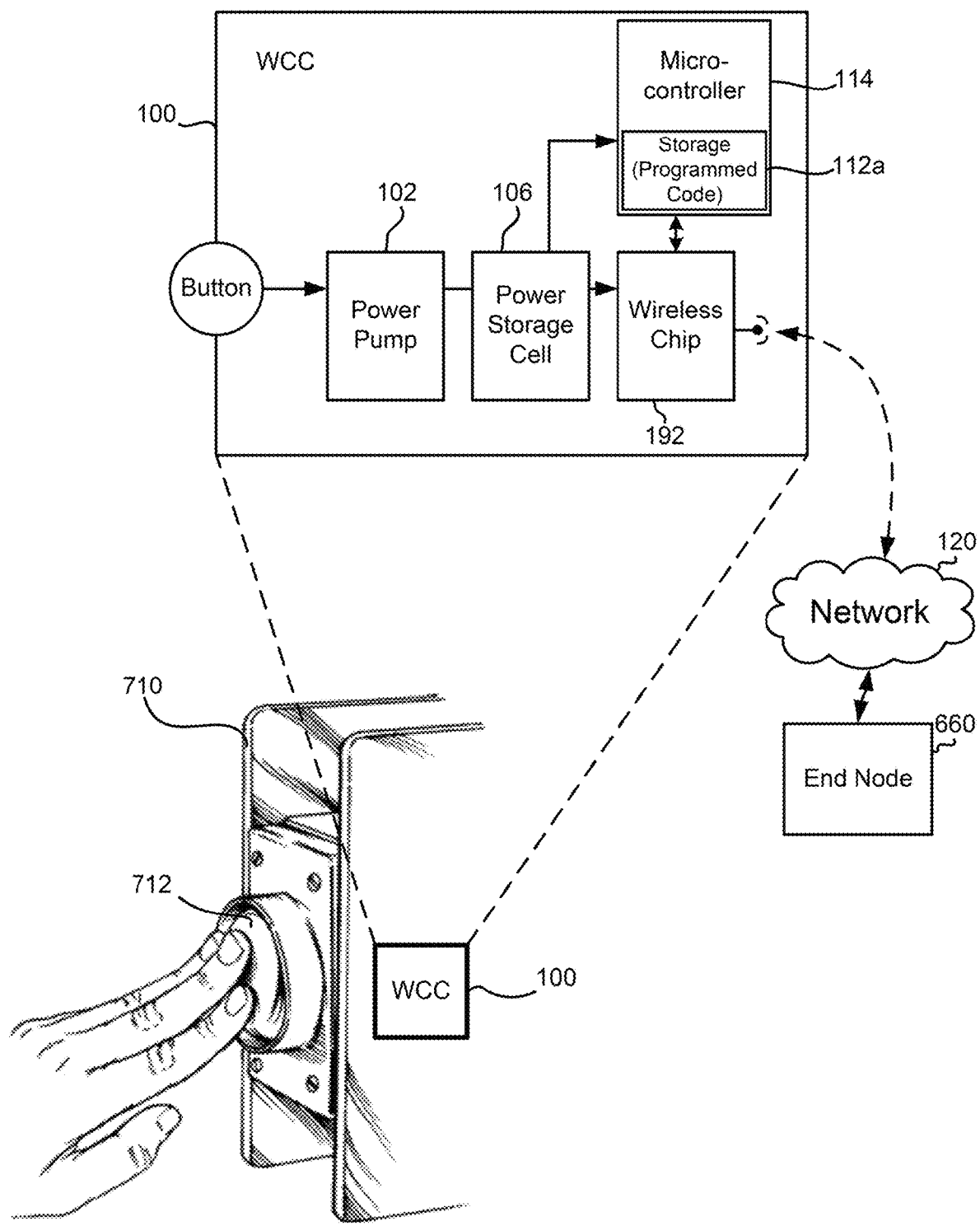
FIG. 24 illustrates another embodiment of the WCC device, in accordance with one embodiment of the present disclosure, in accordance with some embodiments.

FIG. 24 illustrates another embodiment of the WCC device 100, in accordance with one embodiment of the present disclosure. In this example, a microcontroller can be configured to include its own storage 112a, which can store program code. The program code can include predefined instructions that are coded by the manufacturer, the owner of the device, or periodically by a cloud processing server. In another embodiment, the program code can be dynamically generated based on current activity, based on a program that takes data in and processes new data out, or dynamically changing over time based on certain conditions of the WCC device 100, environmental conditions, time of day, uses of the WCC device 100, biometric data, inertial data, or other sensor data that can be multiplexed to define new types of data.

As shown, a button 712 can be pressed to activate the power pump 102 of the WCC device 100. The device 710 incorporating the WCC device 100 can be a box, a door entryway, a refrigerator, an appliance, a vehicle, a computer, a phone, a chair, table, a bike, exercise equipment, or any other thing that can register, provide, or interface some type of movement, motion, input, force, or relay intended or unintended forces upon the button 712. In other embodiments, the button 712 is pressed for a different purpose, such as to open a refrigerator, to ring a doorbell, etc. However, a WCC device 100 that is interfaced with that mechanical button 712 can receive information and additionally produce the data that is communicated to the network 120, and relay to end node 660.

As noted above, note 660 can be part of network 120, or network 120 can be part of node 660. In general, the wireless chip 192 is configured to communicate data produced, sense, or processed by microcontroller 114 and communicated to an end node 660 for further processing, display, or generally providing access by third parties or for machine learning utilized for predicting information needed by a user, or a device.

Figure 25A:
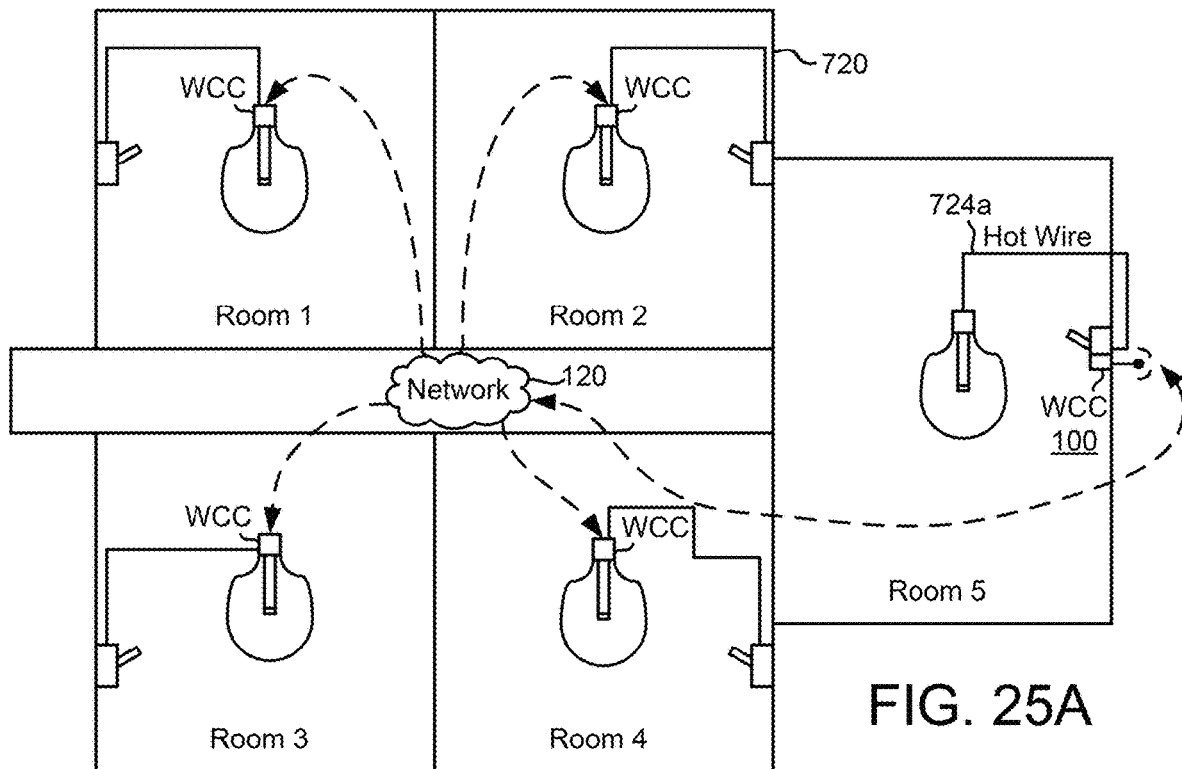
FIGS. 25A-25D illustrate other example uses of WCC devices 100, in accordance with one embodiment.
Figure 25B:
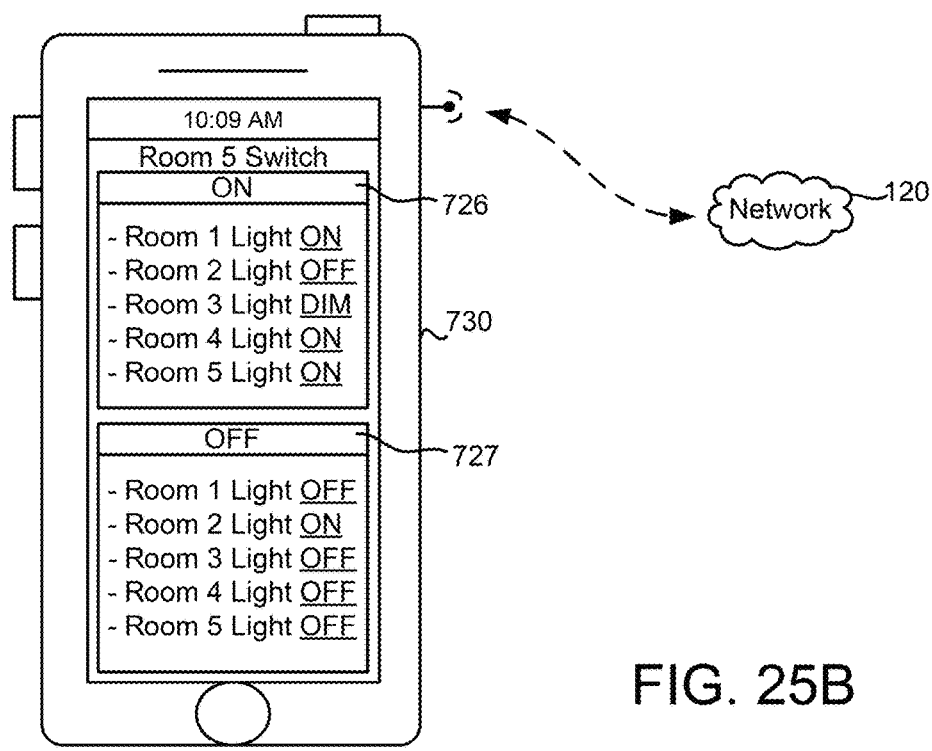

FIGS. 25A-25B illustrate other example uses of WCC devices 100, in accordance with one embodiment. As noted above with respect to the use of electrical outlets, light bulbs, electrical fixtures, and other electrical wiring disposed throughout a building, house, or environment, the WCC devices can be used to activate certain ones of the lighting fixtures or lighting or electrical fixtures via wireless communication signals provided to a network 120. In one embodiment, a WCC device 100 can be associated with a light switch, which can be used to control a light bulb via a wire. If the light bulb is wired to the switch, is referred to as a hot wired device.

However, in addition to being hot wire to a single light fixture, the WCC device 100 can communicate wirelessly information or data for control to the network 120. In this embodiment, network 120 can also communicate with other light fixtures, sockets, or electrical fixtures. As such, it is possible the program the WCC devices 100 to communicate with devices enabled for WCC communication so that specific lighting programs can be operated by activation of the single switch. For example, if the switch in room 5 is turned on, a specific lighting pattern can be set for the different rooms 1-4.

In one embodiment, as shown in FIG. 25B the lighting patterns can be programmed on a device 730 which can include several programs 726, 727, and others. This example shows a portable device utilized to communicate with network 120, which is used to set programming to the different WCC device enabled objects. In this manner, it is possible the program any one of the switches having a WCC device 100, to programmatically and wirelessly send data to specific enabled devices to control their interaction, activity, levels, settings, scenes, and other functionality. In some embodiments, the user can program specific scenes of lighting which are triggered automatically at different times of day, for different events, or from a remote location via a smart phone, smart device, smart watch, a computer, a tablet, or any other device having access to a network 120.

Figure 25C:
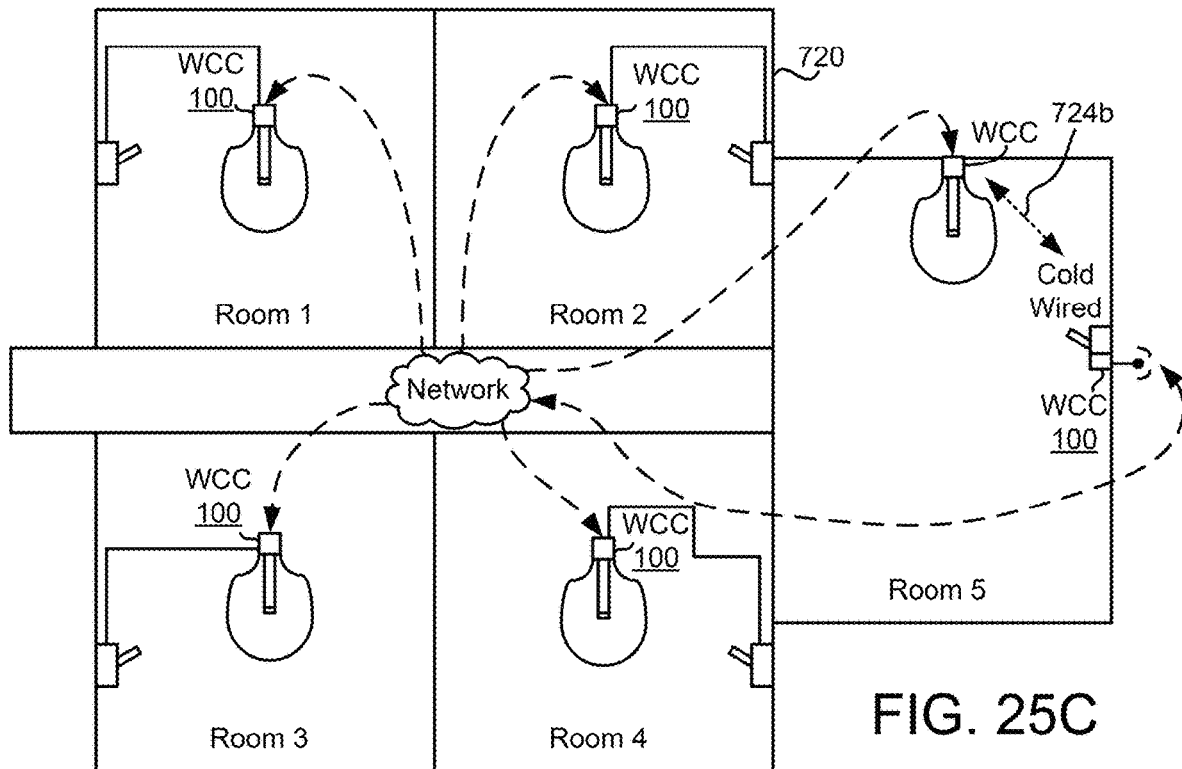

FIG. 25C illustrates another embodiment similar to FIG. 25A, except that the WCC device 100 is associated with a switch that is not hot-wired to the lighting device present in room 5. That is, the switch associated with WCC device 100 in room 5 can be placed at any location on a wall, such as by sticky tape, screws, or simply held in the users hand or placed on an item or thing in a room or carried from room to room, etc. In this example, WCC device 100 can communicate wirelessly 724b to a lighting fixture, for example that is enabled for WCC communication. To be enabled for WCC communication means that the device can receive data and process instructions received from a WCC device 100.

Figure 25D:
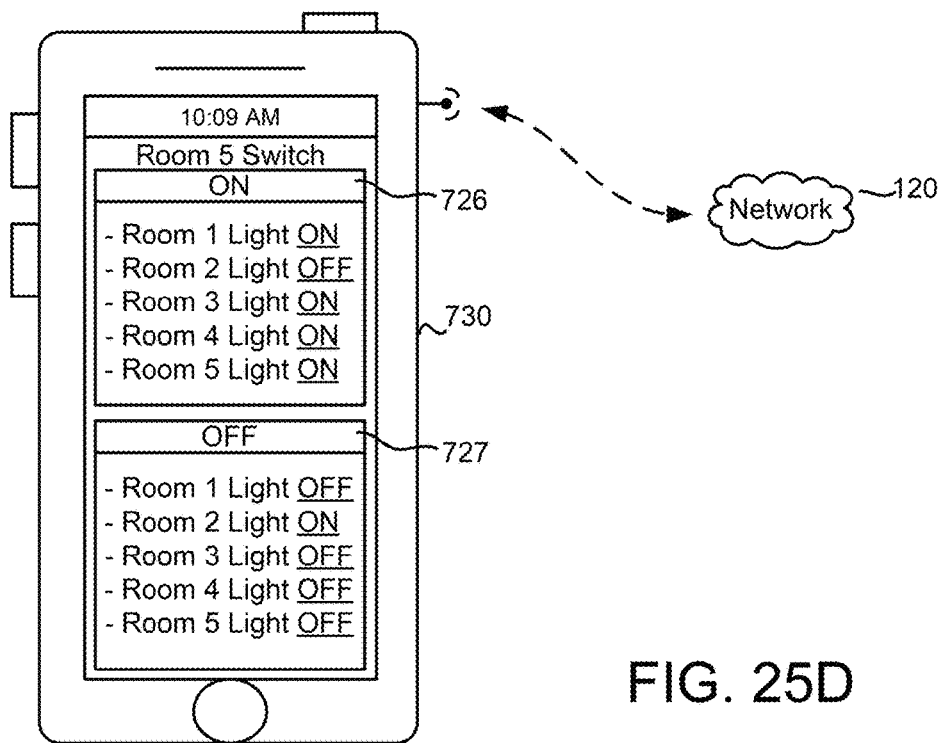

In another embodiment, the WCC communication can also mean that the device can respond and send data in addition to receiving data. In this example, FIG. 25D also illustrates that is possible to program specific settings of the WCC device 100, and its functionality or communication with any other WCC devices. In some embodiments, simply communicating a program to a network 120 can propagate that information and programming to specific WCC devices. As noted above, the communication of information can be wirelessly process from remote locations, or from local areas that are proximate to the device is being controlled.

As used herein, proximate locations can include locations that are located with the same physical structure, the same room, or located within a wireless distance that does not require wide area networks, or within a few feet, within 10 feet, within 100 feet, within 1000 feet, within 1 inch, within several inches, or variants thereof or any number between any one of said example distances that are proximate or can be considered proximate to the WCC devices or end nodes or networks.

FIGS. 26A-E illustrate various examples of WCC devices that can be integrated into various objects or things. In the examples illustrated, a WCC device can be integrated into a power saw, a vacuum cleaner, a turn knob, a dial switch, a rotating disk, and other types of devices that can or would provide direct or indirect movement of an object. The movement of the object is then directly or indirectly transferred as a force that's applied to an element of a power harvesting device, which is utilized to enable the processing and communication of data by the WCC device 100. The processing of information which is communicated can be sent to the cloud that's part of a network 120.

The cloud, in one embodiment, is part of a server and storage system that processes information, or stores information in response to data received. In some embodiments, the cloud can also send data based on predefined programs, or programs that are either systematically update or updated in ad-hoc fashion, or both, over time. For instance, use of the power saw can be tracked and sent to a cloud system, which is then reporting to a specific end node. The owner of the power tool can then be notified, or track the use of the power tool over time by accessing the website, an application on a smart device, or receiving notification on some connected device over the Internet. Similar can be said for devices such as a vacuum cleaner which when moved can activate wheels or button presses can activate the turning on and off of the vacuum cleaner, and such data can be sensed and used to process data by one or more WCC devices 100.

Figure 27:
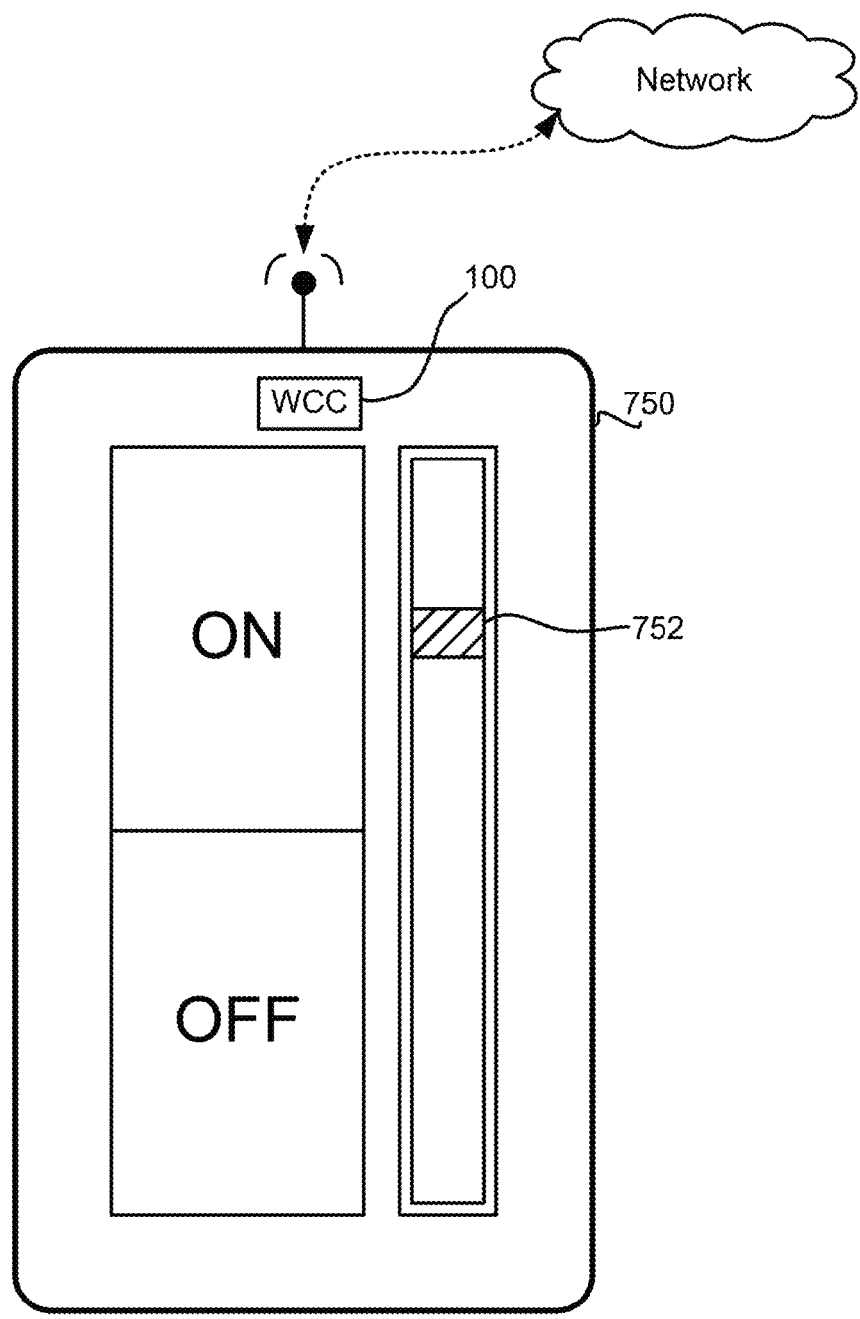
FIG. 27 illustrates an example of a wall switch utilize to turn power on and off in a specific room or light fixture, in accordance with some embodiments.

FIG. 27 illustrates an example of a wall switch 750 utilize to turn power on and off in a specific room or light fixture. In one embodiment, a WCC device 100 is integrated with or connected to a light switch. In some embodiments, a slider button 752 can be used to set a predefined program that activated based on the different button presses of on and off. The on and off function can be a rocker switch, and the slider 752 can further provide sensitivity adjustment, tuning functions, selection functions, adjustment functions, and other input they can be processed by the WCC device 100, so as to provide specific information to and end node via a network.

For instance, the activation of the rocker switch can generate or harvest power for the WCC device 100, and the setting provided by the slider 752 can define a dimming operation or level for that WCC device to communicate to one or more lighting devices which may be local or remote, but still connected to a network and capable of receiving input control data from the WCC device 100 based on the settings.

FIG. 28 illustrates an example of a vending machine 800, which may have a screen 802, selection input buttons 804, a slider for dispensing 806, and multiple sensors 808, in accordance with one embodiment. The vending machine can receive or harness electrical power from any one of the motions or pushes of buttons 804, screen 802, impacts upon sensors 808, rolling motions on the dispense surface 806, etc. In some embodiments, the sensors connected to an array of WCC devices 100' can also identify which type of soda was released, when soda is no longer present in the slot 1, 2 or 3, if a soda can is dispensed empty (e.g. has a different weight), or the failure of the assistant the dispense soda when electronics of the system indicate that dispensing has occurred.

In some embodiments, WCC devices can be used to confirm electrical operation of a device, such as by detecting whether actual mechanical movement of the device has occurred. For instance, a user might select soda number 1, and the display screen 802 will indicate that there is soda number 1 available, and then charge the user. However, if soda number 1 does not dispense, it is sometimes difficult for the machine to know that the mechanical function has actually failed to occur. A WCC device can identify if the mechanical devices fail to operate because there is no motion or impact detected by one of the WCC devices, and this information can be relayed directly to the electronics of the vending machine 800, or can be relayed to a network 120.

In operator of vending machine's 800 can also receive information from a multitude of vending machines distributed throughout a geographic location via network 120. In some embodiments, WCC devices can also detect when impact is applied to a vending machine, such as vandalism. In some embodiments, a WCC device can also take pictures when specific to the collections, mechanical actions are applied to the vending machine 800. These pictures can be taken even when the vending machine is unplugged.

In still further embodiments, it is also possible to integrate WCC devices into money dispensing machines. A money dispensing machine is typically the target of vandalism, or theft. Many times, a money dispensing machine is stolen by criminals who intend to take it to a location where the dispensing machine can be disassembled. In some embodiments, the disassembly of the machine can cause generation of power, and can at the same time track with sensors what is occurring to the machine. For instance, images can be taken of the thieves as they disassemble the money dispensing machine, and the WCC device can communicate with the network to provide information regarding location, image data of the thieves, sound captured while the machine is disassembled, and other metrics.

FIGS. 29A-B illustrate examples of retail objects that may be stored on shelves, such as store shelves. In some embodiments, users may reach in the store shelves and remove one or more of the objects, such as a drink. When the drink is removed from the store shelf, a spring-loaded WCC device can detect that an item has been removed. This information can then be sent to a network to identify a quantity of objects that remain on the store shelf. Often, large warehouses or retail outlets require humans to walk store shelves, or visit different stores to determine when certain products have run out.

In other embodiments, warehouses are also stocked with objects that need to be replaced. WCC devices can be placed in connection with locations, or surfaces, or shelves, or racks, or other structural features that enable tracking of when specific items are moved, release, interfaced with, touch, and the like. This information can be collected and utilized in an efficient manner to allow restocking, reordering, re-shelving, and more optimize shelving places for objects if objects are not being sold. For instance, metrics may be identified of how often users interface with products on shelves.

This information can be critical for store owners to identify which parts of the store shelves are getting the most users to interact with goods and services. By using this information, different goods can be resorted and replaced in different areas of the store, a shelf, or area to optimize their sale. WCC devices can therefore detect interaction over time, and the data can be analyzed by cloud systems, servers, or processes to provide recommendations for new locations per products, replace the products, identification of products that do not sell, removal of products, and the like. Again, warehouses can also optimize the storage of parts, mechanical items, large objects, in other things that need to be optimized for placement, orientation, replacement, or the like.

In some embodiments, advertisers can also be provided with information regarding products that sell on specific shelves, products that do not sell and placed on specific shelves, shelves the get a lot of view traffic, shows the get a lot of interaction, and the like. In one embodiment, digital advertising can be provided to specific shelves in a retail outlet. The digital advertising can be updated based on the type of people that are interacting with products, that amount of interaction that products are interacted with, and or how often products are replaced on store shelves. In some embodiments, the WCC devices can gather this information and provide metrics data to cloud systems which are then viewed remotely by decision-makers, such as marketers, salespeople, advertisement specialist, buyers, and others.

Figure 30:
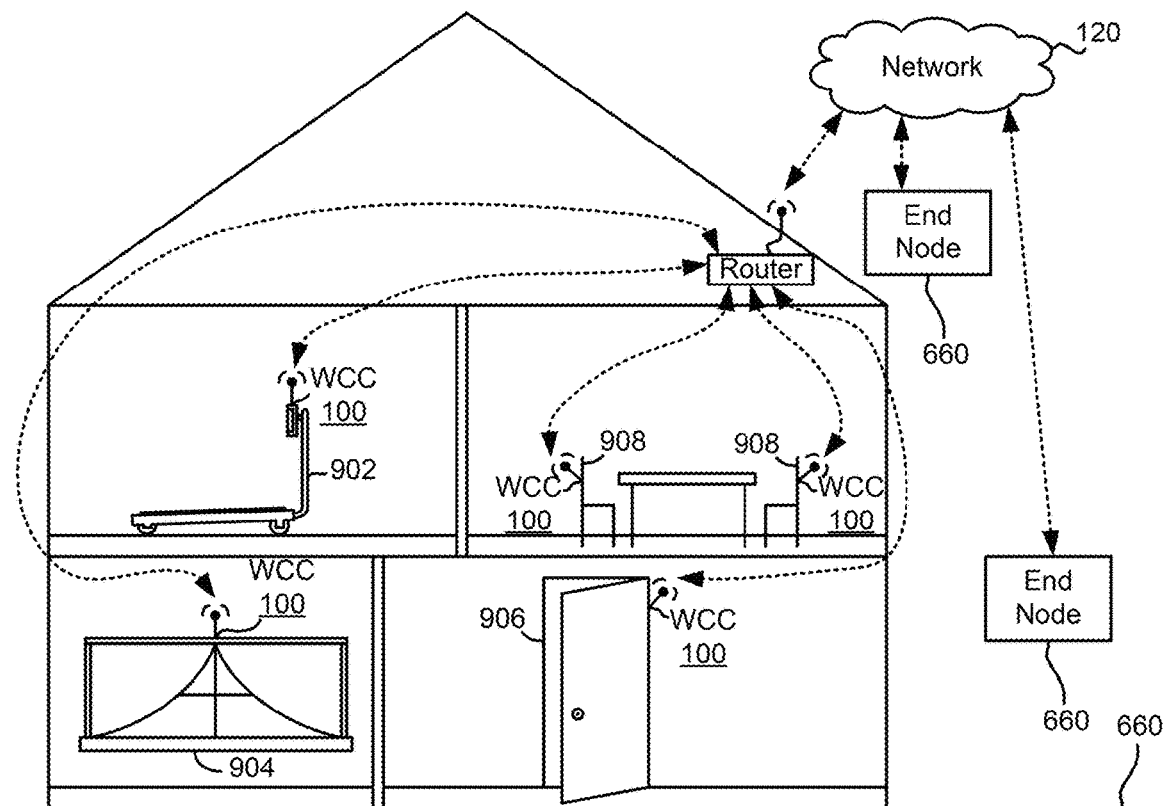
FIG. 30 illustrates an example of a home, which may include a number of WCC devices integrated into various components, objects, things, and wireless communication to a router, in accordance with some embodiments.

FIG. 30 illustrates an example of a home, which may include a number of WCC devices 100 integrated into various components, objects, things, and wireless communication to a router. In this illustration, one room is shown to have a treadmill 902 with an integrated WCC device 100. When the treadmill is used, motion of the treadmill can be transferred to the WCC device 100. In other embodiments, a window 904 can also include a WCC device 100, which may detect when a window is opened, curtain shades are moved, or other interaction occurs with or in front of the WCC device 100.

In some embodiments, an attempt to open the window can also trigger the capture of an image of the person who is trying to open the window. Sound capture can also occur simultaneously or responsively. Also shown is a door 906 that has an integrated WCC device 100, such as integrated with a hinge or 2 hinges or multiple hinges. Still further shown is a room having a table and chairs 908. Chairs can also include WCC devices 100, such as those that detect movement of a chair back, pressure upon the legs of the chair when a person sits on a chair, or other detection or sensing mechanisms that trigger, interfaced with, or incidentally provide force to a WCC device 100. These devices can process the sensed data, and then communicate with the router, as described above. Instead of a router, a repeater device, or other computer can be designated to receive output from the WCC device 100, as programmed by a user or an entity if the house is being monitored by security company that installs the security devices.

In some embodiments, the devices are not security devices, but are simply devices used to track use of different objects or things in a home. Data associated with the tracking can be monitored by the owner of the home, in a private way. Tracking information can also be encrypted, so that only those persons having privileges for viewing the data can view it. The home is shown connected to a network 120, which may be the Internet, which then can provide communication to different and nodes 660.

Figures 31, 32A, 32B:
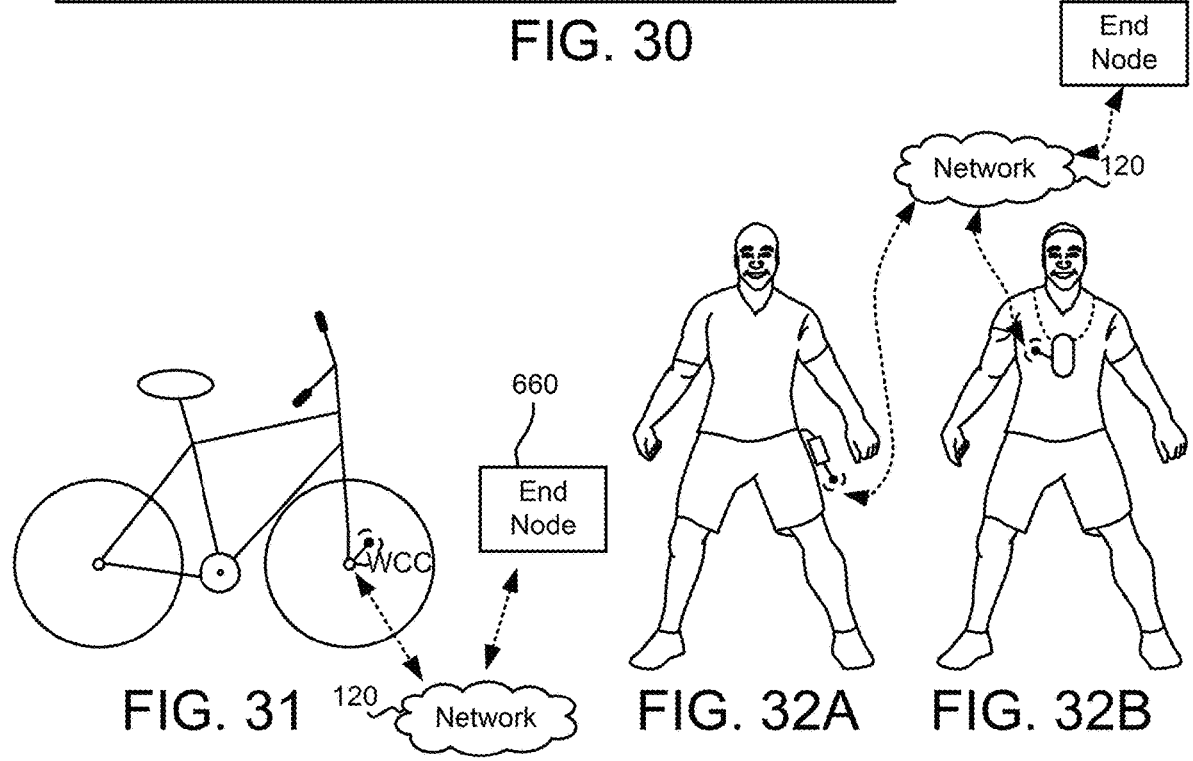
FIG. 31 illustrates a bicycle which may include a WCC device, in accordance with some embodiments.
FIG. 32A illustrates the use of a WCC device for a user, such as integration into an ID badge, in accordance with some embodiments.
FIG. 32B illustrates another embodiment where a WCC device can be attached to the user in a necklace format, in accordance with some embodiments.

FIG. 31 illustrates a bicycle which may include a WCC device. In this example, the bicycle can have a WCC device integrated into the hub of a wheel. As the bicycle is moved or someone rides the bicycle around, the WCC device can collect information and at the same time harvest power for communicating the information to a network, which is then sent to an end node 660.

FIG. 32A illustrates the use of a WCC device for a user, such as integration into an ID badge. As the batch moves, movement of the batch can trigger or cause motion to be transferred to a power harvesting element within the badge. The badge can also instead include a button, which can be pressed by user to activate the WCC device. In some embodiments, the badge can have a button that is pressed before the user is allowed to enter a specific room or across a specific door, such as in a corporate environment that has security. Data regarding the times that the user enter specific doors, activate specific passwords, user specific machines, or any other interfacing that the user does with or incidentally through the WCC device 100 can be sent to a network 120, and then communicated to a node 660.

FIG. 32B illustrates another embodiment where a WCC device can be attached to the user in a necklace format. In some embodiments, WCC devices can be integrated into jewelry. The jewelry can be necklaces, wristbands, ankle bracelets, or clothing. Buttons, sliders, snaps, zippers, and other types of moving objects or objects that move against other objects can be used to generate power, or cost for the harvesting of power that enables the WCC device 100 to provide processing and communication with network 120.

In the paper, incorporated by reference herein, titled "A Piezoelectric Energy Harvester Based on Pressure Fluctuations in Kármán Vortex Street", Dung-An Wang et. al describe an operation of a piezoelectric energy harvester element configured to capture energy from a fluid flowing in a flow channel. In the example, a piezoelectric film is cantilevered from the edge of a flow channel to the topside of a flexible diaphragm. Disposed in the flow channel is a body used to disturb the natural flow of fluid in the channel, causing a vortex street turbulence causing a periodic undulation of the flexible diaphragm, resulting in a mechanical force applied to the piezoelectric element, causing a pulse of energy to be generated. The present disclosure may couple a WCC into a pipe fitting having a diaphragm and piezoelectric element coupled to the diaphragm. In the WCC pipe fitting, the WCC is able to monitor, track or count the pulses of energy associated with the flexing of the diaphragm.

A calculation may be made to determine the flow rate of liquid through the pipe fitting. In one embodiment, a vortex street disturbance is caused by a contour change introduced in the pipe fitting. In another embodiment, a flow disturbance is caused by a trapezoidal bluff body disposed in the flow channel of the pipe fitting. Such pipe fitting may be made of food grade stainless steel or made out of copper, aluminum, or PEX plumbing material. The flexible diaphragm may be made of food grade silicon or other suitable material depending on the application. The pipe fitting may be used in connection with process tracking and automation in pharmaceutical manufacturing, food processing, beverage industry, city water meters, pipes coupled to sinks, toilets, etc. In one example, the WCC is activated upon reaching a threshold energy level upon a minimum flow of fluid through the channel Upon activation the WCC counts pulses of the flow and transmits the pulses in a payload or sends payloads periodically with an indication of flow rate. Flow rate may be computed by the WCC and transmitted or payload data may be processed remotely to determine the flow rate. A valve control or process control may receive the flow rate and use the rate to adhere to a process. In one embodiment, the WCC sends its ID along with the payload.

FIGS. 33A-33E illustrates another embodiment for use of WCC device. In one example, a WCC flow sensor may also be equipped to take an in-vivo sample of the fluid while it flows through the channel One such sensor may indicate density or viscosity and used, for example, to determine the amount of sugar present in the solution. This would be particularly useful in a brewery. Any such secondary sensor may be coupled and activated using the WCC logic and transmission capability and results or an indicia of data samples may accompany a payload. Payload data characterizing or containing an image of the sample may be transmitted with a time code of when the reading was taken. The data can also be shared with FDA, gluten-free certification process, process automation software, etc. Conditions may be set to signal, flag, modify or terminate a process if results are outside of a set range. Payload data may be transmitted to a cloud system, shared with authorized services or persons.

WCC devices can also be used for security purposes, such as for dynamically entering different rooms, tracking motion, tracking activity, tracking geolocation, tracking favorite places, and/or tracking other users that interact with one another which may have their associated WCC devices. As such, WCC devices can communicate with each other, so as to sense other WCC devices when activated. Such WCC devices can then communicate information to a network, which may identify other WCC devices that may have been encountered over time, associated timestamps, and the locations, or combinations thereof. In another embodiment, a temperature sensor is included.

The IC can detect the temperature and can send the data, e.g., temperature to any remote node, such that the remote node can receive data in-vivo. In some examples, an element of the WCC can detect pulses flowing via a pipe, to identify pulses, and this information can identify types of material or changes in material. In another embodiment, a flapping diaphragm to detect temperature, flow, sugar levels, etc. In other embodiments, a WCC can have multiple flapping diaphragms, which calculate, detect and send or communicate data to the IC of the WCC or multiple WCCs. In one embodiment, the diaphragm can be a flexible material, which can be connected to a piezoelectric material, as shown in FIGS. 33A-E. In other embodiments, multiple thin layers of piezoelectric materials may define the structure.

For more information on some of these energy harvesting designs, reference may be made to an article entitled "A Piezoelectric Energy Harvester Based on Pressure Fluctuations" in Kármán Vortex Street, Dung-An Wang, Huy-Tuan Pham, Chia-Wei Chao, Jerry M. Chen, Graduate Institute of Precision Engineering, National Chung Hsing University, Taichung 40227, Taiwan, Department of Mechanical Engineering, National Chung Hsing University, Taichung 40227, Taiwan, ROC.

Figure 34A:
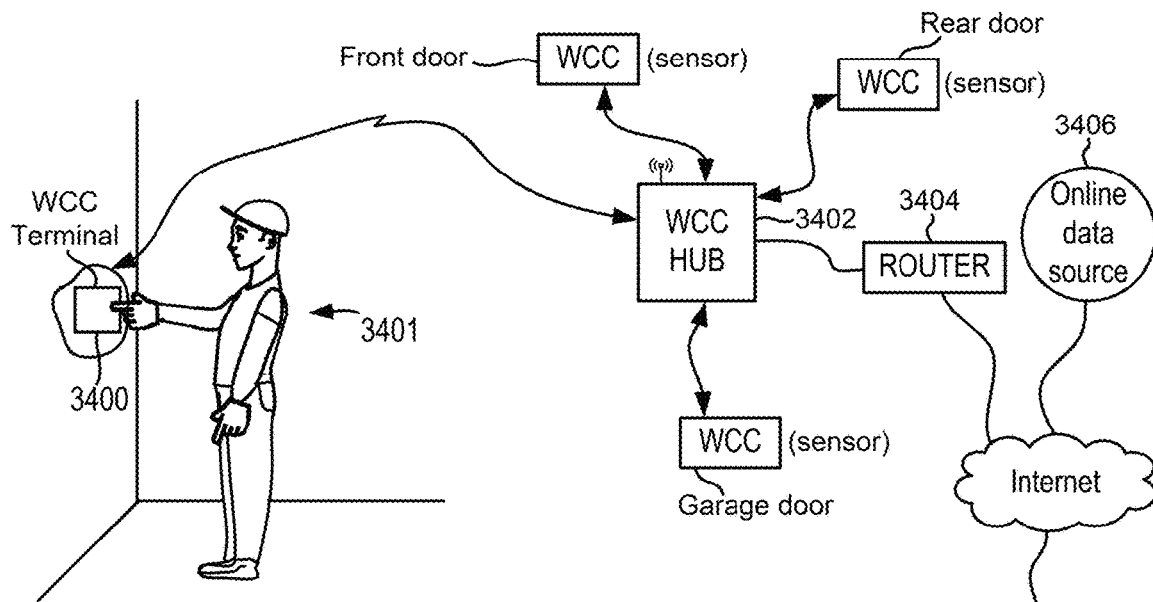
FIG. 34A illustrates an example of a user interfacing with the WCC terminal, in accordance with some embodiments.

FIG. 34A illustrates an example of a user 3401 interfacing with the WCC terminal 3400. In this example, the WCC terminal 3400 is a device that includes a display screen, and can receive input from the user 3401. The input can include, button presses, turns on dials, pumping action, gestures, presses in different regions of the screen, and other interfacing functions. By way of example, once the input is provided to the WCC terminal 3400, the power supply of the WCC terminal 3400 will harvest energy from the mechanical presses or interfaces, and can present information on the display screen. As mentioned above, the display screen can be it bi-stable display, which can hold content on the display from a previous press, or can refresh the display and the data, can remain on the display after the press or interface.

As mentioned above, it by stable display example can be, for example, and e-ink type display screen. E-ink is also referred to as electrophoretic or electronic ink. Sometimes, e-ink displays are referred to as bi-stable displays. This means that the screen will be able to retain the information when all power sources are removed. Thus, the display is only consuming power when something is changing. In some configurations, e-ink is referred to as a reflective display, as no backlight is used. Rather, ambient light from the environment is reflected from the surface to the display back to the user's eyes. Further, by way of example, e-ink displays are commonly made from millions of microcapsules, for each micro capsule contains positively charged white particles and negatively charged black particles suspended in a clear fluid. When a positive or negative electric field is applied, corresponding particles move to the top of the micro capsule when they become visible to the viewer. This makes the surface appear white or black at that spot. Other embodiments may use 3 pigment ink systems, or multiple pigment ink systems to provide color or the resemblance of color.

The optical component of a film used in Electronic Paper Displays (EPD). In one embodiment, the display screen can be similar to those used on Kindle devices produced by Amazon Inc., for other companies. A benefit of having the bi stable display is that data presented on this play can remain presented without requiring additional energy. Continuing with the example, interfacing with the WCC terminal 3400 can cause communication or enable communication with a connected device. As mentioned above, the devices can be those that are previously paired with the WCC terminal 3400. In other embodiments, WCC hubs 3402 can be pre-paired or program to communicate with the WCC hub 3402.

As shown, many types of WCC devices can be communicating with the WCC hub 3402. In some embodiments, the WCC hub 3402 may be coupled to communicate with different WCC devices that are operating as sensors. As mentioned above, some WCC devices can be configured to be powered by incidental movement by objects, and the movement of those objects can cause the generation or harvesting of power, which can be used to communicate information regarding the movement. This information can be reported, for example, to a WCC hub 3402, and that information can be made available to any number of connected devices, such as cell phones, computers, tablets, terminals, or any other computing device.

In the embodiment shown, the WCC hub 3402 may be connected to a router 3404. The router 3402 will therefore have access to the Internet, and can exchange data with online data sources 3406. Data can also be collected from remote WCC devices that may be connected at locations away from the local WCC terminal 3400.

Figure 34B:
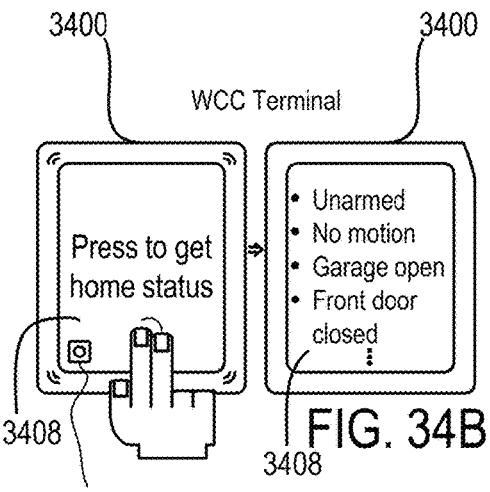
FIG. 34B illustrates one example of WCC terminal, in accordance with one embodiment, in accordance with some embodiments.

FIG. 34B illustrates one example of WCC terminal 3400, in accordance with one embodiment. A display screen 3408 can be provided as part of the WCC terminal 3400. Information can be presented on the display, such as greeting information. The greeting information can include directions on how to activate the WCC terminal 3400. In some embodiments, biometrics can be used to enable customized access to the WCC terminal 3400.

By way of example, biometrics can include fingerprint readers that can identify the user by collecting the fingerprint and verifying the fingerprint as associated with a user profile. In this example, the user is instructed to press on the display screen to get status information regarding his or her home. The entire display screen, in one embodiment, can be pressed down into the housing of the WCC terminal 3400, which can transfer the mechanical pressure onto a power harvesting device disposed in the housing of the WCC terminal, or wall plate disposed in or partially and four on the wall where the device is located. In other embodiments, the WCC terminal 3400 may be a portable device that can be placed at different locations throughout the home, business, or generally the location where a user might be.

Once the screen is pressed, the energy enables communication with an end node, where information can be processed for the WCC terminal 3400. This information can be processed by a server, or other computing device connected to the network or end node. In other embodiments, the WCC terminal can communicate directly with a processing node, to retrieve information for displaying additional data to the display screen 3408. As shown, information regarding the user's home is presented on the screen, after it has been retrieved from the network. This information, as shown, can indicate that the alarm system is unarmed, no motion is present, the garage is open, and the front doors closed. This type of information is only one type of information that can be programmed to be retrieved for the WCC terminal 3400. Virtually any type of information can be retrieved, and customized for the specific application of a WCC terminal 3400.

Figure 34C:
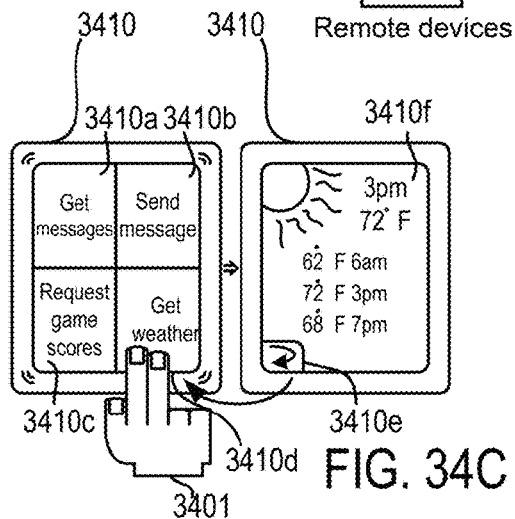
FIG. 34C illustrates a different type of display, which can be pressed at different locations to activate the energy harvesting and also activate retrieval of information associated with the option, in accordance with some embodiments.

FIG. 34C illustrates a different type of display, which can be pressed at different locations to activate the energy harvesting and also activate retrieval of information associated with the option. Different options 3410*a*-3410*e* can be presented on the screen of the WCC terminal 3410. In one embodiment, the pressing of the screen can be configured to rock from a pivot point in the center, so that selecting different quadrants or areas of the screen can be enabled, which can signal the type of information requested by the user.

The user is shown selecting "get weather" 3410*d* and the result is a request to the network, which can retrieve information from a server and remote servers connected to the Internet. This information can then be populated for rendering on the screen of the WCC terminal 3400. As shown, weather information 3410*f* has been shown and displayed, after the selection. Also shown is the option provided back button 3410*e*.

Figure 34D:
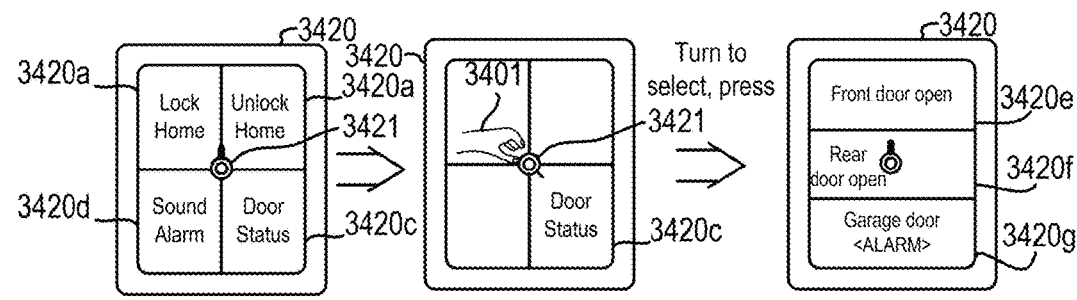
FIG. 34D shows another option of a WCC terminal, which includes a rotating knob, in accordance with some embodiments.

FIG. 34D shows another option of a WCC terminal 3420, which includes a rotating knob 3421. In this example, the user can turn the rotating knob 3421 to the desired selection option 3420*a*-*d*, and then press down on the rotating knob 3421. The mechanical motion of turning the knob as well as the pressing of the knob is used to generate energy that can be harvested, so as to populate data to the screen regions. In this example, the user 3401 has selected door status 3420*c*, which when selected can display information 3420*e*-*g*.

As described above, based on the selections made, and the data retrieved, the display can populate information retrieved, and the user can select to additionally select more information or details. By way of example, the user can press down on the rotating knob 3421 to activate a second request for additional requests. In other embodiments, rotating the knob multiple times can generate power. In other embodiments, the display screen itself can be pressed in.

FIG. 35A illustrates an example of a WCC terminal 3500, with a display screen and an outer shell that can be rotated, while leaving the screen in its present nonmoving position. In this example, the screen is divided up into different locations 3502, 3504, 3506, and 3508. A user can turn the outer shell to activate the screen, e.g., by producing and harvesting power. The screen can be preprogrammed to present different types of information. In this example, the WCC terminal 3500 can have sections associated with different people living in a home. Once the screen is activated, the user can press down on a location of the screen, which can further provide and generate power that is harvested to communicate with the network and a computing device that can return information that is programmed for the user. In some embodiments, the user's fingerprints can be captured on the screen, and that can be used to identify the user instead of selecting a section. In this example, the user has selected dad, 3402.

This selection can then present information that is retrieved for that selection, such as programs options 3512, 3514, 3516, and 3518 shown in FIG. 35B. In other embodiments, more options can be presented, and the options are not limited to four options. This example shows that the user has selected "get messages" 3514, which will then provide additional energy by the press, which pushes down the entire terminal or a portion of the terminal where the user has pressed, or combinations thereof depending on the data displayed on the screen.

In one embodiment, sensors can be disposed below the screen to identify where the user has pressed, and associate the press location to the information being requested for that user. The selection shown, will then present additional data on display 3520, as shown in FIG. 35C. In one embodiment, the display screen can present options 3522, 3524, 3526, and other options in display region 3528. The information presented in these areas can depend on the type of information selected and for the specific user. In some embodiments, the WCC terminal 3500 can also include speakers 3530 and microphones 3540. This provides for the ability of the WCC terminal 3502 play messages, retrieve audio, listen to sounds, listen to voice input, listen to coded communication signals, and process selections.

In one embodiment, the user can turn the knob or casing of the WCC terminal 3500, to select a specific option shown in FIG. 35C. In this example, the user has selected a message from Bob Smith, which is urgent. In indicator can be disposed on the casing of the WCC terminal 3500. In another embodiment, but turning of the casing can highlight different data on the display screen for selection. In one embodiment, once that data is selected, the user can press on the casing or on the display screen or both to provide additional mechanical energy for energy harvesting. In one embodiment, the turning of the casing and presses of the casing for the screen or both can provide the mechanical energy necessary to harvest energy, and provide the communication with the end node that can provide the information for the user.

FIG. 36A as an example of the WCC device 3600, which can be used to order goods or services. As shown, the WCC device 3600 can be used to order typical household items, such as Tide laundry detergent. A button 3602, can be provided on the WCC device 3600. When the user presses the button, the button press can communicate with the end node 3606, which can provide information regarding the order placed by the user. In one embodiment, in addition to providing information out to a node, for ordering an item, the communication link can be bidirectional, to retrieve information that can be displayed on message display 3604.

For example, in addition to pressing the button 3602 the order the product, the user can receive confirmation regarding the order being placed by the online provider. End node 3606, in one embodiment, can be in communication with a device that provides Internet access, and thus access to an online service or product provider. The product can then be shipped by the provider to the user's home or location, which can be programmed to the WCC device 3600. The programming of the device can be, for example, facilitated through a computer. The computer can be a smart phone, the tablet, a personal computer, or any other device that can communicate to the Internet. The WCC device 3600 can then be paired for communication so that activation can order the product or service. The processing provided by the WCC device 3600, is such that information can be displayed on the display, so that the user can get confirmation of an order or information regarding past orders, or information regarding the last ordered products, or can provide feedback to the service provider or products provider.

The data retrieved can be for example, different types of information Re: a purchase that's made, historical information regarding a purchase, information that can be predicted regarding purchases or past purchases, recommendations regarding purchases, confirmations regarding cost spent, information regarding shipping information, information regarding account information, information regarding social connections that are also purchasing goods and services, rewards information, coupons, information regarding bonus points earned, loyalty points, and other information regarding services or goods that are purchased using the WCC device 3600. As mentioned above, the good or service associated with WCC device 3600 can vary, and the messages and information presented on the message display 3604 can change depending on the context of the good or service and or the context of the user or friends of the user.

FIG. 36B illustrates an example of various types of messages and or responses that can be displayed or presented to the user in the message displayed 3604. The list of examples should not be viewed as an exhaustive list, but simply as an example. As shown, one message can be a purchase confirmed message 3604a, a delivery estimate message 3604b, a message indicating a number of items purchased for a period of time 3604c, a message requesting the user to take a survey 3604d, a message indicating to the user that based on historical use of the product that the user will run out soon 3604e, a message asking the user if they want to switch to a different product type 3604f, a message indicating that one box was ordered and the amount charged 3604g, a message indicating an option to post information to a social network regarding the product 3604h, a message asking the user if they wish to purchase a box for a relative or friend 3604i, etc.

In the example of taking a survey, the user can interact with the survey in operations 3610a-3610d, by providing input via the button 3602. As noted, pressing the button one time, two times, three times, multiple times, can be used to provide power generated by energy harvesting by the WCC device 3600, and can also provide for communicating with the end node 3606 for retrieving information use for rendering information on the message display 3604.

Figure 37A:
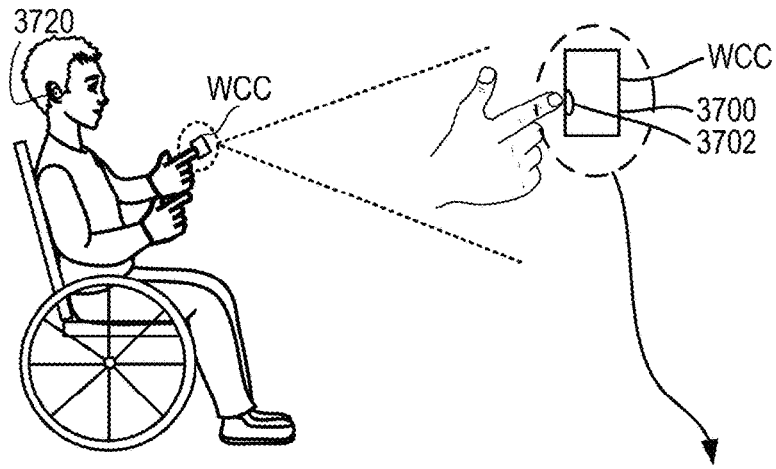
FIGS. 37A-37C illustrate examples of a WCC device which can be configured for use by persons with disabilities, in accordance with some embodiments.

FIG. 37A illustrates an example of a WCC device 3700 which can be configured for use by persons with disabilities. These uses can be, for example, by implementing WCC devices 3700 directly onto equipment used by such persons, such as the illustrated wheelchair. Other uses can include uses by those with illnesses or injuries. Hospital rooms and/or beds, hospital bathrooms, intensive care units, ambulances, etc., can also find uses for such devices. In one some embodiments, a WCC device 3700 can be configured to interface with a hearing aid 3720. The person needing assistance may, for example, press a button to ask for help, and a response by a nurse can speak directly to the person by sending audio, a message ID, a message, or coded sounds to the person's hearing aid.

Figure 37B:
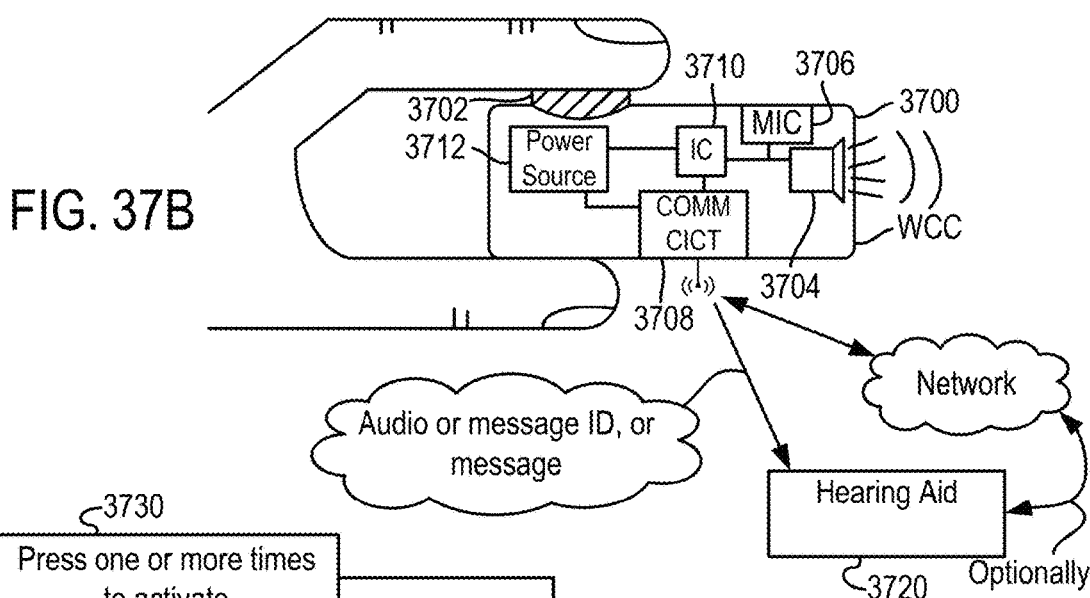

The user, to respond, can press the button and send a reply. The WCC device 3700 is therefore able to function as a communication device, which is pre-programmed to communicate with specific people, e.g., care personnel or the like. A benefit of a WCC device 3700 is that it can communicate with an end node without requiring a battery, which be depleted, leaving the person without help. In one configuration, the mechanical press by the user's finger is used to generate power that is harvested for use as a power source 3712, as shown in FIG. 37B. In other embodiments, other power sources may be used, not limited to mechanically harvested power.

The WCC device 3700 is shown to include an integrated circuit (IC) 3710 that is programmed with the instructions for enabling communication and exchange of data. The programming can also include, for example, the pairing data for enabling the WCC device 3700 to communicate with a specific end node, which can relay or process data for generating a response. A microphone 3706 and a speaker 3704 may also be provided, which is interfaced with the IC 3710. A communication circuit 3708 is provided, in one embodiment, to enable wireless communication with a network, for accessing a device/end node that can process information and return information for display or audio response to the user.

In an alternative embodiment, the WCC device 3700 may be configured with RF harvesting logic and circuits, instead of a mechanical energy harvester. The RF harvesting logic and circuits can, for example, harvest RF energy from one or more local devices to provided power for the power source 3712. Example RF harvesting logic and circuitry may be found in a paper entitled Wi-Fi RF Energy Harvesting for Battery-Free Wearable Radio Platforms, by Vamsi Talla et al., 2015, and a paper entitled Powering the Next Billion Devices with Wi-Fi, by Vamsi Tella, et al., 2015, which are herein incorporated by reference. Other implementations of the communications circuit 3708 is to implement Wi-Fi Backscatter, which uses RF signals as power sources and reuses existing Wi-Fi infrastructure to provide internet connectivity to battery-less devices.

An example of Wi-Fi backscatter is described in a paper entitled Ambient Backscatter: Wireless Communication Out of Thin Air, by Vincent Liu, et al., 2013, which is herein incorporated by reference. It should therefore be understood that embodiments and implementations described herein that use mechanical input to harvest power, e.g., power pumps, may be replaced with devices that use batteries, are hard wired to power, or receive power of the air using any number of RF harvesting configurations.

Figure 37C:
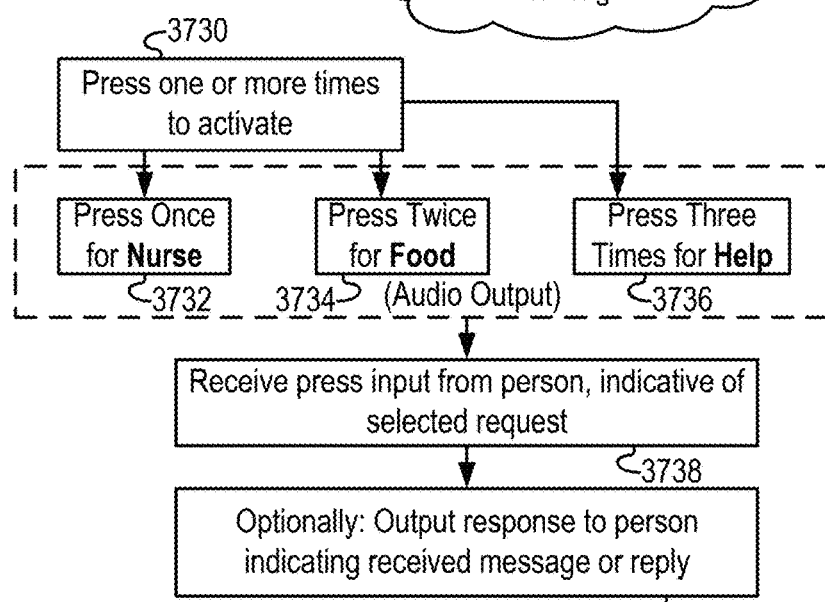

FIG. 37C illustrates an example implementation of a WCC device 3700 that can be programmed to send requests, receive data and/or process communication data based on a number of presses provided. In this example, the WCC device 3700 is one that is simply has one button, but other devices can have other interfaces, such as spinning dials, levers, plungers, display screens, finger print readers, etc. With this understanding, the one button configuration is able to be activated, e.g., from a sleep mode, by pressing the button one or more times in operation 3730.

After activation, the WCC device 3700 can provide a message via a screen or a speaker, providing options. In the example of a person who might be in a hospital or care home, the options can be, e.g., press once to call for a nurse 3732, press twice to request food 3734, press three times to get help 3736. If the WCC device 3700 provides audio output for interfacing with the user, the audio may also be communicated to the user's hearing aid 3720, as noted above.

In another embodiment, if the user watching TV, the TV can be an end node that can display text/audio or information to the user in response to the button press(s). The response can be provided, for example, via the speaker of the TV that the user is watching. The TV may mute, for example, and the nurse can provide audio communication to the user. If there are other audio producing devices in the room, e.g., connected speakers for music, those devices can be used to provide the response to a user implementing a WCC. In one embodiment, the user, by pressing the device may provide audio response, captured by the microphone 3706, which are transferred to the nurse over the network.

In this example, a computing device of the nurse can receive the input 3738 from the user, in response to the button press(s). The WCC device 3700 may optionally provide positive feedback to the user, to let the user know that his or her request was received in operation 3740. For instance, if the user needs help, and presses three times, the nurse can send an audio reply "on my way" or the like.

Figures 38A, 38B:
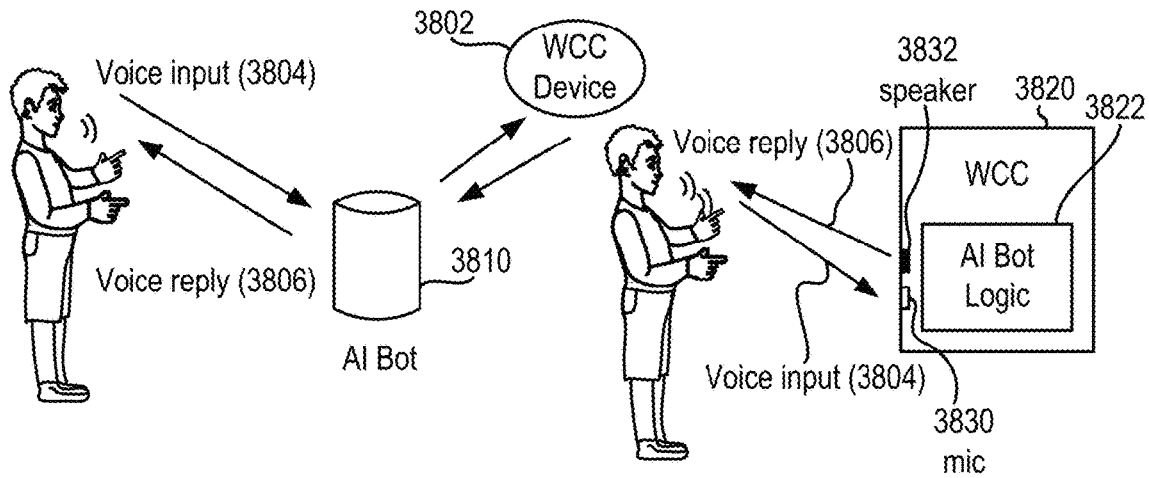
FIGS. 38A-38B illustrate examples of a user interfacing with an artificial intelligence (AI) bot, in accordance with some embodiments.

FIG. 38A illustrates an example of a user interfacing with an artificial intelligence (AI) bot 3810. Reference to Echo, an Amazon Inc. product, is only be way of example to the functionality usable for interacting with WCC devices 3802. In some embodiments, the AI bot functionality could be integrated into a WCC device or a plurality of connected WCC devices. In this example, the user sends a voice input 3804 to AI bot 3810, and WCC device 3802 may reply with information (e.g., sensed data, data collected, state data, data from other WCC devices, data collected from the Internet, etc.). AI bot 3810 can then provide a voice reply 3806 to the user. The data returned by the AI bot 3810 may be simply the data collected from the WCC device(s), or can be augmented with other data collected from the Internet and processed.

FIG. 38B illustrates an example of a user interfacing with a WCC device 3820, which is processing AI bot logic 3822. In one configuration, the AI bot logic 3822 may be an interface for communicating with a computer connected to the network that can process AI bot instructions with more processing power. The computer can then reply back to the AI bot logic 3822, with a response for presentation to the user, e.g., via a voice reply.

In another embodiment, the WCC device 3822 is a more powerful device, which can itself process the AI bot instructions, and generate replies to the user responsive to the queries. The WCC device 3820 in one embodiment may include one or more microphones 3830 and one or more speakers 3832.

Figure 39:
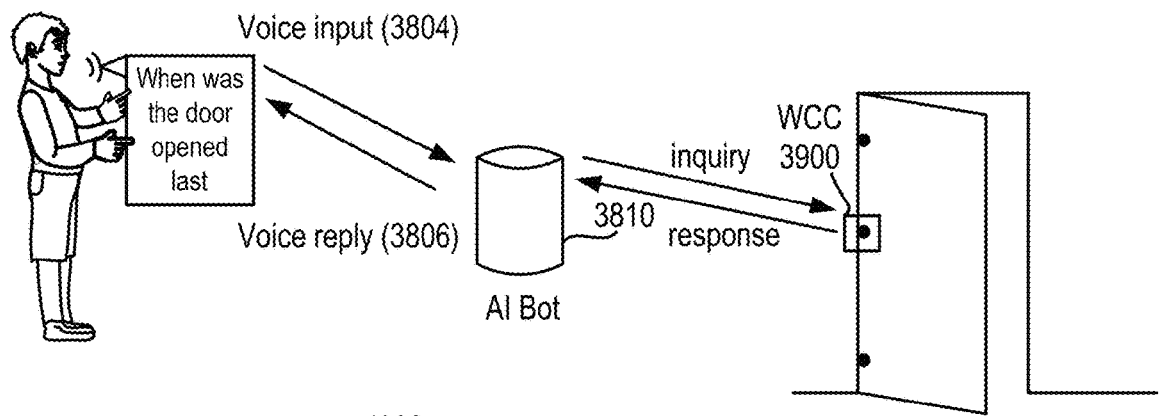
FIG. 39 illustrates an example of a user providing a query to the AI bot, in accordance with some embodiments.

FIG. 39 illustrates an example of a user providing a query to the AI bot 3810. The query is, for example, "when was the door opened last"? As shown, voice input 3804 is provided to the AI bot 3810, and voice reply 3806 can be provided back to the user. The AI bot 3810 can process information by pulling WCC device 3900, to obtain information that was detected based on opening and closing motions of the door. As mentioned above, the door can include a WCC device 3900, which can be powered by mechanical motion of the door itself, thus defining incidental power generation that is harvested and used by the communication circuitry of the WCC device 3900. As mentioned above, the WCC device 3900 may also or alternatively include a battery or other power source, such as RF harvested power. Passive Wi-Fi, RF back scattering, inductive transmission, and other types of power transfers can also be used to power the WCC device 3900.

The AI bot 3810 can therefore report back information that it received in response to a query made to the WCC device 3900. In other embodiments, another WCC device can be used as a proxy for communication with the AI bot 3810. In other embodiments, a network attached hub can be used for communication with WCC device 3900, which can capture motion data associated with the door or other object that is being sensed or can be sensed for activity or data generation. The AI bot 3810, and therefore interrogate the hub, instead of directly communicating with the WCC device 3900. The report back regarding the motion, can include data regarding a number of previous motions or movements of the door 3900. In one embodiment, the data reported that can be filtered based on the type of request being sent. In this case, the filtering has occurred, since the request by the user was to identify when the door was last opened.

Given the context of the question, the AI bot 3810 can filter out other information regarding the door having the WCC device 3900. For instance, the response will not include information of when the door was last closed, or when the door was open most during particular times of day, or when the door was closed hard, or when the door was closed softly, or the rate at which the door was opened or closed, or other data that can be sensed. In some embodiments, the door can also be associated with other WCC devices that can sense other information. For instance, other information can include data collected by motion sensors proximate to the door, image sensors proximate to the door, sound collection devices proximate to the door, etc. These other WCC devices can also be queried by the AI bot 3810, to provide more specific information regarding the door when requests are made to the AI bot 3810.

In one embodiment, learning algorithms can be processed by the AI bot 3810, to identify frequently asked questions, questions that are related to specific objects, pre-identify information to filter, optimize response statements, optimize data sources to check on the Internet for supplying information, learning which WCC devices should be queried in response to a request, optimizing and ranking WCC devices that hold more relevant information to particular questions or requests, comparing types of questions asked by other users for similar types of questions, learning by big data mining of requests and responses made to WCC devices by remote connected users, examining the community database, finding similarities in types of requests and responses for WCC devices, promoting certain WCC devices over other WCC devices in view of the contextual questions, and other processing metrics. These types of analysis can be performed in order to provide more accurate and specific information to the types of requests made by users for WCC devices or IOT devices, which may be present in specific areas or which may hold information that is sensed, gathered, stored, or produced by WCC devices or IOT devices from time to time.

In some implementations, the learning and predicting embodiments may utilize learning and prediction algorithms that are used in machine learning. In one embodiment, certain algorithms may look to patterns of input, inputs to certain user interfaces, inputs that can be identified to biometric patterns, inputs for neural network processing, inputs for machine learning (e.g., identifying relationships between inputs, and filtering based on geo-location and/or state, in real-time), logic for identifying or recommending a result or a next input, a next screen, a suggested input, suggested data that would be relevant for a particular time, geo-location, state of a WCC device, and/or combinations thereof. In one embodiment, use of machine learning enables the AI bots and/or WCC device processing systems to learn what is needed by the user, at a particular time, in view of one or more operating/status state of the WCC devices or IOT device, in view of one or more state of one or more sensors and historical data from databases (local or connected over the Internet).

Thus, one or more inputs or data presented to the user may be provided without an explicit input, request or programming by a user at that time. In one embodiment, reference is made to learning and prediction, wherein both terms may be referencing the same or similar function, e.g., looking at user interactions, preferences, tendencies, etc., in order to identify or select a particular type of data that may be useful for the user based on the learning or prediction. In other embodiments, learning may be defined closer to the traditional sense of machine learning, pattern learning, historical data input analysis, etc., while prediction is may be defined closer to the traditional sense of identifying some data, which is predicted to be relevant based on analysis of the context in which the data is predicted. In still other embodiments, prediction and learning may be hybrids, used in conjunction for providing contextually relevant supplemental content to a user account, a user device, or some target associated with a user account or profile.

Overtime, machine learning can be used to reinforce learned behavior, which can provide weighting to certain inputs. This data, combined with other data, may be used to recommend data regarding information that can be obtained in particular locations. It should be understood that these are just simplified examples to convey examples of recommendations which may be based on some learning, preferences or pattern analysis, or likelihoods.

Thus, context awareness across multiple dimensions will allow for more accurate predictions, learning (e.g., by building and refining behavior models), and surfacing/suggesting recommendations of supplemental content or settings, when it is most probable or likely or useful, or needed by the user, or relevant at a current or proximate or near or destination geo-location.

For purposes of providing example ways of processing learning algorithms, machine learning methods, predictions, data analysis, and the like, without limitations to any specifically claimed embodiment, reference may be made to a book entitled "Introduction to Machine Learning", Second Edition, by Ethem Alpaydin, The MIT Press (ISBN 978-0-262-01243-0), Cambridge, Mass., London England (2010), which is herein incorporated by reference for all purposes.

Figure 40:
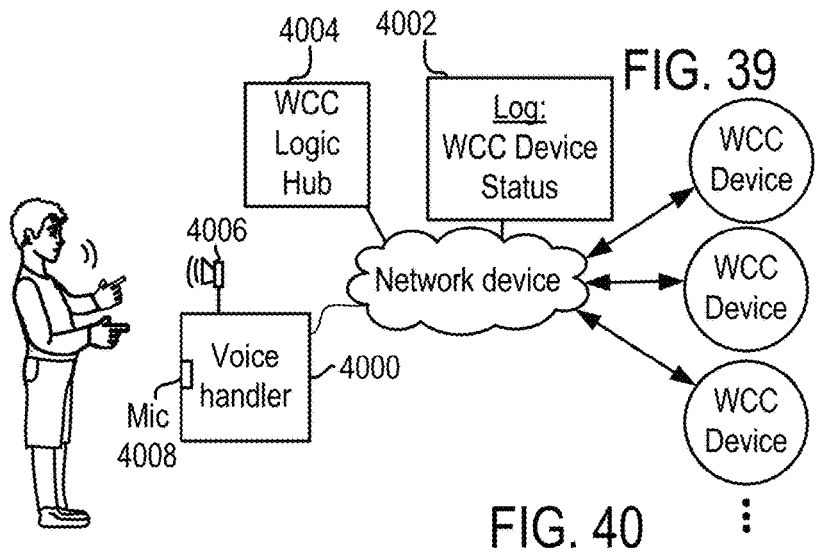
FIG. 40 illustrates another configuration of interface by a user with a voice handler, which can be connected to a network device, in accordance with some embodiments.

FIG. 40 illustrates another configuration of interface by a user with a voice handler 4000, which can be connected to a network device. The network device can be any type of device that provides connectivity to devices whether wired or wireless. The network device can be for example, a router, a switch, a modem, and other computer, a server, a wireless communication device, a transmitter, a repeater, another IOT device, another WCC device, etc.

The voice handler 4000, may be the WCC device, which is programmed the process logical operations for responding to requests for information from the user. The user may communicate with a microphone 4008 and a speaker 4006, which may be integrated or coupled to the voice handler 4000. The voice handler 4000, in one embodiment, can be processing AI bot logic, and can communicate with the network device for obtaining information from WCC devices. The WCC devices, in one embodiment, may be local devices that are sensing information. In another embodiment, the WCC devices may be remote devices that are connected to the network device over the Internet. For example, some WCC devices may be co-located with the user, such as in the same home.

Other WCC devices may be remote, such as at the person's office, vacation home, another country, or simply another place that is connectable over the Internet. In this embodiment, the voice handler 4000, can provide information regarding status from the WCC devices. In some embodiments, a WCC logic hub 4004 may be connected to the network. The WCC logic hub 4004 can be configured to communicate with WCC devices either periodically, or when data is requested. In some embodiments, the data gathered by the WCC logic hub 4004 can be stored to another WCC device, which can function as a storage device that can log information regarding the status collected from other WCC devices. The log 4004 can also be stored to a storage device that is connected to the network. The storage device can be a local storage device or can be a remote storage device, e.g. cloud storage. In this manner, the voice handler 4000 can request information regarding the WCC devices and information can be provided back to the user in either a direct manner, where the WCC devices are interrogated at the point of the request, or indirect where the WCC logic hub 4004 is interrogated for status information that was previously collected and stored to a log or storage.

Broadly speaking, the WCC logic hub 4004 can be a networked device, which connects directly to a local network. The WCC logic hub 4004, in one embodiment, can be connected to a power outlet and can function to communicate with the WCC devices that may be connectable within the network. In other embodiments, the WCC hub 4004 can communicate over the Internet and collect information from other WCC logic hubs 4004, which in turn collect information from other WCC devices. As used herein, it should be understood that WCC devices can also be referred to as IOT devices.

Figure 41A:
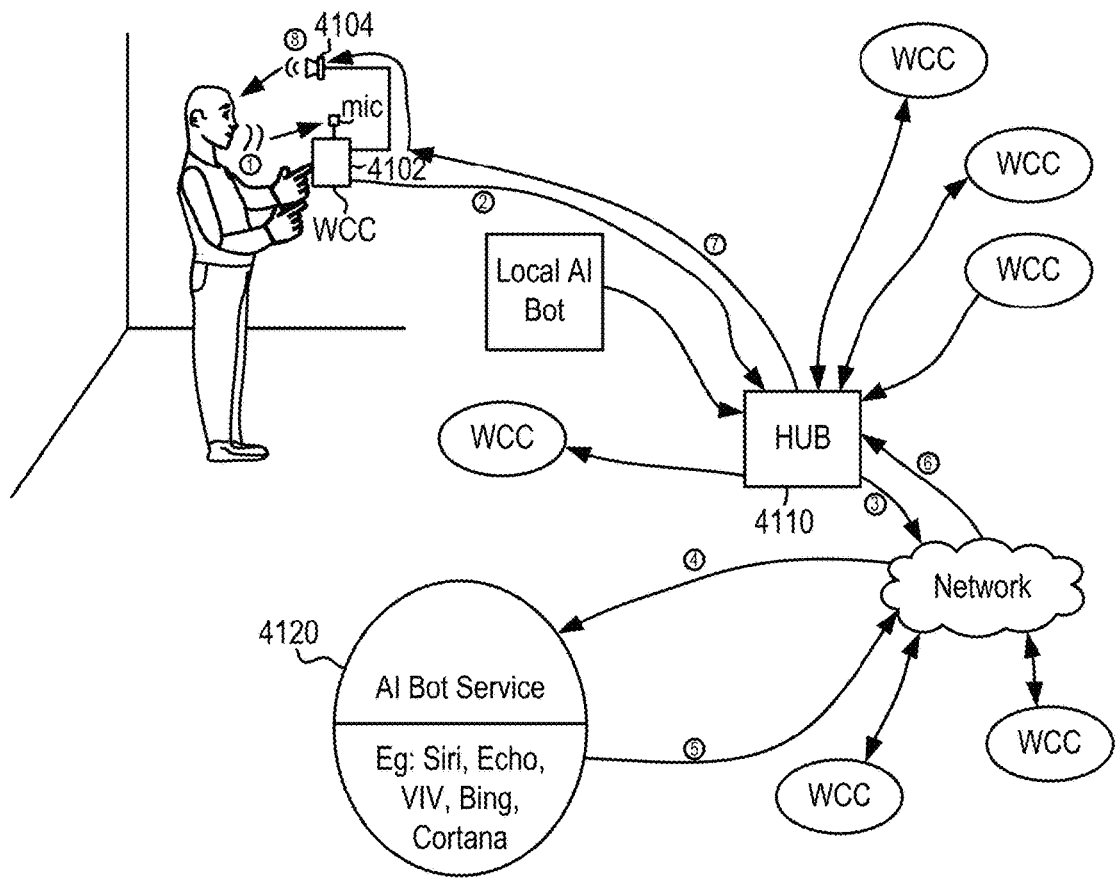
FIG. 41A illustrates an example of a user interfacing with a WCC, which can function as a terminal for communicating with the hub, which in turn communicates with WCC devices over a network, in one embodiment.

FIG. 41A illustrates an example of a user interfacing with a WCC 4102, which can function as a terminal for communicating with the hub 4110, which in turn communicates with WCC devices over a network, in one embodiment. For example, the user can simply approach a WCC terminal 4102, which can collect information requested via a microphone 4106. The request can be sent to a hub 4110, which can then interrogate WCC devices or access a log of information that has previously been collected and saved from communication with WCC devices. The hub 4110 can therefore provide information back to the WCC device 4102. The information can then be communicated via a speaker 4104.

In one embodiment, the microphone 4106 and the speaker 4104 can be integrated into another WCC device, or can be part of another device. For instance, the microphone and speaker can be part of a user smart phone, or can be part of a user's smart glasses, or can be part of a user's hearing aid, or can be part of the users WCC device that is wearable. As shown, a local AI bot can also be executed to provide responses made to the hub 4110. As mentioned above, the local AI bot can query the hub or WCC devices in order to collect information, synthesize information, filter the information, and produce an intelligible response back to the WCC device 4102.

In other embodiments, an AI bot service 4120 can also be accessed over a network, to provide more information from other sources distributed throughout the Internet. The AI bot services, for example, may be provided by commercial entities, that process request using machine learning and or deep learning algorithms.

By way of example, a process flow for making the request and receiving data back from WCC devices that are either local or remote can include the numbered steps 1 through 8. These example steps are only provided for purposes of understanding one process flow, and should not limit the many additional or alternate process flows possible for requested information associated with WCC devices.

Figure 41B:
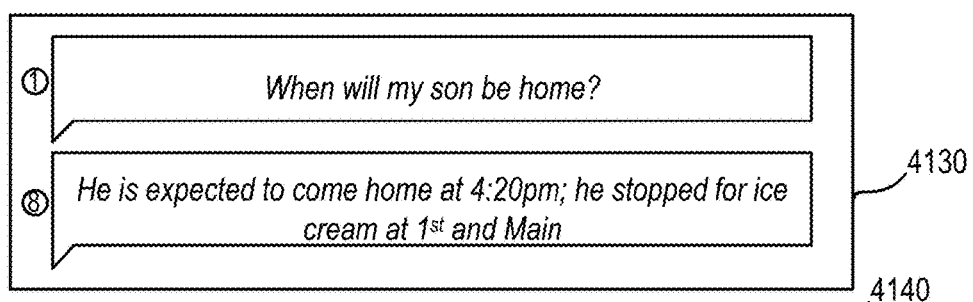
FIGS. 41B and 41C illustrate examples of queries made to the WCC device at step 1, and the responses received by the user from the WCC device at step 8, in accordance with some embodiments.
Figure 41C:
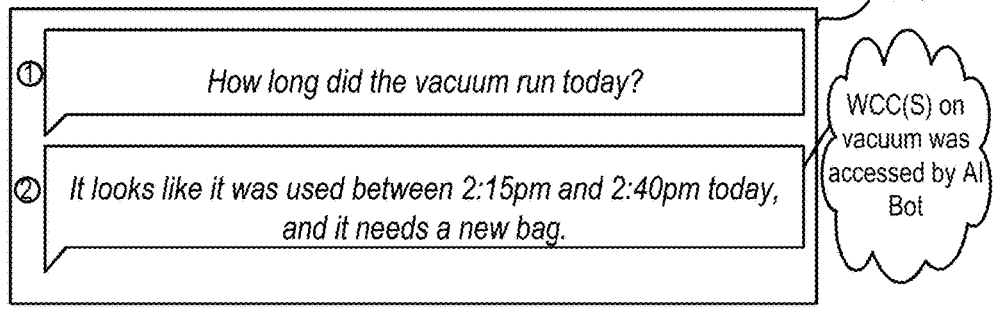

FIGS. 41B and 41C illustrate examples of queries made to the WCC device 4102 at step 1, and the responses received by the user from the WCC device 4102 at step 8.

For example, the user can request information such as "when will my son be home?", in step 1, and the response may be "he is expected home at 4:20 PM; he stopped for ice cream at First and Main." In other query can be, "how long did the vacuum run today?", in step 1, and the response may be "it looks like it was use between 2:15 PM and 2:40 PM today, and it needs a new bag." These examples are only provided to show that information can be collected from sensors associated with WCC devices, and the information can be collected from more than one WCC device in order to provide coherent information that relates to the question and the context.

The WCC can provide the consumer and industrial benefits to tracking, inferring and reporting activity associated with AC devices when directly coupled to the AC power cord.

FIG. 42A shows an appliance or object requiring power may be coupled to WCC device through the power cord that is connected to the object requiring power. The WCC may detect if the plug is connected to the AC outlet. It can detect current flow. It can use fingerprinting techniques as described to detect the appliance coupled to the outlet. It can use fingerprinting techniques, as described, to detect the status of the appliance coupled the outlet. When equipped with a temperature sensor, the WCC may also detect and report the temperature of the power cord.

the future, the AC-power cord WCC may perform signal analysis in connection with the jitter or ripple on the AC line to infer the state of the device. Such signal analysis may be performed on the WCC but preferably, given the computational load and energy requirements, it is preferred that the WCC transmit the data characterizing the ripple signal modulation on the AC line to a management layer or other service capable of performing the signal analysis to determine the identity and status of the device coupled to the cord.

The WCC may continuously wirelessly stream such ripple signal modulation to an end node or, it take an appropriate length of samples at some interval and duty cycle to enable the fidelity of detection necessary for the type of device. Whether to continuously stream or sample, depends on the application, but it may be dynamically set for a condition or device type. For example, if a condition occurs when sampling in non-continuous mode the WCC may be set to operate in continuous mode to further investigate or monitor the device. In a factory, continuous stream would likely be used as the WCC can track the power consumption change over time with enough data (from either the power consumed or the ripple modulation on the AC line or both) to infer the speed of conveyor belt, the amount of pressure in that a pump is exposed to, a point in time when a current spike occurs etc.

TABLE 1

AC Power Cord WCC

| WCC | Detected Status | Detected Appliance | AC Outlet Coupling | Cord Temp | AMPS |
|---|---|---|---|---|---|
| #1 | Fully Charged | Samsung Quick Charger | Plugged In | 69 F. | 1.5 A |
| #2 | N/A | N/A | Not Plugged in | 68 F. | 0 W |
| #3 | Compressor Running | GE Mx23 30 Cu. Ft. | Plugged In | 71 F. | 5 A |
| #4 | On Standby | LG Microwave | Plugged In | 68 F. | .5 A |
| #5 | Cutting | Craftsman Circular Saw | Plugged In | 78 F. | 5 A |
| #6 | Vacuuming | Dyson DC65 | Plugged In | 69 F. | 6 A |
| #7 | Idle | Garage Door Opener | Plugged In | 75 F. | .4 A |
| #8 | N/A | N/A | Plugged In/ Circuit Tripped | 68 F. | 0 W |
| #9 | Pushing Air | Hospital Breather | Plugged In | 68 F. | 2 A |
| #10 | 2.4 second pause | Hospital Breather | Plugged In | 68 F. | 2 A |
| #11 | Conveyer @ 4 MPH | Industrial Conveyor Belt | Plugged In | 85 F. | 15 A |
| #12 | Fault! | (unknown) GzFreezer | Plugged In | 150 F. | 20 A |

The AC cord WCC tracks state data and wirelessly transmits the data to the network, end node, hub etc. Therefore, the state data of AC powered objects can be integrated into a management system capable of providing useful tabulation of activity of such uses of the devices, notification on events and upon reaching thresholds based on the tabulated activity, and the like. The management system may keep track, using WCC-based cords or WCC-based outlets, the total accumulated instantaneous load on any particular circuit, to flag conditions that may lead to a circuit break trip event, before it happens. Cord temperature may be used as a safety monitor or proxy for AMPS flowing through the cord when normalizing the value against ambient temperature, or current can be directly measured, and such may be monitored and triggered alerts, even such actions as closing of a circuit (i.e. using a WCC device with a relay to open or close AC power flow). The management system may form part of, or manage a DLC cluster and enable tracking and control of a plurality of ad-hoc IOT devices.

Using the fingerprinting techniques that are described herein or other similar techniques that may be developed in Such may be combined with ITTT rules to integrate with other systems and process control. For example, to keep an assembly line or other process synchronized or managed. Other uses would include a notification or trigger to flag a replaceable item in the field, such as saw blade or pump, by tracking the hours such has been in use vs the manufacturer's life expectancy of the device, to ensure that the device is changed before it causes a device failure or causes a workplace or home or human environmental danger.

FIG. 42B shows an embodiment where the WCC device can be attached and removed from the power cord. The cord may be of a legacy type or one specifically made to accommodate a snap-in WCC. In the latter case, the cord may contain appropriate current sensor coil(s) that provides adequate coupling for energy harvesting via induction and sensing current flow.

FIGS. 42C and 42D show how a WCC sensor can also be built into a power cord or connected to a power cord or attached to a power cord. The WCC sensor can be equipped inline into a female to male plug adapter. In any of the embodiments herein referring to AC power, the WCC may also be equipped with AC power flow control relay where a management layer may transmit to the WCC a control signal that sets the state of the relay. This will determine whether or not electricity is allowed to flow through the power cord. ITTT rules in a management layer may be used to enable and disable, for example, tools in a workplace, according to the collective state of the tracked tools and environment, to optimize for safety, or speed, quality, or any optimization for that matter.

In a removable WCC AC cord embodiment, the WCC may be housed in a notched sleeve to allow the WCC to be easily removed and when reattached, allow the power cord to pass through the sleeve, providing appropriate coupling to enable operation of the WCC. To avoid magnetic fields from the two AC wires cancelling each other out, the WCC current sensor portion may be sleeved around one wire.

In operation, a magnetic field is induced in the power cord due to current flow, and the lines of flux appear as circles with the axis of the circles parallel to the cord wire. Therefore, in order to harvest energy and characterize the flow of AC through the cord, a coil may be used, where a voltage is induced in the coil due to magnetic coupling. To measure current flow using induction in one embodiment one of the AC hot wire will pass through a core having another winding into which a voltage proportional to current will appear to the WCC. The voltage will be proportional to the number of turns on the core and the resistance of the load connected to the winding.

The AC-cord WCC may use a power source of harvested energy using techniques described herein but also those based on principals known, where a circuit is powered through an induced voltage. However, in one embodiment, the WCC harvests RF energy to provide energy to operate itself. In several cases, the WCC will be coupled to an AC power cord and operate using Passive Wi-Fi.

In another construct, the WCC operates using a combination of Passive Wi-Fi and additional energy harvesting through AC inductive or capacitive coupling from the power cord itself. In another construct, the WCC communicates using Passive Wi-Fi and senses current flow using inductive coupling from the power cord itself. In another construct, the WCC transmits a characterization of the coupled signal from the power cord itself to infer state of the cord and device(s) associated therewith.

Figure 42E:
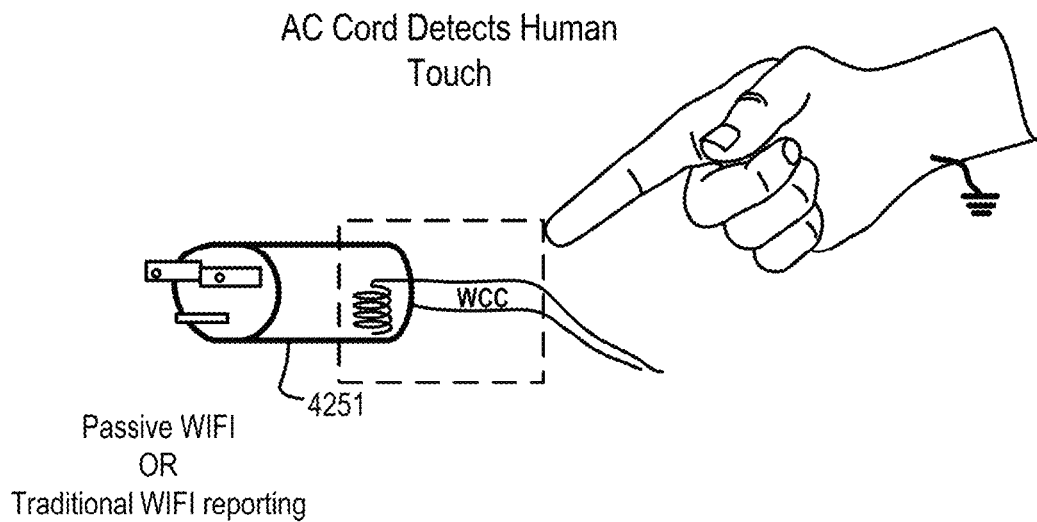
Figure 42F:
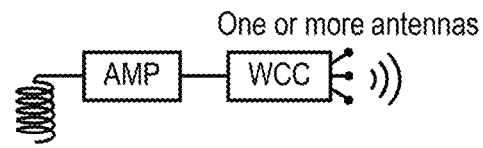

FIGS. 42E-42F shows an embodiment where capacitive coupling is used, where a sense coil 4251 is coupled to or brought near AC lines to induce a voltage drop in the coil probe, and the human body is used as the mains earth by electrical coupling of touch to one end of coil. Thus, a voltage drop across the coil may be amplified using a high gain FET/FET op-amp to create a DC voltage which may be used to trigger a WCC payload indicating that a human is contact with the cord.

In some embodiments, capacitive coupling is used, where a sense coil having an earth ground is coupled to or brought near AC lines to induce a voltage drop in the coil probe, a voltage drop across the coil is amplified using a high gain FET/FET op-amp to create a voltage which may be used to indicate the absence or presence of AC in the cord. Any sensor data from any WCC, including ones described above or below, may be coupled through an A/D converter analog measurements can be transmitted using digital communications.

In another construct, using (a) harvested RF, (b) magnetic inductive power source or a combination of (a) and (b), a hall-effect sensor, an amplifier and an A/D converter can be used to detect the current flowing through the cord, convert it to digital and wirelessly transmit the detected current to an end node. In one embodiment of this construct, Passive Wi-Fi using backscattering technique is used to deliver the wireless payload to an end node.

A temperature sensor 4211 may be coupled to the WCC to enable the WCC to report the temperature of the power cord in the transmission payload communicated from the WCC. A WCC may add to its data payload the characterization of jitter signal or fingerprint that is modulated on top of the detected AC signal and as previously described, such fingerprint may be analyzed in connection with the type of device coupled to the power cord, to determine the state of the device.

The present inventors believe that the tracking of fingerprint data from AC devices can be used in connection with a deep learning cloud services and further that a machine learning cloud service will evolve to raise the fidelity and number of Detected Status states that a management system coupled to a receiving end node will be capable of tracking and providing utility therefor. In several embodiments herein, Google, Amazon, Samsung, Apple platforms are expected to participate in the ecosystems of the present disclosure.

Figure 42G:
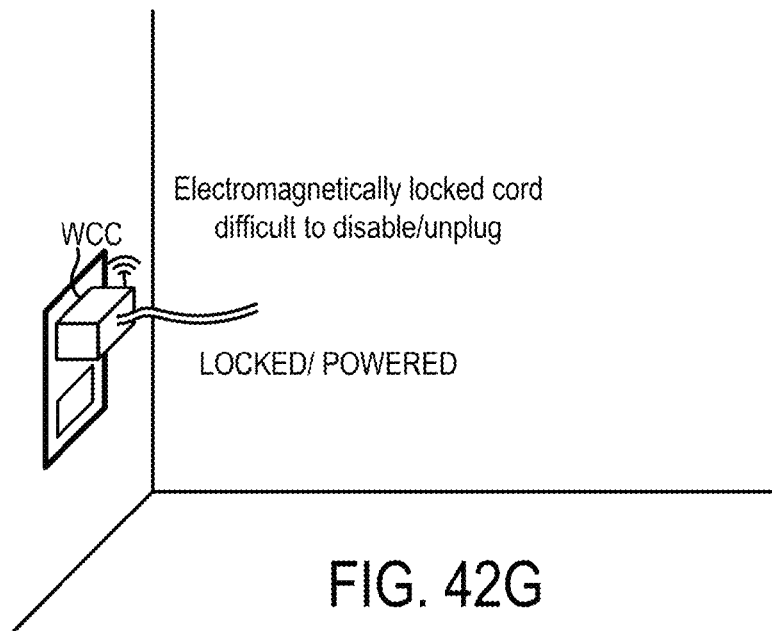

FIG. 42G shows another use of the WCC which is configured to support an AC plug and outlet pair having control for wireless WCC electromagnetically actuated lock to ensure that the plug stays in the socket. The WCC may receive wireless commands to lock and unlock the outlet. Any connector or wiring harness may be used with a similar locking structure, not only AC based plugs. And in addition to controlling flow of current to the actuation coils to lock and unlock the plug to the outlet, the state of the lock structure may also be detected and reported by the WCC.

The terms "wireless chip" and "logic chip" may be the same device or circuit. In some cases, a reference to a wireless chip may include such chips that have logic capability. The present disclosure provides for a mechanism to expand the range of Passive WIFI or any backscatter reflection scheme by managing a mesh of field emissions from more than one "always plugged in" tone generators. In one embodiment, the field emission sources are network connected using another radio channel In another embodiment, the field emission from the multiple tone generators are controlled via Power-line communication over AC wires. Other ways to sync are possible, including direct Ethernet connections, etc.

In one embodiment, having two or more emission sources, the benefits of having expanded range of operation is evident, however it is beneficial to coordinate the emission sources to ensure that commands that are issued to WCCs do not incur cross talk since, in some embodiments, at border situations where the emission sources mix, cross talk could result in communication error in the reception of commands from the tone generator emission source, the "always plugged in" device (which should not be taken literally as requiring to always be plugged in but rather it must have a robust power supply to support the broadcast emission source over time).

It is beneficial to either completely avoid overlapping signals across zones when using multiple emission sources in Passive WIFI, or to take best efforts to synchronize the emission fields and pad the encoding of commands to ensure for real world signal propagation conditions that present themselves. In one embodiment, when using multiple field emission sources, one scheme will ensure that each command is propagated so that it does not overlap with any other command in any adjacent source emission zone. Adjacent zones are zones that have the potential to overlap each other, causing signal error. In one embodiment, when using multiple field emission sources, one scheme will ensure that each command is propagated so that it does not overlap with any other command in any emission zone regardless of whether it is adjacent or not.

In another embodiment, the emission sources are synchronized so commands are issued across all zones in synchronicity. Therefore, commands sent to WCCs do overlap between zones, so a scheme for encoding commands should accommodate for one or more of the group consisting of slight timing variations, room reflections, and synchronization drift, to ensure that WCC devices that straddle a border between zones can still decode a transmission even if one of the zones is subject to signal anomalies. The spacing of bits in the protocol must be wide enough to accommodate for this issue.

In another embodiment, the field emission sources are coordinated so commands do not overlap but based on quality of service measurements of network performance, the scheme may change to a synchronized emission source scheme, as previously described. Similarly, in another embodiment, the field emission sources overlap and are synchronized but based on quality of service measurements of network performance, the scheme may change to a scheme where the commands do not overlap.

In another embodiment, the choice of whether to pursue broadcast synchronization of commands that overlap or not to overlap may also depend on the QOS requirements for the services running Therefore, as services are modified, such may trigger the scheme of managing the field emission source.

In some embodiments, a power cord can be monitored for activity of a device. By way of example, a standard power cord that's plugged into an AC outlet can be monitored by a passive WCC device. The passive WCC device can be a device that attaches to any portion of the power cord, which can detect inductively the state of the device connected to the power cord. For example, if the power cord is connected to a blender or any other appliance or device connectable to an outlet, when power is drawn from the outlet, current flows through the power cord. Current flowing to the power cord can be detected using an inductive detector that detects the state of either on or off of the device connected to the power cord.

The inductive detection of current flowing to the power cord can therefore signal to the WCC device circuitry to send a signal to an end node that reports the activity of the device. The passive WCC device can be powered in a number of ways described throughout this document. One way can be the power the passive WCC device using passive Wi-Fi. In another embodiment, the WCC device can be powered directly by the current flow in the cord, when it is detected to be on when current flows to the device connected to the cord. For instance, it is possible to inductively coupled and believed power from the cord the power the WCC device. Powering on the WCC device can therefore be used to signal to an end node that the object connected to the power cords being turned on. When current stops flowing, the WCC device can signal to the end node that the object is off.

This information can therefore be supplied to any device that requires information of activity of specific devices within a room, or specific devices connected to plugs, or simply to monitor activity in a location. Security activities can also utilize this technique to determine when objects in a specific location are being used. By attaching a passive WCC device to a cord, such as a standard off-the-shelf cord, the object connected to the power cord becomes a wired device. This provides a tremendous flexibility of turning standard off-the-shelf objects into connected devices, which can signal their activity to a network, and therefore can be sent to monitoring devices.

In some embodiments, home automation systems can utilize the system, by simply attaching or clamping a passive WCC device to the cord at any location. In some embodiments, the WCC device may simply look like a doughnut object with a whole that opens and clamps to the cord. In another embodiment, the WCC device can be formed into a clip that attaches to a cord. Any number of ways of attaching a WCC device to accord to detect current flow can be used, and the information collected can be shared with any device requiring information of activity of an object connected to the power cord.

The present family of disclosures contains several examples of wireless energy harvesting and wireless transmission of a payload. It should be understood that any example of a wireless transmission that is, has or will be presented herein, may be based on backscatter techniques which use a broadcast emission field to remotely energize a WCC, which in turn harvests the RF energy, and produces a response transmission.

U.S. Pat. No. 8,410,910 titled "Passive Contactless Integrated Circuit Comprising a Flag for Monitoring an Erase/Programming Voltage" by Naura et al., which is fully incorporated by reference herein, provides additional background and examples of passive integrated circuits that operate over inductive and electrical coupling and are capable of reliably receiving and responding to an emission field, techniques of which may be utilized in connection with parts of the present disclosure.

In one embodiment, passive Wi-Fi, not RFID, uses Wi-Fi spectrum in a way that does not interfere with existing Wi-Fi devices yet allows for passive devices to respond to a broadcast emission field using 802.11B channel. Similarly, embodiments of the present disclosure use a broadcast emission field that is harvested by nodes, supplying energy for decoding a data channel of encoded commands with carrier sense to manage polling of sensors, amongst other things. The interesting aspect of Passive Wi-Fi, however, is that the emission source for return packets is shifted to the center of a Wi-Fi channel, and it is selectively reflected back by nodes to synthesize Wi-Fi data transmissions, without using any additional power. The paper titled "Passive Wi-Fi: Bringing Low Power to Wi-Fi Transmissions" by Bryce Kellogg et al, is incorporated in full by reference and provides a detailed description of RF backscatter technique dubbed "Passive Wi-Fi".

If using Passive Wi-Fi or similar backscatter technique, the state of a WCC can be tracked by repetitively polling the WCC. Depending on the backscatter frequency, polling individual WCC can be made by encoding commands to the WCC through modulation of the broadcast emission source or, in some cases, by ON/OFF keying the emission source itself.

In some cases, when using passive Wi-Fi or another backscatter approach it is entirely possible to sample a sensor value and report it back to an end node using the energy received from the RF harvest of the emission source alone. For example, a cold WCC light switch may use a traditional legacy light switch that is coupled to an RF harvesting WCC. In the simple sense, when the switch is polled, or when it receives an emission source addressed to itself, it reads the state of the switch and reports the state of the switch to an end node.

In some cases, depending on the configuration of the WCC, there is not enough energy harvested from the RF emission source to the perform sensor sampling. But, when using RF backscatter techniques, the WCC is still able to always stay connected to a data source, without requiring any additional power to sustain the connection, so the internal components, memory and state of the WCC as a processing engine, relay, collaborator, terminal, trust liaison, output device, DLC participant, etc., can be maintained, without batteries, forever, as long as data source from the emission field remains active. For example, a WCC or DLC that is persistently connected via Passive Wi-Fi, can be maintained with up to date images, patches, system memory, data contents and the like, and can provide essentially non-stop passive operations to support a DLC infrastructure.

In certain configurations, a WCC is operated under a sustained Passive Wi-Fi data link but is equipped with additional energy harvesting capability, of which several types, including mechanical pump and rotary harvesting, have already been thoroughly covered in this application. The energy harvesting from direct and incidental trigger mechanisms enable for (i) taking input i.e. reading sensors that simply require more power than RF energy harvesting techniques alone can supply, (ii) providing output that require more power than RF energy harvesting techniques alone can supply, or (iii) a system whose input and output requirements when combined require more power than RF energy harvesting alone can supply. The combination of an always-on passive Wi-Fi connection and the energy harvesting I/O capabilities of the present disclosure are noteworthy. For example, certain eco-friendly terminal examples included herein, have e-ink display that only uses transitory power when changing contents of screen, is powered through a mechanical harvester, can detect and report who is using it and fetch contents from any network, has up to date contents ready to display prior to activation, and is, on all accounts, capable of being configured as a completely passive computer terminal, suitable for any task.

The combination of Passive Wi-Fi plus the additional power from energy harvesting enables a WCC or DLC, if necessary, to operate completely passively, without batteries, yet still function to take broad input including photos, voice, video, music, container images, latitude, longitude, within room local GPS, fingerprints, etc., to the cloud and back, make broad output, including displayed images, video, sounds, lights, electromagnetic waves, etc.

In some configurations, a WCC will be equipped with traditional Wi-Fi and the capability to synthesizing an RF baseband source at each WCC node, and then modulate the synthesized RF signal at each WCC node. However, as previously stated, the present disclosure may also mix and combine frequencies. For example, a traditional Wi-Fi WCC may be used as an end node to receive data from a Passive Wi-Fi WCC. In one case, the backscatter operation, previously described, uses a local node configured to broadcast a signal to enable another node to be discovered within the proximity Such local node may be a plugged in device and the broadcast signal may be continuous. The broadcast signal may be modulated to encode a data link and also provide a source of RF energy for harvesting to allow the WCC to decode and respond to the any data requests made in the data channel of the emission source.

In other configurations the continuous RF emission source is KEYED on/off to encode commands In some configurations, the RF emission source is continuous for periods of time but then is KEYED on/off to enable synchronization, encode security state change information, allow operation of devices that are unable to demodulate a data link associated with the continuous mode of emission source.

In some configurations, a large house or office may use multiple field emission zones with a backscatter Wi-Fi configuration, and such separated zones may partially overlap, causing potential interference. In this case, a WCC, DLC, management layer or hub may aim to provide carrier sense across multiple zones. Devices that fall near the boundary line may receive additional duty cycle or be polled with increased frequency to accommodate for potentially lost packets, or the image running on a container within a DLC or WCC device may be updated or modified to address quality of service issues, an antenna may be changed or its state or coupling be modified, a transmit power maybe adjusted up or down, a secondary or alternative frequency band may be negotiated, a secondary Wi-Fi channel may be used with a lag bridge to join the first channel, etc.

In one example, an input feature integrated with the housing of the WCC automatically performs discovery of the local proximate node that is broadcasting the RF signal using the harvested energy from the RF broadcast signal. Upon discovery of the broadcast signal, the WCC decodes the broadcast signal to receive a data transmission. The local node producing the RF signal may initiate onboarding and provisioning sequences with a newly discovered node. The onboarding and provisioning sequences may share key data and invoke secure methods of onboarding devices that have been or will be described herein. In one example, the RF signal contains a sustained burst tone to activate power to the WCC along with transmission that encodes security packets intended to be received by all WCCs, including, key exchange data and security related function calls and responses.

A WCC, IOT or DLC device utilizing certain backscatter transmission techniques may perform a transforming frequency shift of the broadcast RF frequency signal generated by a local node, where the local node is configured to broadcast the signal to enable a node to be discovered within the proximity. The WCC contains logic for processing the RF broadcast signal transmitted by the local node. RF energy from the RF broadcast emission source is harvested to supply power to engage the selective frequency KEY shifting to encode the data transmission reply with payload. In one embodiment, the carrier frequency generated by the second device is shifted to the center of a standard wireless channel such as Wi-Fi 802.11b to synthesize Wi-Fi packets. In another embodiment, the backscatter operation aims to transmit to longer range Wi-Fi standards operating IOT near 900 MHz. In other examples of the present disclosure, backscatter techniques are used for state tracking, resonance analysis, signaling, beam honing and steering, proximity detection and triangulation.

In the present disclosure, a WCC, hub and management layer may be configured to accommodate both Passive Wi-Fi and traditional Wi-Fi capability. In some configurations, the WCC or IOT device would be equipped with a dual radio, comprised of a traditional Wi-Fi module and a Passive Wi-Fi capability. In several configurations, a WCC or hub will be equipped with dual radio, a first wireless transmitter enabling the WCC or hub to accommodate the coded outbound broadcast transmission "tone" or emission field and to receive 802.11B synthesized packets, and a second radio or wireless transceiver enabling the hub to receive and transmit Wi-Fi using a broader mix of current standard protocols and frequencies. In some cases the second radio may be configured as both a receiver for 802.11B and for facilitating other frequencies. In some cases the second radio may be configured to controllably swap a single tuner between 802.11B and other frequencies to accommodate reception of Passive Wi-Fi as well as reception of packets on other frequencies. In some cases the second radio may be configured with multiple tuners enabling the second radio to receive the 802.11B response packets from Passive Wi-Fi transmissions as well as other Wi-Fi packets as supported on other frequencies.

The WCCs in the present disclosure may include 3D "printable" magnetic structures that offer unique physical properties and behaviors. Polymagnet Inc. or Correlated Magnets Research LLC has developed a technique to create customized magnetic materials with pixels, otherwise referred to as MAXELS, that may be disposed anywhere on the substrate to have either a + or − charge. The MAXELS are disposed on the substrates according to a reference CAD design, the reference design is transferred onto the substrate in layers, resulting in a creation of a substrate that offers magnetic properties defined according to the reference CAD design. Such properties are so unique that interacting with variations of these magnets feels almost magical.

For more information on structures and/or techniques associated with fabricating and using magnets, reference can be made to U.S. Pat. Nos. 7,855,624, and 7,868,721, which are herein incorporated by reference for all purposes. In some embodiments, magnets can be defined to connect WCC devices, or to connect a WCC device to a surface. In another embodiment, mechanical operation of WCC devices can include magnets that provide for the generation of power, which is harvested from the movement of the magnets. In some embodiments, the magnets can be engineered to form springs or latches.

In some embodiments, one or more magnets can be assembled to simulate a spring button, a plunger, a locking mechanism, an attachment mechanism, a release mechanism, or any other type of mechanical function. That is, because the polarity of positive and negative regions can be shaped and designed for specific implementations, the shapes enable two or more magnets and their associated regions to repel or attract each other, so as to replicate or cause or impact motion or pressures or forces. Broadly speaking, the magnetic structures can be designed for the specific implementation and integrated with WCC devices and/or IOT devices. Generally speaking, WCC devices are a type of an IOT device.

Several unique demonstration magnetic structures are currently offered for sale by Correlated Magnetics Research LLC, under the Polymagnet brand. Demonstration units are shown having a pair of opposing magnets, round, each having a bore hole that a brass shaft is passed through. In the shown demonstration units, plastic caps are placed on the end of the brass shaft to keep the structure in place. In one embodiment, a WCC structure may be comprised of a Polymagnet pair where one element of the pair is coupled to an energy pump harvester, such that the mechanical vibration incidentally invoked in a second magnet upon manipulation of the first magnet may result in the creation of electricity for use in processing a WCC or DLC system input or output.

A WCC structure may be comprised of a Polymagnet pair where one of the magnets were fixed and includes or is coupled to one or more coils, the manipulation and agitation of the free magnet will energize the coil and result in the creation of electricity for use in processing a WCC or DLC system input or output. In some embodiments, a WCC device may be comprised of a string of magnets (e.g., 3, 4, 5, 6, 7, etc. magnets), which can provide a compressive force or periodic compressive force or pulsing compressive force as the magnets ripple one after another to move. The magnets may be linked together, e.g. by placing them side-by-side and inserting them into a rod. Faces of the magnets can therefore be placed adjacent to one another, and their repelling forces can keep them apart. When one of the magnets is turned, the other magnets, one by one, can be caused to turn as well. The force provided by each of the magnets, e.g. during the rippling effect, can be imparted to a power generation device for energy harvesting. Therefore, by designing the orientation of the polarities in each of the magnets, the ripple effect can be designed to provide the desired amount of power generation effect, which is then harvested to power electronics and or RF circuitry of a the WCC device.

A WCC structure may be comprised of a Spring Polymagnet where the magnets attract from a distance but as the two magnets reach a defined distance, they reach an equilibrium point. If the magnets are pushed past an equilibrium point, the force changes from attract to repel. A WCC structure may be comprised of a Spring Polymagnet pair where one magnet is coupled to an energy pump harvester, to capture the mechanical vibration incidentally invoked in a second magnet by manipulating the first magnet.

A WCC structure may be comprised of a Latch Polymagnet which repel from a distance. When the magnets are pushed past a certain point, the force changes to attract and they "click" or latch together. A WCC structure where one Latch Polymagnet in the pair is coupled to an energy pump harvester, to capture, for example, a hammer-based piezo vibration incidentally invoked by second magnet by pushing the first magnet.

A WCC structure may be comprised of a Twist-Release Polymagnet which creates a strong holding force when in the aligned position. When rotated 90 degrees out of alignment in either direction, they switch to a strong repel force. When the magnets are attracted, they "click" or latch together. A WCC structure where one Twist-Release Polymagnet in the pair is coupled to an energy pump harvester, to capture, for example, a hammer-based piezo vibration incidentally invoked by second magnet by twisting the first magnet. Alternatively, one or more coils may be used to harvest energy from manipulation of a Twist-Release Polymagnet.

A WCC structure may be comprised of a Detent Polymagnet which are engineered to possess a certain number of attract and repel positions—bumps which provide tactile feedback as the magnets are rotated. A WCC structure using a Detent Polymagnet pair may be coupled to an energy pump harvester, to capture, for example, vibration incidentally invoked by second magnet by twisting the first magnet. Alternatively, one or more coils may be used to harvest energy from manipulation of a dent magnet(s).

A WCC structure may be comprised of a gear MAXEL or Polymagnet which are engineered magnets that mimic traditional gears but operate in a non-contact fashion. Such structures can be arranged with other magnets such that the gear MAXEL structures are levitated, resulting in a minimum amount of drag and silent operation. A WCC structure using a gear MAXEL structure pair or set may be coupled to coil structure to harvest magnetic energy, to capture and harvest energy from incidental vibration, and as a component of a tangible user interface coupled to the WCC.

Alternatively, one or more coils may be used to harvest energy from manipulation of a gear-configured MAXEL based magnetic structure.

The magnetic structure and variations of 3D customizable magnetic structures, presented herein, using MAXELS, are well suited for operation with WCC devices as both a mechanism for harvesting mechanical action, and as a tangible element of the user interface. In some embodiments, the magnets may be modified, including their surrounding or supporting structures. In some embodiments, the magnets may incorporate coupling coils to enable energy creation during manipulation, and that such coils may also be configured be able to determine the state of the magnet by sensing a position or orientation of magnet by observation of the induced field in the coils. In some embodiments that use magnetic energy harvesting interface structures, the WCC tracks the orientation of the dial or switch using one or more sense coils. In certain embodiments, the magnets used with a WCC structured MAXEL pattern which may contain an asymmetry or angular reference that does not interfere with the overall desired action of the custom magnet, but enables easier tracking of the position or orientation of the magnet, using coils or some other sensor, including Hall effect.

Furthermore, in certain cases, a WCC configured is configured with coils that are incorporated into or coupled to the various magnets and be used to physically manipulate the state of the magnet, using electricity, for example, to rotate a Twist-Release magnet to a latched or released state, change the angle of a dent magnet, toggle the state of a latching magnet(s) from locked to floating, or to jiggle or controllably resonate a spring constructed magnet(s), etc. When operated as both sense and drive coils, the state of the user interface elements coupled to the magnetic structures are tracked but may also be manipulated, for example, in a closed loop to provide force feedback, haptic and tactile responses.

In some embodiments, a WI-FI serial bus configuration may be used to preform communication functions. By way of example, a thicket of solutions are demonstrated for novel inter-device connectivity, device provisioning mechanisms to easily on-board and off-board devices, ways to establish secure operation, novel applications, a device management ecosystem that fits to complement and overlap the evolution of services and products from the likes of quality providers of tomorrow's IOT infrastructure, including Google Inc., Apple Inc. and Amazon Inc., and more. However, it should be clear that the present disclosure can enable even simple tasks such as maintain a common wake-up and sleep cadence among devices, battery-less devices with buttons that can select options and display results from the Internet, enable modes such as continuous discovery in an ultra-low, passive, battery-less manner, provide a framework for application developers and consumer devices to enable cooperative applications and services across a diverse array of Internet connected things.

Figure 43B:
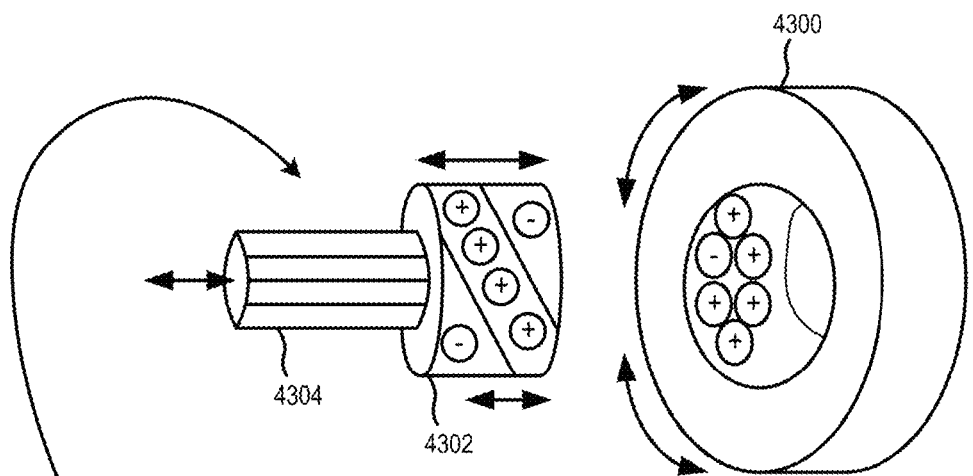
FIGS. 43A-43C illustrate examples of a WCC device that can be powered by motion and a power pump can be charged or receive power in response to reactive motions of magnets integrated in an object, in accordance with some embodiments.
Figure 43A:
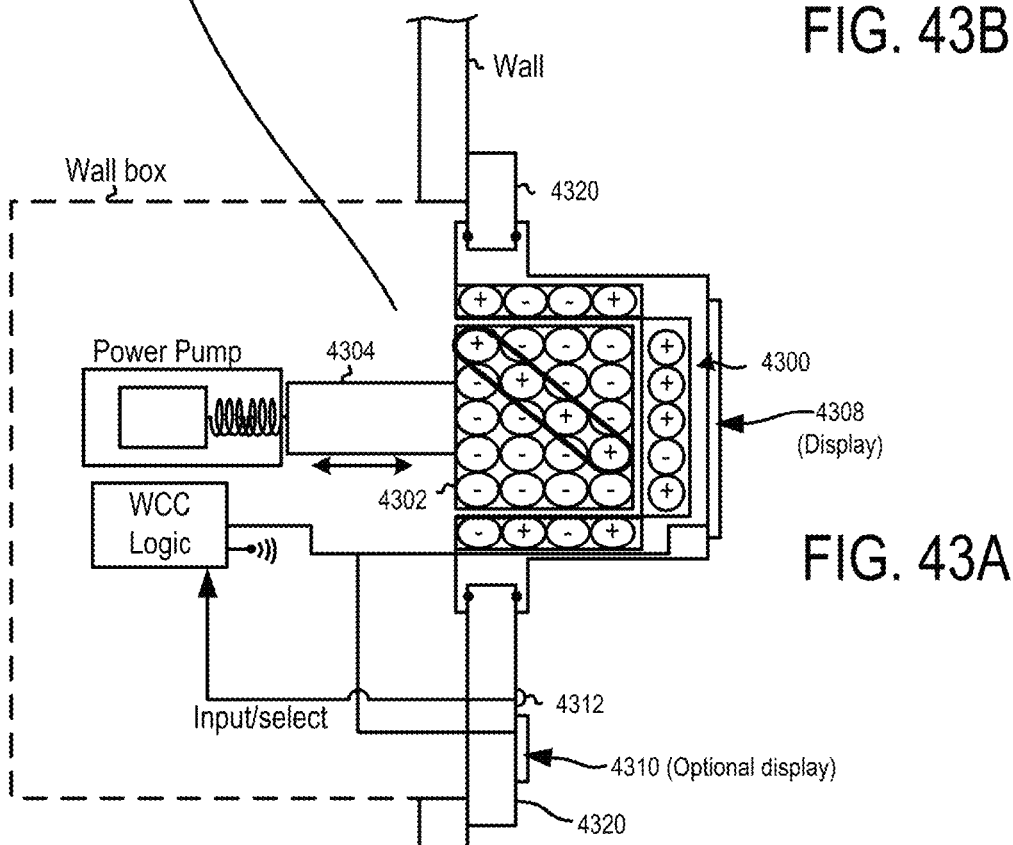

FIG. 43A illustrates an example of a WCC device that can be powered by motion and a power pump can be charged or receive power in response to reactive motions of magnets integrated in an object. In this example, the object is a dial, which can be part of a wall plate 4320. The wall plate 4320, can be assembled and integrated into a standard electrical box that is placed into a wall cavity of a home or business or building. Standard electrical boxes come in various shapes and sizes, and should be suitable for receiving internal electronics and mechanical components usable for activating the power pump, which can store generated energy for powering WCC logic, without a battery.

Figure 43C:
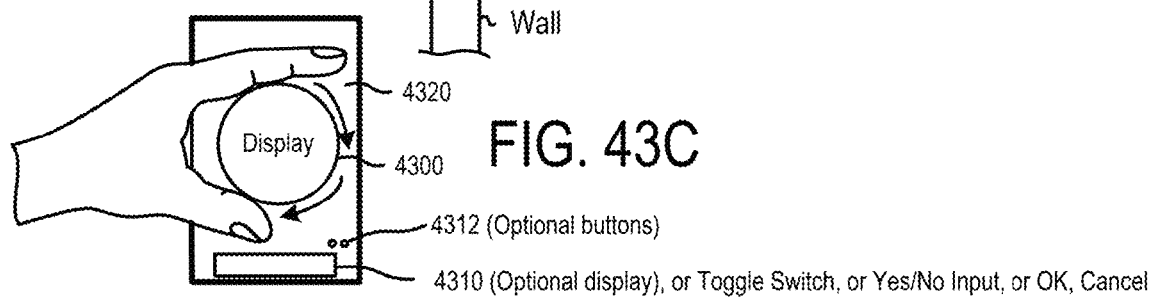

As shown, the dial 4300 may include a display screen 4308, which can be activated in response to motion of the dial 4300 by a user, as shown in FIG. 43C. The wall plate 4320 may also include other display screens, which can also be driven in powered by the power pump. In this embodiment, the magnetic pieces of the dial 4300 may include at least two components as shown in FIG. 43B. The casing of the dial 4300, in one embodiment, may include a layer or a magnet surface that has been printed to have different charge characteristics at different internal radiuses and depths. The arrangement and distribution of the charges associated with magnets formed in the dial body, or in another magnet that is inserted within or connected to the dial body, can be printed or formed to have a specific distribution.

The distribution of the charges, e.g. polarity of positive or negative magnetic poles, can be designed so that another magnetic material can be influenced to turn, move, or repel, or attract. By way of example, and insert 4302 can similarly be printed to have different magnetic poles at different locations, such that a turn of the dial 4300 will force the insert 4302 to turn internally consistent with the attractive and repelling forces associated with the magnetic surfaces. The shaft 4304, can then be caused to move based on the motion created by the magnetic distribution of charges on the insert relative to the dial 4300. In another embodiment, the shaft 4304 can include coils (e.g., pick-up coils) wrapped around the shaft that can harvest inductively generated power responsive to the motion. The coils can, in some embodiments, be used to determine what angle the dial has been turned, e.g., based on the motion of the shaft 4304. The coils, can further be used to provide force feedback. This power can be harvested by the power pump. Again, it should be understood that different types of power harvesting mechanisms may be used and/or combined with other types of power sources, as described throughout this document.

For instance, when the dial 4300 is turned, the magnetic surfaces and distributed magnetic poles within the surface that are adjacent to the outer surface of the insert 4302, will force the insert 4302 to turn, based on the repelling and attractive forces that are distributed on the surface of the insert 4302. These magnetic repelling and attractive forces, can act to force the shaft 4304 to press into and out of the power pump, which can produce power for the power pump, which can charge the WCC logic. The power produced can also be used to power the display 4308. The display 4308, can produce information that's relevant to the program functionality of the WCC device terminal.

Continuing with the example of FIG. 43A, it is shown that one configuration of the dial 4300 can be interfaced so that the screen or display 4308 is powered by the power pump or other power source, and the WCC logic is able to communicate state data or receive information that can be displayed on the display 4308. The WCC logic can therefore provide data for display on displays 4308 and optionally 4310. In some configurations, one or more buttons 4312 can be used to provide input settings back to the WCC logic. The input settings can, for example, operate or select different data for display or retrieval by way of the WCC device. As shown in FIG. 43C, the users hand can be used to turn the dial 4300, and turning can include spinning the dial, pressing the dial in and out, and/or other manipulations of the dial. In one configuration, each twist of the dial can cause generation of power, which can then present information for display on the display screen 4308.

In some embodiments, as the dial is turned one or more revolutions, or partial revolutions, or spun, additional data can be displayed, based on the data that is processed by the WCC logic or data that is obtained by the WCC logic. In some embodiments, the WCC logic can wirelessly transmit data to an end node, as described above. In some embodiments, the wireless transmission of data can be facilitated using passive Wi-Fi transmission, which reduces the need for strong power consuming RF transmitters. Transmission of data can be by way of backscatter reflection, as described throughout the specification. In other embodiments, the transmission by the WCC logic can be via any number of radiofrequency standards, including RF transmission circuitry.

In still other embodiments, the WCC logic can additionally communicate with a wired circuitry in the wall, which can then communicate with other devices, network devices, electrical panels, hubs, routers, switches, a network, the Internet, etc. Broadly speaking, the communication of data from the WCC device to another device, and the communication of data to the WCC device received from other devices can be processed by WCC logic. The WCC logic can include, as described above, circuitry, digital circuitry, integrated circuits (ICs), application specific integrated circuits (ASICs), memory devices, processors, microprocessors, and other logic processed by hardware or software or combinations thereof.

FIGS. 44A-44C show examples of a control knob, housing, dial, terminal and/or structure that maybe provided for user interfacing. A control knob, without limitation, may be pushed, pulled, twisted, lifted, lowered, rocked forward, rocked backwards, rocked to the left, rocked to the right, or rocked along any angle, shifted left, shifted right, or shifted along any radial angle about the centroid of the knob. In one embodiment, when this interaction is imparted, energy may be harvested during such manipulation, energy that may be accumulated to perform useful functions. These functions may include, for example, processing data for entering input and/or wirelessly transmitting a selection. In some embodiments, the selection could entail the multiple degrees of freedom of movement of the knob.

The aforementioned control knob may operate in a WCC structure in an environment that uses any wireless data connection and logic, with or without batteries, where the WCC logic may be wirelessly connected to local devices, end nodes, and services of the world wide web with energy harvested through the control knob to fuel power to the device.

The aforementioned control knob may operate in a WCC structure in an environment that uses Passive Wi-Fi data connection and logic, with or without batteries, where the WCC logic may be wirelessly connected to local devices, end nodes, and services of the world wide web, in perpetuity, with no batteries. An example of such energy harvesting control knob in use is shown in FIGS. 44A-C, in the context of a novel WCC harvesting WCC computer "terminal" 4303.

The terminal may be used for a variety of purposes, including checking email, text messages, reading sports, stocks, news, checking status of systems, etc. The terminal may include WCC logic and wireless communications capable of reaching out to a local end node or directly to a network remote internet data source. The terminal may portable or be housed in a fixed location, including in an electrical box 4303 and disposed in a wall cavity. A miniature version may be embedded to form a wearable device, such as a watch, a button, clothing, shoes, luggage, tools, etc. The WCC logic may include a Passive Wi-Fi capability to enable the terminal to maintain updated data connection and updated data store associated with programming in the WCC logic.

For input, the terminal may accept a novel energy harvesting control knob mechanism as well as additional input of various sensor types, including but not limited to one or more switch, coil, Hall effect device, microphone, camera, photodetector, transducer, near field communication, etc. The input channel may also include those capable of receiving an energy transmission of a field including those fields that are purposely brought in proximity to the terminal, and including those fields that are brought in proximity to the terminal to provide a combination of user authentication and power transfer, and it should be understood that any WCC of the present disclosure may adopt such input channel.

For output, the terminal may produce output of various types, including display of images, sounds, electromagnetic transmissions, electrostatic transmission, NFC interactivity, photo emitter emissions, IR strobing, ultrasonic transducer pulsing, etc. The output channel may also include an electromagnetic transmitter capable of creating an emission field, including a broadcast or one that is purposely brought in proximity to another WCC, and where the field may modulate or pulsed to encode an authentication transmission to enable the terminal to authenticate to the WCC as well as transfer power to the WCC, and it should be understood that any WCC contained in this family of applications may adopt such an output channel.

Still referring to FIGS. 44A-44C, by way of example, show a magnetic assembly that may be used in a control knob of WCC terminal 4303. The magnetic assembly is comprised of two magnetic substrates 4401 and 4403 are each formed by a layout of MAXEL design pattern to accommodate the freedom of movement in the control knob. The magnetic assembly may be coupled together with a shaft 4441, preferably but not necessarily made of non-magnetic material, such as brass. The structure is laid out to achieve a gap between the two magnets when opposing each other. The shaft may be patterned to lock magnet 4401 orientation but allow magnet 4401 to slide left and right on the shaft to increase or decrease the gap distance. Pushing or pulling on magnet 4403 through the exposed part dial results in the magnet 4401 actuating the power pump of the WCC. However, the application of rotational twist applied to magnet 4403 also results in magnet 4401 moving left and right along the shaft, according to the repulsion and attraction layout of the MAXELS on both magnets.

As shown in FIG. 44A, the magnets can be designed with more sections to affect a gearing. Gearing, as used herein, enables adjustments of the repulsive and attractive forces upon one or more other magnets. For example, it is possible to adjust the gearing or ratio of left to right action of magnet 4401 to a given rotational movement of magnet 4403. This can be done by creating more sectors of opposing polarity in the MAXEL pattern, as shown in FIG. 44A. The layout of this magnet behavior and when coupled to the modified shaft, results in a structure that offers the action similar to the operation of a crank or cam. A restoring spring or coil may be used to couple energy into the structure and provide a restoring stability to reset the dial to a rested center position.

This structure will be shown and explained in more detail in the context of a WCC energy harvesting selector dial however the general design offers the benefit of translating rotational movement to linear movement without the coupling of a crank to a wheel or without the wear and tear of a bushings of a cam, or gears.

In one modified configuration of a terminal, one or more coils may be disposed about the structure to capture energy from movement of the structure in addition to, or in replacement of, the mechanical power pump harvesting through the incidental trigger force of magnet 4401. In another embodiment, such coils are deposited about the gap between the magnets. In another embodiment, the coils are applied to a film and coupled to the face of the magnets, 4402 and 4404, in opposition thereto. In another embodiment, the shaft 4441 acts a core having a coil wrapped around it for sensing state of the magnets and capturing energy from manipulation of the magnets. In another embodiment, a coil is actuated to manipulate the dial or cause force feedback. In still another embodiment, a series of magnets are cascaded along the shaft and deposed between the magnets are piezoelectric elements for capturing the incidental trigger of the magnets against the piezoelectric elements.

The WCC terminal may be equipped with a display 4420, preferably a bi-stable e-ink or other ultra-low power display, preferable one that does not require power to sustain its state after its state is set. The display may be disposed in proximity to the user controls, or as shown in the center of an energy harvesting and selection dial, preferably, as shown, coupled to magnet 4404.

The dial may be pushed inward to cause a command to register a selection and in some configurations to charge the pump with the pulse emission defined by the MAXEL pattern configured for the structure. The command may be recognized by coils that track the state of the magnets, by a Hall-Effect device or by any sensor capable of sensing the change of state of the switch, or by any other known means now or in the future. Such may be based on capacitance, resistance or other change in the sensed field about the dial and magnet 4404, etc.

In some embodiments, magnets 4401 and 4403 are shaped in the form of disks. The discs resemble the shape of, for example, a chip used by gambling casinos. The disk shape, as shown, will include a whole to the center, to allow it to rotate about the shaft 4401. In one configuration, the magnetic polarity of a circular region of the disk where the shaft is to go through will have a polarity that will allow it to repel the shaft 4401. This provides for the rotation of the disk around the shaft with little or no friction, as the disk may be at least partially levitated concentrically around the whole through which the shaft passes. As shown, magnet 4303 can include an inner side 4404 that faces the inner side 4402 of magnet 4401.

The magnetic polarities formed on the surfaces 4404 and 4402 can therefore have any number of patterns to allow for the repelling and attracting forces to cause the discs to move and impart forces for generating power for the power pump, which is harvested. In one embodiment, although two disks are shown connected to the shaft 4401, it is possible to connect a plurality of discs, each having a different or complementary polarity in their facing surfaces, so that the twist of the first magnet will cause the second magnet to move in a repelling direction and then the next magnet will then move itself in a repelling direction and then the next magnet will then move in a repelling direction, e.g., in a cascading format.

As such, the movement of a single first magnet can cause a trickle cascading effect to one or more discs that can be connected through the shaft 4401. Each of the movements of the internal magnets that are resultant from the cascading movement can impart themselves a force upon a harvesting element of the power pump, therefore generating energy. The energy can then be used to power the WCC logic and power the display 4420 disposed on the dial 4452. The WCC logic can therefore communicate with an end node, which may be local or remote, and communicate with a network for receiving or sending information to a remote node or receiving information from Internet data sources. As mentioned above, communication with Internet sources can include sending and receiving data, using application programming interfaces (APIs), and retrieval of the data.

The WCC logic can, in some embodiments, be associated with memory or include memory for storing data that's retrieved. Data that is retrieved can then be populated to the screen either in response to the initial twist, turn, or mechanical motion of the dial 4452 that defines the WCC terminal. As mentioned above, the display can be a bi-stable display, such as an e-ink display that can hold the graphical data without requiring further power. Once the data is populated to the screen that information can remain on the display screen until the next power is harvested and/or input is provided.

Figure 44D:
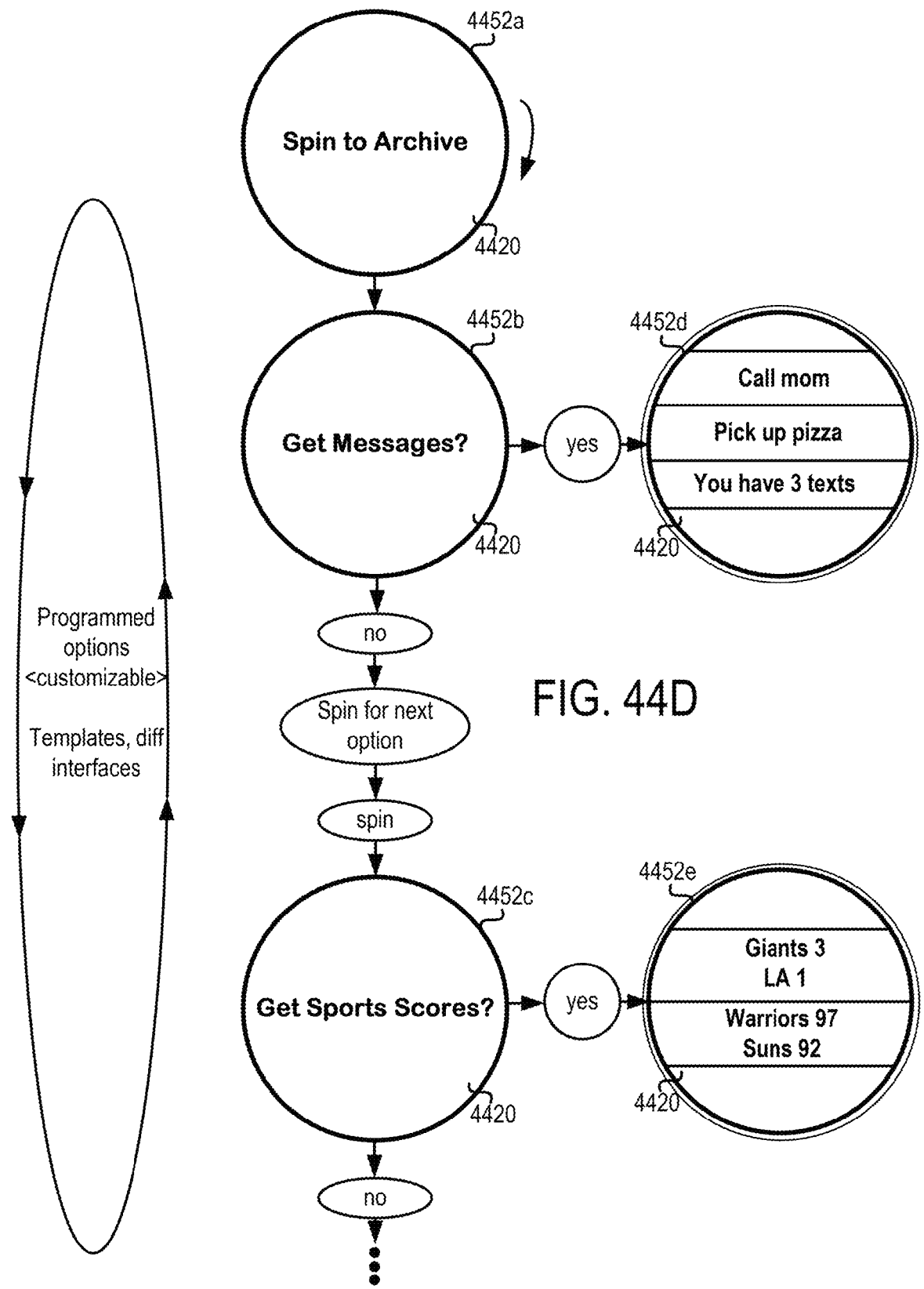

FIG. 44D is shown to provide a graphical representation of the types of interfaces that can be made to the dial and data that can be received from the dial display shown in FIG. 44C, in accordance with one embodiment. As shown, the dial 4452*a* may provide information on his display 4420, which can instruct the user how to use the WCC terminal. In one embodiment, the WCC terminal may be preconfigured to provide certain types of data, as defined by programming. The programming can be set by a user, and can be set remotely on a user device and then communicated to the WCC terminal. As such, the functionality of the WCC terminal can be customized based on the types of settings that are produced or set or defined by the specific user. In some embodiments, the user can provide logic that requires processing by the WCC terminal. In other embodiments, the WCC terminal can be programmed to retrieve certain types of data from other WCC devices, sensors, IOT devices, and/or Internet sources. In this example, the user is instructed to "spin to activate" the WCC terminal. As mentioned above, spinning is only one type of interface functionality that the user can impart on the dial 4452. Other types of interfaces can include simply turning the dial, twisting the dial, press in the dial, twisting the dial back and forth, pulling on the dial, pressing on the dial, etc.

In this specific example, when the user spins the dial 4452*b* to activate the WCC terminal, the user can be provided with another message, asking the user if he or she wishes to get messages. If the user does want to get messages, the dial 4452*d* having the display screen 4420, can populate other types of options. These options can be retrieved from local memory, or can be retrieved from another end node in the network. This example shows that options for get messages can include, call mom, pick up pizza, you have 3 texts, etc. If the user selects one of those options, more data can be retrieved from the network. Data retrieved for the network can be, for example, accessing a user's calendar, accessing a user's text interface, accessing an online telephone, accessing to do list, accessing social data, etc. If the user does not want to get messages, the user can spin the dial to get another option, such as "get sports scores" shown in dial 4452*c*.

If the user indeed wishes to get sports scores, the user can press the dial 4452*c*, turn the dial, double press in the dial, speak voice input to the dial, or provide some gesture. Motion detector gestures can also be detected, in one embodiment, by the dial 4452*c*, or can be detected using another motion detection device at her close to the terminal. For example, data provided to the dial 4452*e* can include information that's collected from a data source over the Internet. Sports scores can therefore be shown in different portions of the display screen 4420. The programming of options, as shown in FIG. 44D, can be customizable.

The inputs required for selecting specific information can also be customized. For example, the type of input required to select, to request, to get additional options, and the like, can be programmed In one embodiment, the programming can be made via a user device. The user device can include, for example, an application of a smart phone, a webpage, or other interconnected device or interface. In some embodiments, a webpage or an app of a smart phone can be used the select customized data sources to collect data, and present options for the dial 4452, of the WCC terminal. In another embodiment, voice input can be provided directly to the terminal, to request programming without requiring access to another device. For instance, voice input can be provided to select the type of data sources or options to present on the screen of the terminal. The user input required for selecting and providing input to the WCC terminal can also be customized either at the terminal itself or via another device connected to the Internet or network.

Figure 44E:
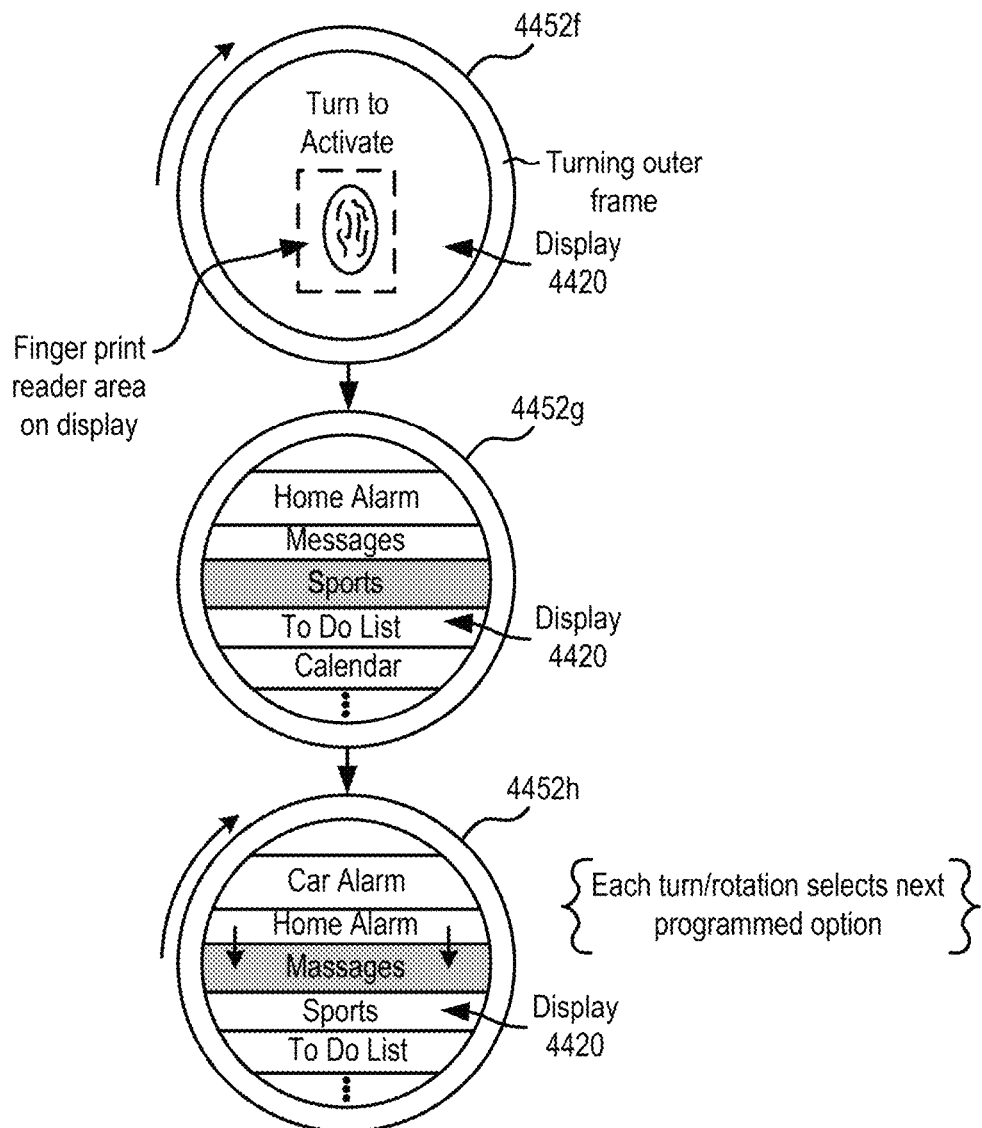

FIG. 44E provides another example of a way to activate and interface with a WCC terminal having a display 4420. In this example, the user may be instructed to activate the WCC terminal by imprinting his or her finger print upon the reader. The user may, for example, press on the display 4420, which imparts mechanical pressure into the display 4420, which in turn generates and harvests energy for activating a next phase of the interfacing with the display 4420. In another embodiment, the user may turn the dial 4452f, to activate the WCC terminal In another embodiment, the user may turn the outer frame of the dial 4452f, while the screen remains in the same position. The outer frame can be a shell, which mechanically can turn to provide energy or impart mechanical input to the energy harvesting device. In one example, once the WCC terminal has been activated, the display can show various options, which may have been programmed by the user.

The dial 4452g, for example, shows a number of options arranged in a stack, where the selected item may be the center item. The center item in this example is "sports," which can be selected by pressing down on the display 4420, applying a gesture to the display, providing voice input to the display, tapping on the display, double tapping on the display, or other type of input. In one embodiment, if the user wishes to item on the display, the user can turn the dial 4452h, which causes the menu to select downward to the next item. In this example, by turning the dial 4452h to the right, the option for "messages" can be shown to be selected. If the user wishes to select, the user can, as mentioned above, press down on the display 4420, provide some other input, provided gesture input, provided double tap, provided triple tap, provide voice input, or any other interfacing signal or action. If the user selects messages, then the display screen would change to provide messages that would be applicable to the user, based on programming.

As mentioned above, the WCC terminal can provide information that is specific to a user. The user profile can be accessed, in one embodiment, using the fingerprint reader area on the display. Therefore, biometrics can be used to identify the user, access profile information, and then use configuration files that identify the types of data available or requested to be available by the users programming. As mentioned above, the example display options are simply provided to show the flexibility of the WCC terminal to gather information, receive input from a user, and send instructions to an end node, which in turn sends or gets data from another device, multiple devices, Internet data sources, and/or communicate messages and/or information.

Figure 45A:
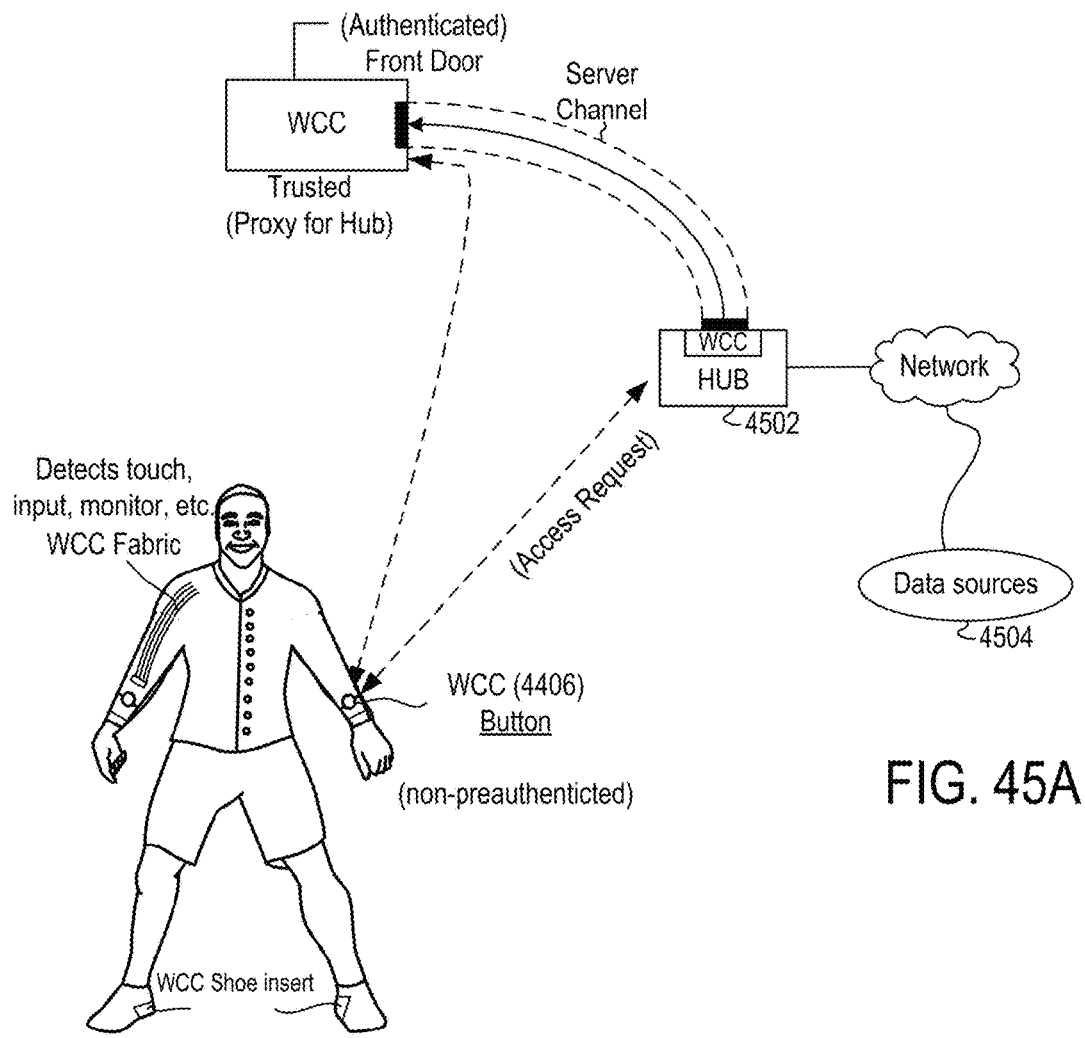
FIGS. 45A and 45B will now be described with reference to example methods to manage security associated with data being transferred to and from WCC devices, in accordance with some embodiments.
Figure 45B:
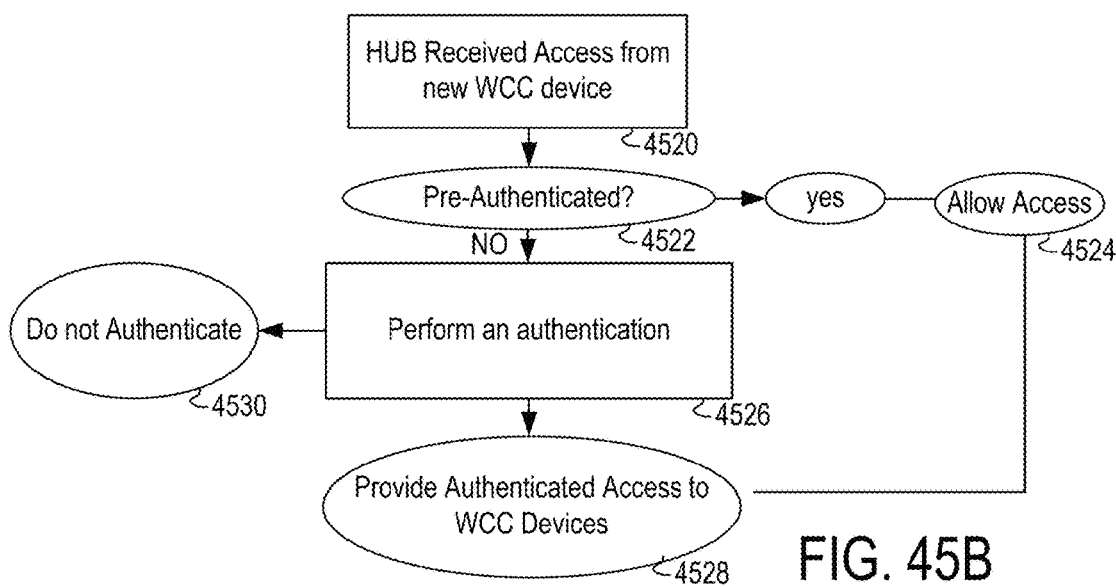

FIGS. 45A and 45B will now be described with reference to example methods to manage security associated with data being transferred to and from WCC devices, in accordance with some embodiments. The examples provided in this section regarding security should be viewed as exemplary in nature, as various sections of this document and documents incorporated by reference have identified other security methodologies. The various methodologies can be combined to define new security protocols, or multiple security protocols can be combined depending on the context of the use associated for the WCC, IOT, DLC, or related connected device.

With this in mind, there is a strong enterprise and home need to provide security to protect computer networks, WCC, IOT and DLC against man-in-the-middle attacks, rogue IOT devices, NAT redirection, brute force cracking, denial of service attacks, pseudo services, and Trojan horse images and the like. However, there is also a need to provide ease-of-use and convenience. And while typically security comes at a price of user inconvenience, an embodiment aims to provide security, convenience and flexibility of a carrier-class framework for a diverse world of devices.

In one embodiment, key-pairs may be used to encrypt and decipher messages on a network. In an example security configuration, key-pairs may be used to communicate encrypted messages within the network but the key-pairs may be automatically regenerated, updated or refreshed, so they transform over time. This provides added security benefits. For example, if a key-pair is stolen by a rogue IOT device, malicious software or intruder, access to network data or messages sent across the network will not be possible since a new key-pair will be used at the next refresh cycle. Periodic key-pair changes may take place upon provisioning new device, onboarding device, for each URL connection, on a fixed, variable, ad-hoc or triggered schedule. Triggered direct or scheduled key-pair changes may take place upon an anomaly being detected. Anomalies may be detected in memory or network condition, device operation, signal or event and at a WCC, IOT, DLC level and by a single or multiple nodes. It may also be detected in whole or part at the management level or by a trusted liaison device associated with the network.

WCC devices may operate in a highly secure manner to ensure the network against intruders impersonating IOT or WCC devices and real IOT devices that are infected with malware by establishing secure onboarding and authentication processes and confirming the authenticity of the programs operating on the devices. For example, IOT or WCC devices may self-prompt or be prompted and interrogated to confirm the legitimacy of an image associated with the device. A hash-checking algorithm may be used to verify the legitimacy of the image. In some embodiments, a known algorithm, the Message-Digest Algorithm, takes an input image designated for a WCC, IOT, DLC, container and produces an MD5 hash that uniquely describes the fingerprint of the image. The MD5 hash value may then be compared against the published value for the container or image. WCC, IOT and DLC devices and related containerized applications may hash compute and confirm sequences on a fixed, variable, ad-hoc or triggered schedule. In some embodiments, triggered direct and scheduling of image verification takes place upon an anomaly being detected. Anomalies may be detected in memory or network condition, device operation, signal or event and at a WCC, IOT, DLC level and by a single or multiple nodes. It may also be detected in whole or part at the management level, on a WCC hub or in connection with a network service.

The WCC, IOT and DLC may form an enterprise security infrastructure utilizing secure encrypted communication, with capability to identity by user, device, MAC address, X.509 certificate, etc. However, as put forth in the present application, a trusted authenticated device, device cluster, DLC cluster, IOT, IOT cluster, service, etc., may act as a trust liaison and trust channel for onboarding and registering a new device's unique credentials as well as providing secure access to the network. The trust liaison device may be equipped with a management layer allowing the device to manage some or part of the network associated with the device.

The present application describes device provisioning and authentication protocols that enable a growing range of WCC devices, including those that do not have rich user interfaces, to authenticate and communicate with another device or service on a network.

One provisioning and authentication mechanism is presented herein for securely authenticating a user or device to a process, service, website, and to dynamically secure connections between users and WCC devices, WCC devices to other WCC and non-WCC devices, and WCC devices to the network and for onboarding and provisioning services. The method is a patentable improvement to the SQRL passwordless login technology that was originally put forth by security researcher Steve Gibson, the background of which (SQRL) is now provided.

SQRL started as a mechanism to allow a user to login to a website using a cell phone as an authenticator, and it has slightly evolved to allow an application running on a desktop to authenticate a user to a website on the same machine. The premise of SQRL operation is based on website's login, which the website presents a QR code containing the URL of its authentication service, plus a nonce. The user's smartphone signs the login URL using a private key derived from its master secret and the URL's domain name. The smartphone sends the matching public key to identify the user, and the signature to authenticate it. In SQRL, the URL encoded in the QR code includes a uniquely generated long random number or nonce, so that every presentation of the login page displays a unique QR code. Typically, a mobile phone associated with the user seeking to login to the website, runs a SQRL authentication app that cryptographically hashes the domain name of the site keyed by the user's master key to produce a site-specific public key pair.

In one embodiment, the app cryptographically signs the entire URL contained in the QR code using the site-specific private key. Because the URL includes a secure nonce, the signature is unique for that site and QR code. The mobile phone then securely performs a POST operation over HTTPS to the QR code's URL providing the site-specific public key and matching signature of the URL. The website receives and acknowledges the POST and now has the URL containing the nonce which came back from the login page via the user's smartphone. The website also has a cryptographic signature of the URL, and the user's site-specific public key. It uses the public key to verify that the signature is valid for the URL. This confirms that the user who produced the signature used the private key corresponding to the public key. After verifying the signature, the authenticating site recognizes the now-authenticated user by their site-specific public key. The SQRL technique presents an entirely different ID to every unique URL that a device seeks to connect. A benefit of SQRL, touted by its author, is that a user would not need to create an account on a website that supports the service. In other words, if you wanted to comment on a blog site instead of creating an account on the site, you simply cross reference your SQRL ID (the site specific public key that is dynamically created for the URL of the site) to a handle name.

The authors of this disclosure see how the benefits of SQRL can translate to quick provisioning and secure access to services by IOT, WCC and DLC devices. There are aspects of security embodiments of the present disclosure that certainly rely on the mechanism above, which is to say, given a device with a master key that seeks to access a resource that supports SQRL, a secure challenge response process exists to authenticate to the resource with a unique public key established for that URL. It is on this basis, that several individual improvements are now put forth to SQRL, improvements of which may modify a specific aspect of SQRL or multiple aspects of SQRL and which may be taken individually or combined in any way.

In one embodiment of the present disclosure, a SQRL improvement is provided based on the aspect of a dynamic key that is established for a specific URL, the improvement being that the URL undergoes a reassignment process over time or upon condition, prompting new key pairs to be generated. The conditions may include but not be limited to factors involving time, session's counts, access to a database, volume, bandwidth, QoS (quality of service), network condition, GPS location, etc. Table 2 gives additional insight into IFTTT rules that may trigger URL reassignment.

In another embodiment of the present disclosure, a SQRL improvement is provided based on the aspect of a dynamic key that is established for a specific URL, the improvement being that instead of accessing a resource, website etc. directly, a local URL is used as an alias to the actual URL, and a proxy which mimics the SQRL authentication, communicates with the device as if it were the service, and upon authenticating, the proxy connects to the resource, website, etc. and relays the information back to the requesting device. In some embodiments the targeted actual URL may not support SQRL protocol but the proxy handles the authentication with the external resource behalf of the device it serves. DLC management software may be used to snap in such services for use with WCC devices.

In another embodiment of the present disclosure, an authentication process is provided to an improvement of SQRL, based on the aspect of a dynamic key that is established for a specific URL, the improvement being that the challenge and response utilize different frequencies, so each is isolated from the other and to avoid interception, such that a challenge may be transmitted using a first channel and the response responded to using a second channel In one embodiment, the challenge is transmitted to a passive device using a broadcast emission source, the device harvests the energy from the transmission, and synthesizes a response over Wi-Fi 802.11B.

In another embodiment of the present disclosure, an authentication process is provided to an improvement of SQRL, based on the Master ID that is associated with each device and used to generate the individual key pairs for a session, the improvement being that the Master ID associated with each device in a cluster of devices associated in a managed network may be remotely commanded to delete and recreate the Master ID, using a WCC or DLC management system.

FIG. 45A shows an example where a wearable WCC device, a button 4406, is seeking to authenticate to a service on the network. The button is not pre-authenticated. It sends a request to WCC hub 4502 to connect to the network. The hub 4502 performs a lookup to determine if the WCC 4406 was previously authenticated. If the WCC was not already authenticated to the hub 4502, the hub 4502 may query other authenticated WCC device to determine if any devices have a trusted relationship with the WCC 4406. This can be useful to ensure that most efficient onboarding approach is used, especially when operating with low power and in cases completely passive devices. If any devices have a trusted relationship with the button, the device may act as a trust liaison to support the authentication and onboarding of the WCC 4406 in coordination with the trusted device.

In certain cases, a challenge involving a random nonce will be generated and must be responded to via a signed response along with the public key that was generated for URL by the WCC. In one embodiment the hub 4502 will confirm the signature of the response to the challenge and either allow or disallow access based on the results. In one embodiment, after the WCC is authenticated, the WCC receives a table of URLs associated with services that are anticipated to be used or required by the WCC.

In a preferred security embodiment, WCC security is provided by a randomly rearranging the resource URLs, such that the location of the URL for given resource is dynamic, not static, and has an expiration setting. In one embodiment, the actual URLs of the service are obfuscated from the WCC view, and a local URL is used by the WCC. In this construct, the trusted liaison will act as a proxy to manage the forwarding of packets to the actual URL and back to the WCC. This will provide additional security since the forwarding agent can operate with services to detect and respond to network anomalies.

A future location of a resource/service may be set in a current session and may be set to expire. Expiration may take form in a variety of ways, including one that is set to expire in the current session, one that is set to expire after a given time period, one that is set to expire after a certain number of reconnections to the service have been made, or one that gets expired immediately upon some notification. In one embodiment, a WCC stores and references a table that contains the network address it is connected to, the expiration of the URL associated with the service, a next URL to connect to upon expiration of the service and the current nonce for which the current session was authenticated.

In one embodiment, a hub or trust liaison will the same information a WCC uses to track resources but will also contain the actual resource URL, as shown in table 2 below:

In one embodiment, there is a relaxing period to accommodate a WCC that does not transition to the appropriate URL for the service according to exact standard of the table. In this case, the HUB or proxy may still service the old URL but aid a transition step to ensure the WCC indexing the old URL is updated by swapping the replacing the local URL with the next URL and replacing the next URL according to the scheme of security presently configured.

FIG. 45B illustrates a high level process for verifying authentication of a WCC device or IOT device, to ensure that proper security levels are applied. In some embodiments, security may be omitted, if data that does not require security needs to be transmitted or received. If the data needs to be secure, the security process can be executed in a number of ways as described above. In one embodiment, the hub 4502 can be used to execute security authentication of WCC devices, to enable exchange of data. In operation 4520, the hub may receive access from new WCC devices. For example, if the new device enters an area where network is actively providing access to WCC devices, the hub 4502, can interrogate the new WCC device to determine if the device has been pre-authenticated 4522.

In one embodiment, messages can be exchanged between the hub and the WCC device when the device performs discovery of networks in a specific area. By way of example, the device can identify itself using a unique identifier, or a code that has been assigned to the WCC device for communication in the network, if the device had been authenticated previously. If the device has been previously authenticated, access is allowed to the network in operation 4524. If the device is not been pre-authenticated, authentication operations can be performed in operation 4526. In the authentication process, if the device is determined to not be suitable for communicating within the network or is identified to be an un-trusted device, the device may not be authenticated in operation 4530.

In some embodiments, devices that were identified as not trusted, can be added to a blacklist. In this manner, subsequent attempts to authenticate to the network can be quickly rejected. In some embodiments, the blacklist can be shared among a plurality of networks, so that devices can be barred from access if they do not meet certain security levels. The levels of security can be associated, for example, based on the data that's being transmitted, based on the manufacturer of the device, based on identifiers of origin of the devices, based on known attacks reported by other users, or any other

| Resource | Local URL | Expiration | Next URL | Nonce | Actual URL |
| --- | --- | --- | --- | --- | --- |
| Thingspeak | 192.168.2.123 | Each Session | 192.168.2.171 | 3475634 | https://api.thingspe . . . |
| OracleIOT | 192.168.2.124 | Every 3rd Session | 192.168.2.173 | 4765736 | https://api.oracleiot . . . |
| Google | 192.168.2.125 | 1 hour | 192.168.2.175 | 3625432 | https://api.google . . . |
| TensorFlow | 192.168.2.126 | On Demand | 192.168.2.177 | 3725434 | https://api.tensorflo . . . |
| Kinesis | 192.168.2.127 | If lockout | 192.168.2.179 | 4732524 | https://api.amazon . . . |
| EMR | 192.168.2.128 | 1 year | 192.168.2.181 | 4625489 | https://api.amazon . . . |
| Spark | 192.168.2.129 | Powerlevel 3 | 192.168.2.183 | 3674523 | https://api.spark . . . |
| ioBridge | 192.168.2.130 | Session 5 | 192.168.2.185 | 2347343 | https://api.iobridge . . . |
| Lambda | 192.168.2.131 | Every Session | 192.168.2.187 | 3846364 | https://api.amazon.l . . . |
| WCC3 | 192.168.2.132 | If unplugged | 192.168.2.189 | 3635253 | https://api.saas . . . |
| IC2 | 192.168.2.133 | Authority controlled | 192.168.2.191 | 4846363 | https://api.ic2 . . . |
| WCC4 | 192.168.2.134 | Never | 192.168.2.193 | 3847463 | https://api.national . . . |
| S3 | 192.168.2.135 | Daily | 192.168.2.195 | 5483646 | https://api.amazon . . . |
| MySQL | 192.168.2.136 | Every 10 Megabytes | 192.168.2.197 | 4573647 | https://api.mysql . . . |
| Redshift | 192.168.2.137 | Weekly | 192.168.2.199 | 4673645 | https://api.redshift . . . |
| Marvell | 192.168.2.138 | if exit home | 192.168.2.201 | 4736443 | https://api.marvell . . . |
| RDS | 192.168.2.139 | if exit office | 192.168.2.203 | 2332233 | https://api.rds . . . |
| Nimbits | 192.168.2.140 | if new MAC | 192.168.2.205 | 2324451 | https://api.nimbits . . . |
| SensorCloud | 192.168.2.141 | when new ARP entry | 192.168.2.207 | 2312414 | https://sensorcloud . . . |
| Windriver | 192.168.2.142 | if network anomaly | 192.168.2.209 | 1231212 | https://windriver . . . | methods of filtering devices that may be susceptible to introduce hacks or leaks to the network. If the device is authenticated, the WCC device can be provided with access to the network in operation 4528.

By way of example, the device can be added to a list of authorized devices for a specific network. In some embodiments, the user attempting to authorize a WCC device can provide input for authentication via another device. For example, the user can authenticate a WCC device by using a smart phone or the website. In some embodiments, users can be assigned codes that enable access to specific network if the device has been verified over a different channel. Access codes can then be transferred to the WCC device, and stored in memory of the WCC device so that attempts to access a specific network can interrogate and obtain the access code, which can be used to authenticate the WCC device for use in the network. In some embodiments, WCC devices can be pre-authenticated for specific types of tasks. The types of task can vary depending on the security level assigned. For example, if messaging tasks are to be used by specific WCC device, the messages can be assigned a specific level that might not be the highest level. If the WCC device is transmitting sensitive data, such as security information, personal information, identity information, or any other type of information that is valuable, the level assigned to the WCC device and associated access code can be much higher. In some embodiments, the access code can identify the level of security that will be applied to the communications by the WCC devices.

The encryption level can be more stringent the higher the level, the levels of encryption can be varied, access codes can be switch periodically, challenge and response protocols can be strengthened, biometric data can be required, and/or other security strengthening protocols, methods and/or procedures. In some embodiments, various types of cryptography can be used for the WCC devices and or IOT devices. The cryptography levels can be modified and adjusted to reduce the complexity or weight of the cryptography, while still providing high levels of security.

In some embodiments, WCC devices and IOT devices can use protocols, such as those commercially available by Amazon Web Services (AWS). One example AWS service is referred to as elliptic curve cryptography (ECC) for IOT devices connecting using TLS. ECC is a methodology that uses a public key cryptography that resembles but differs from a well-known RSA methodology. ECC enables devices to use high-security, while using smaller keys than RSA, while still maintaining a high level of cryptographic strength. Reference to AWS is only by way of example, as many types of security systems, algorithms, and methodologies may be used to ensure secure transactions between WCC and IOT devices in specific networks, based on the data being transferred, based on the contextual transfer of data, based on the users of the data, based on identified users interfacing with devices, based on biometric data, and/or combinations thereof.

Over the past five years, several companies have tried but failed to roll out home automation systems that at least turn lights on and off according to remote control and ITTT programs, still to this day, so much of that market is fragmented and most of the homes today, in the United States, use traditional legacy wall switches, manual switches, limited automation, if any. So, we turn to disclosure relating now a promising advance in green energy and home automation, and in particular, to several WCC devices. We will organize a portion of the disclosure showing an array of novel WCC device constructs, novel sub-constructs of those devices, and a novel interoperability model that should make adoption in existing homes and businesses turnkey.

Figure 46:
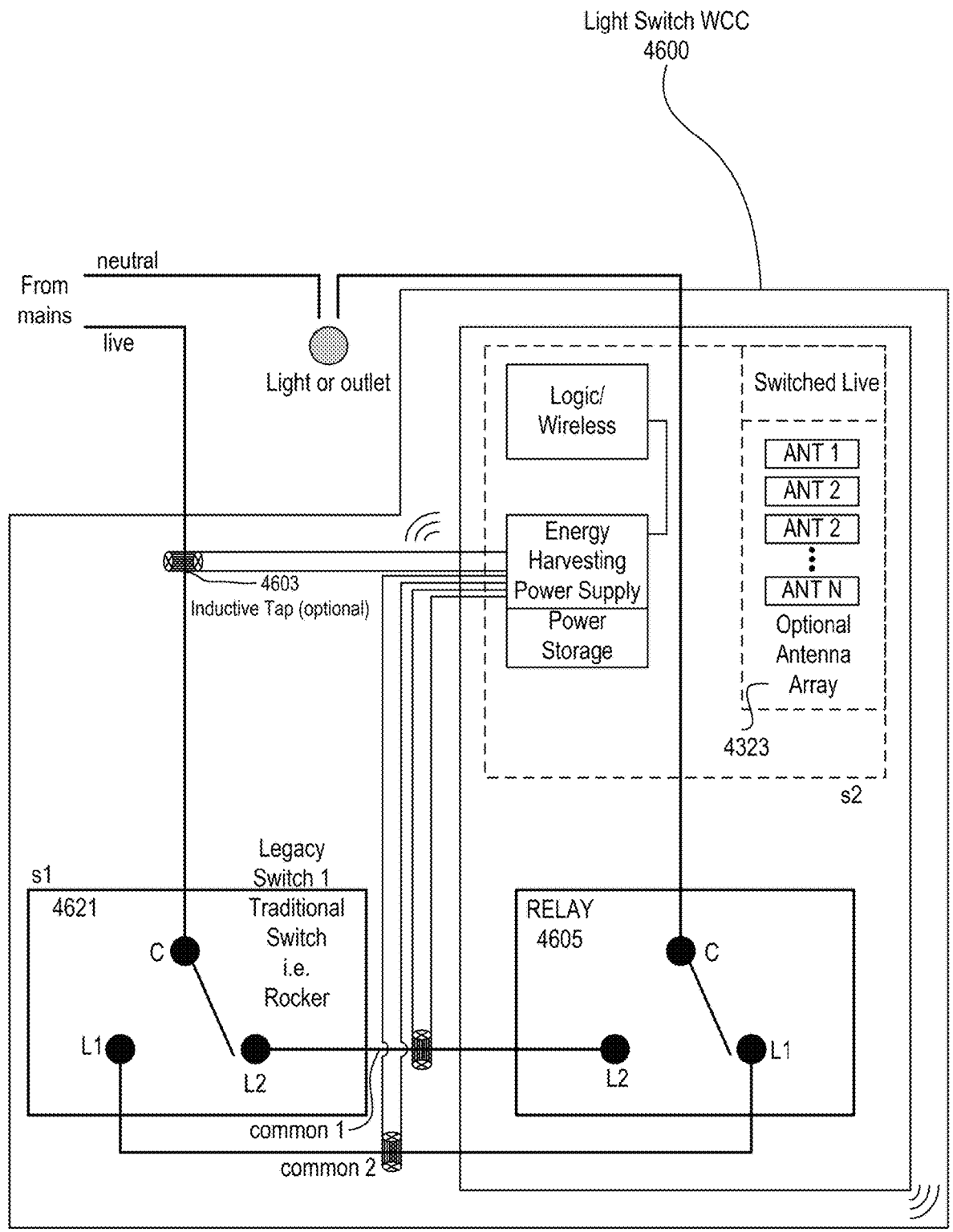
FIG. 46 shows an example of a system with inductive taps.
Figure 47:
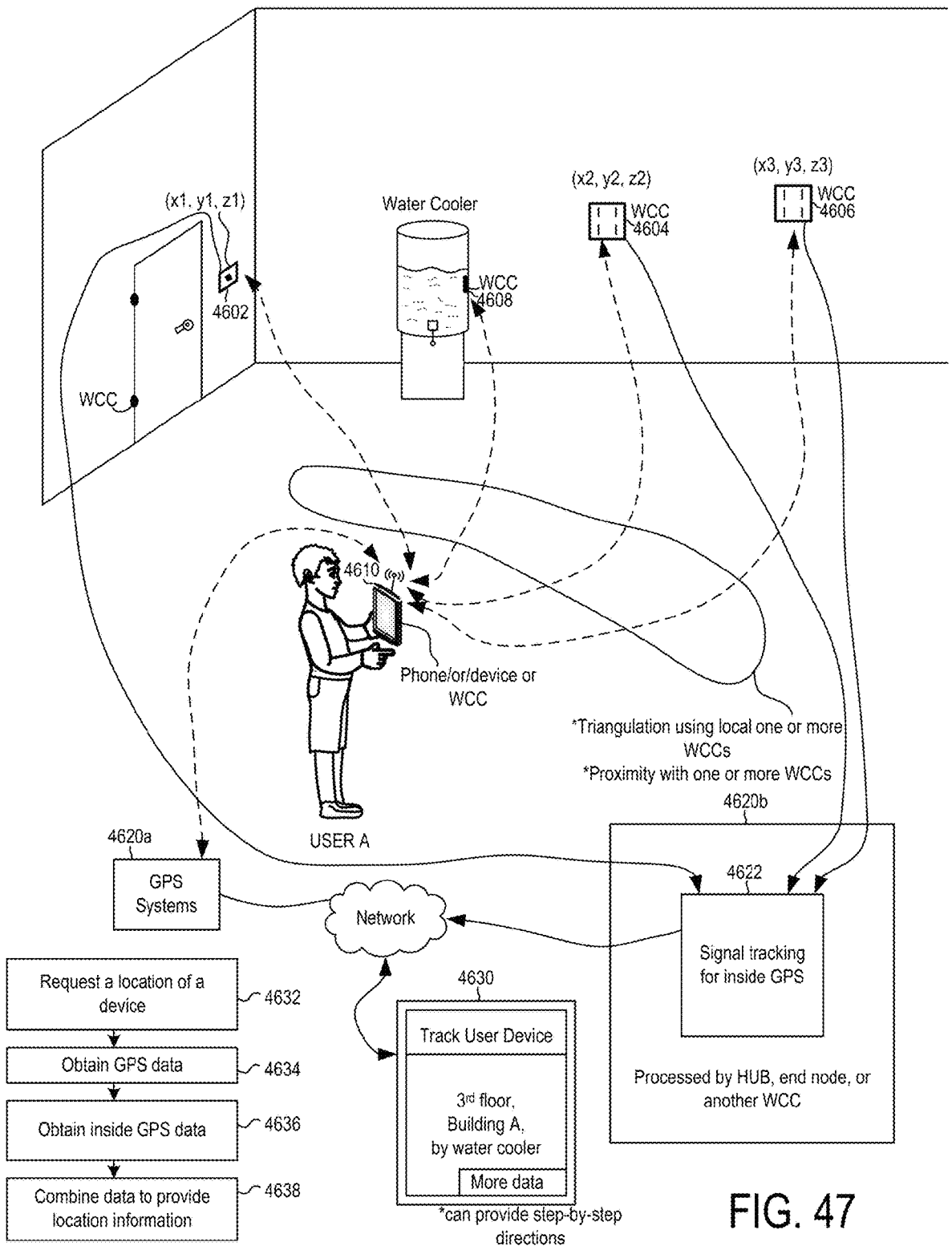
FIG. 47 shows examples of WCC devices that can be disposed in locations to track positions of devices, e.g., to provide a type of internal GPS, in accordance with some embodiments.

FIG. 46-48 show examples of WCC devices that can have multiple functions, ones that integrate with existing building AC outlets and switches, ones that can be disposed in locations to track positions of devices, e.g., to provide a type of internal GPS, in accordance with some embodiments. Such WCC devices may be at fixed anchor positions such as embedded into electrical boxes or be anchors as part of other WCC devices that are typically in a fixed position, such as appliances. In some cases, one or more portable movable WCCs may be establish as a tracking base, where all devices participate in tracking relative position to each other in a tracking cloud.

A WCC light switch may have an AC tap for inductively harvesting power from (preferably) an insulated live wire. Constructs of example devices that may be integrated into an existing electrical box allow for operation of the electrical box, in addition to its normal function of a switch or power outlet, to also provide one or more of (i) a WIFI switch state tracker, (ii) WIFI switch state setter, (iii) a WIFI repeater, (iv) a WIFI tone/field emission emitter for Passive WIFI or other backscatter operation, (v) an anchor node for supporting object tracking of position and orientation inside of a building. The constructs above may communicate with other WCC devices. In one example, the light switch communicates in a manner to facilitate internal GPS tracking of another WCC. In one case, the WCC is a wearable device that is capable of producing feedback in connection with its location in a room. In one case the WCC is capable of interoperating with other WCC, DLC and IOT devices. And still in another case, where other devices respond to a wearable WCC to produce, respective output, guidance, feedback, directions, warnings, incentives or to trigger functions, and the like.

FIG. 46 shows one example embodiment of a WCC light switch 4600 which may fit inside an existing electrical box light switch outlet. The light switch 4600 uses a WCC with relay that harvests energy from AC tap that is wired as a two-way switch with a traditional legacy switch. This switch construct (i) allows manual control of the light or outlet using the traditional switch as a first leg in the two-way switch circuit (ii) allows remote control of the light or control outlet as WCC relay is wired as the second leg in a two-way switch (iii) allows remote tracking of switch state using coils or other sensor read by the WCC.

Light switch WCC 4600 may tap energy from the live wire feeding an AC traditional wall switch 4601 and may also tap to sense the output L1 and L2 of the switch 4601 to determine its state. Switch 4601 may be a legacy style common rocker or common flip switch 4601. The tap 4603 may have a coil for coupling AC into the WCC power supply and drawn by WCC wireless logic and switching relay, which is controlled by the WCC logic. The state of the manual switch and the state of the relay define the path from the live wire through the WCC switch to the light or outlet.

In one embodiment the wireless capability of a switch WCC may be Passive WIFI. In another embodiment the wireless capability of WCC is traditional WIFI. In yet another embodiment the wireless capability in the WCC supports both traditional WIFI plus the "always plugged in" component to the Passive WIFI framework, the field emission source for backscatter synthesis of WIFI packets. In one particular example of a WCC having hybrid WIFI also providing the tone for the passive emission source, the WCC device is capable of coordinating messages with other Passive WIFI tone generators from the "always plugged in" devices to ensure that carrier sense is maintained across a wide area, and to ensure good coverage for expansive operation throughout a facility.

Other WCC device will interoperate with the light switch in novel ways, including electrical outlets. Outlets may be assimilated as a light switch, without the manual switch capability. And like WCC light switch, WCC outlets also interoperate with WCC light switches to produce anchor points in which data are generated to yield an IPS, an indoor positioning system.

Indoor positioning systems, IPS, locates objects or people inside a building using radio waves, magnetic fields, acoustic signal or other sensory information. In the present disclosure, such information may be collected by a WCC or mobile device or transmitted by the WCC or mobile device in either case results in the reliable detection of position, indoors.

In one embodiment, a WCC light switch is further configured to measures the intensity of the received RF signal strength or RSS of a device it is tracking. In one embodiment, the angle of arrival is used to calculate position of the tracked device. In one embodiment, the angle of arrival is computed using an antenna array 4623 in another, the time difference of arrival TDOA the RF signal is received on each antenna is used. In one embodiment the angle of arrival is used with triangulation to determine the location of the tracked object. In one embodiment the received signal strength indication (RSSI), a measurement of the power level received by RF sensor is used to calculate position, based on the notion that radio wave propagation occurs according to the inverse-square law, distance can be approximated based on the relationship between transmitted and received signal strength (the transmission strength is a constant based on the equipment being used), as long as no other errors contribute to faulty results. In one embodiment, beam steering methods are used.

To reduce the impact of reflection and absorption from walls, doors, furniture, and signal fluctuation, in one embodiment, room profiling is used to provide a baseline reference for signal normalization for the environment, and in another embodiment, the method of tracking is modified upon detection of a signal anomaly. In one embodiment, a WCC records telemetry data about the path and approach it takes at the moment leading up to landing in a location of known reference so that it can report any anomaly around the landing pad for the benefit of other devices that move into proximity of the landing pad afterwards, so a correction can be made to filter the anomaly. This provides a mechanism, for example, to provide higher fidelity of tracking movements about Bluetooth zones.

The signal tracking for inside GPS may be processed by the HUB, end node or another WCC. Data collection from RF sources may be at a node, switch or outlet. Triangulation and trilateration may take place, using local or one more WCCs, another device or service on a LAN or WAN.

As shown in FIG. 46, the WCC may be equipped with optional antenna array 4623 to facilitate known frameworks and methods of object tracking that operate using multiple antennas. When another device or service request the location of a device, the GPS data will be obtained that define the world coordinates, and GPS data will be obtained that define the inside GPS data. A management layer or service, such as Google Maps, may combine the data to provide location information that includes external and internal fidelity. It is desirable when performing GPS to have fixed anchor nodes that capture data for calculations of position, and in cases, orientation.

FIG. 47 shows how light switch, electrical outlet and another WCC (water cooler) may provide a surrounding formation of reference anchors for position determination. The benefit of incorporating internal position tracking system into light switch housing, besides having a power supply available at the location, is that such locations are prevalent through residential and commercial structures, and because the locations are fixed. Therefore, such locations provide excellent anchors for node tracking infrastructure.

In one embodiment, the distance between two WCC devices is tracked and when the tracked distance is within a threshold proximity, a first WCC device engages in a wireless transmission to wirelessly transmit power the second WCC device. In one embodiment, the distance between a WCC light switch and another WCC device is tracked and upon reaching a threshold distance of about two feet (or range of between about 1-5 feet) from the WCC light switch resonates to produce a field that is harvested and coupled through a bridge circuit to trigger operation or supply power to WCC device storage. In another embodiment, WCC appliances have field emitters near user interface elements that trigger when user enters proximity to the device.

In another embodiment, power is supplied to a wearable device through the human body, such as hand coupled to a watch where the back face of the watch contains a contact with the skin and coil or other pickup for harvesting power passing through the skin to ground. In these examples, typical things that are coupled to the body, WCC watch, WCC necklace may couple energy from other devices that are configured to emit power supply in addition to function as their primary purpose.

For example, a steering wheel, refrigerator door, oven door, microwave door, light switch, cell phone, may be configured to couple energy through the hand into the wearable WCC device for powering the device through coupling of the human interaction that naturally occurs through the normal functioning of interacting with the power providing device. For example, a WCC watch may receive a power injection when the person wearing the watch reaches to open the refrigerator door. Such power supply coupling through human body from everyday devices to WCC devices, is beneficial because the human interactivity with the devices occurs at good frequency, so much so, the interaction acts as injection points for adding power to maintain operation of WCC energy harvesting wearable.

AC outlets, similar to light switches, also provide some of the same benefits as above. We have already discussed in detail examples of WCC AC outlet and AC power cord capable of determining the state of the device coupled thereto. We reaffirm the features and structures of what has already been described on both of the above may be combined, and put into the form factor of an AC outlet that may comingle with WCC light switches and other WCC AC outlets to create additional anchor points for internal position tracking of objects. By way example, a WCC outlet may have an AC tap for inductively harvesting power from (preferably) an insulated live wire. Constructs of example devices that may be integrated into an existing electrical box allow for operation of the electrical box, in addition to its normal function as a power outlet, to also provide one or more of (i) a WIFI switch state tracker, (ii) WIFI switch state setter, (iii) a WIFI repeater, (iv) a WIFI tone/field emission emitter for Passive WIFI or other backscatter operation, (v)

an anchor node for supporting object tracking of position and orientation inside of a building.

Figure 48A:
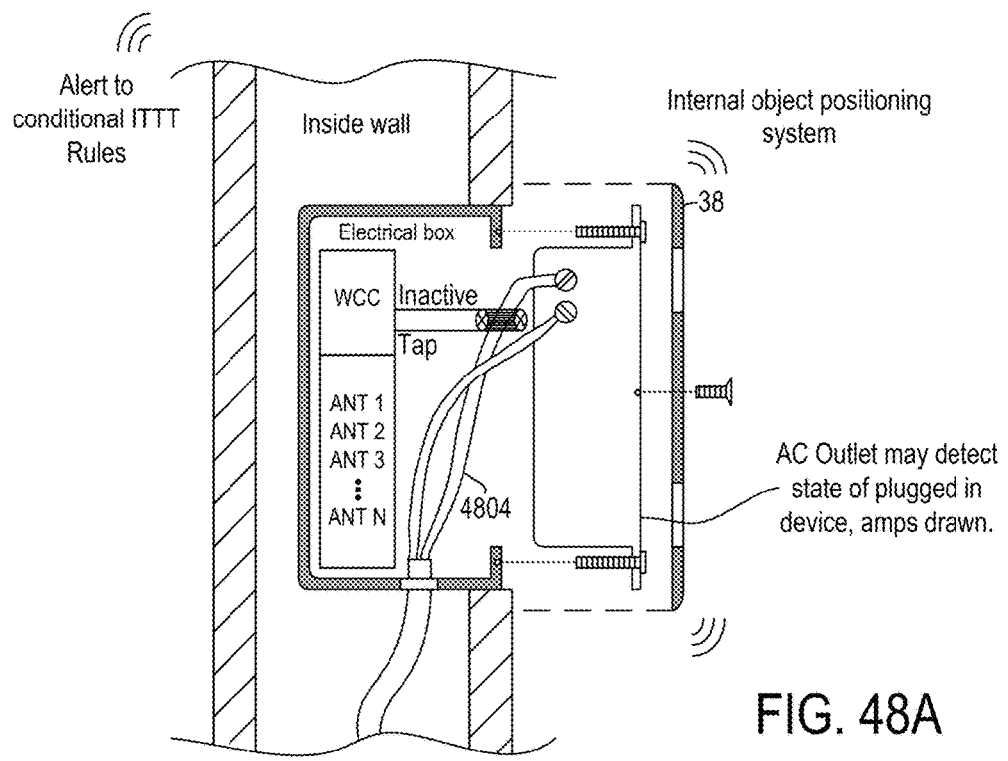
FIGS. 48A-48B illustrate examples of WCC devices in electrical boxes and WCC watches, in accordance with some embodiments.

FIG. 48A shows an example of such AC outlet. As shown, a live AC 4804 line is tapped (preferably) though an insulated wire to supply power for the WCC wireless logic. The logic provides support for signal processing and may provide additional support for all of the features already described in the AC outlet and AC power cord embodiments, and for clarity sake, such features, examples and alternatives methods for powering the device, status of the connected device, measuring current flow, etc. may be applied to the WCC configuration of FIG. 48 and also to similar alternative embodiments covered hereunder. Thus, for clarify sake, such details will not be repeated as it has already been taught in this application but hereafter applied to this AC outlet as a new form factor.

Figure 48B:
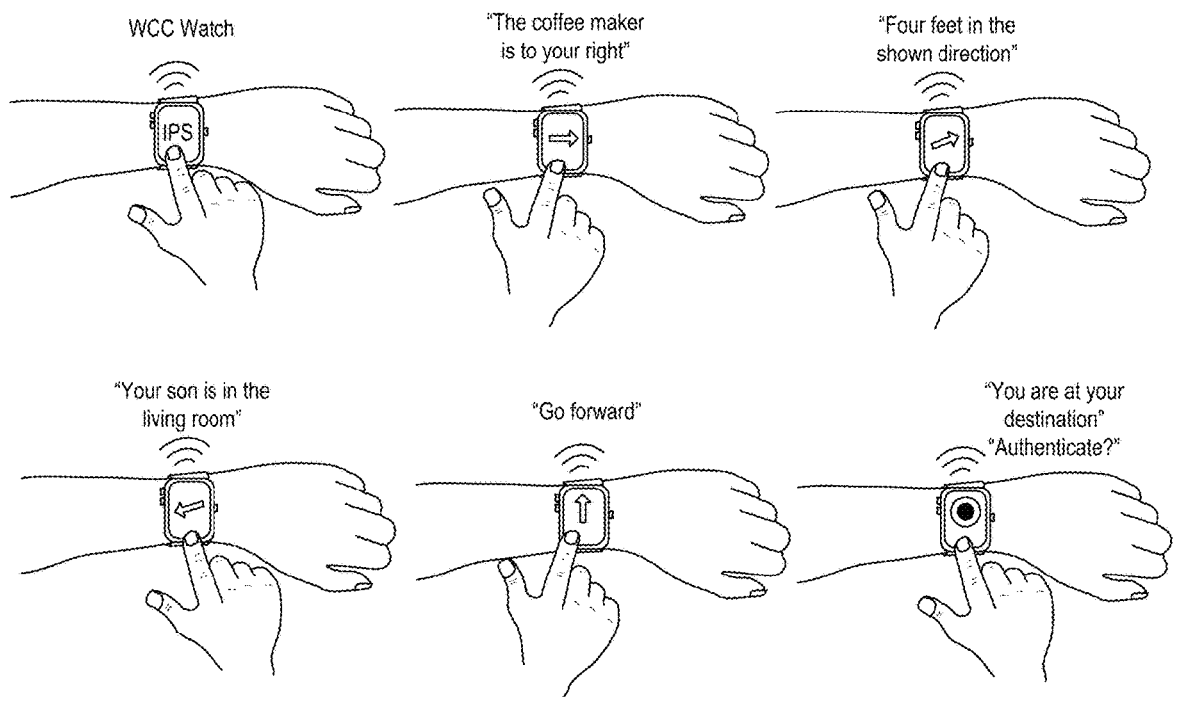

FIG. 48B shows a WCC watch construct in application showing the position guidance and honing to locate other devices and people, and proximity based authentication. In one embodiment, a WCC watch is configured with an e-ink display and uses Passive WIFI to sustain a data link to a hub, end node or network. The watch may be used to send text messages, receive email, make request to services, track status, etc.—most everything that you could do with an existing smart watch you could do with a WCC watch, except that a WCC watch is configured for wireless communication and provides for power harvesting and other features and functions described throughout this application.

Figure 49A:
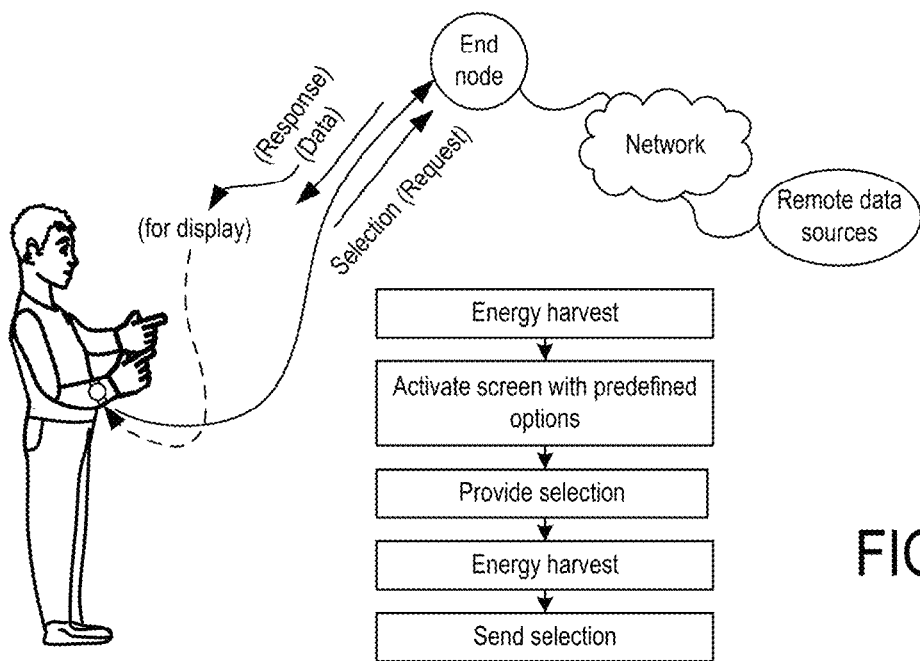
FIGS. 49A-49B illustrate examples of a WCC watch and use of the watch to instruct, command, obtain and interface with data wirelessly, in accordance with some embodiments.
Figure 49B:
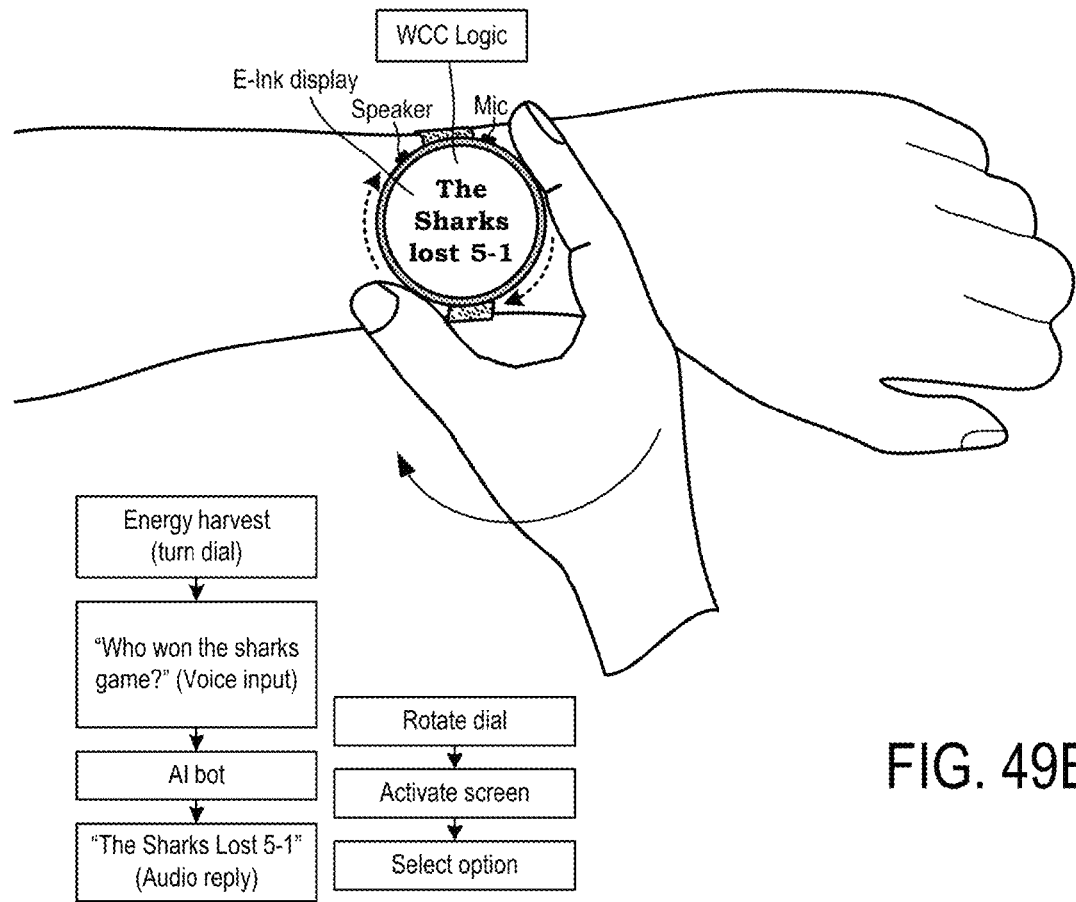

FIGS. 49A-49B provide an example of another WCC watch embodiment, where energy harvesting control knob that may be fit with the watch to enable harvesting of energy from navigation of the knob. In one embodiment, turning the dial on the control knob activates a screen with predefined options. A user may provide a selection, creating energy harvest through the selection and send the selection to an end node. The knob may be turned to result in energy harvesting to supply power to functions such as taking x seconds of microphone input, encoding and transmitting the speech payload to an end node (such as to family members to manage tasks, Google APIs and others including those that use natural language parsing and responses, AI bots, etc.).

The knob may be turned, spun, taped, pressed, pulled, etc., to cause energy harvesting to supply power to functions, such as receiving output payload and playing the output through a built in speaker. Details of such a tangible human interface knob was already discussed at length, including its uses a selector in various user interface example, so that is not repeated here other to say those features, alternatives, structures may apply to a watch form factor of FIG. 49B, or other form factors that can be worn. In some embodiments, a WCC device having similar functionality as WCC watch may simply be referred to as a WCC wearable or simply wearable device or IOT. These devices can be worn on any part of the human body or carried by a user. In some cases, device can be implanted in the human body. In other cases, devices can be integrated into clothing. The clothing may be, for example, pants, shirts, jackets, socks, shoes, scarfs, belts, clips, T-shirts, etc. In examples such as these, a WCC device can interact with such types of clothing items in various ways, whether connected by wires or wireless. In some configurations, the clothing may have conductive fabric that is sown in patterns to enable user interaction with the fabric, e.g., to communicate input, selection, sense data or generally provide an interface.

Continuing with the Examples of FIGS. 49A-49B, the WCC watch may be configured to operate completely battery-less without supplemental power source. However, as like many WCC devices, it may also operate with one or more power supplies. A battery may be used. Or, in one embodiment a self-winding-style energy harvester is used where the WCC watch harvests energy using a magnetic structure instead of the traditional weight used in such self-winding structures, and instead of the weight oscillating to put tension on the main spring, the magnet oscillates about coils, in which result in energy which is coupled through a bridge circuit to a storage to generate accumulating microvolts injections to the power storage during normal movement of the watch.

Figure 50:
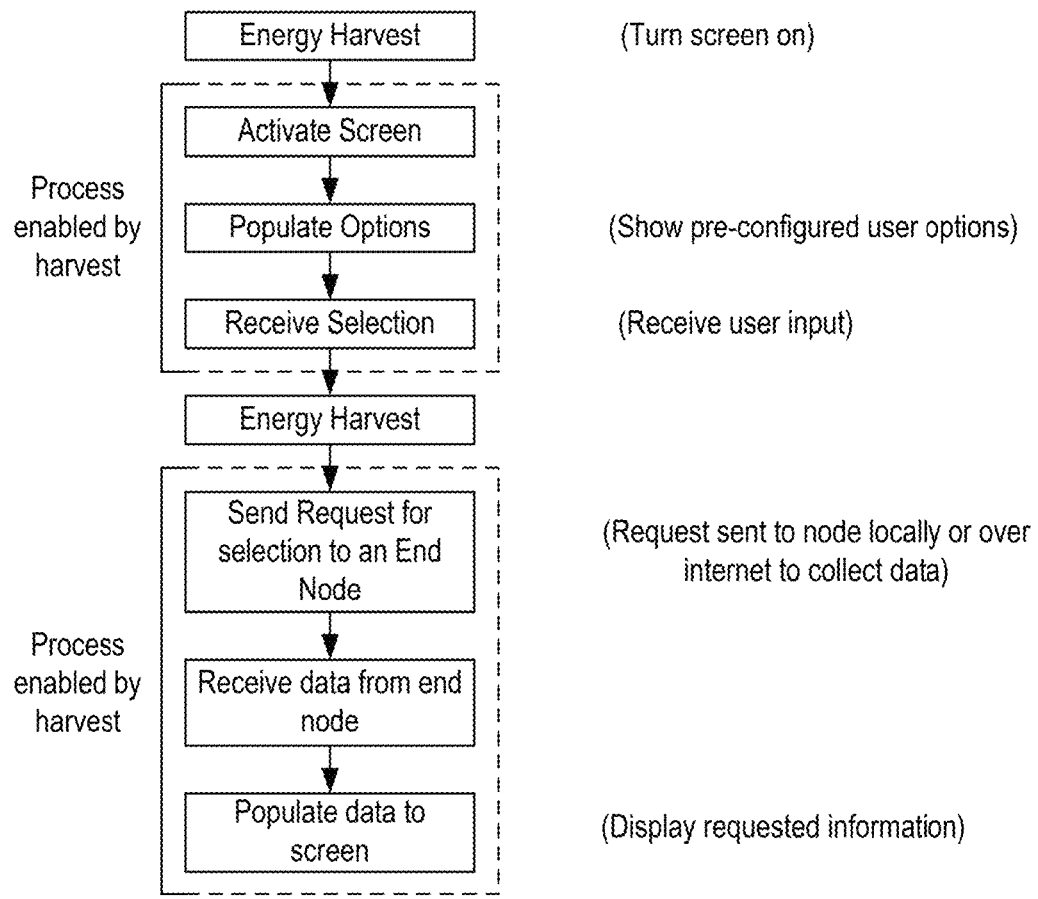
FIG. 50 illustrate examples of obtaining data and use of harvested power, in accordance with some embodiments.

FIG. 50 shows that multiple processes may be enabled by an energy harvest. In one configuration, options are filtered out the selection criteria unless a threshold of energy is already available. In some instances, as shown in FIG. 50, it may be required to perform actions in stages, where it is necessary to harvest between components of a user engagement, such steps may be split between taking and receiving an action and transmitting the action, and in cases additional harvest may be necessary to receive a response and populate data to the screen.

In one configuration the watch band is configured to act as a capacitive power storage. In another configuration the watch band is configured to act as a coil. In a third configuration the watch band forms both a capacitive storage and a coupling coil.

In some embodiments, it is desirable for the WCC watch to operate months to years on a single battery. The battery, if configured, may be rechargeable through coupling or direct contact with power supply. The battery, if configured, may also use one or more energy harvesting capabilities described herein, to maintain battery charge. By way of example, if the battery is rechargeable, the battery may be replenished with charge from time to time when the watch comes in proximity to charging sources. The charging sources, by way of example, may include wireless charging using any one of the technologies described throughout this application and materials incorporated by reference.

In yet another embodiment, the watch may operate in connection with external GPS or internal positioning systems, including those of the present disclosure which may be integrated into other WCC devices, including appliances, outlets and switches.

In some configurations, location-based services may perform dead-reckoning of a path of a user and prediction along with the knowledge of one or more tasks that the user is seeking to complete, where other devices may coordinate timing sequences previously described to ensure efficient use of time, for example, using one or more of recipes, event synchronization or DLC coordination.

If a WCC device is not configured with GPS, the WCC device may use a proxy device within proximity to the WCC and having known GPS coordinates to send, either on behalf of the WCC device without GPS capability, or to the WCC device, hub or end node, the GPS coordinates of the WCC device so that they may be integrated into services associated with the WCC or other device. GPS coordinates may be accompanied by an internal position coordinates or an offset, so network services can augment interactivity with location based services inside and outside of buildings. WCC devices can therefore be associated with tracked devices and piggyback location services from additional GPS capability.

For more information related to localization technologies, which may augment, complement or provide functionality to at least some aspects of WCC/IOT device location methods described herein, reference may be made to any one of the following papers, which are incorporated by reference: (1)

Decimeter-Level Localization with a Single WiFi Access Point, by Deepak Vasisht, MIT CSAIL; Swarun Kumar, Carnegie Mellon University; Dina Katabi, MIT CSAIL (2016); (2) SpotFi: Decimeter Level Localization Using WiFi by Manikanta Kotaru, et al., Stanford University, (2015); (3) Accurate Indoor Localization with Zero Start-up Cost, by Swarun Kumar et al. Massachusetts Institute of Technology (2014); (4) ArrayTrack: A Fine-Grained Indoor Location System by Jie Xiong and Kyle Jamieson, University College London (2013); (5) Phaser: Enabling Phased Array Signal Processing on Commodity WiFi Access Points by Jon Gjengset et al., Department of Computer Science, University College London (2014).

As previously described herein a thicket of solutions are demonstrated for novel inter-device connectivity, device provisioning mechanisms to easily on-board and off-board devices, ways to establish secure operation, passive, battery-less operation, energy harvesting, tracking, novel applications, a device management ecosystem that fits to complement and overlap the evolution of services and products from the likes of quality providers of tomorrow's IOT infrastructure, including Google Inc., Apple Inc., Microsoft Inc. and Amazon Inc., and more.

However, it should be clear the many examples in the disclosure can enable even simple tasks such as maintain a common, synchronized wake-up and sleep cadence among devices, battery-less devices with buttons that can select options and display results from the Internet, enable modes such as continuous discovery in an ultra-low, passive, battery-less manner, provide hybrid energy harvesting combining RF energy harvesting with additional trigger-based energy harvesting to create passive battery less devices that can always maintain connectivity with the network but also perform additional tasks that would not be possible using RF energy harvesting alone, such as taking photos, videos, taking microphone input, producing display output, producing sound output, processing input mic through cloud AI (e.g., artificial intelligence, deep learning, machine learning, etc.) and natural language processing to receive auto output responses, some of which may be enabled in wearable devices, computer terminals, key-fobs etc., that can operate with or without batteries.

The power sources and supply that are described herein are examples and should not be limited to the choice of sub types or materials used. Commonly known types of power and the materials and constructs that one skilled in the art would be capable of assembling in light of these teachings may also fit into and still reserve the inventive aspects of the present disclosure. For instance, a WCC mechanical trigger or pump can use any material capable of producing power when manipulated. Or further yet, any mechanical trigger or pump may manipulate an industrial design to read or produce electrostatic induction, magnetic induction, thermal induction, photovoltaic, chemical induction, or any of the power supply sources presented in the disclosure. The security trust channel can be formed in part of the network service outside the LAN or be contained locally within a LAN to facilitate the relay of authentication requests and includes one or more devices that act to facilitate the authentication processes. In certain circumstances, the term WCC may also be meant to mean IOT or a DLC device.

Any previous examples and description, including but not limited to switches, selectors, light switches, door hinges, terminals, arrayed retail product dispensers, tools, etc. that have not been expressly stated to be operable using wireless capability of type Passive Wi-Fi or of type backscatter RF operation, may use Passive Wi-Fi or backscatter RF operation, in whole and in part, optionally, and use the RF energy to read a sensor payload value into WCC logic (i.e. the state of a switch, door, contact, dimmer, state of a knob, potentiometer, and ones that do not require significant power) as well as to synthesize WIFI packet transmission containing the payload.

While Passive WIFI is used in many places through the specification and reference made to 802.11B, it should be understood that any suitable alternative passive wireless scheme that achieves in principal the outcome of Passive WIFI, whether such outcome achieves a result of synthesizing packets on 802.11B channel, on multiple channels, or on an entirely different part of the spectrum shall fall within the scope of this disclosure as may be used by WCC. Similarly, any wireless communication technique that may involve multiple field emitters or encodings on the field, or boundary detection between fields, may also apply to this scope of disclosure and may be used within the WCC devices and methods.

The power tool and accessory tracking, safety, and other examples may use inductive WCC energy harvesting where the WCC is coupled within proximity to an AC source within the device, such that the WCC can receive energy for operation from the AC source. The AC source may be tracked to determine the absence or presence of the AC source. Upon detection of a change in status of absence or presence of an AC source, the WCC may change a cycle of its operation, or flow control to a different function, cycle, or routine, etc.

As used herein, the term chip may include or be precisely, in whole or part, a circuit. The circuit can be defined by any number of technologies, including semiconductor technologies, nano-technologies, biotechnologies, material technologies, etc.

A WCC may incorporate and operate with several known sensors to derive harvest energy or sense state, including but not limited to sensors including those that include IMU, magnetometer, ultrasonic transducer, photodetector, PIR or other motion detector, pressure sensor, accelerometer, vibrator, transducer, acoustic, ultrasonic, inertial, chemical/gas, force, leak/level, machine vision, optical, motion, velocity, displacement, position, presence, proximity, pressure, temperature, voltage, current, capacitance, inductance and impedance.

While it has been shown that the present disclosure may utilize an WCC or IOT device capable of harvesting wireless power that is transmitted from a transmitter, it should be understood that such transmission may be indirectly harvested from transmission sources not intended for the harvesting IOT or WCC device or direct from a device that is transmitting for the purpose of directing power to another IOT or WCC device or devices. Such transmission sources may take on a variety of wave shaping to generate an oscillating magnetic field, e.g., a DC power source is converted into high frequency AC and coupled into a coil in the transmitter to generate a purposeful magnetic field for reception by a receiver coil, as is known, will induce an AC current in the receiving coil which may be rectified back to DC in the receiving IOT or WCC.

The term "coil" may be used with or without reference to a core and it should be understood to one skilled in the art could tune performance in some examples with variations to the placement and configuration of such coils and although specific examples are provided it is clear other alternative choices might be possible to optimize the drive or sense operation as it pertains to coupling, choice of material, placement and configuration for any desired application.

The embodiments can be practiced without one or more of the specific details, or with other methods, components, materials, etc. In other instances, well-known structures or operations may not be shown or described in detail to avoid obscuring aspects of the embodiments.

It should also be understood that the present application provides disclosure related to harvesting energy from a variety of sources and such sources should not exclude those expressly meant to purposely wirelessly transmit energy to a WCC or other device, including where such transmissions are triggered upon detecting a proximity to the transmitter, and where such transmitters are integrated into ready sources of power, including AC light switches and power outlets, including transmitters meant for powering WCC devices and where WCC devices are configured to receive and harvest such energy to power a cycle of operation.

The disclosure contains many inventive constructs and it should be understood that several of these constructs, methods, and features may operate without WCC device present but simply on a network service, operating system, tablet, personal computer or mobile phone. Reference throughout this specification to "one embodiment" or "an embodiment" or similar means that a particular feature, structure or characteristic described in connection with the embodiment is included in at least one embodiment. Thus, the appearances of the phrases "in one embodiment" or "in an embodiment" or similar may not necessarily be referring to the same embodiment.

As noted above, the WCC devices that harvest energy can use various types of circuits. Although simple circuits have been illustrated with reference to FIGS. 1A and 1B, it should be understood that various other circuit conventions, architectures, and devices can be utilized to optimize the power harvesting, capacitive savings, storage cells, chemical battery cells, or other glue logic associated there with. In some embodiments, circuitry can run in open or closed loop, include capacitors, inductors, resistors, tunable components, and other types of circuitry that enables for more to mine of the power harvesting based on the type of input provided to the WCC device.

For more information regarding power harvesting devices, and optimization processes used to optimize the power harvesting operations and utilization of power, reference may be made to the following articles, which are incorporated by reference herein. One such article is entitled "*A Rectifier-Free Piezoelectric Energy Harvester Circuit,*" by Dongwon Kwon et al., of Georga Tech Analog, Power and Energy Research. Another article is entitled "*Bias-Flip Technique for Frequency Tuning of Piezo-Electric Energy Harvesting Devices*", by Jianying Zhao, et al. published in the Journal of Lower Power Electronics and Applications 2013, 3, 194-214. Again, these articles are incorporated by reference for all purposes. However, it should be understood that the description provided in these articles should not be limiting to any other permutation, modification, optimization, or changes described in the various implementations disclosing this patent application. However, any number of the techniques described herein associated with power harvesting can be integrated into any one of the various implementation examples provided in the description of this application. In some embodiments, some features described above may be omitted, and some may be replaced by features described in the articles that are incorporated by reference. The specific features modified, adjusted, combined, will depend on the specific implementations, which are considered to be part of the described embodiments and implementations covered and envisioned by those skilled in the art after reading the detailed description and full disclosure associated with this filing.

In some embodiments, in addition to a full wave rectifier circuit (e.g., with four diodes), it is also possible for a WCC device to include a resonant tank circuit. A resonant tank circuit coupled to a piezo may maximize capture of energy at the resonant frequency of the tank circuit. In this configuration, if the resonant frequency of the tank circuit coupled to the piezo is matched to the resonant frequency of the vibration chamber or the resonant frequency of the piezo itself, then additional operating efficiency are obtained. These efficiencies in power harvesting enable the WCC device to perform more execution of instructions and send more data or receive more data via a wireless chip of the WCC device.

It will be obvious, however, to one skilled in the art, that the present disclosure may be practiced without some or all of these specific details. In other instances, well known process operations have not been described in detail in order not to unnecessarily obscure the present disclosure. Further, it should be understood that several embodiments have been described in relation to specific feature implementations or combinations. However, it is the intent that multiple combinations, permutations or recombination are possible to define additional specific example implementations using some or all of the features associated with one or more of the example embodiments. The figures have been provided to illustrate specific example uses, circuits, communication, logic, circuits, mechanical features, power supplies, power pumps, energy harvesting, buttons, housings, shapes, integration with other physical objects.

However, it should be understood that individual features used to define those specific examples may be recombined to define other examples. For instance, some devices may use energy harvesting and can provide for communication via wireless chips and processing via specialized microcontrollers or general controllers. The energy harvesting feature, however, may be replaced with a standard power supply, e.g., such as a battery, or power provided from an outlet, or power provided from a motor of a device, or power stored for transitory periods of time (e.g., storage capacitors), and the like. As such, it should be understood that the WCC devices described herein are not limited to energy harvesting models, e.g., those having a power pump, but are equally usable with standard power storing cells, e.g., such as batteries. In some cases, the batteries are rechargeable. The rechargeable batteries may be charged using a standard power outlet or may be charged from a solar cell or may be charged by harvesting RF power wirelessly.

With the above in mind, it should further be understood that the method operations and processes executed with, in connection with, or on a WCC device can produce data. The data, in one embodiment can be stored to storage of the WCC device or a device interfaces with the WCC device locally. In other embodiments, the WCC device will include a wireless communication device that is configured to transfer the data wirelessly to a processing node. The data transferred, in one embodiment, is pre-processed by logic of the WCC device. In other embodiments, the data is raw data that is transferred to the end node for further processing. As noted above, the end node may be a server or some other device that has processing power to execute instructions. The instructions can be predefined, such that the end node knows what to do with the data. The data can, in one configuration, simply be saved to a database or file. In other embodiments, the data is communicated to some other device. In still other embodiments, the data is processed, e.g., such as to run analytics and data metrics analysis. The data metrics can be published or saved to a website or server. The data can then be accessed by any device having a network connection, e.g., provided the device has access or is granted access via a user account or the like.

Broadly speaking, example types of wireless networks usable by WCC devices is extensive, so long as signal data can be wirelessly transmitted initially without a wire or in a phantom pseudo capacity as previously discussed. Once payload or wireless data is sent to a node, the node may be wired or not. For instance, the WCC device can communicate wirelessly to a Wi-Fi Router, which is connected by wire to a router. In some embodiments, the WCC device can communicate wirelessly to one or more nodes until the signal reaches the end node. The end node may be part of a network or connected to the network. In one embodiment, the end node may be a server, a computer, a mobile device, a data center, chord overlay network, a server cluster, a processing machine, a virtual machine, or some other logic that can process the data output by the WCC device.

In some embodiments, the network maybe part of the Internet or can communicate with the Internet. In further embodiments, users of devices, e.g., computers, tablets, phones, watches, desktops, terminals, etc., can log into a server or end node, and request to view, access, interface with, change, modify, or respond to data collected from the transmitting WCC devices. In the various embodiments, WCC devices can be owned by users with specific user accounts. The users can own one or more WCC devices and the data from each can be accessed. In further embodiments, one owner with a single user account can assign multiple WCC devices to multiple people or assign them to multiple physical objects. The data received from the users can then be saved, compared, processed, and generated to produce metric data from the multiple WCC devices.

The following are some examples, without limitation to other wired or wireless networks (both of which may be used for parts of the communication between the WCC device and an end node). The following examples relate to example networks and/or protocols usable by WCC devices for at least part of a communication path to an end node or multiple end nodes. For instance, a WCC device may be designed to communicate its data, state, change in state, information, message or generally data information with multiple end nodes.

Some examples of wireless connections or networks include, for example, microwave communication networks, satellite communication networks, cellular communication networks, radio communication networks, frequency hopping networks, spread spectrum networks, 900 MHz, 2.4 GHz, wireless personal area networks (WPAN), Bluetooth links or networks, Bluetooth low energy (LE) links or networks, Wi-Fi-Aware networks, infrared networks, Zig-Bee networks, near field communication (NFC) links or networks, Wi-Fi PAN networks, Wi-Fi links or networks, Wireless LAN networks, wireless mesh networks (e.g., with node repeating/forwarding/routing), wireless metropolitan area networks, WiMAX networks, Cellular based networks (e.g., that utilize cell towers and base stations and cell sites), global system for mobile communication (GSM) networks, personal communication service (PCS) networks, global area networks (GAN), space networks, wireless access points for network connections, wireless ad hoc networks (WANET), peer-to-peer networks, Wi-Fi Array networks, Wi-Fi direct networks, smart phone Ad hoc networks (SPANs), Internet based mobile ad hoc networks (iMANETs).

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above embodiments in mind, it should be understood that the disclosure could employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. The apparatus may be housed with insulated housing to limit the volume of sound that may occur in some embodiments during an activation cycle. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the appended claims.

What is claimed is:

1. A device, comprising,
persistent memory,
a microcontroller; and
a power source configured to generate power in response to ambient energy received at a first frequency during a cycle of energy harvesting, the power being transferred to a power storage cell such that when the power storage cell has an amount of power the microcontroller performs processing a part of a task, wherein the microcontroller selects and runs code routines based on the amount of power and stores associated state data for the part of the task into the persistent memory,
wherein during one or more additional cycles of energy harvesting, using the generated power meeting at least the amount of power to retrieve the state data for the part of the task from persistent memory to continue performance of the task, the continued performance by the microprocessor includes causing assembly of a payload for wireless transmission of the payload over a second frequency.

2. The device of claim 1, wherein the power source is configured to generate power in response to ambient energy that is received at more than one frequency, wherein power source, in addition to generating power in response to ambient energy received at a first frequency, also generates power in response to ambient energy received at a third frequency.

3. The device of claim 1, further including an input, wherein the microcontroller processes the input and selects and runs code routines based on both a state of the input and the power available during each cycle of energy harvesting.

4. The device of claim 1, further including a flat antenna, wherein the power source includes a bridge circuit coupled thereto, wherein the device performing at least one pre-determined function and the microcontroller performing operations of the pre-determined function or another function that are particularly selected based on the amount of power available during an activation cycle.

5. The device of claim 1, wherein the device receives wireless communication signals, and the microcontroller additionally selects and runs code routines based on the communication signals.

6. The device of claim 5, wherein the wireless transmission of the payload generated is generated in response to one or more of the wireless communication signals received by the device, wherein the payload is configured to be received by an end node for processing.

7. The device of claim 5, further including an input, wherein the wireless transmission of the payload generated is generated in response to the input and to one or more of the wireless communication signals received by the device, wherein the payload is configured to be received by an end node for processing.

8. The device of claim 1, wherein the persistent memory is RAM or non-volatile RAM.

9. The device of claim 1, further comprising,
an input;
wherein the input is coupled to a sensor, and said sensor is configured to produce sensor data that is used in said processing.

10. The device of claim 1, further comprising,
an input
wherein the input is coupled to a microphone used to receive a voice command, and data for the voice command is sent in the payload.

11. The device of claim 1, further comprising,
a camera, wherein the payload relating to an output of the camera.

12. The device of claim 1, wherein the ambient energy is backscattered from one or more radio frequency emitting devices local to the device or wherein the ambient energy includes two or more sources of radio frequency that are local or remote to the device.

13. The device of claim 1, wherein the ambient energy is RF energy and wherein the processing relates to a product, or is related to any command, or is related to an inquiry, or is related to a request, or is related to information sent to the internet, or is related to information received from the internet, or is related to a request for information from a service, or is related to a device, or is related to an item, or is related to user interaction, or is related to a service, or is related to a person, or is related to a status.

14. The device of claim 1, further comprising,
an input, wherein the input is configured to be related to an output of a microphone, or the input is configured to be related to an output of a camera, or the input is configured to be related to a button, or the input is configured to be related to a switch, or the input is configured to be related to a touch sensor, or the input is configured to be related to the output of a sensor, or the input is configured to relate to detected user interaction with an item, or the input facilitates or is related to a process of two factor authentication, or the input is configured to be a timed input, or the input is caused by an incidental trigger, or the input is caused by a direct trigger, or the input relates to an authentication challenge, or the input relates to an authentication response, or the input relates to processing a nuance in connection with an authentication event.

15. The device of claim 1, further including one or more flat antennas.

16. The device of claim 1, further comprising,
an input, wherein the input is associated with a camera for capturing one or more images and the device performs authentication using the one or more images, or the device assists in performing monitoring of items that are moved, released, interfaced with, or touched.

17. The device of claim 1, further comprising,
an input, wherein the input is associated to an identity of a person, the processing is related to the identity of the person, and the payload is related to identify of the person.

18. The device of claim 1, further comprising,
an input, wherein the input is coupled to a sensor that produces sensor data, and wherein the processing includes handling the sensor data to produce the payload.

19. The device of claim 16, further including an input that is associated with a sensor that is one of a temperature sensor, a weight sensor, a pressure sensor, a resistance sensor, a capacitance sensor, and inductance sensor, an impedance sensor, a camera sensor, a motion sensor, sound sensor, or a combination of two or more thereof.

20. The device of claim 1, wherein the second frequency is one of a radio frequency, a Bluetooth frequency, or a Wifi frequency, or Bluetooth Low Energy (BLE).

21. The device of claim 1, wherein the second frequency is formatted based on a Bluetooth channel.

22. The device of claim 1, wherein the device is implanted into a human body, or integrated into clothing, or integrated into a tool, or integrated into luggage, or integrated into a key fob, or associated with a retail shelf, or associated with a container, or associated with a monitoring device.

23. The device of claim 1, wherein the device includes an input, and wherein the device is activated for the processing responsive to a trigger of the input.

24. The device of claim 1, wherein the device includes a capacitor for storage of power and persistent memory for storing data during one or more phases of the processing used to form or assemble the payload to be transmitted.

25. The device of claim 1, further comprising an input that is coupled to a sensor, the sensor is configured to sense information that includes or relates to temperature, or weight, or pressure, or touch, or gesture, or a user, or an identity of a person, or an identification of an object, or an identification of a device, or voltage, or current, or resistance, or capacitance, or impedance, or a biological fluid, or blood, or glucose, or serum, or urine, or gastric fluid, or digestive juices, or tears, or saliva, or stool, or semen, or interstitial fluids derived from tumorous tissues, or a frequency, or a URL, or an IP address, or proximity, or a person, or an image, or a sound, or an electromagnetic field, or an access credential, or a password, a decryption key, or private or public key, or a certificate, or a nuance, or a value, or a threshold, or motion, or appliance state, or package state, or container state, or clothing state, or wearable device state, or moving objects, or stationary objects, or store shelf items, or a medicine delivery device, or a pick up sensing device, or a power tool.

26. The device of claim 1, wherein the device includes an E-ink display.

27. The device of claim 26, wherein the device includes a weight sensor confiaured to measure weiaht associated with items offered for sale in a retail store.

28. The device of claim 26, wherein contents provided via the E-ink display is related in part to the payload or is related in part to a sensed value or to a price of an item for sale.

29. The device of claim 1, wherein the device is implanted into a living body to monitor a state associated with the living body.

30. The device of claim 29, wherein the device is further configured to deliver a drug into the living body.

31. The device of claim 30, wherein based on results of the monitored state the device delivers a selected amount of medicine into the living body.

* * * * *